(12) United States Patent
Hicks et al.

(10) Patent No.: US 12,528,786 B2
(45) Date of Patent: Jan. 20, 2026

(54) PLASMA KALLIKREIN INHIBITORS

(71) Applicant: Merck Sharp & Dohme LLC, Rahway, NJ (US)

(72) Inventors: Jacqueline D. Hicks, Watchung, NJ (US); Rongze Kuang, Green Brook, NJ (US); Christopher J. Sinz, Walnut Creek, CA (US); Matthew J. Lombardo, Flemington, NJ (US); Jovan Alexander Lopez, New Haven, CT (US); Rohan Rajiv Merchant, Burlingame, CA (US); Phillip Patrick Sharp, San Francisco, CA (US); Zhicai Wu, Montvale, NJ (US); Zhiqiang Zhao, Little Neck, NY (US); Alan C. Cheng, San Francisco, CA (US); Song Yang, San Francisco, CA (US); Jianming Bao, Princeton, NJ (US); Maoqun Tian, Forster, CA (US); Galen Paul Shearn-Nance, Tiburon, CA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 485 days.

(21) Appl. No.: 18/014,787

(22) PCT Filed: Jul. 6, 2021

(86) PCT No.: PCT/US2021/040420
§ 371 (c)(1),
(2) Date: Jan. 6, 2023

(87) PCT Pub. No.: WO2022/010828
PCT Pub. Date: Jan. 13, 2022

(65) Prior Publication Data
US 2023/0348428 A1    Nov. 2, 2023

Related U.S. Application Data

(60) Provisional application No. 63/050,220, filed on Jul. 10, 2020.

(51) Int. Cl.
| | | |
|---|---|---|
| C07D 401/14 | (2006.01) |
| A61K 45/06 | (2006.01) |
| A61P 27/02 | (2006.01) |
| A61P 35/00 | (2006.01) |
| C07D 403/14 | (2006.01) |
| C07D 413/14 | (2006.01) |

(52) U.S. Cl.
CPC ............ C07D 401/14 (2013.01); A61K 45/06 (2013.01); A61P 27/02 (2018.01); A61P 35/00 (2018.01); C07D 403/14 (2013.01); C07D 413/14 (2013.01); C07B 2200/05 (2013.01)

(58) Field of Classification Search
None
See application file for complete search history.

(56) References Cited

U.S. PATENT DOCUMENTS

| | | |
|---|---|---|
| 10,329,260 B2 | 6/2019 | Kotian et al. |
| 2012/0035168 A1 | 2/2012 | Brandl et al. |
| 2018/0305339 A1 | 10/2018 | Frattini et al. |
| 2018/0319771 A1 | 11/2018 | Frattini et al. |
| 2019/0263783 A1 | 8/2019 | Mcdonald et al. |

FOREIGN PATENT DOCUMENTS

| | | |
|---|---|---|
| CN | 102762203 A | 10/2012 |
| CN | 106257976 A | 12/2016 |
| CN | 107072985 A | 8/2017 |
| CN | 108430471 A | 8/2018 |
| JP | 2023531411 A | 7/2023 |
| RU | 2660421 C2 | 7/2018 |
| RU | 2707870 C2 | 12/2019 |
| RU | 2712621 C2 | 1/2020 |

(Continued)

OTHER PUBLICATIONS

Chou, Ting-Chao et al., Quantitative Analysis of Dose-Effect Relationships: The Combined Effects of Multiple Drugs or Enzyme Inhibitors, Adv. Enzyme Regul., 1984, 27-55, 22.

(Continued)

*Primary Examiner* — Sarah Pihonak
*Assistant Examiner* — Donna M Nestor
(74) *Attorney, Agent, or Firm* — Daniel Woods; John C. Todaro

(57) ABSTRACT

The present invention provides a compound of Formula I

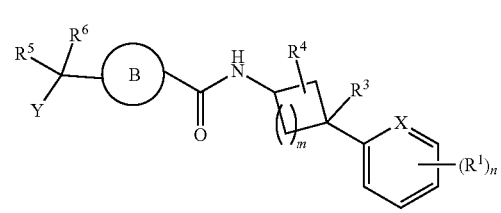

and pharmaceutical compositions comprising one or more said compounds, and methods for using said compounds for treating or preventing one or more disease states that could benefit from inhibition of plasma kallikrein, including hereditary angioedema, uveitis, posterior uveitis, wet age related macular edema, diabetic macular edema, diabetic retinopathy and retinal vein occlusion. The compounds are selective inhibitors of plasma kallikrein.

16 Claims, No Drawings

(56) References Cited

FOREIGN PATENT DOCUMENTS

| | | | |
|---|---|---|---|
| WO | 2011075684 A1 | 6/2011 |
| WO | 2012017020 A1 | 2/2012 |
| WO | 2014108679 A1 | 7/2014 |
| WO | 2014188211 A1 | 11/2014 |
| WO | 2016011209 A1 | 1/2016 |
| WO | 2016083820 A1 | 6/2016 |
| WO | 2017001926 A2 | 1/2017 |
| WO | 2017072020 A1 | 5/2017 |
| WO | 2017072021 A1 | 5/2017 |
| WO | 2017074832 A1 | 5/2017 |
| WO | 2019106375 A1 | 6/2019 |
| WO | 2020035540 A1 | 2/2020 |
| WO | 2021257353 A1 | 12/2021 |

OTHER PUBLICATIONS

Clermont, Allen et al., Plasma Kallikrein Mediates Retinal Vascular Dysfunction and Induces Retinal Thickening in Diabetic Rats, Diabetes, 2011, 1590-1598, 60.

Colman, Robert W., Contact Activation Pathway: Inflammatory, Fibrinolytic, Anticoagulant, Antiadhesive, and Antiangiogenic Activities, Hemostasis and Thrombosis, 2001, 103-121, Chapter 6.

Daiss, Jurgen, O. et al., Sila-venlafaxine, a Sila-Analogue of the Serotonin/Noradrenaline Reuptake Inhibitor Venlafaxine: Synthesis, Crystal Structure Analysis, and Pharmacological Characterization, Organometallics, 2006, pp. 1188-1198, vol. 25.

PubChem-SID-116114044, Modify Date: Mar. 29, 2011 (Mar. 29, 2011), especially: p. 2, figure, this is a purchasable chemical, 5 pages.

Schmaier, Alvin H., Contact Activation, Thrombosis and Hemorrhage, 1998, 105-127, Chapter 5.

Schneider, Lynda et al., Critical role of kallikrein in hereditary angioedema pathogenesis: A clinical trial of ecallantide, a novel kallikrein inhibitor, J Allergy Clin Immunol, 2007, 416-422, 120(2).

Showell, Graham, A. et al., (R)-Sila-venlafaxine: A selective noradrenaline reuptake inhibitor for the treatment of emesis, Bioorganic & Medicinal Chemistry Letters, 2006, pp. 2555-2558, vol. 16.

Belikov, V.G., Pharmaceutical Chemistry, Moscow MEDpress-inform, 4th Edition, 27-29, 2007.

Chou, Ting-Chao, Drug Combination Studies and Their Synergy Quantification Using the Chou-Talalay Method, Cancer Res, 70(2), 440-446, 2010.

Dyson, G. and May, P., Chemistry of Synthetic Medicinal Substances, M: World, N/A, 12-19, 1964.

Kharkevich D.A., Pharmacology, M.: GEOTAR-Media, 10th Ed.. corrected, revised & supplemented, 72-82, 2010.

Kholodov, L.E. et al., Clinical Pharmacokinetics, Moscow, Medicine, N/A, 83-98, 134-138, 160, 378-380, 1985.

Kummerer, K., Pharmaceuticals in the environment, Annual Review of Environment and Resources, 35, 57-75, 2010.

M.D. Mashkovsky, Medicinal Products, Manual for Doctors, Moscow, 15th Edition, 10-11, 2005.

Minronov, Manual for Preclinical Studies of Medications, Moscow: Grif and K, Part 1, 363-434, 478-485, 640-654, 670-684, 818-826, 2012.

Sergeev, P.V., Brief Course in Molecular Pharmacology, Moscow, N/A, 10, 1975.

Sergeeva, P.V. (Sergeev, P.V.), A short course in molecular pharmacology, MOCKBA, N/A, 10, 1975.

PLASMA KALLIKREIN INHIBITORS

CROSS-REFERENCE TO RELATED APPLICATIONS

This application is a National Stage application of International Patent Application No. PCT/US2021/040420, filed Jul. 6, 2021, which claims the benefit of priority to U.S. Provisional Patent Application No. 63/050,220, filed Jul. 10, 2020.

BACKGROUND OF THE INVENTION

Plasma kallikrein is a zymogen of a trypsin-like serine protease and is present in plasma. The gene structure is similar to that of factor XI. Overall, the amino acid sequence of plasma kallikrein has 58% homology to factor XI. Proteolyticactivation by factor XIIa at an internal I 389-R390 bond yields a heavy chain (371 amino acids) and a light chain (248 amino acids). The active site of plasma kallikrein is contained in the light chain. The light chain of plasma kallikrein reacts with protease inhibitors, including alpha 2 macroglobulin and C1-inhibitor. Interestingly, heparin significantly accelerates the inhibition of plasma kallikrein by antithrombin III in the presence of high molecular weight kininogen (HMWK). In blood, the majority of plasma kallikrein circulates in complex with HMWK. Plasma kallikrein cleaves HMWK to liberate bradykinin. Bradykinin release results in increase of vascular permeability and vasodilation (for review, Coleman, R., "Contact Activation Pathway", Hemostasis and Thrombosis, pp. 103-122, Lippincott Williams & Wilkins (2001); Schmaier A. H., "Contact Activation", Thrombosis and Hemorrhage, pp. 105-128 (1998)).

Patients presenting genetic deficiency on C1-esterase inhibitor suffer from hereditary angioedema (HAE), a lifelong disease that results in intermittent swelling throughout the body, including the hands, feet, face, throat, genitals and gastrointestinal tract. Analysis of blisters arising from acute episodes have been shown to contain high levels of plasma kallikrein, and treatment with a protein-based reversible plasma kallikrein inhibitor, Ecallantide (Kalbitor), has been approved by the FDA for the treatment of acute attacks of HAE (Schneider, L, et al., J. Allergy Clin. Immunol., 120: p. 416 (2007)).

Additionally, the plasma kallikrein-kinin system is abnormally abundant in patients diagnosed with advanced diabetic macular edema (DME). Recent publications have shown that plasma kallikrein contributes to observed retinal vascular leakage and dysfunction in diabetic rodent models (A. Clermont, et al., Diabetes, 60:1590 (2011)), and that treatment with a small molecule plasma kallikrein inhibitor ameliorated the observed retinal vascular permeability and other abnormalities related to retinal blood flow.

It would be desirable in the art to develop plasma kallikrein inhibitors having utility to treat a wide range of disorders, including hereditary angioedema, diabetic macular edema and diabetic retinopathy.

SUMMARY OF THE INVENTION

The present invention relates to compounds of Formula I:

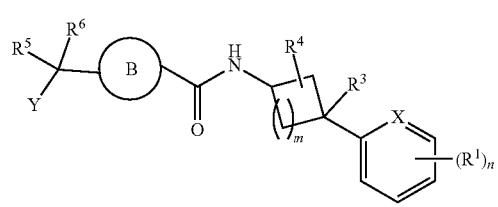

and pharmaceutically acceptable salts thereof. The compounds of Formula I are inhibitors of plasma kallikrein, and as such may be useful in the treatment, inhibition or amelioration of one or more disease states that could benefit from inhibition of plasma kallikrein, including hereditary angioedema, uveitis, posterior uveitis, wet age related macular edema, diabetic macular edema, diabetic retinopathy and retinal vein occlusion. The compounds of this invention could further be used in combination with other therapeutically effective agents, including but not limited to, other drugs useful for the treatment of hereditary angioedema, uveitis, posterior uveitis, wet age related macular edema, diabetic macular edema, diabetic retinopathy and retinal vein occlusion. The invention furthermore relates to processes for preparing compounds of Formula I, and pharmaceutical compositions which comprise compounds of Formula I and pharmaceutically acceptable salts thereof.

DETAILED DESCRIPTION OF THE INVENTION

The present invention relates to compounds of Formula I:

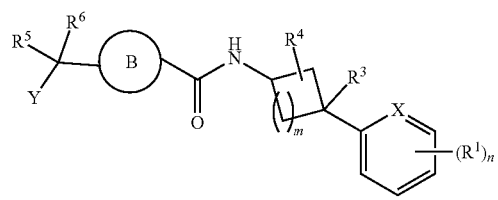

wherein X is $CR^2$ or N;
Y is

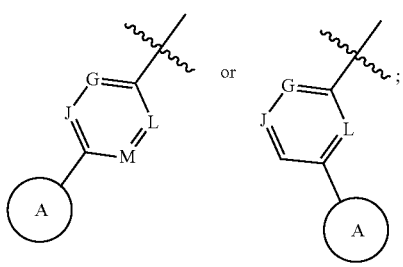

wherein

is selected from

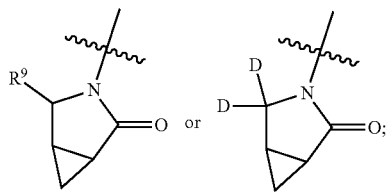

is a 5 membered heteroaryl ring which is optionally substituted with one or two substituents independently selected from the group consisting of halo, cyano, $R^x$ and $OR^x$;

G is N or $CR^7$;
J is N or $CR^8$;
L is N or $CR^7$;
M is absent, N or $CR^8$;
each $R^1$ is independently selected from the group consisting of halo, cyano, $R^x$ and $OR^x$;
$R^2$ is hydrogen, halo, cyano, $R^x$, $OR^x$, $CONH_2$ or heteroaryl, wherein said heteroaryl is optionally substituted with halo;
$R^3$ is hydrogen, deuterium, halo or methyl;
$R^4$ is hydrogen, deuterium, halo, hydroxyl or methyl;
or $R^3$ and $R^4$ can be taken with the carbon atoms between them to form a $C_{3-6}$ membered cycloalkyl group;
$R^5$ is hydrogen or $C_{1-3}$ alkyl, which is optionally substituted with one to three substituents selected from the group consisting of halo and hydroxyl;
or $R^5$ and L can be taken with the carbon atoms between them to form a $C_{3-6}$ membered cycloalkyl group;
$R^6$ is hydrogen, hydroxyl or $C_{1-3}$ alkyl;
or $R^5$ and $R^6$ can be taken together with the carbon atom between them to form a $C_{3-6}$ cycloalkyl group;
each $R^7$ is independently selected from the group consisting of hydrogen, halo, $R^x$ and $OR^x$;
each $R^8$ is independently selected from the group consisting of hydrogen, halo, $R^x$, $OR^x$ and $NH_2$;
$R^9$ is hydrogen or $C_{1-3}$ alkyl;
$R^x$ is hydrogen or $C_{1-6}$ alkyl, which is optionally substituted with one to four substituents independently selected from the group consisting of halo, hydroxyl, methoxy and ethoxy;
m is one or two;
n is an integer from zero to three;
or a pharmaceutically salt thereof.

In an embodiment of the invention, X is $CR^2$. In another embodiment of the invention, X is N.

In an embodiment of the invention, Y is

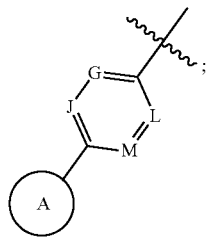

In another embodiment of the invention, Y is

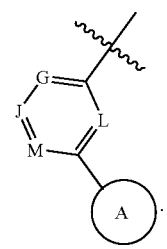

In an embodiment of the invention,

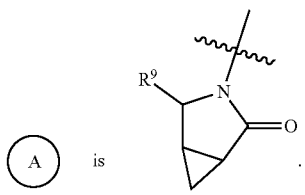

In another embodiment of the invention,

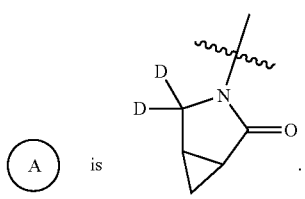

In an embodiment of the invention,

is selected from the group consisting of pyrrolyl, pyrazolyl, imidazolyl, triazolyl, isoxazolyl and oxazolyl, wherein said pyrrolyl, pyrazolyl, imidazolyl, triazolyl, isoxazolyl and oxazolyl groups are optionally substituted with one or two substituents independently selected from the group consisting of halo, cyano, $R^x$ and $OR^x$. In a class of the embodiment, wherein

is selected from the group consisting of pyrazolyl, triazolyl or isoxazolyl, wherein said pyrazolyl group is optionally substituted with $R^x$ or $OR^x$. In a subclass of the embodiment, $$\text{B}$$

is pyrazolyl, wherein said pyrazolyl group is optionally substituted with $R^x$ or $OR^x$. In another subclass of the embodiment, $$\text{B}$$

is triazolyl. In a subclass of the embodiment, $$\text{B}$$

is oxazolyl.

In an embodiment of the invention, G is N. In another embodiment of the invention, G is $CR^8$. In a class of the embodiment, G is CH.

In an embodiment of the invention, J is N. In another embodiment of the invention, J is $CR^8$. In a class of the embodiment, J is CH.

In an embodiment of the invention, L is N. In another embodiment of the invention, L is $CR^8$. In a class of the embodiment, L is CH.

In an embodiment of the invention, M is absent. In another embodiment of the invention, M is N. In another embodiment of the invention, M is $CR^8$. In a class of the embodiment, M is CH.

In an embodiment of the invention, $R^1$ is chloro, fluoro, methyl or cyano. In a class of the embodiment, $R^1$ is chloro. In another class of the embodiment, $R^1$ is fluoro. In another class of the embodiment, $R^1$ is methyl. In another class of the embodiment, $R^1$ is cyano.

In an embodiment of the invention, $R^2$ is cyano, $CONH_2$, fluoropyrazolyl, $R^x$ or $OR^x$. In a class of the embodiment of the invention, $R^2$ is cyano. In another class of the embodiment of the invention, $R^2$ is $CONH_2$. In another class of the embodiment embodiment of the invention, $R^2$ is fluoropyrazolyl. In another class of the embodiment embodiment of the invention, $R^2$ is $R^x$. In another class of the embodiment of the invention, $R^2$ is $OR^x$.

In an embodiment of the invention, $R^3$ is hydrogen. In another embodiment of the invention, $R^3$ is deuterium. In another embodiment of the invention, $R^3$ is halo. In another embodiment of the invention, $R^3$ is methyl.

In an embodiment of the invention, $R^4$ is hydrogen. In another embodiment of the invention, $R^4$ is deuterium. In another embodiment of the invention, $R^4$ is halo. In another embodiment of the invention, $R^4$ is hydroxyl. In another embodiment of the invention, $R^4$ is methyl.

In an embodiment of the invention, $R^3$ and $R^4$ are taken with the carbon atoms between them to form a cyclohexyl group.

In an embodiment of the invention, $R^5$ is methyl.

In an embodiment of the invention, $R^5$ and L are taken with the carbon atoms between them to form a cyclopentyl group.

In an embodiment of the invention, $R^6$ is hydrogen. In an embodiment of the invention, $R^6$ is methyl.

In an embodiment of the invention, $R^9$ is hydrogen.

In an embodiment of the invention, n is one. In another embodiment of the invention, n is two.

In an embodiment of the invention, n is zero. In another embodiment of the invention, n is one. In another embodiment of the invention, n is two. In another embodiment of the invention, n is three.

Reference to the preferred classes and subclasses set forth above is meant to include all combinations of particular and preferred groups unless stated otherwise.

Specific embodiments of the present invention include, but are not limited to the compounds identified herein as Example 1 to 174, or pharmaceutically acceptable salts thereof.

Also included within the scope of the present invention is a pharmaceutical composition which is comprised of a compound of Formula I as described above and a pharmaceutically acceptable carrier. The invention is also contemplated to encompass a pharmaceutical composition which is comprised of a pharmaceutically acceptable carrier and any of the compounds specifically disclosed in the present application. These and other aspects of the invention will be apparent from the teachings contained herein.

The invention includes compositions for treating a diseases or condition in which plasma kallikrein activity is implicated. Accordingly the invention includes compositions for treating impaired visual activity, diabetic retinopathy, diabetic macular edema, retinal vein occlusion, hereditary angioedema, diabetes, pancreatitis, cerebral hemorrhage, nephropathy, cardiomyopathy, neuropathy, inflammatory bowel disease, arthritis, inflammation, septic shock, hypotension, cancer, adult respiratory distress syndrome, disseminated intravascular coagulation, blood coagulation during cardiopulmonary bypass surgery, and bleeding from postoperative surgery in a mammal, comprising a compound of the invention in a pharmaceutically acceptable carrier. A class of the invention includes compositions for treating hereditary angioedema, uveitis, posterior uveitis, wet age related macular edema, diabetic macular edema, diabetic retinopathy and retinal vein occlusion. These compositions may optionally include anti-inflammatory agents, anti-VEGF agents, immunosuppressive agents, anticoagulants, antiplatelet agents, and thrombolytic agents. The compositions can be added to blood, blood products, or mammalian organs in order to effect the desired inhibitions.

The invention also includes compositions for preventing or treating retinal vascular permeability associated with diabetic retinopathy and diabetic macular edema in a mammal, comprising a compound of the invention in a pharmaceutically acceptable carrier. These compositions may optionally include anti-inflammatory agents, anti-VEGF agents, immunosuppressive agents, anticoagulants, antiplatelet agents, and thrombolytic agents.

The invention also includes compositions for treating inflammatory conditions of the eye, which includes, but is not limited to, uveitis, posterior uveitis, macular edema, acute macular degeneration, wet age related macular edema, retinal detachments, retinal vein occlusion, ocular tumors, fungal infections, viral infections, multifocal choroiditis, diabetic uveitis, diabetic macular edema, diabetic retinopathy, proliferative vitreoretinopathy, sympathetic opthalmia, Vogt Koyanagi-Harada syndrome, histoplasmosis and uveal diffusion. These compositions may optionally include anti-inflammatory agents, anti-VEGF agents, immunosuppressive agents, anticoagulants, antiplatelet agents, and thrombolytic agents.

The invention also includes compositions treating posterior eye disease, which includes, but is not limited to, uveitis, posterior uveitis, wet age related macular edema, diabetic macular edema, diabetic retinopathy and retinal vein occlusion. These compositions may optionally include anti-inflammatory agents, anti-VEGF agents, immunosuppressive agents, anticoagulants, antiplatelet agents, and thrombolytic agents.

It will be understood that the invention is directed to the compounds of structural Formula I described herein, as well as the pharmaceutically acceptable salts of the compounds of structural Formula I and also salts that are not pharmaceutically acceptable when they are used as precursors to the free compounds or their pharmaceutically acceptable salts or in other synthetic manipulations.

The compounds of the present invention may be administered in the form of a pharmaceutically acceptable salt. The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, ascorbate, adipate, alginate, aspirate, benzenesulfonate, benzoate, bicarbonate, bisulfate, bitartrate, borate, bromide, butyrate, camphorate, camphorsulfonate, camsylate, carbonate, chloride, clavulanate, citrate, cyclopentane propionate, diethylacetic, digluconate, dihydrochloride, dodecylsulfanate, edetate, edisylate, estolate, esylate, ethanesulfonate, formic, fumarate, gluceptate, glucoheptanoate, gluconate, glutamate, glycerophosphate, glycollylarsanilate, hemisulfate, heptanoate, hexanoate, hexylresorcinate, hydrabamine, hydrobromide, hydrochloride, 2-hydroxyethanesulfonate, hydroxynaphthoate, iodide, isonicotinic, isothionate, lactate, lactobionate, laurate, malate, maleate, mandelate, mesylate, methylbromide, methylnitrate, methylsulfate, methanesulfonate, mucate, 2-naphthalenesulfonate, napsylate, nicotinate, nitrate, N-methylglucamine ammonium salt, oleate, oxalate, pamoate (embonate), palmitate, pantothenate, pectinate, persulfate, phosphate/diphosphate, pimelic, phenylpropionic, polygalacturonate, propionate, salicylate, stearate, sulfate, subacetate, succinate, tannate, tartrate, teoclate, thiocyanate, tosylate, triethiodide, trifluoroacetate, undeconate, valerate and the like. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Also included are the ammonium, calcium, magnesium, potassium, and sodium salts. Salts derived from pharmaceutically acceptable organic non-toxic bases include salts of primary, secondary, and tertiary amines, cyclic amines, dicyclohexyl amines and basic ion-exchange resins, such as arginine, betaine, caffeine, choline, N,N-dibenzylethylenediamine, diethylamine, 2-diethylaminoethanol, 2-dimethylaminoethanol, ethanolamine, ethylamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like. Also, included are the basic nitrogen-containing groups may be quatemized with such agents as lower alkyl halides, such as methyl, ethyl, propyl, and butyl chloride, bromides and iodides; dialkyl sulfates like dimethyl, diethyl, dibutyl; and diamyl sulfates, long chain halides such as decyl, lauryl, myristyl and stearyl chlorides, bromides and iodides, aralkyl halides like benzyl and phenethyl bromides and others.

These salts can be obtained by known methods, for example, by mixing a compound of the present invention with an equivalent amount and a solution containing a desired acid, base, or the like, and then collecting the desired salt by filtering the salt or distilling off the solvent. The compounds of the present invention and salts thereof may form solvates with a solvent such as water, ethanol, or glycerol. The compounds of the present invention may form an acid addition salt and a salt with a base at the same time according to the type of substituent of the side chain.

If the compounds of Formula I simultaneously contain acidic and basic groups in the molecule the invention also includes, in addition to the salt forms mentioned, inner salts or betaines (zwitterions).

The present invention encompasses all stereoisomeric forms of the compounds of Formula I. Unless a specific stereochemistry is indicated, the present invention is meant to comprehend all such isomeric forms of these compounds. Centers of asymmetry that are present in the compounds of Formula I can all independently of one another have (R) configuration or (S) configuration. When bonds to the chiral carbon are depicted as straight lines in the structural Formulas of the invention, it is understood that both the (R) and (S) configurations of the chiral carbon, and hence both each individual enantiomer and mixtures thereof, are embraced within the Formula. When a particular configuration is depicted, that entantiomer (either (R) or (S), at that center) is intended. Similarly, when a compound name is recited without a chiral designation for a chiral carbon, it is understood that both the (R) and (S) configurations of the chiral carbon, and hence individual enantiomers and mixtures thereof, are embraced by the name. The production of specific stereoisomers or mixtures thereof may be identified in the Examples where such stereoisomers or mixtures were obtained, but this in no way limits the inclusion of all stereoisomers and mixtures thereof from being within the scope of this invention.

Unless a specific enationmer or diastereomer is indicated, the invention includes all possible enantiomers and diastereomers and mixtures of two or more stereoisomers, for example mixtures of enantiomers and/or diastereomers, in all ratios. Thus, enantiomers are a subject of the invention in enantiomerically pure form, both as levorotatory and as dextrorotatory antipodes, in the form of racemates and in the form of mixtures of the two enantiomers in all ratios. In the case of a cis/trans isomerism the invention includes both the cis form and the transform as well as mixtures of these forms in all ratios. The preparation of individual stereoisomers can be carried out, if desired, by separation of a mixture by customary methods, for example by chromatography or crystallization, by the use of stereochemically uniform starting materials for the synthesis or by stereoselective synthesis. Optionally a derivatization can be carried out before a separation of stereoisomers. The separation of a mixture of stereoisomers can be carried out at an intermediate step during the synthesis of a compound of Formula I or it can be done on a final racemic product. Absolute stereochemistry may be determined by X-ray crystallography of crystalline products or crystalline intermediates which are derivatized, if necessary, with a reagent containing a stereogenic center of known configuration. Where compounds of this invention are capable of tautomerization, all individual tautomers as well as mixtures thereof are included in the scope of this invention. The present invention includes all such isomers, as well as salts, solvates (including hydrates) and solvated salts of such racemates, enantiomers, diastereomers and tautomers and mixtures thereof.

In the compounds of the invention, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the specifically and generically described compounds. For example, different isotopic forms of hydrogen (H) include protium ($1_H$) and deuterium ($2_H$). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds can be prepared without undue experimentation by conventional techniques well known to those skilled in the art or by processes analogous to those described in the general process schemes and examples herein using appropriate isotopically-enriched reagents and/or intermediates.

When any variable (e.g. $R^6$, etc.) occurs more than one time in any constituent, its definition on each occurrence is independent at every other occurrence. Also, combinations of substituents and variables are permissible only if such combinations result in stable compounds. Lines drawn into the ring systems from substituents represent that the indicated bond may be attached to any of the substitutable ring atoms. If the ring system is bicyclic, it is intended that the bond be attached to any of the suitable atoms on either ring of the bicyclic moiety.

It is understood that one or more silicon (Si) atoms can be incorporated into the compounds of the instant invention in place of one or more carbon atoms by one of ordinary skill in the art to provide compounds that are chemically stable and that can be readily synthesized by techniques known in the art from readily available starting materials. Carbon and silicon differ in their covalent radius leading to differences in bond distance and the steric arrangement when comparing analogous C-element and Si-element bonds. These differences lead to subtle changes in the size and shape of silicon-containing compounds when compared to carbon. One of ordinary skill in the art would understand that size and shape differences can lead to subtle or dramatic changes in potency, solubility, lack of off-target activity, packaging properties, and so on. (Diass, J. O. et al. Organometallics (2006) 5:1188-1198; Showell, G. A. et al. Bioorganic & Medicinal Chemistry Letters (2006) 16:2555-2558).

It is understood that substituents and substitution patterns on the compounds of the instant invention can be selected by one of ordinary skill in the art to provide compounds that are chemically stable and that can be readily synthesized by techniques known in the art, as well as those methods set forth below, from readily available starting materials. If a substituent is itself substituted with more than one group, it is understood that these multiple groups may be on the same carbon or on different carbons, so long as a stable structure results. The phrase "optionally substituted" (with one or more substituents) should be understood as meaning that the group in question is either unsubstituted or may be substituted with one or more substituents.

Furthermore, compounds of the present invention may exist in amorphous form and/or one or more crystalline forms, and as such all amorphous and crystalline forms and mixtures thereof of the compounds of Formula I are intended to be included within the scope of the present invention. In addition, some of the compounds of the instant invention may form solvates with water (i.e., a hydrate) or common organic solvents. Such solvates and hydrates, particularly the pharmaceutically acceptable solvates and hydrates, of the instant compounds are likewise encompassed within the scope of this invention, along with unsolvated and anhydrous forms.

Also, in the case of a carboxylic acid (—COOH) or alcohol group being present in the compounds of the present invention, pharmaceutically acceptable esters of carboxylic acid derivatives, such as methyl, ethyl, or pivaloyloxymethyl, or acyl derivatives of alcohols, such as O-acetyl, O-pivaloyl, O-benzoyl, and O-aminoacyl, can be employed. Included are those esters and acyl groups known in the art for modifying the solubility or hydrolysis characteristics for use as sustained-release or prodrug formulations.

Any pharmaceutically acceptable pro-drug modification of a compound of this invention which results in conversion in vivo to a compound within the scope of this invention is also within the scope of this invention. For example, esters can optionally be made by esterification of an available carboxylic acid group or by formation of an ester on an available hydroxy group in a compound. Similarly, labile amides can be made. Pharmaceutically acceptable esters or amides of the compounds of this invention may be prepared to act as pro-drugs which can be hydrolyzed back to an acid (or —COO— depending on the pH of the fluid or tissue where conversion takes place) or hydroxy form particularly in vivo and as such are encompassed within the scope of this invention. Examples of pharmaceutically acceptable pro-drug modifications include, but are not limited to, —$C_{1-6}$ alkyl esters and —$C_{1-6}$alkyl substituted with phenyl esters.

Accordingly, the compounds within the generic structural formulas, embodiments and specific compounds described and claimed herein encompass salts, all possible stereoisomers and tautomers, physical forms (e.g., amorphous and crystalline forms), solvate and hydrate forms thereof and any combination of these forms, as well as the salts thereof, pro-drug forms thereof, and salts of pro-drug forms thereof, where such forms are possible unless specified otherwise.

Except where noted herein, the terms "alkyl" and "alkylene" are intended to include both branched- and straight-chain saturated aliphatic hydrocarbon groups having the specified number of carbon atoms. Commonly used abbreviations for alkyl groups are used throughout the specification, e.g. methyl, may be represented by conventional abbreviations including "Me" or $CH_3$ or a symbol that is an extended bond as the terminal group, e.g.

ethyl may be represented by "Et" or $CH_2CH_3$, propyl may be represented by "Pr" or $CH_2CH_2CH_3$, butyl may be represented by "Bu" or $CH_2CH_2CH_2CH_3$, etc. "$C_{1-4}$ alkyl" (or "$C_1$-$C_4$ alkyl") for example, means linear or branched chain alkyl groups, including all isomers, having the specified number of carbon atoms. For example, the structures

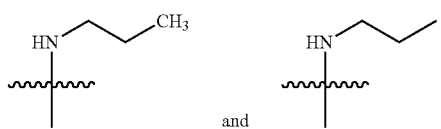

and have equivalent meanings. $C_{1-4}$ alkyl includes n-, iso-, sec- and t-butyl, n- and isopropyl, ethyl and methyl. If no number is specified, 1-4 carbon atoms are intended for linear or branched alkyl groups.

Except where noted, the term "cycloalkyl" means a monocyclic or bicyclic saturated aliphatic hydrocarbon group having the specified number of carbon atoms. For example, "cycloalkyl" includes cyclopropyl, cyclobutyl, cyclopentyl, cyclohexyl, and so on.

Except where noted, the term "aryl", as used herein, represents a stable monocyclic or bicyclic ring system of up to 10 carbon atoms in each ring, wherein at least one ring is aromatic. Bicyclic aryl ring systems include fused ring systems, where two rings share two atoms, and spiro ring systems, where two rings share one atom. Aryl groups within the scope of this definition include, but are not limited to: phenyl, indene, isoindene, naphthalene, and tetralin.

Except where noted, the term "heteroaryl", as used herein, represents a stable monocyclic or bicyclic ring system of up to 10 atoms in each ring, wherein at least one ring is aromatic, and at least one ring contains from 1 to 4 heteroatoms selected from the group consisting of O, N and S. Bicyclic heteroaryl ring systems include fused ring systems, where two rings share two atoms, and spiro ring systems, where two rings share one atom. Heteroaryl groups within the scope of this definition include but are not limited to: azaindolyl, benzoimidazolyl, benzisoxazolyl, benzofuranyl, benzofurazanyl, benzopyrazolyl, benzotriazolyl, benzothiophenyl, benzoxazolyl, carbazolyl, carbolinyl, cinnolinyl, dihydroindenyl, furanyl, indolinyl, indolyl, indolazinyl, indazolyl, isobenzofuranyl, isoindolyl, isoquinolyl, isothiazolyl, isoxazolyl, naphthalenyl, naphthpyridinyl, oxadiazolyl, oxazolyl, oxazoline, isoxazoline, pyranyl, pyrazinyl, pyrazolyl, pyrazolopyrimidinyl, pyridazinyl, pyridopyridinyl, pyridyl, pyrimidinyl, pyrrolyl, quinazolinyl, quinolyl, quinoxalinyl, tetrazolyl, tetrazolopyridyl, thiadiazolyl, thiazolyl, thienyl, triazolyl, dihydrobenzoimidazolyl, dihydrobenzofuranyl, dihydrobenzothiophenyl, dihydrobenzoxazolyl, dihydroindolyl, dihydroquinolinyl, dihydrobenzodioxinyl, dihydropyrazoloxazinyl, dihydropyrazolyothiazinedioxidyl, methylenedioxybenzene, benzothiazolyl, benzothienyl, quinolinyl, isoquinolinyl, oxazolyl, tetra-hydroquinoline and 3-oxo-3,4dihydro-2N-benzo[b][1,4]thiazine. If the heteroaryl contains nitrogen atoms, it is understood that the corresponding N-oxides thereof are also encompassed by this definition.

Except where noted, the term "halogen" or "halo" means fluorine, chlorine, bromine or iodine.

"Celite®" (Fluka) diatomite is diatomaceous earth, and can be referred to as "celite".

Except where noted herein, structures containing substituent variables such as variable "R" below:

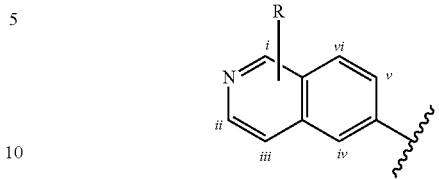

which are depicted as not being attached to any one particular bicyclic ring carbon atom, represent structures in which the variable can be optionally attached to any bicyclic ring carbon atom. For example, variable R shown in the above structure can be attached to any one of 6 bicyclic ring carbon atoms i, ii, iii, iv, v or vi.

Except where noted herein, bicyclic ring systems include fused ring systems, where two rings share two atoms, and spiro ring systems, where two rings share one atom.

The invention also relates to medicaments containing at least one compound of the Formula I and/or of a pharmaceutically acceptable salt of the compound of the Formula I and/or an optionally stereoisomeric form of the compound of the Formula I or a pharmaceutically acceptable salt of the stereoisomeric form of the compound of Formula I, together with a pharmaceutically suitable and pharmaceutically acceptable vehicle, additive and/or other active substances and auxiliaries.

The term "patient" used herein is taken to mean mammals such as primates, humans, sheep, horses, cattle, pigs, dogs, cats, rats, and mice.

The medicaments according to the invention can be administered by oral, inhalative, rectal or transdermal administration or by subcutaneous, intraarticular, intraperitoneal or intravenous injection. Oral administration is preferred. Coating of stents with compounds of the Formulas I and other surfaces which come into contact with blood in the body is possible.

The invention also relates to a process for the production of a medicament, which comprises bringing at least one compound of the Formula I into a suitable administration form using a pharmaceutically suitable and pharmaceutically acceptable carrier and optionally further suitable active substances, additives or auxiliaries.

Suitable solid or galenical preparation forms are, for example, granules, powders, coated tablets, tablets, (micro) capsules, suppositories, syrups, juices, suspensions, emulsions, drops or injectable solutions and preparations having prolonged release of active substance, in whose preparation customary excipients such as vehicles, disintegrants, binders, coating agents, swelling agents, glidants or lubricants, flavorings, sweeteners and solubilizers are used. Frequently used auxiliaries which may be mentioned are magnesium carbonate, titanium dioxide, lactose, mannitol and other sugars, talc, lactose, gelatin, starch, cellulose and its derivatives, animal and plant oils such as cod liver oil, sunflower, peanut or sesame oil, polyethylene glycol and solvents such as, for example, sterile water and mono- or polyhydric alcohols such as glycerol.

The dosage regimen utilizing the plasma kallikrein inhibitors is selected in accordance with a variety of factors including type, species, age, weight, sex and medical condition of the patient; the severity of the condition to be treated; the route of administration; the renal and hepatic function of the patient; and the particular compound or salt thereof employed. An ordinarily skilled physician or veterinarian can readily determine and prescribe the effective amount of the drug required to prevent, counter, or arrest the progress of the condition.

Oral dosages of the plasma kallikrein inhibitors, when used for the indicated effects, will range between about 0.01 mg per kg of body weight per day (mg/kg/day) to about 30 mg/kg/day, preferably 0.025-7.5 mg/kg/day, more preferably 0.1-2.5 mg/kg/day, and most preferably 0.1-0.5 mg/kg/day (unless specified otherwise, amounts of active ingredients are on free base basis). For example, an 80 kg patient would receive between about 0.8 mg/day and 2.4 g/day, preferably 2-600 mg/day, more preferably 8-200 mg/day, and most preferably 8-40 mg/kg/day. A suitably prepared medicament for once a day administration would thus contain between 0.8 mg and 2.4 g, preferably between 2 mg and 600 mg, more preferably between 8 mg and 200 mg, and most preferably 8 mg and 40 mg, e.g., 8 mg, 10 mg, 20 mg and 40 mg. Advantageously, the plasma kallikrein inhibitors may be administered in divided doses of two, three, or four times daily. For administration twice a day, a suitably prepared medicament would contain between 0.4 mg and 4 g, preferably between 1 mg and 300 mg, more preferably between 4 mg and 100 mg, and most preferably 4 mg and 20 mg, e.g., 4 mg, 5 mg, 10 mg and 20 mg.

Intravenously, the patient would receive the active ingredient in quantities sufficient to deliver between 0.025-7.5 mg/kg/day, preferably 0.1-2.5 mg/kg/day, and more preferably 0.1-0.5 mg/kg/day. Such quantities may be administered in a number of suitable ways, e.g. large volumes of low concentrations of active ingredient during one extended period of time or several times a day, low volumes of high concentrations of active ingredient during a short period of time, e.g. once a day. Typically, a conventional intravenous formulation may be prepared which contains a concentration of active ingredient of between about 0.01-1.0 mg/mL, e.g. 0.1 mg/mL, 0.3 mg/mL, and 0.6 mg/mL, and administered in amounts per day of between 0.01 mL/kg patient weight and 10.0 mL/kg patient weight, e.g. 0.1 mL/kg, 0.2 mL/kg, 0.5 mL/kg. In one example, an 80 kg patient, receiving 8 mL twice a day of an intravenous formulation having a concentration of active ingredient of 0.5 mg/mL, receives 8 mg of active ingredient per day. Glucuronic acid, L-lactic acid, acetic acid, citric acid or any pharmaceutically acceptable acid/conjugate base with reasonable buffering capacity in the pH range acceptable for intravenous administration may be used as buffers. The choice of appropriate buffer and pH of a formulation, depending on solubility of the drug to be administered, is readily made by a person having ordinary skill in the art.

Compounds of Formula I can be administered both as a monotherapy and in combination with other therapeutic agents, including but not limited to anti-inflammatory agents, anti-VEGF agents, immunosuppressive agents, anticoagulants, antiplatelet agents, and thrombolytic agents.

An "anti-inflammatory agent" is any agent which is directly or indirectly effective in the reduction of inflammation when administered at a therapeutically effective level. "Anti-inflammatory agent" includes, but is not limited to steroidal anti-inflammatory agents and glucocorticoids. Suitable anti-inflammatory agents include, but are not limited to, cortisone, dexamethasone, hydrocortisone, methylprednisolone, prednisolone, prednisone and triamcinolone.

An "anti-VEGF agent" is any agent which is directly or indirectly effective in inhibiting the activity of VEGF (Vascular Endothelial Growth Factor). Suitable anti-VEGF agents include, but are not limited to, bevacizumab, ranibizumab and aflibercept.

An "immunosuppressant agent" is any agent which is directly or indirectly effective in suppressing, or reducing, the strength of the body's immune system. Suitable immunosuppressant agents include, but are not limited to, corticosteroids (for example, prednisone, budesonide, prednisolone), janus kinase inhibitors (for example, tofacitinib), calcineurin inhibitors (for example, cyclosporin, tacrolimus), mTOR inhibitors (for example, sirolimus, everolimus), IMDH inhibitors (for example, azathioprine, leflunomide, mycophenolate), biologics (for example, abatacept, adalimumab, anakinra, certolizumab, etanercept, golimumab, infliximab, ixekizumab, natalizumab, rituximab, secukinumab, tocilizumab, ustekinumab, vedolizumab), and monoclonal antibodies (for example, basiliximab, daclizumab).

Suitable anticoagulants include, but are not limited to, Factor XIa inhibitors, thrombin inhibitors, thrombin receptor antagonists, factor VIIa inhibitors, factor Xa inhibitors, factor IXa inhibitors, factor XIIa inhibitors, adenosine diphosphate antiplatelet agents (e.g., P2Y12 antagonists), fibrinogen receptor antagonists (e.g. to treat or prevent unstable angina or to prevent reocclusion after angioplasty and restenosis), other anticoagulants such as aspirin, and thrombolytic agents such as plasminogen activators or streptokinase to achieve synergistic effects in the treatment of various vascular pathologies. Such anticoagulants include, for example, apixaban, dabigatran, cangrelor, ticagrelor, vorapaxar, clopidogrel, edoxaban, mipomersen, prasugrel, rivaroxaban, and semuloparin. For example, patients suffering from coronary artery disease, and patients subjected to angioplasty procedures, would benefit from coadministration of fibrinogen receptor antagonists and thrombin inhibitors.

In certain embodiments the anti-inflammatory agents, anti-VEGF agents, immunosuppressant agents, anticoagulants, antiplatelet agents, and thrombolytic agents described herein are employed in their conventional dosage ranges and regimens as reported in the art, including, for example, the dosages described in editions of the *Physicians' Desk Reference*, such as the 70th edition (2016) and earlier editions. In other embodiments, the anti-inflammatory agents, anti-VEGF agents, immunosuppressant agents, anticoagulants, antiplatelet agents, and thrombolytic agents described herein are employed in lower than their conventional dosage ranges.

Alternatively or additionally, one or more additional pharmacologically active agents may be administered in combination with a compound of the invention. The additional active agent (or agents) is intended to mean a pharmaceutically active agent (or agents) that is active in the body, including pro-drugs that convert to pharmaceutically active form after administration, which is different from the compound of the invention, and also includes free-acid, free-base and pharmaceutically acceptable salts of said additional active agents when such forms are sold commercially or are otherwise chemically possible. Generally, any suitable additional active agent or agents, including but not limited to anti-hypertensive agents, additional diuretics, anti-atherosclerotic agents such as a lipid modifying compound, anti-diabetic agents and/or anti-obesity agents may be used in any combination with the compound of the invention in a single dosage formulation (a fixed dose drug combination), or may be administered to the patient in one or more separate dosage formulations which allows for concurrent or sequential administration of the active agents (co-administration of the separate active agents). Examples of additional active agents which may be employed include but are not limited to angiotensin converting enzyme inhibitors (e.g. alacepril, benazepril, captopril, ceronapril, cilazapril, delapril, enalapril, enalaprilat, fosinopril, imidapril, lisinopril, moveltipril, perindopril, quinapril, ramipril, spirapril, temocapril, or trandolapril); angiotensin II receptor antagonists also known as angiotensin receptor blockers or ARBs, which may be in free-base, free-acid, salt or pro-drug form, such as azilsartan, e.g., azilsartan medoxomil potassium (EDARBI®), candesartan, e.g., candesartan cilexetil (ATACAND®), eprosartan, e.g., eprosartan mesylate (TEVETAN®), irbesartan (AVAPRO®), losartan, e.g., losartan potassium (COZAAR®), olmesartan, e.g, olmesartan medoximil (BENICAR®), telmisartan (MICARDIS®), valsartan (DIOVAN®), and any of these drugs used in combination with a thiazide-like diuretic such as hydrochlorothiazide (e.g., HYZAAR®, DIOVAN HCT®, ATACAND HCT®), etc.); potassium sparing diuretics such as amiloride HCl, spironolactone, eplerone, triamterene, each with or without HCTZ; neutral endopeptidase inhibitors (e.g., thiorphan and phosphoramidon); aldosterone antagonists; aldosterone synthase inhibitors; renin inhibitors; enalkrein; RO 42-5892; A 65317; CP 80794; ES 1005; ES 8891; SQ 34017; aliskiren (2(S),4(S),5(S),7(S)—N-(2-carbamoyl-2-methylpropyl)-5-amino-4-hydroxy-2,7-diisopropyl-8-[4-methoxy-3-(3-methoxypropoxy)-phenyl]-octanamid hemifumarate) SPP600, SPP630 and SPP635); endothelin receptor antagonists; vasodilators (e.g. nitroprusside); calcium channel blockers (e.g., amlodipine, nifedipine, verapamil, diltiazem, felodipine, gallopamil, niludipine, nimodipine, nicardipine); potassium channel activators (e.g., nicorandil, pinacidil, cromakalim, minoxidil, aprilkalim, loprazolam); sympatholitics; beta-adrenergic blocking drugs (e.g., acebutolol, atenolol, betaxolol, bisoprolol, carvedilol, metoprolol, metoprolol tartate, nadolol, propranolol, sotalol, timolol); alpha adrenergic blocking drugs (e.g., doxazosin, prazosin or alpha methyldopa); central alpha adrenergic agonists; peripheral vasodilators (e.g. hydralazine); lipid lowering agents, e.g., HMG-CoA reductase inhibitors such as simvastatin and lovastatin which are marketed as ZOCOR® and MEVACOR® in lactone pro-drug form and function as inhibitors after administration, and pharmaceutically acceptable salts of dihydroxy open ring acid HMG-CoA reductase inhibitors such as atorvastatin (particularly the calcium salt sold in LIPITOR®), rosuvastatin (particularly the calcium salt sold in CRESTOR®), pravastatin (particularly the sodium salt sold in PRAVACHOL®), and fluvastatin (particularly the sodium salt sold in LESCOL®); a cholesterol absorption inhibitor such as ezetimibe (ZETIA®), and ezetimibe in combination with any other lipid lowering agents such as the HMG-CoA reductase inhibitors noted above and particularly with simvastatin (VYTORIN®) or with atorvastatin calcium; niacin in immediate-release or controlled release forms, and particularly niacin in combination with a DP antagonist such as laropiprant and/or with an HMG-CoA reductase inhibitor; niacin receptor agonists such as acipimox and acifran, as well as niacin receptor partial agonists; metabolic altering agents including insulin sensitizing agents and related compounds for the treatment of diabetes such as biguanides (e.g., metformin), meglitinides (e.g., repaglinide, nateglinide), sulfonylureas (e.g., chlorpropamide, glimepiride, glipizide, glyburide, tolazamide, tolbutamide), thiazolidinediones also referred to as glitazones (e.g., pioglitazone, rosiglitazone), alpha glucosidase inhibitors (e.g., acarbose, miglitol), dipeptidyl peptidase inhibitors, (e.g., sitagliptin (JANUVIA®), alogliptin, vildagliptin, saxagliptin, linagliptin, dutogliptin, gemigliptin), ergot alkaloids (e.g., bromocriptine), combination medications such as JANUMET® (sitagliptin with metformin), and injectable diabetes medications such as exenatide and pramlintide acetate; inhibitors of glucose uptake, such as sodium-glucose transporter (SGLT) inhibitors and its various isoforms, such as SGLT-1, SGLT-2 (e.g., ASP-1941, TS-071, BI-10773, tofogliflozin, LX-4211, canagliflozin, dapagliflozin, ertugliflozin, ipragliflozin, remogliflozin and sotagliflozin), and SGLT-3; or with other drugs beneficial for the prevention or the treatment of the above-mentioned diseases including but not limited to diazoxide; and including the free-acid, free-base, and pharmaceutically acceptable salt forms, pro-drug forms, e.g., esters, and salts of pro-drugs of the above medicinal agents, where chemically possible. Trademark names of pharmaceutical drugs noted above are provided for exemplification of the marketed form of the active agent(s); such pharmaceutical drugs could be used in a separate dosage form for concurrent or sequential administration with a compound of the invention, or the active agent(s) therein could be used in a fixed dose drug combination including a compound of the invention.

Typical doses of the plasma kallikrein inhibitors of the invention in combination with other suitable agents may be the same as those doses of plasma kallikrein inhibitors administered without coadministration of additional agents, or may be substantially less that those doses of plasma kallikrein inhibitors administered without coadministration of additional agents, depending on a patient's therapeutic needs.

The compounds are administered to a mammal in a therapeutically effective amount. By "therapeutically effective amount" it is meant an amount of a compound of the present invention that, when administered alone or in combination with an additional therapeutic agent to a mammal, is effective to treat (i.e., prevent, inhibit or ameliorate) the disease condition or treat the progression of the disease in a host.

The compounds of the invention are preferably administered alone to a mammal in a therapeutically effective amount. However, the compounds of the invention can also be administered in combination with an additional therapeutic agent, as defined below, to a mammal in a therapeutically effective amount. When administered in a combination, the combination of compounds is preferably, but not necessarily, a synergistic combination. Synergy, as described for example by Chou and Talalay, *Adv. Enzyme Regul.* 1984, 22, 27-55, occurs when the effect (in this case, inhibition of the desired target) of the compounds when administered in combination is greater than the additive effect of each of the compounds when administered individually as a single agent. In general, a synergistic effect is most clearly demonstrated at suboptimal concentrations of the compounds. Synergy can be in terms of lower cytotoxicity, increased anticoagulant effect, or some other beneficial effect of the combination compared with the individual components.

By "administered in combination" or "combination therapy" it is meant that the compound of the present invention and one or more additional therapeutic agents are administered concurrently to the mammal being treated. When administered in combination each component may be administered at the same time or sequentially in any order at different points in time. Thus, each component may be administered separately but sufficiently closely in time so as to provide the desired therapeutic effect. The administration of each component does not need to be via the same route of administration; for example, one component can be administered orally, and another can be delivered into the vitreous of the eye.

The present invention is not limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the relevant art and are intended to fall within the scope of the appended claims.

General Methods

Compounds of the present invention may be prepared using conventional techniques or according to the methodology outlined in the following general synthetic schemes. One skilled in the art can vary the procedures and reagents shown to arrive at similar intermediates and/or final compounds.

NMR spectra were measured on VARIAN or Bruker NMR Systems (400, 500 or 600 MHz). Chemical shifts are reported in ppm downfield and up field from tetramethylsilane (TMS) and referenced to either internal TMS or solvent resonances ($^1$H NMR: δ 7.27 for CDCl$_3$, δ 2.50 for (CD$_3$)(CHD$_2$)SO, and $^{13}$C NMR: δ 77.02 for CDCl$_3$, δ 39.51 for (CD$_3$)$_2$SO. Coupling constants (J) are expressed in hertz (Hz), and spin multiplicities are given as s (singlet), d (doublet), dd (double doublet), t (triplet), m (multiplet), and br (broad). Chiral resolutions were performed on either Waters Thar 80 SFC or Berger MG II preparative SFC systems. LC-MS data were recorded on SHIMADAZU LC-MS-2020, SHIMADAZU LC-MS-2010, or Agilent 1100 series LC-MS, Agilent Prime-1260, or Waters Acquity LC-MS instruments using C18 columns employing a MeCN gradient in water containing 0.02 to 0.1% TFA. UV detections were at 220 and/or 254 nm and ESI ionization was used for MS detection.

When chiral resolution was achieved by chromatography using chiral columns, the chiral columns used for SFC chiral resolutions are listed in tables. Some of the chiral columns used were CHIRALPAK AD, CHIRALCEL OJ, CHIRALPAK AS, CHIRALPAK AY, CHIRALPAK IA, CHIRALPAK AD-H, and CHIRALPAK AS-H. Henceforth, they will be referred by their two or three letter abbreviations. As a convention, the fast-eluting isomer from a chiral resolution is always listed first in this table followed immediately by the slower-eluting isomer from the same resolution. If more than two isomers were separated, they will be always listed in the tables in order they were eluted, such as Peak 1 followed by Peak 2, Peak 3 and so on. A * symbol near a chiral center in a structure denotes that this chiral center was resolved by chiral resolution without its stereochemical configuration unambiguously determined.

Also, TLC is thin layer chromatography; UV is ultraviolet; W is watts; wt. % is percentage by weight; xg is times gravity; $α_D$ is the specific rotation of polarized light at 589 nm; ° C. is degrees Celsius; % w/v is percentage in weight of the former agent relative to the volume of the latter agent; Hz is hertz; cpm is counts per minute; $δ_H$ is chemical shift; d is doublet; dd is doublet of doublets; MHz is megahertz; MS is mass spectrum, and a mass spectrum obtained by ES-MS may be denoted herein by "LC-MS"; m/z is mass to charge ratio; n is normal; N is normal; nm is nanometer; nM is nanomolar.

Several catalysts and ligands are used in the following procedures. "XANTPHOS" is also known as 4,5-bis(diphenylphosphino)-9,9-dimethylxanthene. "XANTPHOS Pd G3" is also known as [(4,5-Bis(diphenylphosphino)-9,9-dimethylxanthene)-2-(2'-amino-1,1'-biphenyl)]palladium (II) methanesulfonate. "BrettPhos" is also known as 2-(dicyclohexylphosphino)3,6-dimethoxy-2',4',6'-triisopropyl-1,1'-biphenyl and the "BrettPhos Pd G3" is also known as [(2-Di-cyclohexylphosphino-3,6-dimethoxy-2',4',6'-triisopropyl-1,1'-biphenyl)-2-(2'-amino-1,1'-biphenyl)]palladium (II) methanesulfonate. "cataCXium A Pd G2" is also know as chloro[(di(1-adamantyl)-n-butylphosphine)-2-(2-aminobiphenyl)]palladium(II). These catalysts and ligands are available from Millipore Sigma.

For purposes of this specification, the following abbreviations have the indicated meanings:

| | |
|---|---|
| Ac | acetyl |
| ACN | acetonitrile |
| AcOH or HOAc | acetic acid |
| APCI | atmospheric-pressure chemical ionization |
| aq | aqueous |
| Bn | benzyl |
| Boc or BOC | tert-butoxycarbonyl |
| Brettphos | 2-(dicyclohexylphosphino)3,6-dimethoxy-2',4',6'-triisopropyl-1,1'-biphenyl |
| BrettPhos Pd G3 | [(2-Di-cyclohexylphosphino-3,6-dimethoxy-2',4',6'-triisopropyl-1,1'-biphenyl)-2-(2'-amino-1,1' -biphenyl)]palladium(II) methanesulfonate |
| Bu | butyl |
| Bz | benzoyl |
| calc'd | calculated |
| cataCXium A Pd G2 | chloro[(di(1-adamantyl)-n-butylphosphine)-2-(2-aminobiphenyl)]palladium(II) |
| cBu | cyclobutyl |
| Cbz | benyzloxy carbonyl |
| cHep | cycloheptyl |
| cHex | cyclohexyl |
| cPen | cyclopentyl |
| cPr | cyclopropyl |
| DAST | (diethylamino)sulfur trifluoride |
| dba | dibenzylideneacetone |
| DBAD | Di-tert-butyl azodicarboxylate |
| DBU | 1,8-Diazabicyclo[5.4.0]undec-7-ene |
| DCE | 1,2-dichloroethane |
| DCM | dichloromethane |
| DIAD | diisopropyl azodicarboxylate |

-continued

| | |
|---|---|
| DIBAL or DIBAL-H | diisobutylaluminum hydride |
| DIC | N,N'-diisopropylcarbodiimide |
| DIEA or Hünig's base | N,N-diisopropylethylamine |
| DIPA | diisopropylamine |
| DMA | 1,2-dimethylacetamide |
| DMAP | 4-dimethylaminopyridine |
| DMF | dimethylformamide |
| DMP | Dess-Martin periodinane (1,1,1-triacetoxy)-1,1-dihydro-1,2-benziodoxol-3(1H)-one |
| DMS | Dimethyl sulfide |
| DMSO | dimethyl sulfoxide |
| DPPA | Diphenyl phosphoryl azide |
| dppf | 1,1'-bis(diphenylphosphino)ferrocene |
| DPy | 2,2'-Dipyridine |
| DTBPY or BBBPY | 4,4'-Di-tert-butyl-2,2'-dipyridyl |
| DTT | dithiothreitol |
| EA | ethyl acetate |
| EDC | 1-ethyl-3-(3-dimethylaminopropyl)carbodiimide |
| EDTA | ethylenediamine tetraacetic acid |
| ESI | electrospray ionization |
| Et | ethyl |
| EtOH | ethanol |
| EtOAc | ethyl acetate |
| g | grams |
| GST | glutathione S-transferase |
| h | hour |
| HATU | N,N,N',N'-tetramethyl-O-(7-azabenzotriazol-1-yl)uronium hexafluorophosphate |
| HMDS | 1,1,1,3,3,3-hexamethyldisilazane |
| HOBt | 1-hydroxy benzotriazole |
| HPLC | high-performance liquid chromatography |
| IPA | isopropanol |
| iPr | isopropyl |
| LC | liquid chromatography |
| LCMS | liquid chromatography mass spectrometry |
| LDA | lithium diisopropylamide |
| mCPBA | m-choroperoxy benzoic acid |
| Me | methyl |
| MeOH | methanol |
| mg | milligrams |
| min | minute |
| μL | microliters |
| mL | milliliters |
| mmol | millimoles |
| MS | mass spectrometry |
| Ms | methanesulfonyl (mesyl) |
| MPLC | medium pressure liquid chromatography |
| MTBE | methyl tert-butyl ether |
| NBS | N-bromosuccinimide |
| $NiCl_2$ glyme | Nickel(II) chloride ethylene glycol dimethyl ether complex |
| NMR | nuclear magnetic resonance spectroscopy |
| obsv'd | observed |
| Ph | phenyl |
| Pr | propyl |
| PS | polystyrene |
| rac | racemic mixture |
| RT or rt | room temperature (ambient, about 25° C.) |
| sat | saturated |
| SFC | supercritical fluid chromatography |
| S-phos | 2-dicyclohexylphosphino-2',6'-dimethoxy biphenyl |
| TBAF | tert-butyl ammonium fluoride |
| TBAI | tetra-n-butylammonium iodide |
| TBS or TBDMS | tert-butyldimethyl silyl |
| TBSCI | tert-butyldimethylsilyl chloride |
| TCFH | tetramethylchloroformamidinium hexafluorophosphate |
| tBu | tert-butyl |
| tBu X-phos | 2-di-tert-butylphosphino-2',4',6'-triisopropylbiphenyl |
| TEA | triethylamine ($Et_3N$) |
| TFA | trifluoroacetic acid |
| TFAA | trifluoroacetic anhydride |
| THF | tetrahydrofuran |
| TLC | thin layer chromatography |
| TMS | trimethylsilyl |
| Tris | tris(hydroxymethyl)aminomethane |
| Ts | toluenesulfonyl (tolyl) |
| TSA | p-toluenesulfonic acid |

| | |
|---|---|
| X-phos | 2-dicyclohexylphosphino-2',4',6'-triisopropylbiphenyl |
| Xantphos | 4,5-bis(diphenylphosphino)-9,9-dimethylxanthene |
| Xantphos Pd G3 | [(4,5-Bis(diphenylphosphino)-9,9-dimethylxanthene)-2-(2'-amino-1,1'-biphenyl)]palladium(II) methanesulfonate |

General

Starting materials used were obtained from commercial sources or prepared in other examples, unless otherwise noted.

The methods used for the preparation of the compounds of this invention are illustrated by the following schemes. Unless specified otherwise, all starting materials used are commercially available.

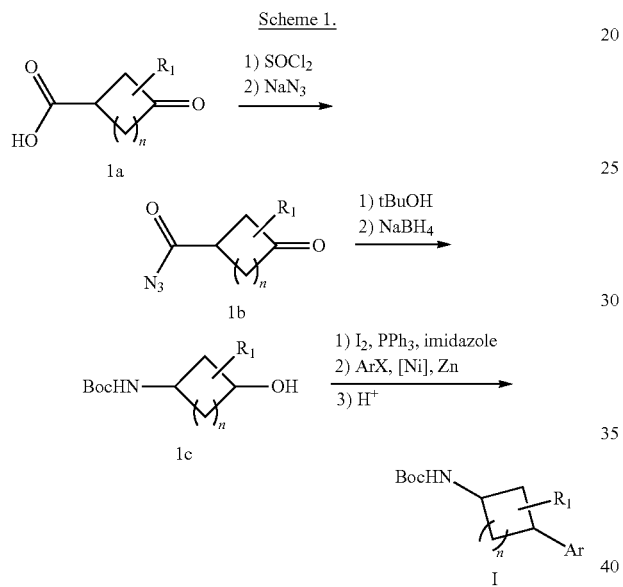

Compounds of formula (I) are prepared from an acid such as 1a. 1a is converted to 1b by formation of the acid chloride followed by treatment with a reagent such as sodium azide. Formation of the Boc-protected amine followed by reduction with a reagent such as sodium borohydride provides 1c. Generation of the alkyl iodide followed by Ni-mediated reductive coupling with an aryl halide and deprotection provides intermediates such as I.

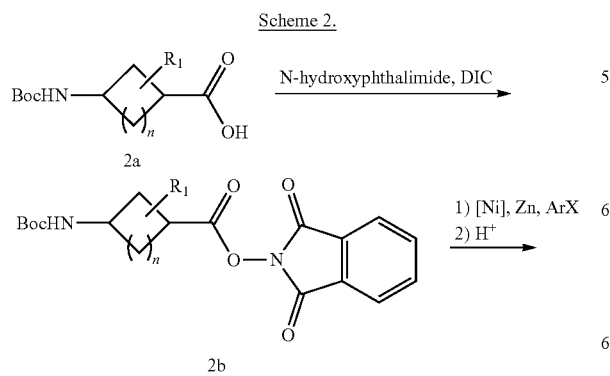

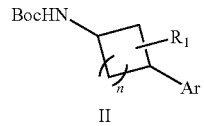

Compounds of formula (II) are prepared from an acid such as a. Coupling of acid 2a with a reagent such as N-hydroxyphthalimide, followed by Ni-mediated reductive coupling with an aryl halide and acid mediated deprotection provides intermediates such as II.

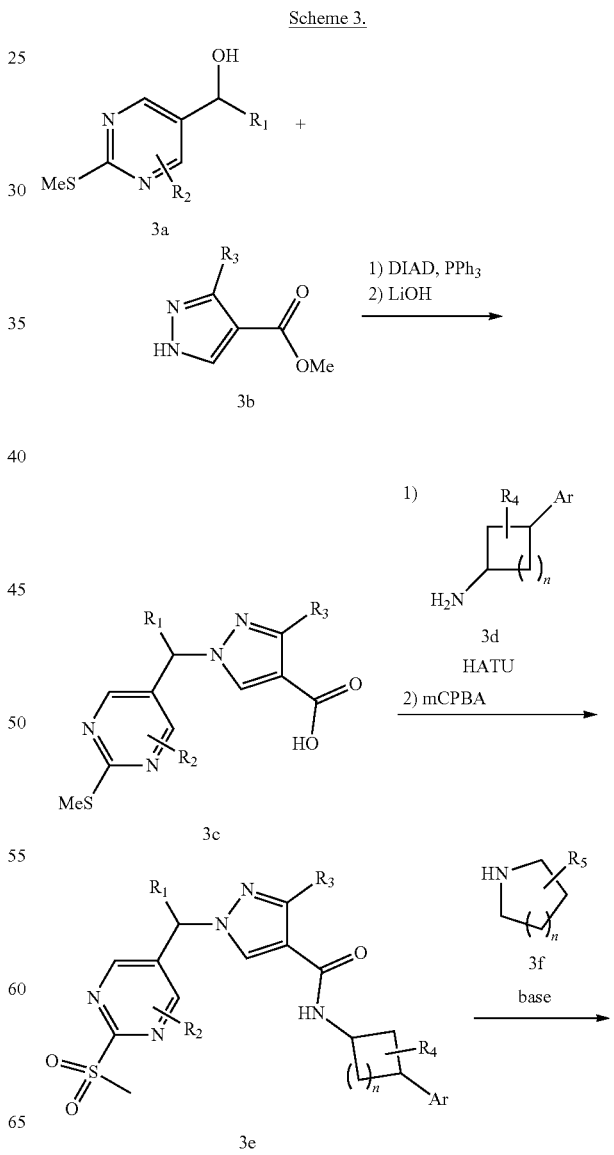

-continued

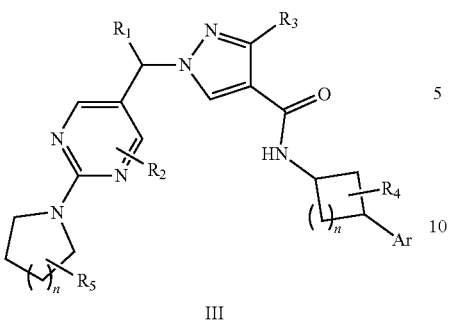

III

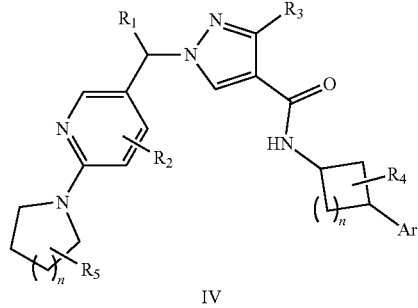

IV

General synthesis of multiple embodiments of the present invention are summarized in Scheme 3 which depicts the preparation of compounds III from intermediate 3a and 3b. Mitsunobu reaction of alcohol 3a with a pyrazole such as 3b using a reagent such as diisopropyl azodicarboxylate and triphenylphosphine, followed by ester hydrolysis provides acid 3c. Amide coupling of 3c with an amine such as 3d using a reagent such as N,N,N',N'-tetramethyl-O-(7-azabenzotriazol-1-yl)uronium hexafluorophosphate (HATU) followed by oxidation provides 3e. Treatment of sulfone 3e with an amine such as 3f under basic conditions provide III.

General synthesis of multiple embodiments of the present invention are summarized in Scheme 4 which depicts the preparation of compounds IV from intermediates 4a and 4b. The Mitsunobu reaction product of alcohol 4a and pyrazole 4b was treated with an amine such as 4c under basic condition to provide acid 4d. Amide coupling of 4d with an amine such as 4e using a reagent such as N,N,N,N-tetramethyl-O-(7-azabenzotriazol-1-yl)uronium hexafluorophosphate (HATU) provide IV.

Scheme 4.

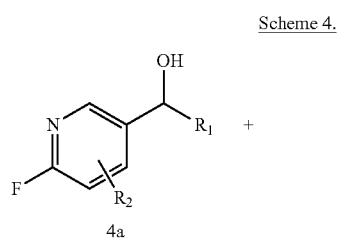

4a

Scheme 5.

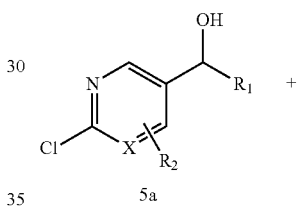

5a

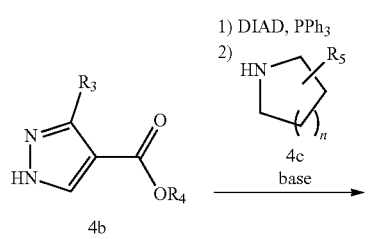

4b

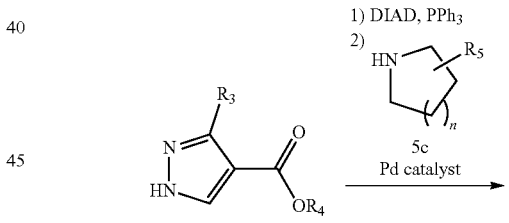

5b

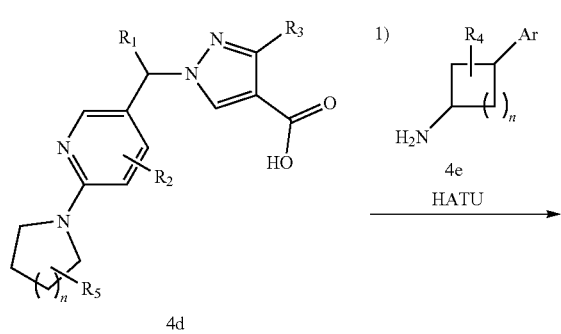

4d

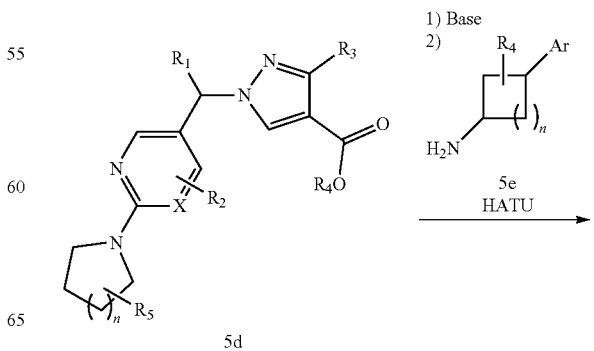

5d

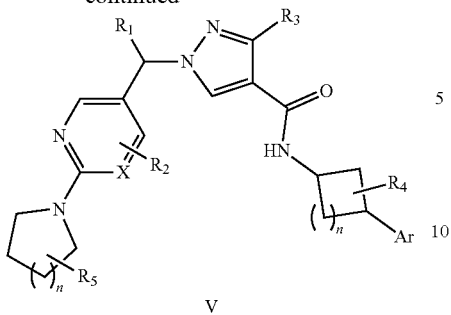

V

General synthesis of multiple embodiments of the present invention are summarized in Scheme 5 which depicts the preparation of compounds V from intermediates 5a and 5b. The Mitsunobu reaction product of alcohol 5a and pyrazole 5b was treated with an amine such as 5c under Pd-mediated carbon-nitrogen bond formation conditions to provide ester 5d. Hydrolysis of ester 5d under basic conditions followed by amide coupling with an amine such as 5e using a reagent such as N,N,N',N'-tetramethyl-O-(7-azabenzotriazol-1-yl)uronium hexafluorophosphate (HATU) provide V.

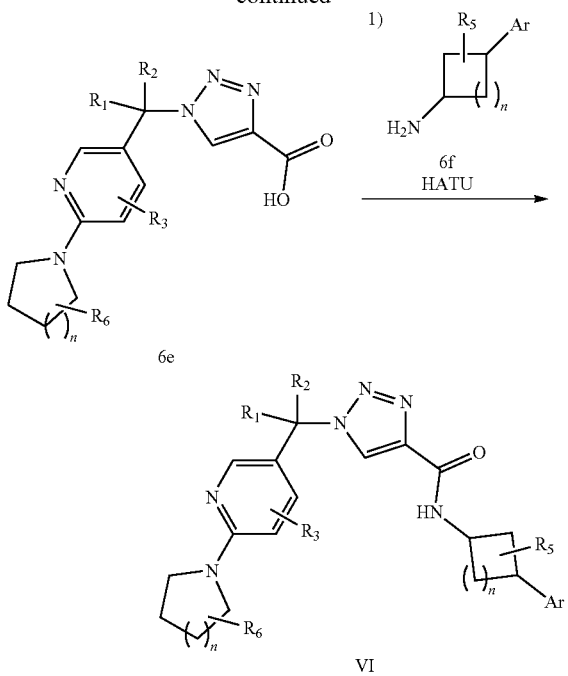

VI

General synthesis of multiple embodiments of the present invention are summarized in Scheme 6 which depicts the preparation of compounds VI from intermediate 6a. Generation of an intermediate azide from 6a using a reagent such as diphenyl phosphoryl azide and DBU, followed by treatment with alkyne 6b under Cu-catalyzed conditions provide triazole 6c. Treatment of 6c with an amine such as 6d under basic conditions, provided acid 6e. Amide coupling of 6e with an amine such as 6f using a reagent such as N,N,N',N'-tetramethyl-O-(7-azabenzotriazol-1-yl)uronium hexafluorophosphate (HATU) provide VI.

Scheme 6.

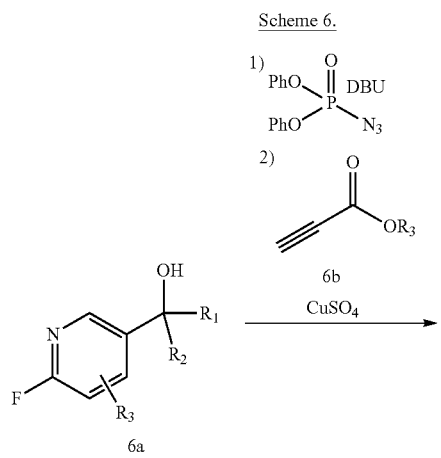

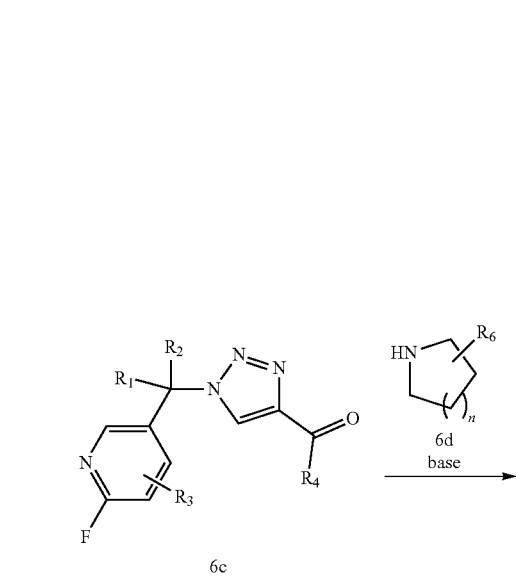

Scheme 7.

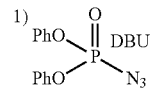

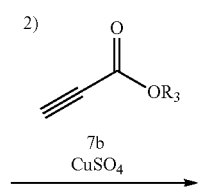

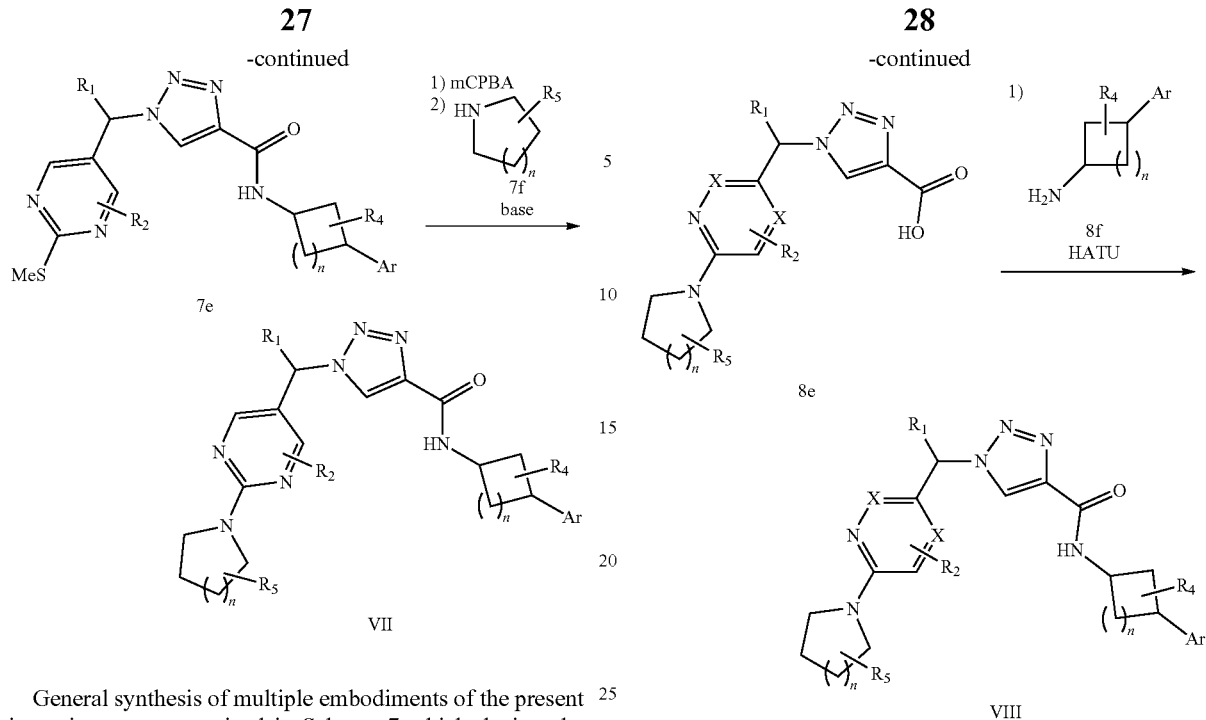

General synthesis of multiple embodiments of the present invention are summarized in Scheme 7 which depicts the preparation of compounds VII from intermediate 7a. Generation of an intermediate azide from 7a using a reagent such as diphenyl phosphoryl azide and DBU, followed by treatment with alkyne 7b under Cu-catalyzed conditions provide triazole 7c. Ester hydrolysis followed by coupling with amine 7d using a reagent such at HATU provides 7e. Oxidation with a reagent, such as mCPBA, followed by treatment with amine 7f under basic conditions provide VII.

General synthesis of multiple embodiments of the present invention are summarized in Scheme 8 which depicts the preparation of compounds VIII from intermediate 8a. Generation of an intermediate azide from 8a using a reagent such as, diphenyl phosphoryl azide and DBU or via alcohol activation and treatment with sodium azide, followed by treatment with alkyne 8b under Cu-catalyzed conditions provide triazole 8c. Ester hydrolysis and Pd-mediated carbon-nitrogen formation condition provide acid 8e. Amide coupling of 8e with an amine such as 8f using a reagent such as HATU provide VIII.

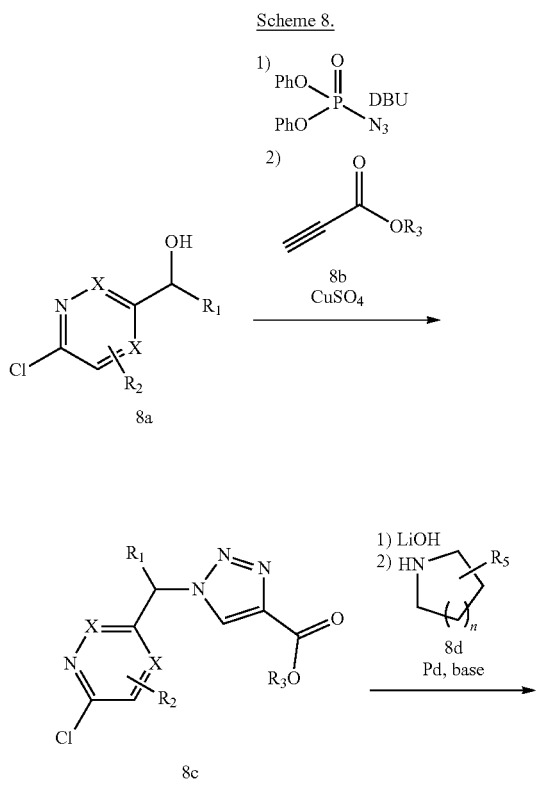

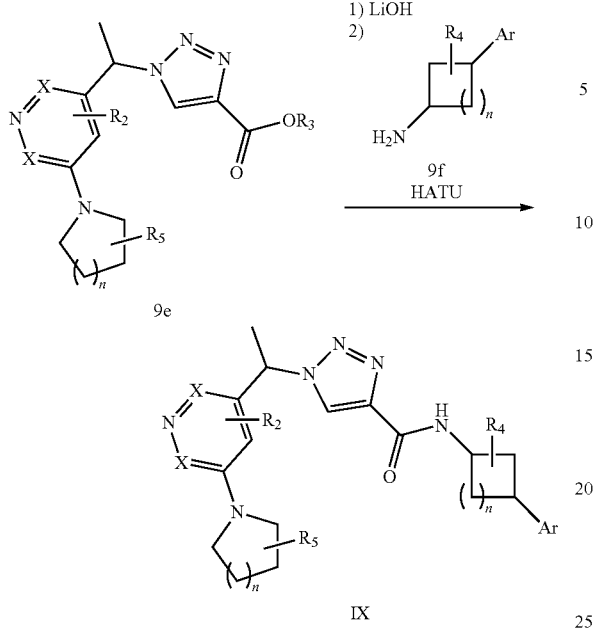

9e

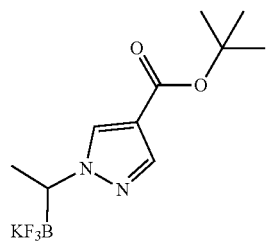

IX

General synthesis of multiple embodiments of the present invention are summarized in Scheme 9 which depicts the preparation of compounds VIII from intermediate 9a. Generation of an intermediate azide from 9a using a reagent such as diphenyl phosphoryl azide and DBU, followed by treatment with alkyne 9b under Cu-catalyzed conditions provide triazole 9c. Pd-mediated carbon-nitrogen bond formation with an amine such as 9d provide 9e. Ester hydrolysis under basic conditions and amide coupling with amine 9f using a reagent such as HATU provide IX.

Scheme 10.

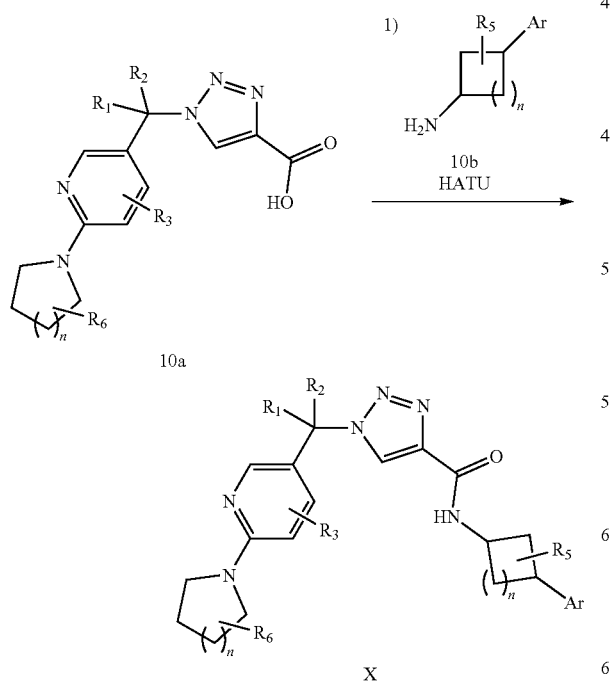

10a

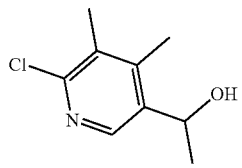

X

General synthesis of multiple embodiments of the present invention are summarized in Scheme 10 which depicts the preparation of compounds X from intermediate 10a. Amide coupling of an acid such as 10a with an amine 10b using a reagent such as HATU provides X.

Intermediates

Intermediate A tert-butyl-1-(1-(trifluoro-14-boraneyl)ethyl)-1H-pyrazole-4-carboxylate, potassium salt Step 1. (1-(4-(tert-butoxycarbonyl)-1H-pyrazol-1-yl)ethyl)boronic acid To a solution of tert-butyl 1H-pyrazole-4-carboxylate (95 g, 565 mmol) at 0° C. in DMF (1 L) was added NaH (27.1 g, 678 mmol, 1.20). The reaction was stirred for 1 h at 0° C., then 2-(1-iodoethyl)-4,4,5,5-tetramethyl-1,3,2-dioxaborolane (239 g, 847 mmol) was added at 0° C. The reaction was stirred at 25° C. for 15 hrs. MTBE (1.00 L) was added and the mixture was stirred at 25° C. for 30 mins. The mixture was filtered and concentrate the filtrate to the title compound. MS=241.3 (M+1).

Step 2. tert-butyl-1-(1-(trifluoro-14-boraneyl)ethyl)-1H-pyrazole-4-carboxylate, potassium salt To a solution of (R)-(1-(4-(tert-butoxycarbonyl)-1H-pyrazol-1-yl)ethyl)boronic acid and (S)-(1-(4-(tert-butoxycarbonyl)-1H-pyrazol-1-yl)ethyl)boronic acid (180 g, 750 mmol) in MeOH (1.80 L) at 25° C. was added KHF$_2$ (234 g, 3.00 mmol) in H$_2$O (900 mL). The solution was stirred at 25° C. for 12 hrs and concentrated to give a residue. Acetone (2.50 L) was added and the mixture at 25° C. for 1 hr. The mixture was filtered and concentrated, then purified by recrystallization from MTBE to provide the title compound. $^1$H NMR (400 MHz DMSO, ppm) δ 7.86 (s, 1H), 7.56 (s, 1H), 3.21 (br d, J=3.4 Hz, 1H), 1.45 (s, 9H), 1.12 (d, J=7.2 Hz, 3H)

Intermediate B 1-(6-chloro-4,5-dimethylpyridin-3-yl)ethan-1-ol

Step 1. 5-bromo-2-chloro-3,4-dimethylpyridine 5-bromo-3,4-dimethylpyridin-2-amine (6.0 g, 29.8 mmol) was suspended in 36% HCl (aq) (120 mL) and was cooled to −15° C. Sodium nitrite (10.29 g, 149 mmol) was added and the reaction mixture was slowly warmed to 25° C. and stirred for 15 h. The reaction was quenched by addition of water (100 mL) and extracted with DCM (5×50 mL). The combined organic layers were dried over sodium sulfate, filtered, and concentrated. The crude material was purified by flash silica gel chromatography (0~21% Ethyl acetate/Petroleum ether) to give the title compound. MS=219.9, 221.9 (M+1).

Step 2.
1-(6-chloro-4,5-dimethylpyridin-3-yl)ethanone

Pd(PPh$_3$)$_2$Cl$_2$ (0.637 g, 0.907 mmol) was dissolved in toluene (20 mL), then tributyl(1-ethoxyvinyl)stannane (4.06 mL, 12.02 mmol) and 5-bromo-2-chloro-3,4-dimethylpyridine (2 g, 9.07 mmol) were added at 20° C. The resulting mixture was stirred for 16 h at 90° C. under N$_2$. The reaction was cooled to 20° C. and 6 M HCl (8 mL) was added and stirred for 1 h. NaHCO$_3$ (aq. 20 mL) was added and the mixture was washed with aq KF (saturated, 3×10 mL). The mixture was extracted with DCM (3×30 mL). The combined organic fractions were washed with brine (saturated, 50 mL), dried over Na$_2$SO$_4$, filtered and the solvent was evaporated under reduced pressure. The residue was purified by flash silica gel chromatography (0~12% Ethyl acetate/Petroleum ether) to the title compound. $^1$H NMR (400 MHz, Methanol-d$_4$) δ 8.50 (s, 1H), 2.60 (s, 3H), 2.45 (s, 3H), 2.42 (s, 3H).

Step 3.
1-(6-chloro-4,5-dimethylpyridin-3-yl)ethan-1-ol

To a stirred solution 1-(6-chloro-4,5-dimethylpyridin-3-yl)ethanone (1.3 g, 7.08 mmol) in MeOH (20 mL) was added NaBH$_4$ (0.402 g, 10.62 mmol) at 0° C. After the addition was finished, the reaction was stirred at 20° C. for 1 h. Aqueous ammonium chloride (saturated, 10 mL) was added and the mixture was extracted with ethyl acetate (3×10 mL), the organic layers were washed with brine (20 mL), dried over Na$_2$SO$_4$, filtered and concentrated to give the title compound. MS=186.0 (M+1).

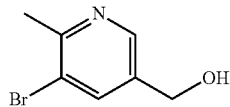

Intermediate C (5-bromo-6-methylpyridin-3-yl)methanol

Step 1. methyl 5-bromo-6-iodonicotinate

To a stirred solution of methyl 5-bromo-6-chloronicotinate (5 g, 19.96 mmol) and sodium iodide (8.98 g, 59.9 mmol) in MeCN (40 mL) was added iodotrimethylsilane (3.99 g, 19.96 mmol) at 25° C., after the addition was finished, the reaction was stirred at 30° C. for 14 h. The reaction was concentrated and diluted with water (20 mL). The pH value of the solution was adjusted to 7 with 2N NaOH. The reaction was extracted with DCM (15 mL×3). The combined organic layer was brine, dried over anhydrous Na$_2$SO$_4$, concentrated in vacuum to provide crude methyl 5-bromo-6-iodonicotinate which was used without further purification. MS=341.8, 343.8 (M+1).

Step 2. methyl 5-bromo-6-methylnicotinate

To a stirred solution of methyl 5-bromo-6-iodonicotinate (3.4 g, 9.94 mmol) and 2,4,6-trimethyl-1,3,5,2,4,6-trioxatriborinane (3.74 g, 29.8 mmol) in dioxane (25 mL) were added K$_2$CO$_3$ (4.12 g, 29.8 mmol) and Pd(DPPF)Cl$_2$ (0.812 g, 0.994 mmol) at 25° C., after the addition was finished, the reaction was stirred at 75° C. for 12 h under N$_2$. The mixture was concentrated, diluted with water (20 mL) and extracted with EtOAc (25 mL×3). The organic layers were washed with brine (20 mL) dried over Na$_2$SO$_4$ and concentrated. The residue was purified by flash silica gel chromatography (0~30% EtOAc/Pet.) to give the title compound. MS=229.9, 231.9 (M+1).

Step 3. (5-bromo-6-methylpyridin-3-yl)methanol

To a stirred solution methyl 5-bromo-6-methylnicotinate (1.7 g, 7.39 mmol) in THF (10 mL) and MeOH (10 mL) was added NaBH$_4$ (0.419 g, 11.08 mmol) and at 0° C., after the addition was finished, the reaction was stirred at 20° C. for 13 h. Aqueous ammonium chloride (saturated, 20 mL) was added and the mixture was extracted with EtOAc (15 mL×3). The combined organic fractions were washed with brine (saturated, 15 mL), dried (Na$_2$SO$_4$), filtered and the solvent was evaporated under reduced pressure. The residue was purified by flash silica gel chromatography (0~36% EtOAc/Pet.) to give the title compound. MS=201.9, 203.9 (M+1).

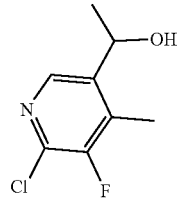

Intermediate D 1-(6-chloro-5-fluoro-4-methylpyridin-3-yl)ethan-1-ol

Step 1. 2-chloro-3-fluoro-5-iodo-4-methylpyridine

To a solution of 2-chloro-3-fluoro-4-iodopyridine (5 g, 19.42 mmol) in THF (50 mL) was added LDA (2M in THF and hexane) (11.65 mL, 23.31 mmol) at −78° C. The mixture was stirred at −78° C. for 30 min. Iodomethane (9.61 ml, 154 mmol) was added at −78° C. and the reaction was stirred at −78° C. for 1.5 h. The mixture was quenched NH$_4$Cl and extracted with EtOAc. The organic layers were washed with sat. NaCl (20 mL), dried over Na$_2$SO$_4$ and concentrated. The residue was purified by flash silica gel chromatography (0-3% Ethyl acetate/Pet. ether) to give the title compound. MS=271.9 (M+1).

Step 2.
1-(6-chloro-5-fluoro-4-methylpyridin-3-yl)ethenone

To a solution of (PPh$_3$)$_2$PdCl$_2$ (1.158 g, 1.650 mmol) in toluene (40 mL) was added tributyl(1-ethoxyvinyl)stannane (5.97 mL, 17.69 mmol) and 2-chloro-3-fluoro-5-iodo-4- methylpyridine (4.48 g, 16.50 mmol) at 20° C. The resulting mixture was stirred for 16 h at 90° C. under N₂. The reaction was cooled to 20° C., 6 M HCl (20 mL) was added, and the mixture was stirred for 1 h at 20° C. NaHCO₃ (aq. 20 mL) was added and the mixture was washed with aq. KF (saturated, 3×10 mL). The mixture was extracted with EtOAc. The combined organic fractions were washed with brine, dried over Na₂SO₄, filtered and concentrated. The residue was purified by flash silica gel chromatography (0-12% Ethyl acetate/Petroleum) to give the title compound. MS=188.0 (M+1).

Step 3. 1-(6-chloro-5-fluoro-4-methylpyridin-3-yl)ethan-1-ol

To a solution of 1-(6-chloro-5-fluoro-4-methylpyridin-3-yl)ethanone (1.665 g, 8.88 mmol) in THF (10 mL) was added NaBH₄ (0.504 g, 13.31 mmol) at 0° C. The mixture was stirred at 20° C. for 1 h. The mixture was quenched with acetone (10 mL), concentrated, and Water (20 mL) and EtOAc (10 mL) were added. The organic layer was separated and the aqueous was extracted with EtOAc. The combined organic layers were washed with brine, dried over anhydrous Na₂SO₄, filtered and concentrated to give the crude product. The crude product was purified by flash silica gel chromatography (0-30% ethyl acetate/pet. ether) to give the title compound. MS=190.0 (M+1).

Intermediate E

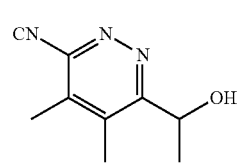

1-(6-chloro-4,5-dimethylpyridazin-3-yl)ethan-1-ol

Step 1. 1-(6-chloro-4,5-dimethylpyridazin-3-yl)ethenone

To a solution of 3,6-dichloro-4,5-dimethylpyridazine (0.42 g, 2.37 mmol) in toluene (10 mL) was added tributyl(1-ethoxyvinyl)stannane (0.842 mL, 2.49 mmol) and Pd(Ph₃P)₂Cl₂ (0.083 g, 0.119 mmol), then the mixture was degassed three times and filled with nitrogen. The mixture was stirred at 90° C. for 12 h, then quenched by addition of aq. KF (30 mL). The mixture was filtered, and the filtrate was extracted with EtOAc (2*20 mL). The organic layers were concentrated in vacuum to give a residue that was dissolved into THF (10 mL) and aq. HCl (5 mL, 4 M). The mixture was stirred at room temperature (26° C.) for 0.5 h, then concentrated in vacuum to give the title compound, that was used directly without further purification. MS=185.0 (M+1).

Step 2. 1-(6-chloro-4,5-dimethylpyridazin-3-yl)ethan-1-ol

To a solution of 1-(6-chloro-4,5-dimethylpyridazin-3-yl)ethanone (0.4 g, 2.17 mmol) in MeOH (1 mL) and THF (5 mL) was added sodium borohydride (0.082 g, 2.167 mmol) at 0° C. The mixture was stirred at 0° C. for 0.5 h, then acetone (5 mL) was added, and the mixture was stirred at 26° C. (room temp) for 1 h. The mixture was concentrated in vacuum to give a residue, which was purified by flash silica gel chromatography (0~50% EtOAc/Pet. Ether) to give the title compound. ¹H NMR (400 MHz, CDCl₃) δ 5.13 (br d, J=5.9 Hz, 1H), 2.41 (s, 3H), 2.31 (s, 3H), 1.50 (d, J=6.3 Hz, 3H). MS=187.1 (M+1).

Intermediate F

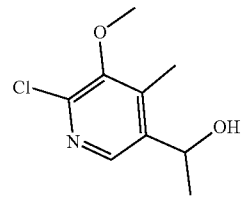

1-(6-chloro-5-methoxy-4-methylpyridin-3-yl)ethan-1-ol

Step 1. 2-chloro-3-fluoro-5-iodo-4-methylpyridine

To a solution of 2-chloro-3-fluoro-4-iodopyridine (3 g, 11.65 mmol) in THF (40 mL) was added LDA (2M in THF and hexane) (6.99 mL, 13.98 mmol) at −78° C. The mixture was stirred at −78° C. for 30 min, iodomethane (3.95 mL, 63.4 mmol) was added at −78° C. and the reaction was stirred at −78° C. for 2 h. The mixture was quenched by NH₄Cl (aq. 40 mL) and extracted with EtOAc (30 mL*3), the combined organic layers were washed with sat. NaCl (20 mL), dried over Na₂SO₄ and concentrated, the residue was purified by reverse phase HPLC (ACN/water with 0.05% TFA modifier) to give the title compound. MS=271.9 (M+1).

Step 2. 2-chloro-5-iodo-3-methoxy-4-methylpyridine

To a solution of 2-chloro-3-fluoro-5-iodo-4-methylpyridine (2.3 g, 8.47 mmol) in MeOH (40 mL) was added sodium methanolate (0.687 g, 12.71 mmol) at 27° C. The mixture was stirred at 80° C. for 48 h, water (aq. 30 mL) was added and the mixture was extracted with EtOAc (20 mL*3). The combined organic layers were washed with brine (20 mL), dried over Na₂SO₄, concentrated and the residue was purified by flash silica gel chromatography (0~7% Pet. ether/EtOAc) to give the title compound. ¹H NMR (400 MHz, CDCl₃) δ 8.43 (s, 1H), 3.86 (s, 3H), 2.45 ppm (s, 3H). MS=283.9 (M+1)

Step 3. 1-(6-chloro-5-methoxy-4-methylpyridin-3-yl)ethan-1-one

To a solution of 2-chloro-5-iodo-3-methoxy-4-methylpyridine (2.6 g, 9.17 mmol) in toluene (40 mL) were added tributyl(1-ethoxyvinyl)stannane (3.71 mL, 11.01 mmol) and (PPh₃)₂PdCl₂ (0.644 g, 0.917 mmol) at 20° C. The resulting mixture was stirred for 16 h at 90° C. under N₂, then cooled to 20° C. and 6 M HCl (40 mL) was added. The mixture was stirred for 1 h at 20° C., then quenched with aq. KF (saturated, 25 mL). The mixture was extracted with EtOAc (3×15 mL). The combined organic fractions were washed with brine (saturated, 50 mL), dried over Na₂SO₄, filtered and the solvent was evaporated under reduced pressure. The residue was purified by flash silica gel chromatography (0~50% Pet. ether/EtOAc) to give the title compound. ¹H NMR (400 MHz, CDCl₃) δ 8.50 (s, 1H), 3.86 (s, 3H), 2.62 (s, 3H), 2.52 ppm (s, 3H). MS=200.1 (M+1).

Step 4. 1-(6-chloro-5-methoxy-4-methylpyridin-3-yl)ethan-1-ol

To a solution of 1-(6-chloro-5-methoxy-4-methylpyridin-3-yl)ethanone (1.4 g, 7.01 mmol) in THF (20 mL) and MeOH (2 mL) was added the sodium tetrahydroborate (0.318 g, 8.42 mmol) at 0° C. and the reaction mixture was stirred at 0° C. for 2 h. Sat. NH₄Cl (5 mL) was added and the aqueous was extracted with EtOAc (5 mL*3). The combined organic layers were concentrated, and the residue was purified by flash silica gel chromatography (0~50% Pet. ether/EtoAc) to give the title compound. ¹H NMR (400 MHz, CDCl₃) δ 8.26 (s, 1H), 5.02-5.14 (m, 1H), 3.84 (s, 3H), 2.33 (s, 3H), 1.53 ppm (d, J=6.6 Hz, 3H). MS=202.1 (M+1).

Intermediate G

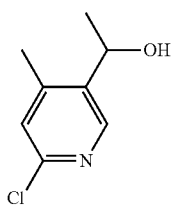

1-(6-chloro-4-methylpyridin-3-yl)ethan-1-ol

Step 1. 1-(6-chloro-4-methylpyridin-3-yl)ethenone 5-bromo-2-chloro-4-methylpyridine (1 g, 4.84 mmol) was dissolved in toluene (20 mL), then tributyl(1-ethoxyvinyl) stannane (2.495 mL, 7.39 mmol) and (PPh₃)₂PdCl₂ (0.340 g, 0.484 mmol) were added at 20° C. The resulting mixture was stirred for 16 h at 90° C. under N₂. The reaction was cooled to 20° C., 6 M HCl (4 mL) was added, and the mixture was stirred for 1 h at 20° C. NaHCO₃ (aq. 20 mL) was added to the mixture and the aqueous was extracted with EtOAc (3×30 mL). The combined organic fractions were washed with aq. KF (saturated, 3×10 mL) and brine (saturated, 50 mL), dried over Na₂SO₄, filtered and concentrated. The residue was purified by flash silica gel chromatography (0~12% ethyl acetate/petroleum ether) to give the title compound. (400 MHz, CDCl₃, ppm) δ 8.71 (s, 1H), 7.22 (s, 1H), 2.60 (s, 3H), 2.54 (s, 3H). MS=170.1 (M+1).

Step 2. 1-(6-chloro-4-methylpyridin-3-yl)ethan-1-ol

To a solution of 1-(6-chloro-4-methylpyridin-3-yl)ethanone (430 mg, 2.54 mmol) in MeOH (5 mL) was added NaBH₄ (96 mg, 2.54 mmol). The mixture was stirred at 20° C. for 0.5 h, then quenched with CH₃COCH₃ (10 mL). The mixture was concentrated, diluted with H₂O (15 mL) was added, and extracted with EtOAc (5 mL*3). The combined organics were washed with brine (10 mL), dried over anhydrous Na₂SO₄, filtered and concentrated. The crude was purified by flash silica gel chromatography (0~50% ethyl acetate/pet. ether) to give the title compound. ¹H NMR (400 MHz, CDCl₃) δ 8.40 (s, 1H), 7.07 (s, 1H), 5.08 (q, J=6.4 Hz, 1H), 2.33 (s, 3H), 1.49 (d, J=6.6 Hz, 3H).

Intermediate H

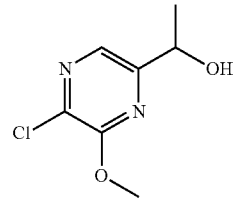

1-(5-chloro-6-methoxypyrazin-2-yl)ethan-1-ol

Step 1. 1-(5-chloro-6-methoxypyrazin-2-yl)ethenone

To a solution of 5-bromo-2-chloro-3-methoxypyrazine (440 mg, 1.969 mmol) and tributyl(1-ethoxyvinyl)tin (0.665 mL, 1.969 mmol) in toluene (14 mL) was added Pd(Ph₃P)₄ (228 mg, 0.197 mmol) and the reaction mixture was stirred at 110° C. for 2 h. The reaction was cooled to 20° C., HCl (4 M, 3 mL) was added, and the reaction was stirred at 20° C. for 1 h. The mixture was diluted with water (10 mL) and extracted with EtOAc (20 mL×3). The combined organic layers were washed with brine, dried over Na₂SO₄, filtered and concentrated. The residue was purified by flash silica gel chromatography (0~17% EA/PE) to give the title compound. MS=187.1 (M+1).

Step 2. 1-(5-chloro-6-methoxypyrazin-2-yl)ethan-1-ol

To a solution of 1-(5-chloro-6-methoxypyrazin-2-yl)ethanone (271 mg, 1.452 mmol) in THF (5 mL) and MeOH (1 mL) was added sodium borohydride (38.5 mg, 1.017 mmol) at 0° C. The mixture was stirred at 25° C. (room temperature) for 1 h. The reaction was quenched by acetone (10 mL), concentrated, and the residue was purified by flash silica gel chromatography (0~25% EA/PE) to give the title compound. MS=189.1 (M+1).

Intermediate I

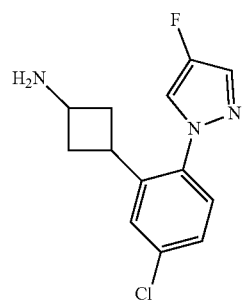

3-(5-chloro-2-(4-fluoro-1H-pyrazol-1-yl)phenyl)cyclobutan-1-amine

Step 1. benzyl (3-(5-chloro-2-(4-fluoro-1H-pyrazol-1-yl)phenyl)cyclobutyl)carbamate A mixture of potassium (3-(((benzyloxy)carbonyl)amino)cyclobutyl)trifluoroborate (202 mg, 0.650 mmol), 1-(2-bromo-4-chlorophenyl)-4-fluoro-1H-pyrazole (138 mg, 0.5 mmol), cesium carbonate (244 mg, 0.750 mmol), [4,4'-Bis(1,1-dimethylethyl)-2,2'-bipyridine]nickel (II) dichloride (99 mg, 0.250 mmol), [4,4'-Bis(1,1-dimethylethyl)-2,2'-bipyridine-N1,N1']bis[3,5-difluoro-2-[5-(trifluoromethyl)-2-pyridinyl-N]phenyl-C]Iridium(III) hexafluorophosphate (14.02 mg, 0.013 mmol) were added to a flask which was sparged with $N_2$ for 10 mins then sealed and submitted to 450 nM light for 12 h using the photoreactor (full power, full fan speed). The mixture was then diluted with EtOAc and washed with water. Aqueous was extracted with EtOAc, and combined organics dried and purified by flash silica gel chromatography (0-100% EtOAc/hexane), affording the title compound. MS=399.0 (M+1).

Step 2. 3-(5-chloro-2-(4-fluoro-1H-pyrazol-1-yl) phenyl)cyclobutan-1-amine

To benzyl (3-(5-chloro-2-(4-fluoro-1H-pyrazol-1-yl)phenyl)cyclobutyl)carbamate (39 mg, 0.098 mmol) in MeOH was added water, followed by potassium hydroxide (192 mg, 3.41 mmol). The mixture was stirred at 65° C., overnight at 90° C. for 3 h, then the mixture was partitioned between EtOAc and $NH_4Cl$ (sat aq.). The aqueous extracted with EtOAc, dried (MgSO4) filtered and concentrated. Crude material was carried forward without further purification. MS=266.0 (M+1)

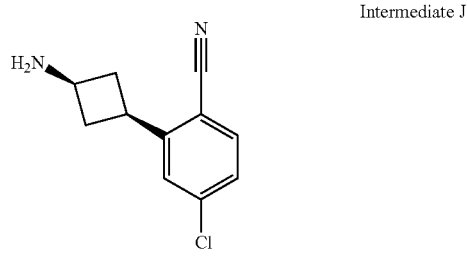 [SMILES: N#Cc1ccc(Cl)cc1[C@H]1C[C@@H](N)C1]

Intermediate J 2-((cis)-3-aminocyclobutyl)-4-chlorobenzonitrile with 2,2,2-trifluoroacetic acid (Scheme 1)

Step 1. 3-oxocyclobutane-1-carbonyl chloride

To a solution of 3-oxocyclobutanecarboxylic acid (122 g, 1070 mmol, 1.0 eq) in dry DCM (1200 mL) at 0° C. was added $SOCl_2$ (233 mL, 3210 mmol, 3.0 eq) dropwise. The mixture was heated to reflux for 1.5 h and then evaporated in vacuo to provide the title compound.

Step 2. 3-oxocyclobutane-1-carbonyl azide

To a solution of 3-oxocyclobutanecarbonyl chloride (99 g, 749 mmol, 1.0 eq) in acetone (1000 mL) at 0° C., a solution of $NaN_3$ (58.4 g, 898.8 mmol, 1.2 eq) in $H_2O$ (200 mL) at 0° C. was added dropwise. After addition, the mixture was stirred for 1 h and treated with ice (110 g). The resulting mixture was extracted with $Et_2O$ (2×1000 mL). Combined organic layers were washed with brine, dried over anhydrous Mg2SO4 and concentrated to about 15 mL solution. Toluene (2×30 mL) was added into the residue and the mixture was co-evaporated twice to remove $Et_2O$ (about 30 mL solution left each time to avoid explosion), which provided the title compound.

Step 3. tert-butyl (3-oxocyclobutyl)carbamate

To a solution of 3-oxocyclobutane-1-carbonyl azide in toluene from the previous step, was added 800 mL toluene. The resulting solution was heated to 90° C. until the evolution of $N_2$ ceased. Next, 500 mL of t-BuOH was added into the reaction mixture and the resulting mixture was stirred overnight at 90° C. The mixture was cooled and concentrated. The crude residue was purified using flash silica gel chromatography (17% ethyl acetate/petroleum ether) to provide the title compound.

Step 4. tert-butyl (3-hydroxycyclobutyl)carbamate

To a solution of tert-butyl N-(3-oxocyclobutyl)carbamate (95 g, 502.9 mmol, 1.0 eq) in THF (950 mL) and MeOH (475 mL) cooled to 0° C. was added $NaBH_4$ (38 g, 1005.8 mmol, 1.0 eq) was added in portions. The mixture was stirred for 1 h at rt. The reaction solution was quenched by addition of 1 L $NH_4Cl$ (aq), THF and MeOH in the solution was evaporated and extracted with DCM (3×1 L). The organic layers were combined and washed with brine (2×1 L). The organic layer was dried by $Na_2SO_4$ and concentrated under vacuum to provide the title compound.

Step 5. tert-butyl (3-iodocyclobutyl)carbamate

To a solution of tert-butyl N-(3-hydroxycyclobutyl)carbamate (88.9 g, 472.8 mmol, 1.0 eq) in DCM (900 mL) was added 12 (144 g, 567.4 mmol, 1.2 eq), $PPh_3$ (148.6 g, 567.4 mmol, 1.2 eq), and imidazole (38.6 g, 567.4 mmol, 1.2 eq). The reaction mixture was stirred at rt 12 h. The mixture was diluted with 2 L $H_2O$, then filtered, and the liquid was extracted with DCM (2×1 L). The organic layers were combined and washed with brine (2×1 L). The organic layer was dried by $Na_2SO_4$ and concentrated under vacuum. The residue was purified by flash silica gel chromatography (3% ethyl acetate/petroleum ether) to afford the title compound.

Step 6. tert-butyl (3-(5-chloro-2-cyanophenyl)cyclobutyl)carbamate

To a solution of $NiCl_2$(DME) (16.25 g, 73.97 mmol, 0.2 eq) in DMA (1000 mL) was added, DPy (11.55 g, 73.97 mmol, 0.2 eq) and the mixture was degassed with $N_2$ (×3) and stirred at room temperature for 30 min. tert-butyl N-(3-iodocyclobutyl)carbamate (109.9 g, 369.86 mmol, 1.0 eq), 2-bromo-4-chlorobenzonitrile (96.07 g, 443.84 mmol, 1.2 eq), and zinc powder (36.29 g, 554.8 mmol, 1.5 eq) in DMA (4000 mL) was added. The mixture was degassed with $N_2$ (×3). The reaction mixture was stirred at r.t for 3 h and 5 L of water was added. The resulting solution was extracted with ethyl acetate (3×2 L) and the organic layers combined. The resulting mixture was washed with brine. The organic layers were dried over anhydrous sodium sulfate and concentrated under vacuum. The residue was purified by flash silica gel chromatography (2% to 3% ethyl acetate/petroleum ether) to afford mixture of isomers. The title compounds were resolved by Prep-SFC with the following conditions: EnantioPak-A1-5(02); IPA 40%). This resulted in the faster eluting isomer tert-butyl (cis-(5-chloro-2-cyanophenyl)cyclobutyl)carbamate obtained as a solid: MS: 305. $^1$H NMR (300 MHz, CD3OD): δ 7.66 (d, J=8.3 Hz, 1H), 7.57 (d, J=1.9 Hz, 1H), 7.41 (dd, J=8.3, 2.0 Hz, 1H), 4.10 (p, J=8.3 Hz, 1H), 3.48 (tt, J=10.1, 7.6 Hz, 1H), 2.92-2.74 (m, 2H), 2.18-2.01 (m, 2H), 1.46 (s, 9H). [M−1]⁻.

The slower eluting isomer tert-butyl (trans-(5-chloro-2-cyanophenyl)cyclobutyl)carbamate obtained as a solid: MS: 305 [M−1] $^1$H NMR (300 MHz, CD3OD): δ 7.69 (d, J=8.2

Hz, 2H), 7.42 (dd, J=8.3, 2.0 Hz, 1H), 4.17 (dt, J=14.2, 6.4 Hz, 1H), 3.91 (p, J=7.6, 7.2 Hz, 1H), 2.54 (t, J=7.3 Hz, 4H), 1.47 (s, 9H).

Step 7. 2-((cis)-3-aminocyclobutyl)-4-chlorobenzonitrile compound with 2,2,2-trifluoroacetic acid (1:1)

Trifluoroacetic acid (6.03 ml, 78 mmol) was added to a stirred solution of tert-butyl (cis-(5-chloro-2-cyanophenyl) cyclobutyl)carbamate (3.0 g, 9.78 mmol) in dichloromethane at RT. The reaction mixture was stirred at RT for 2 h. The reaction mixture was concentrated under reduced pressure. The residue was purified by reverse phase HPLC (ACN/water with 0.05% TFA modifier) to give the title compound. MS=207.2 (M+1).

Table 1. The following compounds were prepared according to procedures similar to those described for Intermediate J using the appropriate starting materials.

| Intermediate | Structure | Name | Exact Mass [M]+ or 1H NMR |
|---|---|---|---|
| K | | 3-(5-chloro-2-(difluoromethyl)phenyl)cyclobutan-1-amine | Calc'd 231.1 Found 232.1 |
| L | | 3-(5-chloro-2-(difluoromethoxy)phenyl)cyclobutan-1-amine | Calc'd 247.1 Found 248.1 |
| M | | 2-(3-aminocyclobutyl)-4-fluorobenzonitrile | Calc'd 190.1 Found 191.1 |
| N | | 2-(3-aminocyclobutyl)-6-methylnicotinonitrile | Calc'd 187.1 Found 188.1 |
| O | | 3-(4-chloropyridin-2-yl)cyclobutan-1-amine | Calc'd 182.1 Found 182.9 |

Intermediate P

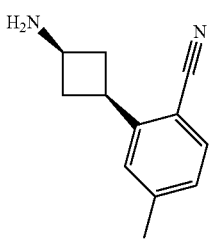

2-((cis)-3-aminocyclobutyl)-4-methylbenzonitrile

Step 1. 3-oxocyclobutane-1-carbonyl chloride

To a solution of 3-oxocyclobutanecarboxylic acid (122 g, 1070 mmol, 1.0 eq) in dry DCM (1200 mL) at 0° C. was added $SOCl_2$ (233 mL, 3210 mmol, 3.0 eq) dropwise. The mixture was heated to reflux for 1.5 h and then evaporated in vacuo to provide the title compound.

Step 2. 3-oxocyclobutane-1-carbonyl azide

To a solution of 3-oxocyclobutanecarbonyl chloride (99 g, 749 mmol, 1.0 eq) in acetone (1000 mL) at 0° C., a solution of $NaN_3$ (58.4 g, 898.8 mmol, 1.2 eq) in $H_2O$ (200 mL) at 0° C. was added dropwise. After addition, the mixture was stirred for 1 h and treated with ice (110 g). The resulting mixture was extracted with $Et_2O$ (2×1000 mL). Combined organic layers were washed with brine, dried over anhydrous $MgSO_4$ and concentrated to about 15 mL solution. Toluene (2×30 mL) was added into the residue and the mixture was co-evaporated twice to remove $Et_2O$ (about 30 mL solution left each time to avoid explosion), which afforded the title compound.

Step 3. tert-butyl (3-oxocyclobutyl)carbamate

To a solution of 3-oxocyclobutane-1-carbonyl azide in toluene from the previous step, was added 800 mL toluene. The resulting solution was heated to 90° C. until the evolution of $N_2$ ceased. Next, 500 mL of t-BuOH was added into the reaction mixture and the resulting mixture was stirred overnight at 90° C. The mixture was cooled and concentrated. The crude residue was purified using flash silica gel chromatography (17% ethyl acetate/petroleum ether) to provide the title compound.

Step 4. tert-butyl (3-hydroxycyclobutyl)carbamate

To a solution of tert-butyl N-(3-oxocyclobutyl)carbamate (95 g, 502.9 mmol, 1.0 eq) in THF (950 mL) and MeOH (475 mL) cooled to 0° C. was added $NaBH_4$ (38 g, 1005.8 mmol, 1.0 eq) was added in portions. The mixture was stirred for 1 h at rt. The reaction solution was quenched by addition of 1 L $NH_4Cl$ (aq), THF and MeOH in the solution was evaporated and extracted with DCM (3×1 L). The organic layers were combined and washed with brine (2×1 L). The organic layer was dried by $Na_2SO_4$ and concentrated under vacuum to provide the title compound.

Step 5. tert-butyl (3-iodocyclobutyl)carbamate

To a solution of tert-butyl N-(3-hydroxycyclobutyl)carbamate (88.9 g, 472.8 mmol, 1.0 eq) in in DCM (900 mL) was added 12 (144 g, 567.4 mmol, 1.2 eq), $PPh_3$ (148.6 g, 567.4 mmol, 1.2 eq), and imidazole (38.6 g, 567.4 mmol, 1.2 eq). The reaction mixture was stirred at rt 12 h. The mixture was diluted with 2 L $H_2O$, then filtered, and the liquid was extracted with DCM (2×1 L). The organic layers were combined and washed with brine (2×1 L). The organic layer was dried by $Na_2SO_4$ and concentrated under vacuum. The residue was purified by flash silica gel chromatography (3% ethyl acetate/petroleum ether) to give the title compound.

Step 6. tert-butyl (3-(5-chloro-2-cyanophenyl)cyclobutyl)carbamate

To a solution of $NiCl_2(DME)$ (16.25 g, 73.97 mmol, 0.2 eq) in DMA (1000 mL) was added, DPy (11.55 g, 73.97 mmol, 0.2 eq) and the mixture was degassed with $N_2$ (×3) and stirred at room temperature for 30 min. tert-butyl N-(3-iodocyclobutyl)carbamate (109.9 g, 369.86 mmol, 1.0 eq), 2-bromo-4-chlorobenzonitrile (96.07 g, 443.84 mmol, 1.2 eq), and zinc powder (36.29 g, 554.8 mmol, 1.5 eq) in DMA (4000 mL) was added. The mixture was degassed with $N_2$ (×3). The reaction mixture was stirred at r.t for 3 h and 5 L of water was added. The resulting solution was extracted with ethyl acetate (3×2 L) and the organic layers combined. The resulting mixture was washed with brine. The organic layers were dried over anhydrous sodium sulfate and concentrated under vacuum. The residue was purified by flash silica gel chromatography (2% to 3% ethyl acetate/petroleum ether) to give a mixture of isomers. The title compounds were resolved by Prep-SFC with the following conditions: EnantioPak-A1-5(02); IPA 40%). This resulted in the faster eluting isomer tert-butyl (cis-(5-chloro-2-cyanophenyl)cyclobutyl)carbamate obtained as a solid: MS: 305 [M–1]⁻. The slower eluting isomer tert-butyl (trans-(5-chloro-2-cyanophenyl)cyclobutyl)carbamate obtained as a solid: MS: 305 [M–1]⁻

Step 7. tert-butyl ((cis)-3-(2-cyano-5-methylphenyl)cyclobutyl)carbamate

To a solution of tert-butyl ((cis)-3-(5-chloro-2-cyanophenyl)cyclobutyl)carbamate (500 mg, 1.630 mmol), potassium phosphate (1038 mg, 4.89 mmol), and methylboronic acid (293 mg, 4.89 mmol) in dioxane (8 mL) placed under a nitrogen atmosphere was added $Pd(dppf)Cl_2$ (239 mg, 0.293 mmol). The reaction mixture was stirred overnight at 90° C. Upon reaction completion, the mixture was diluted with ethyl acetate, filtered, concentrated under reduced pressure and purified by flash silica gel chromatography (0-100% ethyl acetate/hexane) to afford the title compound. MS=287.0 (M+1).

Step 8. 2-((cis)-3-aminocyclobutyl)-4-methylbenzonitrile

Hydrogen chloride (5 mL, 20.00 mmol) (4N in dioxane) was added to a stirred solution of tert-butyl ((cis)-3-(2-cyano-5-methylphenyl)cyclobutyl)carbamate (384 mg, 1.341 mmol) in dichloromethane (5 mL) at room temperature. The reaction mixture was stirred for 1.5 hr at room temperature. The reaction mixture was concentrated under reduced pressure to afford the title compound as an HCl salt. MS=187.1 (M+1).

Intermediate Q

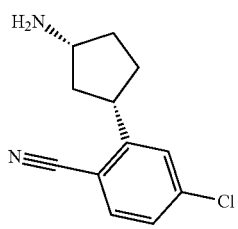

2-((1S,3R)-3-aminocyclopentyl)-4-chlorobenzonitrile (Scheme 2)

Step 1. 1,3-dioxoisoindolin-2-yl (1S,3R)-3-((tert-butoxycarbonyl)amino)cyclopentane-1-carboxylate To a solution of (1S,3R)-3-((tert-butoxycarbonyl)amino)cyclopentane-1-carboxylic acid (750 mg, 3.27 mmol), N-hydroxyphthalimide (640 mg, 3.93 mmol), and DMAP (40.0 mg, 0.327 mmol) in DCM (16.400 ml) was added DIC (0.663 ml, 4.25 mmol). The reaction was stirred 18 h at rt, then filtered through celite and concentrated. The residue was purified by silica gel chromatography (0-100% EtOAc in Hex) to give the title compound. MS=375.1 (M+1)

Step 2. tert-butyl ((1R,3R)-3-(5-chloro-2-cyanophenyl)cyclopentyl)carbamate and tert-butyl ((1R,3S)-3-(5-chloro-2-cyanophenyl)cyclopentyl)carbamate To a solution of Nickel(II) Chloride Hexahydrate (31.7 mg, 0.134 mmol) and 4,4'-di-tert-butyl-2,2'-bipyridine (35.8 mg, 0.134 mmol) in DMA (2226 µl) in a glove box was added 1,3-dioxoisoindolin-2-yl (1S,3R)-3-((tert-butoxycarbonyl)amino)cyclopentane-1-carboxylate (250 mg, 0.668 mmol), 2-bromo-4-chlorobenzonitrile (289 mg, 1.335 mmol) and activated zinc (87 mg, 1.335 mmol). The reaction was stirred 6 h at rt, then diluted with 1M HCl and EtOAc. The aqueous was extracted with EtOAc (×2) and combine extracts were washed with brine, dried over $Na_2SO_4$, filtered and concentrated. The residue was purified by silica gel chromatography (0~100% EtOAc/Hex) to give the title compounds. The enantiopure title compounds were resolved by Chiral SFC (AD-H, 21×250 mm; 10% MeOH). The faster-eluting enantiomer of the title compound was obtained as a solid (2-((1R,3R)-3-aminocyclopentyl)-4-chlorobenzonitrile): MS=265.4 (M+1-56).

Step 3. 2-((1S,3R)-3-aminocyclopentyl)-4-chlorobenzonitrile

To a solution of tert-butyl ((1R,3S)-3-(5-chloro-2-cyanophenyl)cyclopentyl)carbamate (23.8 mg, 0.074 mmol)) in DCM (371 µl) was added 4N HCl in dioxane (185 µl, 0.742 mmol). The reaction was stirred 2 h at rt and concentrated. The residue was used directly. MS=221.0 Table 2. The following compounds were prepared according to procedures similar to those described for Intermediate P using the appropriate starting materials.

| Intermediate | Structure | Name | Exact Mass [M]+ or 1H NMR |
|---|---|---|---|
| R | ![structure] | 2-((cis)-3-amino-1-methylcyclobutyl)-4-chlorobenzonitrile | Calc'd 220.1 Found 221.1 |
| S | ![structure] | 2-(cis)-3-amino-1-fluorocyclobutyl)-4-chlorobenzonitrile | Calc'd 224.1 Found 225.1 |
| T | ![structure] | 2-(5-aminobicyclo[3.1.1]heptan-1-yl)-4-chlorobenzonitrile | Calc'd 246.1 Found 247.0 |

Intermediate U

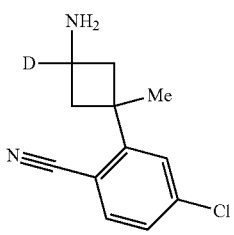

2-(3-amino-1-methylcyclobutyl-3-d)-4-chlorobenzonitrile

Step 1.
4-chloro-2-(1-methyl-3-oxocyclobutyl)benzonitrile

To a solution of nickel (II) chloride hexahydrate (609 mg, 2.56 mmol) and 4,4'-di-tert-butyl-2,2'-bipyridine (1375 mg, 5.12 mmol) to in DMA (42.700 ml) in a glove box, was added 1,3-dioxoisoindolin-2-yl 1-methyl-3-oxocyclobutane-1-carboxylate (3500 mg, 12.81 mmol), 2-bromo-4-chlorobenzonitrile (5545 mg, 25.6 mmol) and Zinc (1675 mg, 25.6 mmol). The reaction was stirred 6 h at rt, filtered through Celite, and diluted with 1M HCl and EtOAc. The aqueous was extracted with EtOAc (×2) and the combined extracts were washed with brine, dried over $Na_2SO_4$, filtered, and concentrated. The residue was purified by flash silica gel chromatography (0~100% EtOAc/Hex.) to give the title compound. $^1$H NMR (500 MHz, CD3OD, ppm) δ 7.78 (d, J=8.3 Hz, 1H), 7.61 (d, J=2.0 Hz, 1H), 7.50 (dd, J=8.3, 2.0 Hz, 1H), 3.72-3.63 (m, 2H), 3.29-3.20 (m, 2H), 1.69 (s, 3H).

Step 2. 2-(3-amino-1-methylcyclobutyl-3-d)-4-chlorobenzonitrile

To a solution of 4-chloro-2-(1-methyl-3-oxocyclobutyl)benzonitrile (60 mg, 0.273 mmol) in ammonia in methanol (683 μl, 1.366 mmol)) was added titanium(IV) isopropoxide (162 μl, 0.546 mmol). The reaction was stirred 4 h at rt., sodium borodeuteride (14.41 μl, 0.410 mmol)) was added and the reaction was stirred 2 h at rt. Ammonia hydroxide (200 uL, 0.4 mmol) (2M in MeOH) was added, the solution was diluted with EtOAc, filtered through celite, and concentrated. The residue was purified by reverse phase HPLC (ACN/water with 0.05% TFA modifier) to give the title compound. MS=222.3 (M+1).

Intermediate V

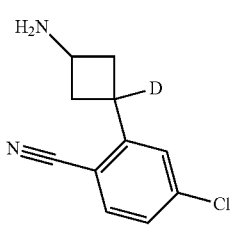

2-(3-aminocyclobutyl-1-d)-4-chlorobenzonitrile

Step 1.
tert-butyl(3-iodocyclobutoxy-3-d)dimethylsilane

To a solution of 3-((tert-butyldimethylsilyl)oxy)-cyclobutan-1-d-1-ol (2.34 g, 11.5 mmol, 1.0 eq) in DCM (46 mL), 12 (3.5 g, 13.8 mmol, 1.2 eq), $PPh_3$ (3.92 g, 15.0 mmol, 1.3 eq), and imidazole (1.18 g, 17.3 mmol, 1.5 eq) were added. The reaction mixture was stirred at rt for 12 h. The mixture was diluted with $H_2O$ and filtered over celite. The layers in the filtrate were separated and the aqueous layer extracted with DCM. The combined organic layers were dried over $MgSO_4$, filtered and concentrated under reduced pressure. The crude residue was purified by flash silica gel chromatography (EtOAc/hexanes) to afford the title compound.

Step 2. 2-(3-((tert-butyldimethylsilyl)oxy)cyclobutyl-1-d)-4-chlorobenzonitrile

To a vial containing $NiCl_2$(DME) (44 mg, 0.2 mmol, 0.2 eq) and 2,2'-bipyridine (31 mg, 0.2 mmol, 0.2 eq), DMA (4 mL) was added. The mixture was degassed with $N_2$ and stirred at room temperature for 30 min. This solution was added to another vial (under $N_2$) containing tert-butyl(3-iodocyclobutoxy-3-d)dimethylsilane (313 mg, 1.0 mmol, 1.0 eq), 2-bromo-4-chlorobenzonitrile (325 mg, 1.50 mmol, 1.5 eq), TBAI (369 mg, 1.0 mmol, 1.0 eq), and zinc powder (98 mg, 1.50 mmol, 1.5 eq) in DMA (1.6 mL). The mixture was degassed with $N_2$ for 5 min and then left to stir at rt for 4 h. The reaction was quenched with $H_2O$ and diluted with EtOAc. The layers were separated and aqueous layer extracted with EtOAc. The combined organic layers were dried over $MgSO_4$, filtered and concentrated under reduced pressure. The crude residue was purified by flash silica gel chromatography (EtOAc/hexanes) to give the title compound.

Step 3.
4-chloro-2-(3-hydroxycyclobutyl-1-d)benzonitrile

To a solution of 2-(3-((tert-butyldimethylsilyl)oxy)cyclobutyl-1-d)-4-chlorobenzonitrile (132 mg, 0.41 mmol, 1.0 eq) in THF (4 mL) in an ice bath was added 1.0M TBAF in THF (0.61 mL, 0.61 mmol, 1.5 eq). The reaction mixture was allowed to warm to room temperature and stirred for 4 h. The reaction was quenched with $H_2O$ and diluted with EtOAc. The layers were separated and the aqueous layer was extracted with EtOAc. The combined organic layers were dried over $MgSO_4$, filtered and concentrated under reduced pressure to give the title compound. The crude alcohol was carried forward without any additional purification.

Step 4.
4-chloro-2-(3-oxocyclobutyl-1-d)benzonitrile

To a solution of 4-chloro-2-((cis)-3-hydroxycyclobutyl-1-d)benzonitrile and 4-chloro-2-((trans)-3-hydroxycyclobutyl-1-d)benzonitrile (83 mg, 0.4 mmol, 1.0 eq), $NaHCO_3$ (67 mg, 0.80 mmol, 2.0 eq) in DCM (2.0 mL), Dess-Martin periodinane (187 mg, 0.44 mmol, 1.1 eq) was added. The mixture was stirred at rt for 1 h. DCM was removed under reduced pressure and the crude residue purified by flash silica gel chromatography (EtOAc/hexanes) to afford the title compound.

Step 5.
2-(3-aminocyclobutyl-1-d)-4-chlorobenzonitrile

To a solution of 4-chloro-2-(3-oxocyclobutyl-1-d)benzonitrile (90 mg, 0.44 mmol, 1.0 eq) in $NH_3$ (7 M in MeOH, 1.2 mL, 8.7 mmol, 20 eq), Ti(O$^i$Pr)$_4$ (0.16 mL, 0.52 mmol, 1.2 eq) was added. The reaction was let to stir at rt for 16 h at which point it was cooled to 0° C. $NaBH_4$ (132 mg, 3.5 mmol, 8 eq) was added to the solution, the mixture allowed to warm up to rt and stirred for 12 h. MeOH was removed under reduced pressure followed by addition of H₂O and EtOAc. The mixture was filtered through celite, layers separated, and the aqueous layer extracted with EtOAc. The combined organic layers were dried over MgSO₄, filtered and concentrated under reduced pressure to give the title compound. The crude amine was carried forward without any additional purification. MS=208.1 (M+1)

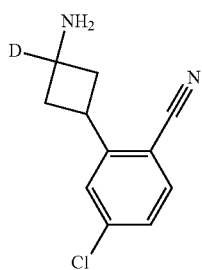

Intermediate W 2-(3-aminocyclobutyl-3-d)-4-chlorobenzonitrile

Step 1. 4-chloro-2-(3-oxocyclobutyl)benzonitrile

To a solution of NiCl₂(DME) (0.42 g, 1.9 mmol) in DMA (10 mL) was added, 4,4'-di-tert-butyl-2,2'-bipyridine (0.54 g, 2.02 mmol) and the mixture was degassed with N₂ (×3) and stirred at room temperature for 30 min. 1,3-dioxoisoindolin-2-yl 3-oxocyclobutane-1-carboxylate (5 g, 19.2 mmol), 2-bromo-4-chlorobenzonitrile (6.26 g, 28.9 mmol), and zinc powder (2.52 g, 38.6 mmol) in DMA (10 mL) was added. The mixture was degassed with N₂ (×3). The reaction mixture was stirred at r.t. for 3 h and water was added. The resulting solution was extracted with ethyl acetate and the organic layers combined. The resulting mixture was washed with brine. The organic layers were dried over anhydrous sodium sulfate and concentrated under vacuum. The residue was purified by flash silica gel chromatography (0% to 50% ethyl acetate/hexane) to give the title compound.

Step 2. 2-(3-aminocyclobutyl-3-d)-4-chlorobenzonitrile

To a solution of 4-chloro-2-(3-oxocyclobutyl)-benzonitrile (130 mg, 0.63 mmol, 1.0 eq) in NH₃ (7 M in MeOH, 1.8 mL, 12.6 mmol, 20 eq), Ti(O'Pr)₄ (0.23 mL, 0.76 mmol, 1.2 eq) was added. The mixture was stirred at rt for 16 h at which point it was cooled to 0° C. NaBD₄ (212 mg, 5.1 mmol, 8 eq) was added to the solution, the mixture was allowed to warm to rt and stirred for 12 h. MeOH was removed under reduced pressure followed by addition of H₂O and EtOAc. The mixture was filtered through celite, layers separated, and the aqueous layer extracted with EtOAc. The combined organic layers were dried over MgSO₄, filtered and concentrated under reduced pressure to give the title compound. The crude amine was carried forward without any additional purification. MS=208.1 (M+1).

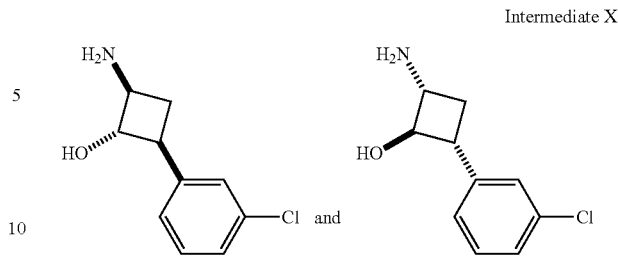

Intermediate X (1S,2S,4S)-2-amino-4-(3-chlorophenyl)cyclobutan-1-ol and (1R,2R,4R)-2-amino-4-(3-chlorophenyl)cyclobutan-1-ol Step 1. tert-butyl (3-(3-chlorophenyl)-3-hydroxycyclobutyl)carbamate To a solution of 1-bromo-3-chlorobenzene (3.10 g, 16.20 mmol) in dry THF (20 mL) was added n-butyllithium (6.48 mL, 16.20 mmol) dropwise at −78° C., then the mixture was degassed three times and stirred under nitrogen atmosphere at −78° C. for 20 min. tert-butyl (3-oxocyclobutyl)carbamate (1.5 g, 8.10 mmol) (dissolved into 1.5 mL of THF) was added dropwise to the reaction mixture and the mixture was stirred at −78° C. for 1 h. The reaction mixture was poured into an aqueous solution of sat. NH₄Cl (30 mL) and extracted with EtOAc (2×30 mL), the organic layer was dried by anhydrous sodium sulfate, filtered and concentrated to give the crude product, which was purified by flash silica gel chromatography (0~30% EtOAc/Pet.) to give the title compound. MS=223.9 (M+1−56−18).

Step 2. 3-(3-chlorophenyl)cyclobut-2-enamin

The mixture of tert-butyl (3-(3-chlorophenyl)-3-hydroxycyclobutyl)carbamate (250 mg, 0.840 mmol) and methanesulfonic acid (0.545 mL, 8.40 mmol) in DCM (6 mL) was stirred at 25° C. for 2 h. The solvent was evaporated, and the residue was purified by reverse phase HPLC (ACN/water with 0.05% TFA modifier) to provide the title compound as a TFA salt. MS=163.0 (M+1-17).

Step 3. (1S,2S,4S)-2-amino-4-(3-chlorophenyl)cyclobutan-1-ol and (1R,2R,4R)-2-amino-4-(3-chlorophenyl)cyclobutan-1-ol (racemic 2-amino-4-(3-chlorophenyl)cyclobutanol, amide and Phenyl Ring are on the Same Side, OH and Phenyl Ring are on the Different Side)

To the 0° C. solution of 3-(3-chlorophenyl)cyclobut-2-enamine, TFA salt (110 mg, 0.375 mmol) in THF (4 mL) was added BH₃-DMS (0.187 mL, 1.873 mmol) (10M in DMS) dropwise under N₂, and the mixture was stirred at 0° C. for 5 min and at 25° C. for 4 h. To the reaction was added sodium perborate (153 mg, 1.873 mmol) and water (1 mL) carefully, and the resulting mixture was stirred at 25° C. for another 1 h. The solvent was evaporated and the residue was purified by reverse phase HPLC (ACN/water with 0.05% TFA modifier) to give 2-amino-4-(3-chlorophenyl)cyclobutanol, TFA salt (faster eluting peak, racemic, amide and phenyl ring are cis, OH and phenyl ring are trans): MS=198.0 (M+1) and 2-amino-4-(3-chlorophenyl)cyclobutanol, TFA salt (slower eluting peak, racemic, amine and phenyl ring are trans, OH and amine are cis): MS=198.0 (M+1).

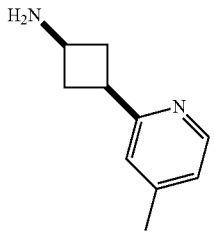

Intermediate Y (cis)-3-(4-methylpyridin-2-yl)cyclobutan-1-amine

Step 1. tert-butyl ((cis)-3-(4-chloropyridin-2-yl)cyclobutyl)carbamate

To a solution of 2,2'-bipyridine (0.105 g, 0.673 mmol), nickel(II) chloride ethylene glycol dimethyl ether complex (0.148 g, 0.673 mmol), TBAI (1.243 g, 3.37 mmol) and zinc (0.330 g, 5.05 mmol) in DMA (5 mL) was added tert-butyl (3-iodocyclobutyl)carbamate (1 g, 3.37 mmol) and 2-bromo-4-chloropyridine (0.648 g, 3.37 mmol) at 27° C. The mixture was stirred at 27° C. for 12 h. Water was added and the reaction was extracted with EtOAc. The organic layers were concentrated and purified by flash silica gel chromatography (0-40% Pet. ether/EtOAc gradient) to give the title compound as a mixture of cis and trans isomers. The isomers were separated by SFC (OD-H; Mobile 15% EtOH (0.1% NH₃H₂O)) to provide the faster eluting isomer tert-butyl ((cis)-3-(4-chloropyridin-2-yl)cyclobutyl)carbamate and the slower eluting isomer tert-butyl ((trans)-3-(4-chloropyridin-2-yl)cyclobutyl)carbamate Step 2. tert-butyl ((cis)-3-(4-methylpyridin-2-yl)cyclobutyl)carbamate To a solution of tert-butyl ((cis)-3-(4-chloropyridin-2-yl)cyclobutyl)carbamate (150 mg, 0.530 mmol), 2,4,6-trimethyl-1,3,5,2,4,6-trioxatriborinane (133 mg, 1.061 mmol) and potassium phosphate (338 mg, 1.591 mmol) in dioxane (3 mL) and H₂O (0.6 mL) was added 1,1'-bis(di-tert-butylphosphino)ferrocene palladium dichloride (34.6 mg, 0.053 mmol). The reaction mixture was stirred for 12 h at 110° C. and water was added, and then the mixture was extracted with EA. The organic layers were concentrated and purified by flash silica gel chromatography (Pet. ether: EA=3:1) to give the title compound. MS=263.1 (M+1).

Step 3. (cis)-3-(4-methylpyridin-2-yl)cyclobutan-1-amine

To a stirred solution of tert-butyl ((cis)-3-(4-methylpyridin-2-yl)cyclobutyl)carbamate (110 mg, 0.419 mmol) in DCM (5 mL) were added TFA (0.5 mL) at 25° C., after the addition was finished, the reaction was stirred at 25° C. for 12 h. The mixture was concentrated to give the title compound, which was used without further purification. MS=163.1 (M+1).

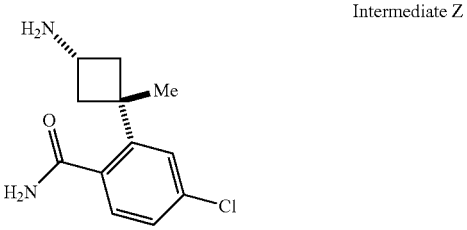 [SMILES: C[C@]1(c2cc(Cl)ccc2C(N)=O)C[C@@H](N)C1]

Intermediate Z 2-((cis)-3-amino-1-methylcyclobutyl)-4-chlorobenzamide

Step 1. 2-((cis)-3-amino-1-methylcyclobutyl)-4-chlorobenzamide

To a solution of 2-((cis)-3-amino-1-methylcyclobutyl)-4-chlorobenzonitrile hydrochloride (20 mg, 0.078 mmol) in MeOH (0.3 ml) and THF (0.3 ml) was added sodium hydroxide (2.333 ml, 11.67 mmol, 5N in water). The reaction mixture was stirred for 16 hr at 90° C. The mixture was concentrated under reduced pressure to remove the organic solvents. The mixture was neutralized with TFA and purified by preparative reverse phase HLC (ACN/water with 0.05% TFA modifier) to afford the title compound as a TFA salt. MS=238.9 (M+1).

Intermediate AA (1R,5S)-3-azabicyclo[3.1.0]hexan-2-one

Step 1. dimethyl (1R,2S)-cyclopropane-1,2-dicarboxylate

To a solution of (1R,5S)-3-oxabicyclo[3.1.0]hexane-2,4-dione (680 g, 6067 mmol) in MeOH (6.8 L) stirred at 30° C., was added H₂SO₄ (68 g, 679 mmol) and the solution was heated to 70° C. for 16 h. The reaction was concentrated under vacuum, diluted with EtOAc, and washed with water (×2). The aqueous was extracted with EtOAc and the combine organics were washed with sat. NaHCO₃ and brine. The Organics were concentrated under vaccum and purified by flash silica gel chromatography (1-10% EtOAc/Pet. Ether) to give the title compound. ¹H NMR (400 MHz, Chloroform-d) δ 3.69 (s, 6H), 2.06 (dd, J=6.9, 8.1 Hz, 2H), 1.76-1.61 (m, 1H), 1.24 (dt, J=5.1, 8.4 Hz, 1H).

Step 2. (1S,2R)-2-(methoxycarbonyl)cyclopropane-1-carboxylic acid

To a solution of Pig liver esterase (2 g, 3 wt % loading) in buffer (3.35 L, 0.1 M phosphate buffer pH=7.0) was added dimethyl (1R,2S)-cyclopropane-1,2-dicarboxylate (67 g, 424 mmol) in MeCN (335 mL) at 30° C. The mixture was stirred for 48 hrs at 30° C. while a pH of 6.8-7.2 was maintained. NaCl (2 kg) was added and the pH was adjusted from 7 to 2. The solution was filtered through celatom and extracted with isopropyl acetate (1.2 L×4). The combine organics were washed with brine (300 mL×3), dried over Na$_2$SO$_4$, filter and concentrated to provide the title compound. MS=145.2 (M+1)

Step 3. methyl (1R,2S)-2-(hydroxymethyl)cyclopropane-1-carboxylate

To a solution of (1S,2R)-2-(methoxycarbonyl)cyclopropane-1-carboxylic acid (220 g, 1526 mmol) in THF (2.2 L), BH$_3$·DMS (305 mL, 3053 mmol) was added dropwise at 40° C. The reaction was stirred at 45° C. for 2 hrs, MeOH (500 mL) was added at 0° C. and the mixture was heated to 50° C. for 4 hrs. The mixture was dried over Na$_2$SO$_4$, concentrated, and purified by flash silica gel chromatography (1~10% EtOAc/Pet. Ether) to give the title compound. $^1$H NMR (400 MHz, CDCl$_3$) δ 3.92 (br dd, J=4.9, 11.7 Hz, 1H), 3.81-3.64 (m, 4H), 2.41-2.19 (m, 1H), 1.83-1.73 (m, 1H), 1.60 (dquin, J=5.3, 8.1 Hz, 1H), 1.15-1.07 (m, 2H).

Step 4. (1R,5S)-3-azabicyclo[3.1.0]hexan-2-one

To a solution of methyl (1R,2S)-2-(hydroxymethyl)cyclopropane-1-carboxylate (220 g, 1690 mmol) in DCM (2.2 L) at 0° C. under N$_2$ was added TEA (471 mL, 3381 mmol) and MsCl (290 g, 2536 mmol). The reaction was stirred for 1h at 0° C. The solution was diluted with DCM (1.0 L), washed with water (300 mL×3) and sat. NaCl (300 mL). The organics were dried over MgSO$_4$, filtered and concentrated. The residue was dissolved in THF (900 mL) and charged into a 5 L autoclave. The mixture was charged with NH$_3$·H$_2$O (2.1 L) and stirred at 50° C. for 12 hrs. The aqueous phase was extracted with CHCl$_3$/i-PrOH (3 V/1 V, 500 mL×4) and the combined organics were washed with brine. The organics were dried over MgSO$_4$, filtered and concentrated. The residue was suspended in MTBE and stirred at 25° C. for 16 hrs, then filtered to provide the title compound. MS=98.3 (M+1)$^1$H NMR (400 MHz, DMSO-d$_6$) δ 7.022 (s, 1H), 3.37-3.28 (d, 1H), 3.14 (d, J=10.4 Hz, 1H), 1.90 (m, J=4.5, 5.9 Hz, 1H), 1.61 (m, J=1.5, 3.1, 6.5 Hz, 1H), 1.00 (m, J=4.2, 8.0 Hz, 1H), 0.44 (m, J=4.0 Hz, 1H).

Intermediate AB

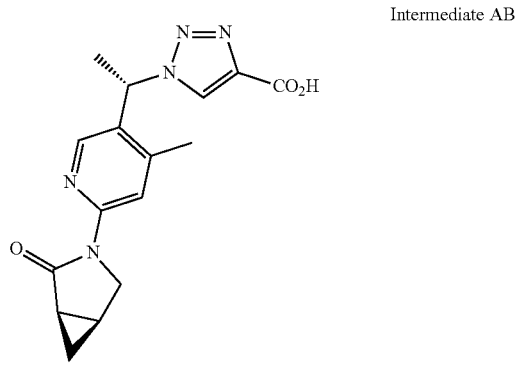 [SMILES: Cc1cc(N2C[C@H]3C[C@H]3C2=O)ncc1[C@H](C)n1cc(C(=O)O)nn1]

1-((S)-1-(4-methyl-6-((1R,5S)-2-oxo-3-azabicyclo [3.1.0]hexan-3-yl)pyridin-3-yl)ethyl)-1H-1,2,3-triazole-4-carboxylic acid Step 1. 5-bromo-4-methylpyridin-2-amine To a solution of 4-methylpyridin-2-amine (250 g, 2.31 mol) in AcOH (1.50 L) below 10° C. was added bromine (369 g, 2.31 mol) dropwise. The reaction was stirred at 25° C. for 2 hr. The solution was concentrated under reduced pressure to remove solvent. H$_2$O (5.00 L) was added, and the pH was adjusted to 7-8 with NaHCO$_3$. The resulting mixture was extracted with ethyl acetate (2.00 L×3), which was then washed with sat. NaCl (2.00 L), dried over sodium sulfate, filtered and concentrated under reduced pressure. The crude product was triturated with MTBE (5.00 L) and filtered to give the title compound. $^1$HNMR: (400 MHz, CDCl$_3$) (8.09 (s, 1H) 6.42 (s, 1H) 4.43 (br s, 2H) 2.29 (s, 3H).

Step 2. 5-bromo-2-fluoro-4-methylpyridine

To a solution of nitrosyl tetrafuoroborate (234 g, 2.00 mol) in CHCl$_3$ (1.00 L) (under nitrogen) at 0° C. was added 5-bromo-4-methylpyridin-2-amine (250 g, 1.34 mol). After stirring at 0° C. for 30 mins, the reaction was stirred at 25° C. for 1.5 hr. The reaction was concentrated under reduced pressure, and the residue was dissolved in DMSO (1.0 L) and stirred for 14 hr at 145° C. The reaction solution was cooled to room temperature, and the reaction liquid was made basic with saturated sodium hydrogen carbonate. The resulting mixture was extracted with EtOAc (2.00 L×5), washed with sat. NaCl (5.00 L×2), dried over sodium sulfate, filtered and concentrated under reduced pressure. The crude was purified by flash silica gel chromatography (10~100% EtOAc/Pet.) to give the title compound. $^1$HNMR: (400 MHz, CDCl$_3$) δ 8.27 (s, 1H) 6.86 (d, J=2.40 Hz, 1H) 2.45 (s, 3H).

Step 3. 1-(6-fluoro-4-methylpyridin-3-yl)ethan-1-ol

Under nitrogen, to a 3 L three-necked flask at 25° C. was added dry Mg (51.2 g, 2.11 mol) and dry LiCl (74.5 g, 1.76 mol), followed by THF (1.5 L). DIBAL-H (1 M, 14.0 mL) was then added, and the reaction was purged and degassed three times with nitrogen. 5-bromo-2-fluoro-4-methylpyridine (267 g, 1.41 mol) was added dropwise at 25° C. over a period of 2 hr under N$_2$, during which the temperature was maintained below 35° C. The reaction stirred at 25° C. for 1 hr. The reaction was cooled to 0° C., and acetaldehyde (5 M, 422 mL) was added dropwise over a period of 30 mins under N$_2$. The reaction was allowed to stir at 25° C. for 1 hr. The reaction was quenched with 50% NH$_4$Cl (1.00 L) and then extracted with EtOAc (500 mL×3). The combined organic phase was washed with brine (1.00 L), dried over anhydrous Na$_2$SO$_4$, filtered and concentrated under reduced pressure. The crude was purified by flash silica gel chromatography (20~50% EtOAc/Pet. Ether) to give the title compound. $^1$H NMR: (400 MHz, DMSO-d$_6$) δ 8.18 (s, 1H) 6.95 (s, 1H) 5.28 (d, J=4.4 Hz, 1H) 4.79-5.02 (m, 1H) 2.36 (s, 3H) 1.35 (d, J=6.4 Hz, 3H).

Step 4. 5-(1-azidoethyl)-2-fluoro-4-methylpyridine

To a solution of 1-(6-fluoro-4-methylpyridin-3-yl)ethan-1-ol (250 g, 1.61 mol), DPPA (466 g, 1.69 mol) and DMAP (197 g, 1.61 mol) in THF (1.00 L) cooled to 0° C. was added DBU (257 g, 1.69 mol) dropwise. The reaction stirred at 25° C. for 24 hr. H$_2$O (500 mL) was added, and the aqueous phase was extracted with MTBE (200 mL×3), washed with sat. NaCl (200 mL×3), dried over Na$_2$SO$_4$, filtered and concentrated under reduced pressure. The residue was purified by flash silica gel chromatography (10~20% EtOAc/ Pet.) to give the title compound. $^1$H NMR: (400 MHz, CDCl$_3$) δ 8.16 (s, 1H) 6.75 (d, J=0.8 Hz, 1H) 4.77 (q, J=6.8 Hz, 1H) 2.41 (s, 3H) 1.59 (d, J=6.8 Hz, 3H).

Step 5. ethy-1-(1-(6-fluoro-4-methylpyridin-3-yl)ethyl)-1H-1,2,3-triazole-4-carboxylate To a solution of –5-(1-azidoethyl)-2-fluoro-4-methylpyridine (230 g, 1.28 mol) and HCCCO$_2$Et (250 g, 2.55 mol) in MeOH (1.50 L) was added a solution of CuSO$_4$·5H$_2$O (79.68 g, 319 mmol) and sodium ascorbate (129 g, 638 mmol) (in H$_2$O (500 mL). The reaction mixture was stirred at room temperature for 1 hr. The reaction was filtered and sat. NaCl (200 mL) was added. The aqueous phase was extracted with EtOAc (300 mL×5), washed with sat. NaCl (200 mL×3), dried over Na$_2$SO$_4$, filtered and concentrated under reduced pressure. The crude product was purified by filtering from MTBE/PE (1:1) to afford title compound. The remaining solution was purified by flash silica gel chromatography (10~100% EtOAc/Pet.) to give the title compound. MS=279.2 (M+1). $^1$H NMR: (400 MHz, CDCl$_3$) (8.23 (br s, 1H) 7.89 (s, 1H) 6.81 (br s, 1H) 6.11 (q, J=6.8 Hz, 1H) 4.40 (q, J=7.2 Hz, 2H) 2.27 (s, 3H) 2.03 (d, J=7.2 Hz, 3H) 1.38 (t, J=7.2 Hz, 3H).

Step 6. ethyl 1-((R)-1-(4-methyl-6-((1R,5S)-2-oxo-3-azabicyclo[3.1.0]hexan-3-yl)pyridin-3-yl)ethyl)-1H-1,2,3-triazole-4-carboxylate and ethyl 1-((S)-1-(4-methyl-6-((1R,5S)-2-oxo-3-azabicyclo[3.1.0]hexan-3-yl)pyridin-3-yl)ethyl)-1H-1,2,3-triazole-4-carboxylate To a solution of ethyl 1-(1-(6-fluoro-4-methylpyridin-3-yl)ethyl)-1H-1,2,3-triazole-4-carboxylate (31.5 g, 113 mmol) and (1R,5S)-3-azabicyclo[3.1.0]hexan-2-one (Intermediate AA) (11.0 g, 113 mmol) in DMA (80 mL) was added NaH (4.76 g, 119 mmol, 60% purity). The reaction was heated at 90° C. for 1 hr. The reaction was then concentrated under reduced pressure to remove solvent. Then, 500 mL EtOAc was added, which was washed with sat. NaCl (100 mL×3). The organic layer was extracted out and concentrated down. The reaction mixture was purified by reverse phase HPLC (ACN/water with 0.05% TFA modifier) to afford the mixture of diastereomers. The title compounds were resolved by chiral SFC (Chiralpak AD, 250*50 mm i.d. 10 μm; 45% MeOH; Gradient: B %=45%) to furnish the enantiopure compounds. The faster-eluting diastereomer of the title compound: MS=356.1 (M+1). $^1$H NMR: (400 MHz, DMSO-d$_6$) δ 8.91 (s, 1H) 8.31 (s, 1H) 8.01 (s, 1H) 6.20 (q, J=6.8 Hz, 1H) 4.30 (q, J=7.2 Hz, 2H) 3.92-4.04 (m, 2H) 2.28 (s, 3H) 2.04-2.11 (m, 2H) 1.93 (d, J=7.2 Hz, 3H) 1.29 (t, J=7.2 Hz, 3H) 1.19 (td, J=8.0, 4.22 Hz, 1H) 0.73 (q, J=4.0 Hz, 1H). The slower-eluting diastereomer of the title compound: MS=356.2 (M+1). $^1$H NMR: (400 MHz, DMSO-d$_6$) δ 8.90 (s, 1H) 8.34 (s, 1H) 8.01 (s, 1H) 6.21 (q, J=6.8 Hz, 1H), 4.30 (q, J=7.2 Hz, 2H) 4.03 (dd, J=11.2, 4.83 Hz, 1H) 3.93 (d, J=11.6 Hz, 1H) 2.28 (s, 3H) 2.07 (br dd, J=7.6, 3.24 Hz, 2H) 1.88-2.00 (m, 3H) 1.29 (t, J=7.2 Hz, 3H) 1.17 (td, J=8.0, 4.28 Hz, 1H) 0.72 (q, J=4.0 Hz, 1H).

Step 7. 1-((S)-1-(4-methyl-6-((1R,5S)-2-oxo-3-azabicyclo[3.1.0]hexan-3-yl)pyridin-3-yl)ethyl)-1H-1,2,3-triazole-4-carboxylic acid To a solution of ethyl 1-((S)-1-(4-methyl-6-((1R,5S)-2-oxo-3-azabicyclo[3.1.0]hexan-3-yl)pyridin-3-yl)ethyl)-1H-1,2,3-triazole-4-carboxylate (500 mg, 1.407 mmol, slower eluting isomer from previous step) in Dioxane (21.10 ml) and Water (7.034 ml) was added LiOH (37.1 mg, 1.548 mmol). The reaction was stirred overnight at room temperature. Toluene (20 mL) was added and the reaction was concentrated under reduced pressure. An additional 20 mL of toluene was added, and the reaction was concentrated under reduced pressure to afford title compound. MS=327.9 (M+1).

Intermediate AC

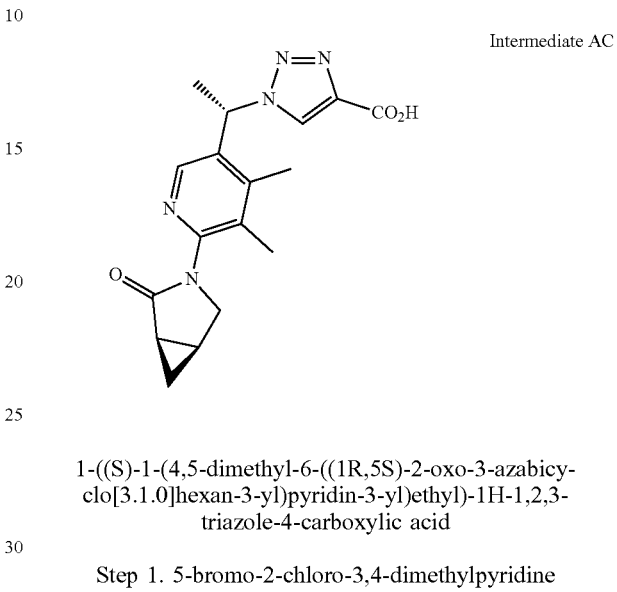

1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxylic acid Step 1. 5-bromo-2-chloro-3,4-dimethylpyridine To HCl (12 M, 3.50 L, 48.3 eq) at –15° C. was added 5-bromo-3,4-dimethylpyridin-2-amine (175 g, 870 mmol, 1.00 eq), followed by addition of a solution of NaNO$_2$ (300 g, 4.35 mol, 5.00 eq) in H$_2$O (150 mL). The reaction stirred at –15° C. for 0.5 hr, and was then warmed to room temperature and allowed to stir for 10 hr. The reaction was poured into water (3.50 L) and the aqueous phase was extracted with dichloromethane (3.00 L×3). The organic layer was washed with sat. NaCl (1.50 L×2), dried over sodium sulfate, filtered and concentrated under reduced pressure. The crude was purified by flash silica gel chromatography (petroleum ether:ethyl acetate=100:1 to 20:1) to afford the title compound. MS=219.8, 221.9 (M+1). $^1$HNMR: (400 MHz, MeOD) δ: 8.28 (s, 1H), 2.48 (s, 3H), 2.43 (s, 3H).

Step 2. 1-(6-chloro-4,5-dimethylpyridin-3-yl)ethan-1-one

A solution of 5-bromo-2-chloro-3,4-dimethylpyridine (230 g, 1.04 mol, 1.00 eq) in toluene (2.30 L) was degassed and purged with N$_2$ three times. Tributyl(1-ethoxyvinyl)stannane (501 g, 1.39 mol, 468 mL, 1.33 eq) and (PPh$_3$)$_2$PdCl$_2$ (73.2 g, 104.3 mmol, 0.10 eq) were added to the mixture under N$_2$ atmosphere. The reaction was degassed and purged with N$_2$ three times and stirred at 90° C. for 12 hrs. The reaction was then cooled to 20° C. and 6.0 M hydrochloric acid aqueous solution (1.00 L) was added to the mixture. The mixture stirred at 20° C. for 1 hr. The mixture was then filtered, and the filtrate was extracted with EtOAc (600 mL×3). The combined organic phase was washed with saturated sodium bicarbonate solution (300 mL×2), KF solution (saturated, 150 mL×3), and brine (500 mL×2). The organic phase was dried over sodium sulfate, filtered and concentrated under reduced pressure. The crude was purified by flash silica gel chromatography (2~10% EtOAc/Pet.). The purified material was then concentrated under reduced pressure and triturated with petroleum ether (450 mL) at 25° C. for 0.5 hr. The mixture was filtered, and the filter cake was washed with petroleum ether (100 mL). The filter cake was then collected and dried under reduced pressure to afford title compound. $^1$HNMR: (400 MHz, MeOD) δ: 8.50 (s, 1H), 2.60 (s, 3H), 2.46 (s, 3H), 2.42 (s, 3H).

Step 3.
1-(6-chloro-4,5-dimethylpyridin-3-yl)ethan-1-ol

To a solution of 1-(6-chloro-4,5-dimethylpyridin-3-yl)ethan-1-one: (80.0 g, 436 mmol, 1.00 eq) in THF (320 mL) and EtOH (80 mL) at 0° C. was added NaBH$_4$ (24.7 g, 653 mmol, 1.50 eq) (in three portions). The reaction was stirred at 0° C. for 15 min, and was then warmed to room temperature and stirred for 5 hr. The mixture was poured into a saturated ammonium chloride aqueous solution (400 mL) at 0° C. and the mixture was extracted with ethyl acetate (150 mL×3). The organic phase with washed with sat. NaCl (150 mL×2), dried over sodium sulfate, filtered and concentrated under reduced pressure to afford the title compound. $^1$HNMR: (400 MHz, MeOD) δ: 8.26 (s, 1H), 5.10 (q, J=6.4 Hz, 1H), 2.38 (s, 3H), 2.36 (s, 3H), 1.45 (d, J=6.4 Hz, 3H).

Step 4.
2-chloro-5-(1-chloroethyl)-3,4-dimethylpyridine

To a solution of 1-(6-chloro-4,5-dimethylpyridin-3-yl)ethan-1-ol (80.0 g, 431 mmol, 1.00 eq) in dry DCM (1.25 L) under N$_2$ atmosphere was added triethylamine (131 g, 1.29 mol, 180 mL, 3.00 eq). MsCl (182 g, 1.59 mol, 123 mL, 3.68 eq) was then added dropwise to the mixture at 0° C. under N$_2$. The mixture was stirred at 0° C. for 5 min, and was then warmed to 20° C. and stirred for 12 hrs. The mixture was poured into saturated ammonium chloride aqueous solution (1.00 L). The aqueous layer was extracted with dichloromethane (300 mL×3). The combined organic layers were washed with saturated sodium bicarbonate solution (300 mL×3) and brine (300 mL×3). The organic layer was dried over sodium sulfate, filtered and concentrated under reduced pressure to afford the title compound. MS=203.9 (M+1).

Step 5.
5-(1-azidoethyl)-2-chloro-3,4-dimethylpyridine

A solution of NaN$_3$ (14.3 g, 220 mmol, 1.50 eq) in DMF (150 mL) at 20° C. was degassed and purged with N$_2$. To the mixture was added dropwise a solution of 2-chloro-5-(1-chloroethyl)-3,4-dimethylpyridine (30.0 g, 147 mmol, 1.00 eq) in DMF (100 mL). The reaction was stirred at 40° C. for 12 hr. The reaction was cooled to room temperature and poured into ice water (750 mL) and stirred for 5 min. MTBE (750 mL) was added to the mixture, which was allowed to stir for 15 min. The mixture was filtered, and the filter cake was washed with MTBE (750 mL×2). The filtrate was extracted with MTBE (750 mL×2). The organic layer was then washed with sat. NaCl (300 mL×3), dried over sodium sulfate, filtered and concentrated under reduced pressure to afford the title compound. $^1$HNMR: (400 MHz, MeOD) δ: 8.17 (s, 1H), 5.03 (q, J=6.8 Hz, 1H), 2.40 (s, 3H), 2.39 (s, 3H), 1.56 (d, J=6.8 Hz, 1H).

Step 6. tert-butyl 1-(1-(6-chloro-4,5-dimethylpyridin-3-yl)ethyl)-1H-1,2,3-triazole-4-carboxylate Under nitrogen, to a solution of 5-(1-azidoethyl)-2-chloro-3,4-dimethylpyridine (55.0 g, 261 mmol, 1.00 eq) in t-BuOH (1.38 L) and H$_2$O (1.38 L) was added tert-butyl prop-2-ynoate (42.8 g, 339 mmol, 46.6 mL, 1.30 eq). To the solution was then added sodium ascorbate (103 g, 522 mmol, 2.00 eq) and CuSO$_4$·5H$_2$O (6.52 g, 26.1 mmol, 0.10 eq). The reaction was degassed, purged with N$_2$ and stirred at room temperature for 12 hr. EtOAc (1.50 L) and water (1.50 L) were added to the mixture, which was stirred at room temperature for 5 min. The mixture was filtered, and the filtrate was extracted with ethyl acetate (1.50 L×3). The organic layer was washed with sat. NaCl (1.00 L×3) and the organic layer was dried under sodium sulfate, filtered and concentrated under reduced pressure. The crude was purified by flash silica gel chromatography (petroleum ether:ethyl acetate:DCM=5:1:1 to 1:1:1). The purified material was then concentrated under reduced pressure and tritiated with MTBE (250 mL) at room temperature for 0.5 hr. The mixture was filtered, and the filter cake was washed with MTBE (100 mL). The filter cake was then collected and dried under reduced pressure to afford the title compound. MS=337.2 (M+1). $^1$HNMR: (400 MHz, MeOD) δ: 8.50 (s, 1H), 8.12 (s, 1H), 6.30 (q, J=7.2 Hz, 1H), 2.40 (s, 3H), 2.34 (s, 3H), 2.01 (d, J=7.2 Hz, 1H), 1.57 (s, 9H).

Step 7. Tert-butyl 1-((R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxylate and tert-butyl 1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxylate To a solution of tert-butyl 1-(1-(6-chloro-4,5-dimethylpyridin-3-yl)ethyl)-1H-1,2,3-triazole-4-carboxylate (95.0 g, 282 mmol, 1.00 eq) and (1R,5S)-3-azabicyclo[3.1.0]hexan-2-one hydrochloride (Intermediate AA) (39.6 g, 296 mmol, 1.05 eq, HCl) in dioxane (1.35 L) was added Cs$_2$CO$_3$ (322 g, 987 mmol, 3.50 eq). The reaction was degassed and purged with N$_2$ three times. Xantphos (16.3 g, 28.2 mmol, 0.10 eq) and Pd$_2$(dba)$_3$ (25.8 g, 28.2 mmol, 0.10 eq) were added to the mixture. The reaction was degassed and purged with N$_2$ three times. The reaction stirred at 100° C. for 12 hr. EtOAc (500 mL) and DCM (500 mL) were added to the mixture, which stirred for 10 min. The mixture was filtered, and the filter cake was washed with ethyl acetate/DCM (1:1) (1.50 L). The organic layer was concentrated under reduced pressure. The crude was purified by flash silica gel chromatography (20~50% EtOAc/Pet. Ether) to afford the mixture of diasteromers. The racemic title compound was resolved by chiral SFC (DAICEL CHIRALCEL OD, 250*50 mm i.d. 10u; 55% IPA (0.1% NH$_3$H$_2$O) to furnish the enantiopure compounds. The faster-eluting enantiomer of the title compound: MS=398.4 (M+1). $^1$HNMR: (400 MHz, MeOD) δ: 8.45 (s, 1H), 8.22 (s, 1H), 6.31 (q, J=7.2 Hz, 1H), 4.19 (br.s, 1H), 3.69-3.73 (m, 1H), 2.31 (s, 3H), 2.17-2.18 (m, 1H), 2.16 (s, 3H), 2.05-2.10 (m, 1H), 2.01-2.02 (m, 3H), 1.57 (s, 9H), 1.30-1.32 (m, 1H), 0.97-1.15 (m, 1H). The slower-eluting enantiomer of the title compound: MS=398.4 (M+1). $^1$HNMR: (400 MHz, MeOD) δ: 8.48 (s, 1H), 8.22 (s, 1H), 6.32 (q, J=6.8 Hz, 1H), 4.22-4.26 (br.s, 1H), 3.69-3.72 (m, 1H), 2.31 (s, 3H), 2.18-2.19 (m, 1H), 2.17 (s, 3H), 2.05-2.10 (m, 1H), 2.01-2.03 (m, 3H), 1.58 (s, 9H), 1.29-1.33 (m, 1H), 0.97-1.15 (m, 1H).

Step 8. 1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxylic acid To a solution of tert-butyl 1-((S)-1-(4,5-dimethyl-6-((1R,5S)-2-oxo-3-azabicyclo[3.1.0]hexan-3-yl)pyridin-3-yl)

ethyl)-1H-1,2,3-triazole-4-carboxylate (35.0 g, 88.1 mmol, 1.00 eq, slower eluting isomer from previous step) in DCM (245 mL) was added TFA (377 g, 3.31 mol, 245 mL, 37.6 eq). The reaction was degassed and purged with $N_2$ and stirred at room temperature for 1 hr. The mixture was concentrated under reduced pressure at 40° C. To the mixture was added MTBE (200 mL), which was then stirred for 30 min. The mixture was filtered, and the filter cake was washed with MTBE (20.0 mL×2). The filter cake was collected and triturated with MTBE:EtOAc (6:1) (120 mL) at 20° C. for 30 min. The mixture was again filtered, and the filter cake was washed with MTBE (30.0 mL×2). The filter cake was collected and dried under reduced pressure to afford the title compound. MS=342.1 (M+1). $^1$HNMR: (400 MHz, DMSO-$d_6$) δ: 8.85 (s, 1H), 8.22 (s, 1H), 6.29 (q, J=7.2 Hz, 1H), 4.20-4.23 (m, 1H), 3.56-3.58 (m, 1H), 2.25 (s, 3H), 2.09-2.12 (m, 1H), 1.92-1.99 (m, 7H), 1.10-1.22 (m, 1H), 0.78-0.80 (m, 1H).

EXAMPLES

Example 1

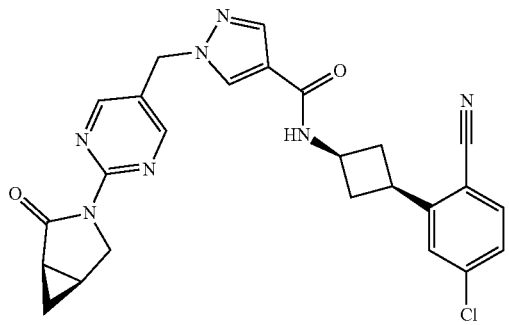 [SMILES: N#Cc1ccc(Cl)cc1[C@H]1C[C@@H](NC(=O)c2cnn(Cc3cnc(N4C[C@H]5C[C@H]5C4=O)nc3)c2)C1]

N-((cis)-3-(5-chloro-2-cyanophenyl)cyclobutyl)-1-((2-((1S,5R)-2-oxo-3-azabicyclo[3.1.0]hexan-3-yl)pyrimidin-5-yl)methyl)-1H-pyrazole-4-carboxamide (Scheme 3)

Step 1. 5-(bromomethyl)-2-(methylthio)pyrimidine

To a stirred solution of (2-(methylthio)pyrimidin-5-yl)methanol (1.19 g, 7.62 mmol) in DCM (25 ml) at 0° C. was added carbon tetrabromide (3.28 g, 9.90 mmol) and triphenylphosphine (2.60 g, 9.90 mmol). The mixture was stirred at 0° C. for 2 h. The reaction mixture was concentrated and the residue was purified by flash silica gel column chromatography (0-20% EtOAc/Hexanes) to give the title compound. MS=219.0 (M+1).

Step 2. Methyl 1-((2-(methylthio)pyrimidin-5-yl)methyl)-1H-pyrazole-4-carboxylate To a stirred solution of 5-(bromomethyl)-2-(methylthio) pyrimidine (1.2 g, 5.48 mmol) in DMF (36.5 ml) was added methyl 1H-pyrazole-4-carboxylate (0.760 g, 6.02 mmol) and $Cs_2CO_3$ (5.35 g, 16.43 mmol) at room temperature and the mixture was stirred at room temperature overnight. The mixture was diluted with water (30 mL) and extracted with dichloromethane (2×30 mL). The combined organic phases were washed with brine, dried over $MgSO_4$ and concentrated under reduced pressure. The residue was purified by flash silica gel chromatography (0~60% EtOAc/hexane) to give the title compound. MS=265.2 (M+1).

Step 3. 1-((2-(methylthio)pyrimidin-5-yl)methyl)-1H-pyrazole-4-carboxylic acid

To methyl 1-((2-(methylthio)pyrimidin-5-yl)methyl)-1H-pyrazole-4-carboxylate (1.1 g, 4.16 mmol) in THF (35 ml) and water (7 ml) was added lithium hydroxide (0.299 g, 12.49 mmol) at room temperature and the mixture was stirred at 60° C. for overnight. The mixture was acidified with 1N HCl to pH 2. The mixture was diluted with water (30 mL) and extracted with ethyl acetate (2×50 mL). The combined organic phases were washed with brine, dried over $MgSO_4$ and concentrated under reduced pressure. The title compound was used directly in the subsequent step. MS=251.2 (M+1).

Step 4. N-((cis)-3-(5-chloro-2-cyanophenyl)cyclobutyl)-1-((2-(methylthio)pyrimidin-5-yl)methyl)-1H-pyrazole-4-carboxamide To a stirred solution of 1-((2-(methylthio)pyrimidin-5-yl) methyl)-1H-pyrazole-4-carboxylic acid (0.72 g, 2.88 mmol) was added Hunig's base (3.01 ml, 17.26 mmol) and HATU (2.188 g, 5.75 mmol), followed by 2-((cis)-3-aminocyclobutyl)-4-chlorobenzonitrile 2,2,2-trifluoroacetate (1.85 g, 5.75 mmol) in DMF (25 ml) at room temperature. The mixture was stirred at room temperature for 4 h. The mixture was diluted with water (30 mL) and extracted with dichloromethane (2×30 mL). The combined organic phases were washed with brine, dried over $MgSO_4$, and concentrated under reduced pressure. The residue was purified by flash silica gel chromatography (0~80% Heptane/Ethanol (3:1)) to give the title compound. MS=439.2 (M+1).

Step 5. N-((cis)-3-(5-chloro-2-cyanophenyl)cyclobutyl)-1-((2-(methylsulfonyl)pyrimidin-5-yl)methyl)-1H-pyrazole-4-carboxamide To a stirred solution of N-((cis)-3-(5-chloro-2-cyanophenyl)cyclobutyl)-1-((2-(methylthio)pyrimidin-5-yl)methyl)-1H-pyrazole-4-carboxamide (520 mg, 1.185 mmol) in DCM (11 ml) at room temperature was added mCPBA (345 mg, 1.540 mmol) and the mixture was stirred at room temperature for 3 h. The mixture was diluted with water (30 mL) and extracted with dichloromethane (2×30 mL). The combined organic phases were washed with brine, dried over $MgSO_4$ and concentrated under reduced pressure. The residue was purified by flash silica gel chromatography (0~80% EtOAc/Pet.) to give the title compound. MS=471.3 (M+1).

Step 6. N-((cis)-3-(5-chloro-2-cyanophenyl)cyclobutyl)-1-((2-((1S,5R)-2-oxo-3-azabicyclo[3.1.0]hexan-3-yl)pyrimidin-5-yl)methyl)-1H-pyrazole-4-carboxamide To a stirred solution of N-((cis)-3-(5-chloro-2-cyanophenyl)cyclobutyl)-1-((2-(methylsulfonyl)pyrimidin-5-yl)methyl)-1H-pyrazole-4-carboxamide (25 mg, 0.053 mmol) in DMSO (531 µl) at room temperature was added $Cs_2CO_3$ (86 mg, 0.265 mmol) and (1R,5S)-3-azabicyclo[3.1.0] hexan-2-one hydrochloride (28.4 mg, 0.212 mmol). The reaction mixture was stirred at 110° C. for 1 h. The mixture was diluted with water (30 mL) and extracted with dichloromethane (2×30 mL). The combined organic phases were washed with brine, dried over MgSO₄, and concentrated under reduced pressure. The residue was purified by purified by reverse phase HPLC (ACN/water with 0.05% TFA modifier) to give the title compound. MS=488.2 (M+1). $^1$H NMR (500 MHz, Chloroform-d) δ 8.59 (d, J=6.2 Hz, 2H), 7.94 (s, 1H), 7.85 (s, 1H), 7.58 (dd, J=8.3, 3.8 Hz, 1H), 7.47-7.39 (m, 1H), 7.33 (td, J=8.5, 2.0 Hz, 1H), 6.46 (d, J=7.5 Hz, 1H), 5.28 (d, J=6.1 Hz, 2H), 4.67-4.58 (m, 1H), 4.18 (dd, J=11.4, 5.7 Hz, 1H), 4.02 (d, J=11.5 Hz, 1H), 3.61-3.50 (m, 1H), 3.02 (dt, J=11.7, 7.3 Hz, 2H), 2.65 (d, J=8.2 Hz, 1H), 2.27 (q, J=10.0 Hz, 2H), 2.20 (s, 1H), 2.08 (p, J=6.0 Hz, 1H), 1.29 (td, J=8.1, 4.9 Hz, 1H), 0.91 (q, J=4.4 Hz, 1H).

The following compounds were prepared using procedures similar to those described for Example 1 using appropriate starting materials. Racemic products were separated using chiral columns specified in the table. For those pairs of enantiomers, the fast-eluting isomer is listed first. This convention for listing enantiomers from chiral HPLC separations will be used in all the subsequent tables.

| Example No. | Structure | Name | Exact Mass [M + H]⁺ | Chiral column |
|---|---|---|---|---|
| 2 | | N-((cis)-3-(5-chloro-2-cyanophenyl)cyclobutyl)-1-((2-((1R,5S)-2-oxo-3-azabicyclo[3.1.0]hexan-3-yl)pyrimidin-5-yl)methyl)-1H-pyrazole-4-carboxamide | Calc'd 487.2 Found 488.1 | |
| 3 | | N-((cis)-3-(5-chloro-2-cyanophenyl)cyclobutyl)-1-((R or S)-1-(2-((1R,5S)-2-oxo-3-azabicyclo[3.1.0]hexan-3-yl)pyrimidin-5-yl)ethyl)-1H-pyrazole-4-carboxamide | Calc'd 501.2 Found 502.2 | AS-H |
| 4 | | N-((cis)-3-(5-chloro-2-cyanophenyl)cyclobutyl)-1-((S or R)-1-(2-((1R,5S)-2-oxo-3-azabicyclo[3.1.0]hexan-3-yl)pyrimidin-5-yl)ethyl)-1H-pyrazole-4-carboxamide carboxamide | Calc'd 501.2 Found 502.2 | AS-H |

Examples 5 and 6

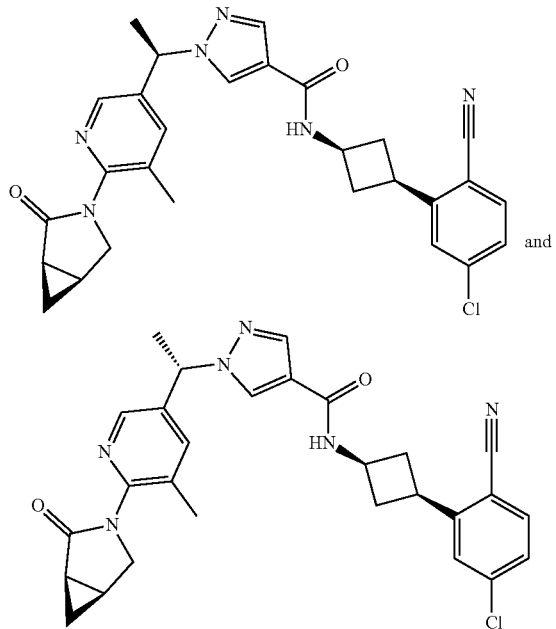

N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((R)-1-(5-methyl-6-((R,5S)-2-oxo-3-azabicyclo[3.1.0]hexan-3-yl)pyridin-3-yl)ethyl)-1H-pyrazole-4-carboxamide (Scheme 4)

Step 1. 1-(6-fluoro-5-methylpyridin-3-yl)ethan-1-ol

To a solution of 6-fluoro-5-methylnicotinaldehyde (600 mg, 4.31 mmol) in THF (25 mL), stirred at 0° C., was slowly added methylmagnesium bromide (0.951 mL, 3.23 mmol) (3.4 N in 2-MeTHF). The reaction mixture was stirred for 2 h at room temperature. Upon reaction completion, the mixture was quenched with NH$_4$Cl (sat aq.) and extracted with ethyl acetate (×3). The combined organic layers were dried over anhydrous sodium sulfate, filtered, concentrated under reduced pressure and purified by flash silica gel chromatography (0-30% methanol/dichloromethane) to afford the title compound. MS=156.0 (M+1).

Step 2. ethyl-1-(1-(6-fluoro-5-methylpyridin-3-yl)ethyl)-1H-pyrazole-4-carboxylate To a solution of 1-(6-fluoro-5-methylpyridin-3-yl)ethan-1-ol (300 mg, 1.933 mmol), ethyl 1H-pyrazole-4-carboxylate (298 mg, 2.127 mmol), triphenylphosphine (558 mg, 2.127 mmol) in THF (15 mL), stirred at 0° C., was slowly added DIAD (0.413 mL, 2.127 mmol). The reaction mixture was stirred overnight at room temperature. Upon reaction completion, the mixture was quenched with NaCl (sat aq.) and extracted with ethyl acetate. The combined organic layers were dried over anhydrous sodium sulfate, filtered, concentrated under reduced pressure and purified by silica chromatography (0-100% ethyl acetate/hexane), followed by a subsequent purification by reverse phase HPLC (ACN/water with 0.05% TFA modifier) to afford the product as a TFA salt. MS=278.1 (M+1).

Step 3. 1-(1-(5-methyl-6-((1R,5S)-2-oxo-3-azabicyclo[3.1.0]hexan-3-yl)pyridin-3-yl)ethyl)-1H-pyrazole-4-carboxylic acid To a solution of ethyl 1-(1-(6-fluoro-5-methylpyridin-3-yl)ethyl)-1H-pyrazole-4-carboxylate (93 mg, 0.335 mmol) and (1R,5S)-3-azabicyclo[3.1.0]hexan-2-one hydrochloride (90 mg, 0.671 mmol) in DMA (2 ml), stirred at room temperature under nitrogen, was added sodium hydride (24.14 mg, 1.006 mmol). The reaction mixture was stirred for 1 hr at 100° C. Upon reaction completion, the mixture was quenched with water and extracted with ethyl acetate. The aqueous layer was purified by reverse phase HPLC (ACN/water with 0.05% TFA modifier) to afford the product, as a TFA salt. MS=327.0 (M+1).

Step 4. N-((cis)-3-(5-chloro-2-cyanophenyl)cyclobutyl)-1-(1-(5-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-pyrazole-4-carboxamide To a solution of 1-(1-(5-methyl-6-((1R,5S)-2-oxo-3-azabicyclo[3.1.0]hexan-3-yl)pyridin-3-yl)ethyl)-1H-pyrazole-4-carboxylic acid, 2,2,2-trifluoroacetate salt (40 mg, 0.091 mmol), DMF (2 mL), N-ethyl-N-isopropylpropan-2-amine (0.239 mL, 1.366 mmol) and 2-(3H-[1,2,3]triazolo[4,5-b]pyridin-3-yl)-1,1,3,3-tetramethylisouronium hexafluorophosphate(V) (43.3 mg, 0.114 mmol) in DMF (1 mL), stirred at room temperature, was added 2-((cis)-3-aminocyclobutyl)-4-chlorobenzonitrile hydrochloride (27.7 mg, 0.114 mmol). The reaction mixture was stirred for 1 hr at room temperature. Upon reaction completion, the mixture was quenched with NaCl (aq.) and extracted with ethyl acetate (3 times). The combined organic layers were concentrated under reduced pressure and purified by reverse phase HPLC (ACN/water with 0.05% TFA modifier). The enantiopure title compounds were resolved by Chiral SFC (AS-H, 55% methanol/CO$_2$). The compounds were purified by reverse phase HPLC (ACN/water with 0.05% TFA modifier). The faster-eluting enantiomer of the title compound was obtained as TFA salt (Example 5): $^1$H NMR (500 MHz, Methanol-d$_4$) δ 8.26 (s, 1H), 8.24 (d, J=2.1 Hz, 1H), 7.97 (s, 1H), 7.69 (dd, J=5.1, 3.1 Hz, 2H), 7.64 (d, J=1.9 Hz, 1H), 7.44 (dd, J=8.3, 2.0 Hz, 1H), 5.71 (q, J=7.0 Hz, 1H), 4.62-4.48 (m, 1H), 4.28 (dd, J=10.5, 5.9 Hz, 1H), 3.70 (d, J=10.4 Hz, 1H), 3.66-3.55 (m, 1H), 2.94 (qd, J=7.8, 2.8 Hz, 2H), 2.31-2.22 (m, 2H), 2.16-2.21 (m, 4H), 2.05 (d, J=5.1 Hz, 1H), 1.94 (d, J=7.1 Hz, 3H), 1.32 (td, J=8.0, 4.6 Hz, 1H), 0.96 (q, J=4.3 Hz, 1H). MS=515.5 (M+1). The slower-eluting enantiomer of the title compound was obtained as a TFA salt (Example 6): $^1$H NMR (500 MHz, Methanol-d$_4$) δ 8.26 (s, 1H), 8.25 (d, J=2.2 Hz, 1H), 7.97 (s, 1H), 7.67-7.70 (m, 2H), 7.64 (d, J=1.9 Hz, 1H), 7.44 (dd, J=8.3, 2.0 Hz, 1H), 5.71 (q, J=7.1 Hz, 1H), 4.56 (p, J=9.0 Hz, 1H), 4.28 (dd, J=10.5, 5.9 Hz, 1H), 3.70 (d, J=10.7 Hz, 1H), 3.61 (ddd, J=18.0, 10.2, 7.8 Hz, 1H), 2.94 (qd, J=7.7, 2.7 Hz, 2H), 2.31-2.08 (m, 6H), 2.08-2.02 (m, 1H), 1.94 (d, J=7.1 Hz, 3H), 1.32 (td, J=8.0, 4.6 Hz, 1H), 0.95 (q, J=4.3 Hz, 1H). MS=515.5 (M+1).

The following compounds were prepared using procedures similar to those described for Example 5 and 6, using appropriate starting materials.

| Example No. | Structure | Name | Exact Mass [M + H]⁺ | Chiral column |
|---|---|---|---|---|
| 7 | | N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 514.2 Found 515.4 | AD-H |
| 8 | | N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 514.2 Found 515.4 | AD-H |
| 9 | | N-((cis)-3-(5-chloro-2-cyanophenyl)-3-methylcyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.1 | AS-H |
| 10 | | N-((cis)-3-(5-chloro-2-cyanophenyl)-3-methylcyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.1 | AS-H |

Examples 11 and 12

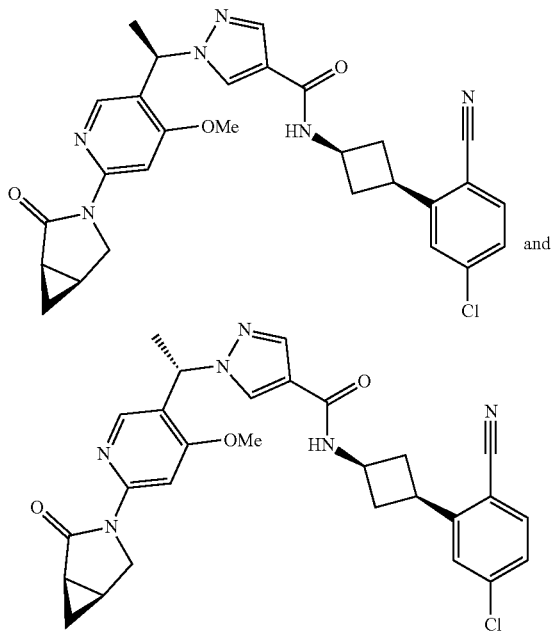

N-((cis)-3-(5-chloro-2-cyanophenyl)cyclobutyl)-1-((S)-1-(4-methoxy-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((R)-1-(4-methoxy-6-((1R,5S)-2-oxo-3-azabicyclo[3.1.0]hexan-3-yl)pyridin-3-yl)ethyl)-1H-pyrazole-4-carboxamide (Scheme 5)

Step 1. (6-chloro-4-methoxypyridin-3-yl)methanol

To a solution of methyl 6-chloro-4-methoxynicotinate (1000 mg, 4.96 mmol) in THF (20 mL) stirred at 0° C., was slowly added lithium borohydride (7.44 mL, 14.88 mmol) (2M in THF). The reaction mixture was stirred for 1 h at 0° C. and then stirred for 5.5 hr at room temperature. Upon reaction completion, the mixture was quenched with NaOH (1M aq.) and extracted with ethyl acetate (×3). The combined organic layers were dried over anhydrous sodium sulfate, filtered, concentrated under reduced pressure and purified by flash silica gel chromatography (0-20% methanol/dichloromethane) to afford the title compound. MS=174.0 (M+1).

Step 2. 6-chloro-4-methoxynicotinaldehyde

To a solution of (6-chloro-4-methoxypyridin-3-yl)methanol (740 mg, 4.26 mmol) in DCM (25 mL). Stirred at room temperature, was slowly added Dess-Martin Periodinane (2260 mg, 5.33 mmol). The reaction mixture was stirred for 1 h at room temperature. Upon reaction completion, the mixture was filtered and concentrated under reduced pressure and purified by silica chromatography (0-20% methanol/dichloromethane), followed by a subsequent purification by flash silica gel chromatography (0-70% ethyl acetate/hexane) to afford the title compound. MS=171.9 (M+1).

Step 3. 1-(6-chloro-4-methoxypyridin-3-yl)ethan-1-ol

To a solution of 6-chloro-4-methoxynicotinaldehyde (600 mg, 3.50 mmol) in THF (20 mL), stirred at 0° C., was slowly added methylmagnesium bromide (2.057 ml, 6.99 mmol) (3.4N in 2-MeTHF). The reaction mixture was stirred for 30 min at 0° C. and then stirred for 1 hr at room temperature. Upon reaction completion, the mixture was quenched with NH₄Cl (sat aq.) and extracted with ethyl acetate (×3). The combined organic layers were dried over anhydrous sodium sulfate, filtered, concentrated under reduced pressure and purified by flash silica gel chromatography (0-30% methanol/dichloromethane) to afford the title compound. MS=188.0 (M+1).

Step 4. ethyl-1-(1-(6-chloro-4-methoxypyridin-3-yl)ethyl)-1H-pyrazole-4-carboxylate To a solution of 1-(6-chloro-4-methoxypyridin-3-yl)ethan-1-ol (200 mg, 1.055 mmol), ethyl 1H-pyrazole-4-carboxylate (163 mg, 1.161 mmol) and triphenylphosphine (304 mg, 1.161 mmol) in THF (5 mL), stirred at room temperature, was slowly added DIAD (0.226 ml, 1.161 mmol). The reaction mixture was stirred for 30 min at room temperature. Upon reaction completion, the mixture was quenched with NaCl (sat aq.) and extracted with ethyl acetate (×3). The combined organic layers were dried over anhydrous sodium sulfate, filtered, concentrated under reduced pressure and purified by flash silica chromatography (0-100% ethyl acetate/hexane), followed by a subsequent purification by reverse phase HPLC (ACN/water with 0.05% TFA modifier) to afford the product. MS=310.0 (M+1).

Step 5. ethyl 1-(1-(4-methoxy-6-((1R,5S)-2-oxo-3-azabicyclo[3.1.0]hexan-3-yl)pyridin-3-yl)ethyl)-1H-pyrazole-4-carboxylate Ethyl 1-(1-(6-chloro-4-methoxypyridin-3-yl)ethyl)-1H-pyrazole-4-carboxylate (125 mg, 0.404 mmol), cesium carbonate (394 mg, 1.211 mmol), (1R,5S)-3-azabicyclo[3.1.0]hexan-2-one hydrochloride (81 mg, 0.605 mmol) and XantPhos Pd G3 (83 mg, 0.081 mmol) were combined, placed under a nitrogen atmosphere, followed by addition of dioxane (2 mL), and placed again under a nitrogen atmosphere. The reaction mixture was stirred for 4 hr at 100° C. Upon reaction completion, the mixture was quenched with NaCl (sat aq.) and extracted with ethyl acetate (×3). The combined organic layers were dried over anhydrous sodium sulfate, filtered, concentrated under reduced pressure and purified by flash silica gel chromatography (0-30% methanol/dichloromethane) to afford the product. MS=371.1 (M+1).

Step 6. 1-(1-(4-methoxy-6-((1R,5S)-2-oxo-3-azabicyclo[3.1.0]hexan-3-yl)pyridin-3-yl)ethyl)-1H-pyrazole-4-carboxylic acid To a solution of ethyl 1-(1-(4-methoxy-6-((1R,5S)-2-oxo-3-azabicyclo[3.1.0]hexan-3-yl)pyridin-3-yl)ethyl)-1H-pyrazole-4-carboxylate (108 mg, 0.292 mmol) in THF (0.5 ml), water (0.5 ml) and methanol (0.25 ml), stirred at room temperature, was added lithium hydroxide (69.8 mg, 2.92 mmol). The reaction mixture was stirred for 90 min at room temperature. Upon reaction completion, the mixture was concentrated under reduced pressure. The mixture was quenched with hydrogen chloride (3.50 ml, 3.50 mmol) (1N aqueous), concentrated under reduced pressure and purified by reverse phase HPLC (ACN/water with 0.05% TFA modifier) to afford the product. MS=343.2 (M+1).

Step 7. N-((cis)-3-(5-chloro-2-cyanophenyl)cyclobutyl)-1-((S)-1-(4-methoxy-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((R)-1-(4-methoxy-6-((1R,5S)-2-oxo-3-azabicyclo[3.1.0]hexan-3-yl)pyridin-3-yl)ethyl)-1H-pyrazole-4-carboxamide To a solution of 1-(1-(4-methoxy-6-((1R,5S)-2-oxo-3-azabicyclo[3.1.0]hexan-3-yl)pyridin-3-yl)ethyl)-1H-pyrazole-4-carboxylic acid, 2,2,2-trifluoroacetate salt (36.4 mg, 0.080 mmol), DMF (2 mL), N-ethyl-N-isopropylpropan-2-amine (0.209 mL, 1.199 mmol) and 2-(3H-[1,2,3]triazolo[4,5-b]pyridin-3-yl)-1,1,3,3-tetramethylisouronium hexafluorophosphate(V) (38.0 mg, 0.100 mmol) in DMF (2 mL), stirred at room temperature, was added 2-((cis)-3-aminocyclobutyl)-4-chlorobenzonitrile hydrochloride (24.29 mg, 0.100 mmol). The reaction mixture was stirred for 1 hr at room temperature. Upon reaction completion, the mixture was quenched with NaCl (aq.) and extracted with ethyl acetate (×3). The combined organic layers were concentrated under reduced pressure and purified by reverse phase HPLC (ACN/water with 0.05% TFA modifier) to afford the diastereomeric mixture of products as a TFA salt. The enantiopure title compounds were resolved by Chiral SFC (AS-H, 21×250 mm, 50% methanol). The compounds were purified by reverse phase HPLC (ACN/water with 0.05% TFA modifier). The faster-eluting enantiomer of the title compound was obtained as a TFA salt (Example 11): $^1$H NMR (500 MHz, Methanol-d$_4$) δ 8.24 (s, 1H), 8.04 (s, 1H), 7.97 (s, 1H), 7.69 (d, J=8.3 Hz, 1H), 7.63 (d, J=1.8 Hz, 1H), 7.44 (dd, J=8.3, 1.9 Hz, 1H), 7.33 (s, 1H), 5.89 (q, J=7.0 Hz, 1H), 4.56 (p, J=8.8 Hz, 1H), 4.16-4.04 (m, 5H), 3.66-3.55 (m, 1H), 2.94 (qd, J=7.7, 2.7 Hz, 2H), 2.32-2.19 (m, 4H), 1.90 (d, J=7.0 Hz, 3H), 1.40 (q, J=7.9 Hz, 1H), 0.94 (s, 1H). MS=531.1 (M+1). The slower-eluting enantiomer of the title compound was obtained as a TFA salt (Example 12): $^1$H NMR (500 MHz, Methanol-d$_4$) δ 8.22 (s, 1H), 8.03 (s, 1H), 7.96 (s, 1H), 7.69 (d, J=8.3 Hz, 1H), 7.63 (d, J=1.9 Hz, 1H), 7.50 (s, 1H), 7.44 (dd, J=8.3, 2.0 Hz, 1H), 5.87 (q, J=7.0 Hz, 1H), 4.65-4.42 (m, 1H), 4.21-4.06 (m, 2H), 4.02 (s, 3H), 3.67-3.51 (m, 1H), 2.94 (qd, J=7.6, 2.8 Hz, 2H), 2.32-2.20 (m, 4H), 1.90 (d, J=7.1 Hz, 3H), 1.37 (td, J=8.1, 4.7 Hz, 1H), 0.90 (q, J=4.1 Hz, 1H). MS=531.0 (M+1).

The following compounds were prepared using procedures similar to those described for Examples 11 and 12 using appropriate starting materials.

| Example No. | Structure | Name | Exact Mass [M + H]$^+$ | Chiral column |
|---|---|---|---|---|
| 13 | | N-((cis)-3-(5-chloro-2-cyanophenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-pyrazole-4-carboxamide | Calc'd 530.2 Found 531.6 | AS-H |
| 14 | | N-((cis)-3-(5-chloro-2-cyanophenyl)cyclobutyl)-1-((S or R)-1-(5-methoxy-6-((1R,5S)-2-oxo-3-azabicyclo[3.1.0]hexan-3-yl)pyridin-3-yl)ethyl)-1H-pyrazole-4-carboxamide | Calc'd 530.2 Found 531.1 | AS-H |

| Example No. | Structure | Name | Exact Mass [M + H]+ | Chiral column |
|---|---|---|---|---|
| 15 | | N-((cis)-3-(5-chloro-2-cyanophenyl)cyclobutyl)-3-methyl-1-((R or S)-1-(2-((1R,5S)-2-oxo-3-azabicyclo[3.1.0]hexan-3-yl)pyrimidin-5-yl)ethyl)-1H-pyrazole-4-carboxamide | Calc'd 515.2 Found 516.2 | AD-H |
| 16 | | N-((cis)-3-(5-chloro-2-cyanophenyl)cyclobutyl)-3-methyl-1-((S or R)-1-(2-((1R,5S)-2-oxo-3-azabicyclo[3.1.0]hexan-3-yl)pyrimidin-5-yl)ethyl)-1H-pyrazole-4-carboxamide | Calc'd 515.2 Found 516.2 | AD-H |
| 17 | | N-((cis)-3-(5-chloro-2-cyanophenyl)cyclobutyl)-3-cyano-1-((R or S)-1-(2-((1R,5S)-2-oxo-3-azabicyclo[3.1.0]hexan-3-yl)pyrimidin-5-yl)ethyl)-1H-pyrazole-4-carboxamide | Calc'd 526.2 Found 527.1 | AD |
| 18 | | N-((cis)-3-(5-chloro-2-cyanophenyl)cyclobutyl)-3-cyano-1-((S or R)-1-(2-((1R,5S)-2-oxo-3-azabicyclo[3.1.0]hexan-3-yl)pyrimidin-5-yl)ethyl)-1H-pyrazole-4-carboxamide | Calc'd 526.2 Found 527.0 | AD |

-continued

| Example No. | Structure | Name | Exact Mass [M + H]+ | Chiral column |
|---|---|---|---|---|
| 19 | | N-((cis)-3-(5-chloro-2-cyanophenyl)cyclobutyl)-3-methyl-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.4 | AD-H |
| 20 | | N-((cis)-3-(5-chloro-2-cyanophenyl)cyclobutyl)-3-methyl-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.1 | AD-H |
| 21 | | N-((cis)-3-(5-chloro-2-cyanophenyl)cyclobutyl)-1-((R or S)-1-(5-fluoro-6-((1R,5S)-2-oxo-3-azabicyclo[3.1.0]hexan-3-yl)pyridin-3-yl)ethyl)-1H-pyrazole-4-carboxamide | Calc'd 518.2 Found 519.3 | AS-H |
| 22 | | N-((cis)-3-(5-chloro-2-cyanophenyl)cyclobutyl)-1-((S or R)-1-(5-fluoro-6-((1R,5S)-2-oxo-3-azabicyclo[3.1.0]hexan-3-yl)pyridin-3-yl)ethyl)-1H-pyrazole-4-carboxamide | Calc'd 518.2 Found 519.0 | AS-H |

| Example No. | Structure | Name | Exact Mass [M + H]+ | Chiral column |
|---|---|---|---|---|
| 23 | | N-((cis)-3-(2-cyano-5-methylphenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-pyrazole-4-carboxamide | Calc'd 510.2 Found 511.1 | AS-H |
| 24 | | N-((cis)-3-(5-chloro-2-cyanophenyl)cyclobutyl)-1-((R or S)-1-(3-methyl-5-((1R,5S)-2-oxo-3-azabicyclo[3.1.0]hexan-3-yl)pyridin-2-yl)ethyl)-1H-pyrazole-4-carboxamide | Calc'd 514.2 Found 515.3 | AS-H |
| 25 | | N-((cis)-3-(5-chloro-2-cyanophenyl)cyclobutyl)-1-((S or R)-1-(3-methyl-5-((1R,5S)-2-oxo-3-azabicyclo[3.1.0]hexan-3-yl)pyridin-2-yl)ethyl)-1H-pyrazole-4-carboxamide | Calc'd 514.2 Found 515.3 | AS-H |
| 26 | | N-((cis)-3-(5-chloro-2-cyanophenyl)cyclobutyl)-1-((R or S)-1-(3-fluoro-5-((1R,5S)-2-oxo-3-azabicyclo[3.1.0]hexan-3-yl)pyridin-2-yl)ethyl)-1H-pyrazole-4-carboxamide | Calc'd 518.2 Found 519.3 | AS-H |

-continued

| Example No. | Structure | Name | Exact Mass [M + H]⁺ | Chiral column |
|---|---|---|---|---|
| 27 | | N-((cis)-3-(5-chloro-2-cyanophenyl)cyclobutyl)-1-((S or R)-1-(3-fluoro-5-((1R,5S)-2-oxo-3-azabicyclo[3.1.0]hexan-3-yl)pyridin-2-yl)ethyl)-1H-pyrazole-4-carboxamide | Calc'd 518.2 Found 519.3 | AS-H |
| 28 | | N-((cis)-3-(5-chloro-2-cyanophenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-pyrazole-4-carboxamide | Calc'd 532.2 Found 533.1 | AD |
| 29 | | N-((cis)-3-(5-chloro-2-cyanophenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-pyrazole-4-carboxamide | Calc'd 532.2 Found 533.1 | AD |
| 30 | | N-((cis)-3-(5-chloro-2-cyanophenyl)cyclobutyl)-1-((R or S)-1-(5-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | AS-H |

| Example No. | Structure | Name | Exact Mass [M + H]+ | Chiral column |
|---|---|---|---|---|
| 31 | | N-((cis)-3-(5-chloro-2-cyanophenyl)cyclobutyl)-1-((S or R)-1-(5-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | AS-H |
| 32 | | 1-((R or S)-1-(4-methyl-6-((1R,5S)-2-oxo-3-azabicyclo[3.1.0]hexan-3-yl)pyridin-3-yl)ethyl)-N-((cis)-3-(4-methylpyridin-2-yl)cyclobutyl)-1H-pyrazole-4-carboxamide | Calc'd 470.2 Found 471.2 | IG |
| 33 | | 1-((S or R)-1-(4-methyl-6-((1R,5S)-2-oxo-3-azabicyclo[3.1.0]hexan-3-yl)pyridin-3-yl)ethyl)-N-((cis)-3-(4-methylpyridin-2-yl)cyclobutyl)-1H-pyrazole-4-carboxamide | Calc'd 470.2 Found 471.2 | IG |
| 34 | | N-((cis)-3-(2-cyano-5-fluorophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 498.2 Found 499.2 | IG |

-continued

| Example No. | Structure | Name | Exact Mass [M + H]+ | Chiral column |
|---|---|---|---|---|
| 35 | | N-((cis)-3-(2-cyano-5-fluorophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 498.2 Found 499.2 | IG |
| 36 | | N-((cis)-3-(2-cyano-5-methylphenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 494.2 Found 495.1 | AD-H |
| 37 | | N-((cis)-3-(5-chloro-2-cyanophenyl)cyclobutyl)-1-((4-methyl-6-((1R,5S)-2-oxo-3-azabicyclo[3.1.0]hexan-3-yl)pyridin-3-yl)methyl)-1H-pyrazole-4-carboxamide | Calc'd 500.2 Found 501.0 | |
| 38 | | N-((cis)-3-(5-chloro-2-cyanophenyl)cyclobutyl)-3-(difluoromethyl)-1-((4-methyl-6-((1R,5S)-2-oxo-3-azabicyclo[3.1.0]hexan-3-yl)pyridin-3-yl)methyl)-1H-pyrazole-4-carboxamide | Calc'd 550.2 Found 551.1 | |

| Example No. | Structure | Name | Exact Mass [M + H]+ | Chiral column |
|---|---|---|---|---|
| 39 | | N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.2 | AD |
| 40 | | N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-pyrazole-4-carboxamide | Calc'd 528.2 Found 529.2 | AD |
| 41 | | N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridazin-3-yl)ethyl)-1H-pyrazole-4-carboxamide | Calc'd 529.2 Found 530.2 | AD |
| 42 | | N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridazin-3-yl)ethyl)-1H-pyrazole-4-carboxamide | Calc'd 529.2 Found 530.2 | AD |

-continued

| Example No. | Structure | Name | Exact Mass [M + H]⁺ | Chiral column |
|---|---|---|---|---|
| 43 | | N-((cis)-3-(5-chloro-2-cyanophenyl)cyclobutyl)-1-((R or S)-1-(5-methoxy-4-methyl-6-((1R,5S)-2-oxo-3-azabicyclo[3.1.0]hexan-3-yl)pyridin-3-yl)ethyl)-1H-pyrazole-4-carboxamide | Calc'd 544.2 Found 545.2 | OJ-H |
| 44 | | N-((cis)-3-(5-chloro-2-cyanophenyl)cyclobutyl)-1-((S or R)-1-(5-methoxy-4-methyl-6-((1R,5S)-2-oxo-3-azabicyclo[3.1.0]hexan-3-yl)pyridin-3-yl)ethyl)-1H-pyrazole-4-carboxamide | Calc'd 544.2 Found 545.2 | OJ-H |
| 45 | | N-((cis)-3-(2-cyano-5-methylphenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-pyrazole-4-carboxamide | Calc'd 508.3 Found 509.2 | AD |
| 46 | | N-((cis)-3-(2-cyano-5-methylphenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-pyrazole-4-carboxamide | Calc'd 508.3 Found 509.2 | AD |

-continued

| Example No. | Structure | Name | Exact Mass [M + H]+ | Chiral column |
|---|---|---|---|---|
| 47 | | N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | OD |
| 48 | | N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | OD |
| 49 | | N-((cis)-3-(5-chloro-2-cyanophenyl)cyclobutyl)-3-(methoxymethyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 558.2 Found 559.2 | AD |
| 50 | | N-((cis)-3-(5-chloro-2-cyanophenyl)cyclobutyl)-3-(methoxymethyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide | Calc'd 558.2 Found 559.3 | AD |

-continued

| Example No. | Structure | Name | Exact Mass [M + H]+ | Chiral column |
|---|---|---|---|---|
| 51 | | N-((cis)-3-(3-cyano-6-methylpyridin-2-yl)cyclobutyl)-1-((R or S)-1-(6-methyl-5-((1R,5S)-2-oxo-3-azabicyclo[3.1.0]hexan-3-yl)pyrazin-2-yl)ethyl)-1H-pyrazole-4-carboxamide | Calc'd 496.2 Found 497.2 | OD-H |
| 52 | | N-((cis)-3-(3-cyano-6-methylpyridin-2-yl)cyclobutyl)-1-((S or R)-1-(6-methyl-5-((1R,5S)-2-oxo-3-azabicyclo[3.1.0]hexan-3-yl)pyrazin-2-yl)ethyl)-1H-pyrazole-4-carboxamide | Calc'd 496.2 Found 497.2 | OD-H |
| 53 | | N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | OD |
| 54 | | N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-pyrazole-4-carboxamide | Calc'd 515.2 Found 516.2 | OD |

Example 55 and 56

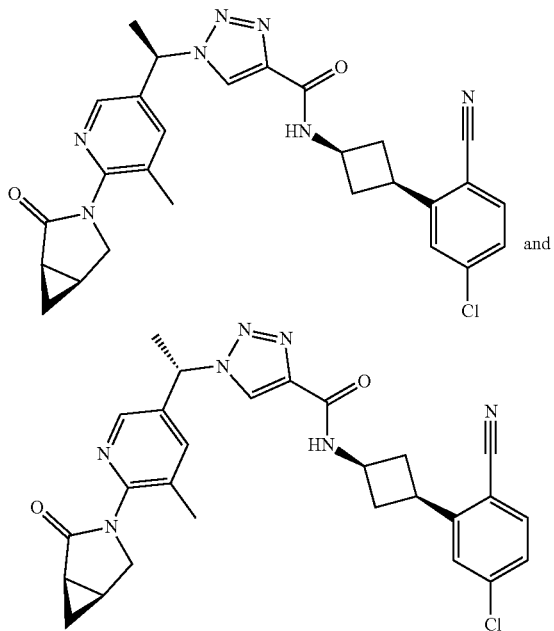

N-((cis)-3-(5-chloro-2-cyanophenyl)cyclobutyl)-1-((R)-1-(5-methyl-6-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-1,2,3-triazole-4-carboxamide (Scheme 6)

Step 1. 1-(6-fluoro-5-methylpyridin-3-yl)ethan-1-ol

To a solution of 6-fluoro-5-methylnicotinaldehyde (150 mg, 1.078 mmol) 13.7 mmol) in THF (8 mL), stirred at 0° C., was slowly added methylmagnesium bromide (0.951 mL, 3.23 mmol) (3.4N in 2-MeTHF). The reaction mixture was stirred for 2 h at room temperature. Upon reaction completion, the mixture was quenched with NH4Cl (sat aq.) and extracted with ethyl acetate (3 times). The combined organic layers were dried over anhydrous sodium sulfate, filtered, concentrated under reduced pressure and purified by flash silica gel chromatography (0-30% methanol/dichloromethane) to afford the title compound. MS=156.0 (M+1).

Step 2. 5-(1-azidoethyl)-2-fluoro-3-methylpyridine

To a solution of 1-(6-fluoro-5-methylpyridin-3-yl)ethan-1-ol (212 mg, 1.079 mmol) in toluene (8 ml), stirred at 0° C., was slowly added diphenylphosphoryl azide (0.278 ml, 1.295 mmol) and DBU (0.195 ml, 1.295 mmol). The reaction mixture was gradually warmed to room temperature and was stirred overnight. Upon reaction completion, the mixture was quenched with NaCl (sat aq.) and extracted with ethyl acetate (×3). The combined organic layers were dried over anhydrous sodium sulfate, filtered, concentrated under reduced pressure and purified by flash silica gel chromatography (0-70% ethyl acetate/hexane) to afford the title compound. MS=181.0 (M+1).

Step 3. Ethyl-1-(1-(6-fluoro-5-methylpyridin-3-yl)ethyl)-1H-1,2,3-triazole-4-carboxylate To a solution of 5-(1-azidoethyl)-2-fluoro-3-methylpyridine (295 mg, 1.081 mmol) in ethanol (5 mL), stirred at room temperature, was added ethyl propiolate (0.219 mL, 2.161 mmol), followed by a solution of L-sodium ascorbate (42.8 mg, 0.216 mmol) (in 2.5 mL water) and copper(II) sulfate pentahydrate (54.0 mg, 0.216 mmol) (in 2.5 mL water). The reaction mixture was stirred for 1.5 h at room temperature. Upon reaction completion, the mixture was concentrated under reduced pressure. The mixture was quenched with water and extracted with dichloromethane (×3). The combined organic layers were dried over anhydrous sodium sulfate, filtered, concentrated under reduced pressure and purified by flash silica gel chromatography (0-100% ethyl acetate/hexane) to afford the title compound. MS=279.1 (M+1).

Step 4. 1-(1-(5-methyl-6-((1R,5S)-2-oxo-3-azabicyclo[3.1.0]hexan-3-yl)pyridin-3-yl)ethyl)-1H-1,2,3-triazole-4-carboxylic acid To a solution of ethyl 1-(1-(6-fluoro-5-methylpyridin-3-yl)ethyl)-1H-1,2,3-triazole-4-carboxylate (73 mg, 0.262 mmol) and (1R,5S)-3-azabicyclo[3.1.0]hexan-2-one hydrochloride (70.1 mg, 0.525 mmol), in DMA (1.2 ml), stirred at room temperature under nitrogen, was added sodium hydride (20.98 mg, 0.525 mmol). The reaction mixture was stirred for 50 min at 100° C. Upon reaction completion, the mixture was quenched with water and extracted with ethyl acetate (1 time). The aqueous layer was purified by reverse phase HPLC (ACN/water with 0.05% TFA modifier) to afford the title compound as a TFA salt. MS=328.0 (M+1).

Step 5. N-((cis)-3-(5-chloro-2-cyanophenyl)cyclobutyl)-1-((R)-1-(5-methyl-6-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-1,2,3-triazole-4-carboxamide To a solution of 1-(1-(5-methyl-6-((1R,5S)-2-oxo-3-azabicyclo[3.1.0]hexan-3-yl)pyridin-3-yl)ethyl)-1H-1,2,3-triazole-4-carboxylic acid, 2,2,2-trifluoroacetate salt (34 mg, 0.077 mmol), N-ethyl-N-isopropylpropan-2-amine (0.202 mL, 1.158 mmol) and 2-(3H-[1,2,3]triazolo[4,5-b]pyridin-3-yl)-1,1,3,3-tetramethylisouronium hexafluorophosphate (V) (29.4 mg, 0.077 mmol), in DMF (1 mL), stirred at room temperature, was added 2-((cis)-3-aminocyclobutyl)-4-chlorobenzonitrile hydrochloride (18.77 mg, 0.077 mmol). The reaction mixture was stirred for 30 min at room temperature. Upon reaction completion, the mixture was quenched with NaCl (aq.) and extracted with ethyl acetate (3 times). The combined organic layers were concentrated under reduced pressure and purified by reverse phase HPLC (ACN/water with 0.05% TFA modifier) to afford the mixture of diastereomers as a TFA salt. The enantiopure title compounds were resolved by Chiral SFC (AS-H, 21×250 mm, 45% (EtOH with 0.2% DIPA)). The compounds were purified by reverse phase HPLC (ACN/water with 0.05% TFA modifier). The faster-eluting enantiomer of the title compound was obtained as a TFA salt (Example 55): $^1$H NMR (500 MHz, Methanol-$d_4$) δ 8.50 (s, 1H), 8.34 (d, J=2.2 Hz, 1H), 7.77 (d, J=2.1 Hz, 1H), 7.73-7.63 (m, 2H), 7.43 (dd, J=8.3, 2.0 Hz, 1H), 6.06 (q, J=7.1 Hz, 1H), 4.61 (ddd, J=16.8, 9.2, 7.6 Hz, 1H), 4.30 (dd, J=10.5, 5.9 Hz, 1H), 3.71 (d, J=10.5 Hz, 1H), 3.61 (ddd, J=18.0, 10.3, 7.7 Hz, 1H), 2.93 (qd, J=7.7, 2.8 Hz, 2H), 2.37 (qd, J=9.3, 2.7 Hz, 2H), 2.16-2.23 (m, 4H), 2.02-2.08 (m, 4H), 1.32 (td, J=8.0, 4.6 Hz, 1H), 0.96 (q, J=4.4 Hz, 1H). MS=516.4/518.4 (M+1). The slower-eluting enantiomer of the title compound was obtained as a TFA salt (Example 56): $^1$H NMR (500 MHz, Methanol-$d_4$) δ 8.50 (s, 1H), 8.35 (d, J=2.3 Hz, 1H), 7.76 (d, J=2.2 Hz, 1H), 7.71-7.62 (m, 2H), 7.43 (dd, J=8.3, 2.0 Hz, 1H), 6.06 (d, J=7.0 Hz, 1H), 4.61 (t, J=7.6 Hz, 1H), 4.30 (dd, J=10.5, 5.9 Hz, 1H), 3.70 (d, J=9.3 Hz, 1H), 3.66-3.56 (m, 1H), 2.98-2.85 (m, 2H), 2.42-2.31 (m, 2H), 2.00-2.08 (m, 4H), 2.04 (d, J=7.1 Hz, 4H), 1.32 (td, J=8.1, 4.6 Hz, 1H), 0.96 (q, J=4.4 Hz, 1H). MS=516.3/518.4 (M+1).

The following compounds were prepared using procedures similar to those described for Examples 55 and 56 using appropriate starting materials.

| Example No. | Structure | Name | Exact Mass [M + H]$^+$ | Chiral column |
|---|---|---|---|---|
| 57 | | N-((cis)-3-(5-chloro-2-cyanophenyl)cyclobutyl)-1-((R or S)-1-(6-((1R,5S)-2-oxo-3-azabicyclo[3.1.0]hexan-3-yl)pyridin-3-yl)ethyl)-1H-1,2,3-triazole-4-carboxamide | Calc'd 501.2 Found 501.9 | OJ-H |
| 58 | | N-((cis)-3-(5-chloro-2-cyanophenyl)cyclobutyl)-1-((S or R)-1-(6-((1R,5S)-2-oxo-3-azabicyclo[3.1.0]hexan-3-yl)pyridin-3-yl)ethyl)-1H-1,2,3-triazole-4-carboxamide | Calc'd 501.2 Found 501.9 | OJ-H |
| 59 | | N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.4 | AD-H |
| 60 | | N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.2 | AD-H |

-continued

| Example No. | Structure | Name | Exact Mass [M + H]+ | Chiral column |
|---|---|---|---|---|
| 61 | | N-((cis)-3-(5-chloro-2-cyanophenyl)cyclobutyl)-1-(2-(5-methyl-6-((1R,5S)-2-oxo-3-azabicyclo[3.1.0]hexan-3-yl)pyridin-3-yl)propan-2-yl)-1H-1,2,3-triazole-4-carboxamide | Calc'd 529.2 Found 530.5 | |
| 62 | | N-((1R,3S)-3-(5-chloro-2-cyanophenyl)cyclopentyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.1 | OD-H |
| 63 | | N-((1R,3S)-3-(5-chloro-2-cyanophenyl)cyclopentyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.2 | OD-H |
| 64 | | N-((cis)-3-(5-chloro-2-cyanophenyl)-3-methylcyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.0 | OD-H |

-continued

| Example No. | Structure | Name | Exact Mass [M + H]+ | Chiral column |
|---|---|---|---|---|
| 65 | | N-((cis)-3-(5-chloro-2-cyanophenyl)-3-methylcyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.1 | OD-H |
| 66 | | N-((cis)-3-(2-cyano-5-methylphenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 495.2 Found 496.4 | OD-H |
| 67 | | N-((cis)-3-(2-cyano-5-methylphenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 495.2 Found 496.4 | OD-H |
| 68 | | N-((cis)-3-(3-cyano-6-methylpyridin-2-yl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 496.2 Found 497.0 | AD-H |

| Example No. | Structure | Name | Exact Mass [M + H]⁺ | Chiral column |
|---|---|---|---|---|
| 69 | | N-((cis)-3-(5-chloro-2-(difluoromethoxy)phenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 556.2 Found 557.2 | AD |
| 70 | | N-((cis)-3-(5-chloro-2-(difluoromethoxy)phenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 556.2 Found 557.2 | AD |
| 71 | | N-((cis)-3-(5-chloro-2-(difluoromethyl)phenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 540.2 Found 541.1 | AD |
| 72 | | N-((cis)-3-(5-chloro-2-(difluoromethyl)phenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 540.2 Found 541.1 | AD |

-continued

| Example No. | Structure | Name | Exact Mass [M + H]+ | Chiral column |
|---|---|---|---|---|
| 73 | | N-((cis)-3-(4-chloropyridin-2-yl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 491.2 Found 492.2 | OD-H |
| 74 | | N-((cis)-3-(4-chloropyridin-2-yl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 491.2 Found 492.2 | OD-H |
| 75 | | N-(cis)-3-(5-chloro-2-cyanophenyl)-3-fluorocyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 533.2 Found 534.1 | AD-H |
| 76 | | N-((cis)-3-(5-chloro-2-cyanophenyl)-3-fluorocyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 533.2 Found 534.1 | AD-H |

Example 77 and 78

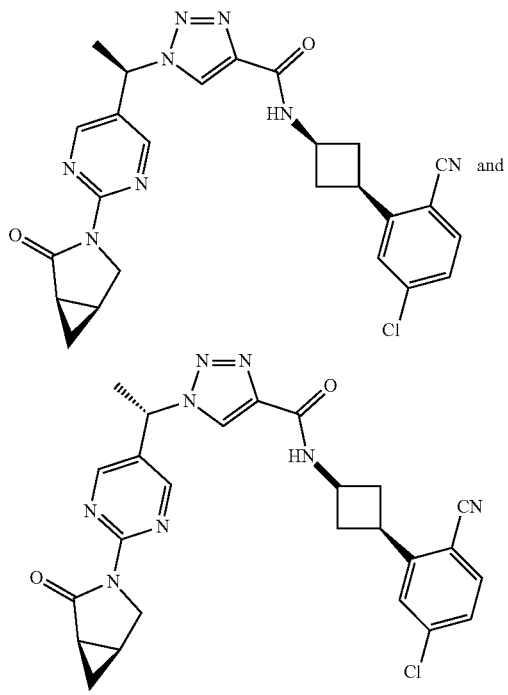

4N-((cis)-3-(5-chloro-2-cyanophenyl)cyclobutyl)-1-((R)-1-(2-((1R,5S)-2-oxo-3-azabicyclo[3.1.0]hexan-3-yl)pyrimidin-5-yl)ethyl)-1H-1,23-triazole-4-carboxamide and N-((cis)-3-(5-chloro-2-cyanophenyl)cyclobutyl)-1-((S)-1-(2-((1R,5S)-2-oxo-3-azabicyclo[3.1.0]hexan-3-yl)pyrimidin-5-yl)ethyl)-1H-1,2,3-triazole-4-carboxamide (Scheme 7)

Step 1. 1-(2-(methylthio) pyrimidin-5-yl)ethan-1-ol

Methyl magnesium bromide (2.480 ml, 8.43 mmol) was added to a stirred solution of 2-(methylthio)pyrimidine-5-carbaldehyde (1000 mg, 6.49 mmol) in THF (20 ml) at 0° C. and the mixture was stirred at 0° C. for 1 h. The reaction was partitioned between saturated NH$_4$Cl and EtOAc. The organic layer was washed with brine, dried over MgSO$_4$, and filtered. The filtrate was concentrated in vacuo. The residue was purified by purified by flash silica gel chromatography (EtOAc/hexane 0-50%) give the title compound. MS=171.2 (M+1).

Step 2. 5-(1-azidoethyl)-2-(methylthio)pyrimidine

Diphenyl phosphoryl azide (1.644 ml, 7.63 mmol) and 1,8-diazabicyclo[5.4.0]undec-7-ene (1.141 ml, 7.63 mmol) were added to a stirred solution of 1-(2-(methylthio)pyrimidin-5-yl)ethan-1-ol (999 mg, 5.87 mmol) in toluene (26 ml) at 0° C. and the mixture was stirred at room temperature overnight. LCMS analysis indicated that the reaction was complete. The mixture was diluted with water (30 mL) and extracted with ethyl acetate (2×30 mL). The combined organic phases were washed with brine, dried (MgSO$_4$) and filtered. The filtrate was concentrated at RT under reduced pressure. The residue was purified by flash silica gel chromatography (EtOAc/hexane 0-40%). The desired fractions were concentrated to give the title compound. MS=196.3 (M+1).

Step 3. Ethyl 1-(1-(2-(methylthio)pyrimidin-5-yl)ethyl)-1H-1,2,3-triazole-4-carboxylate Ethyl propiolate (1.183 ml, 11.68 mmol) was added to a stirred solution of starting material 5-(1-azidoethyl)-2-(methylthio)pyrimidine (1.14 g, 5.84 mmol) in EtOH (7.30 ml) at room temperature. A solution of sodium ascorbate (0.231 g, 1.168 mmol) in water (3.5 ml) was added, followed by the addition of a solution of copper(II) sulfate pentahydrate (0.292 g, 1.168 mmol) in water (3.5 mL). The reaction mixture was stirred at room temperature for 45 min. The mixture was diluted with water (30 mL) and extracted with dichloromethane (2×30 mL). The combined organic phases were washed with brine, dried (MgSO$_4$) and filtered. The filtrate was concentrated under reduced pressure. The residue was purified by flash silica gel chromatography (EtOAc/hexane 0-80%) to give the title compound. MS=294.2 (M+1).

Step 4. 1-(1-(2-(methylthio)pyrimidin-5-yl)ethyl)-1H-1,2,3-triazole-4-carboxylic acid LiOH (1.012 g, 42.3 mmol) was added to a stirred solution of ethyl 1-(1-(2-(methylthio)pyrimidin-5-yl)ethyl)-1H-1,2,3-triazole-4-carboxylate (1.24 g, 4.23 mmol) in THF (30 ml) and water (10 ml) at room temperature and the mixture was stirred at 60° C. overnight. LCMS analysis indicated that the reaction was complete. The mixture was acidified with hydrochloric acid (1M) to pH 3 and extracted with ethyl acetate (2×30 mL). The combined organic phases were washed with brine, dried (MgSO$_4$) and filtered. The filtrate was concentrated under reduced pressure. The residue was purified by flash silica gel chromatography (EtOAc/hexane 0-100%) to give the title compound. MS=266.2 (M+1).

Step 5. N-((cis)-3-(5-chloro-2-cyanophenyl)cyclobutyl)-1-(1-(2-(methylthio)pyrimidin-5-yl)ethyl)-1H-1,2,3-triazole-4-carboxamide 2-((cis)-3-aminocyclobutyl)-4-chlorobenzonitrile (353 mg, 1.708 mmol) and Hunig's base (795 µl, 4.55 mmol) were added to a stirred solution of 1-(1-(2-(methylthio)pyrimidin-5-yl)ethyl)-1H-1,2,3-triazole-4-carboxylic acid (302 mg, 1.138 mmol) in DMF (9486 µl) at room temperature, followed by adding HATU (1082 mg, 2.85 mmol). The mixture was stirred at room temperature for 30 min. LCMS analysis indicated that the reaction was complete. The mixture was diluted with water (30 mL) and extracted with ethyl acetate (2×30 mL). The combined organic phases were washed with brine, dried (MgSO$_4$) and filtered. The filtrate was concentrated under reduced pressure. The residue was purified by flash silica gel chromatography (EtOAc/hexane 0-80%) to give the title compound. MS=454.2.0 (M+1).

Step 6. N-((cis)-3-(5-chloro-2-cyanophenyl)cyclobutyl)-1-(1-(2-(methylsulfonyl)pyrimidin-5-yl)ethyl)-1H-1,2,3-triazole-4-carboxamide MCPBA (448 mg, 2.000 mmol) was added to a stirred solution of N-(3-(5-chloro-2-cyanophenyl)cyclobutyl)-1-(1-(2-(methylthio)pyrimidin-5-yl)ethyl)-1H-1,2,3-triazole-4-carboxamide (454 mg, 1.000 mmol) in dichloromethane (6667 μl) at room temperature and the mixture was stirred at room temperature for 6 h. LCMS analysis indicated that the reaction was complete. The mixture was diluted with aqueous sodium hydrogen carbonate (30 mL) and extracted with dichloromethane (2×30 mL). The combined organic phases were washed with brine, dried (MgSO$_4$) and filtered. The filtrate was concentrated under reduced pressure. The residue was purified by flash silica gel chromatography (EtOAc/hexane 0-80%) to give the title compound. MS=486.1 (M+1).

Step 7. N-((cis)-3-(5-chloro-2-cyanophenyl)cyclobutyl)-1-((R)-1-(2-((1R,5S)-2-oxo-3-azabicyclo[3.1.0]hexan-3-yl)pyrimidin-5-yl)ethyl)-1H-1,2,3-triazole-4-carboxamide and N-((cis)-3-(5-chloro-2-cyanophenyl)cyclobutyl)-1-((S)-1-(2-((1R,5S)-2-oxo-3-azabicyclo[3.1.0]hexan-3-yl)pyrimidin-5-yl)ethyl)-1H-1,2,3-triazole-4-carboxamide (1R,5S)-3-azabicyclo[3.1.0]hexan-2-one (13.99 mg, 0.144 mmol) and Cs$_2$CO$_3$ (188 mg, 0.576 mmol) were added to a stirred solution of N-(3-(5-chloro-2-cyanophenyl)cyclobutyl)-1-(1-(2-(methylsulfonyl)pyrimidin-5-yl)ethyl)-1H-1,2,3-triazole-4-carboxamide (70 mg, 0.144 mmol) in DMSO (1440 μl) at room temperature and the mixture was stirred at 90° C. for 1 h. The mixture was diluted with water (30 mL) and extracted with dichloromethane (2×30 mL). The combined organic phases were washed with brine, dried (MgSO$_4$), and filtered. The filtrate was concentrated under reduced pressure. The residue was dissolved in DMSO (2 ml) and purified by reverse phase HPLC (ACN/water with 0.05% TFA modifier) to afford the mixture of diastereomers. The enantiopure title compounds were resolved by chiral SFC (OD-H, 4.6×250 mm, 45% MeOH+0.1% DIPA). The faster-eluting enantiomer of the title compound was obtained (Example 77) $^1$H NMR (500 MHz, CDCl$_3$) δ: 8.61 (s, 2H), 8.09 (s, 1H), 7.57 (d, J=8.2 Hz, 2H), 7.44 (s, 1H), 7.32 (d, J=8.2 Hz, 1H), 5.86 (q, J=7.1 Hz, 1H), 4.64 (m, 1H), 4.16 (dd, J=11.4, 5.7 Hz, 1H), 3.99 (d, J=11.5 Hz, 1H), 3.59 (m, 1H), 3.05 (m, 2H), 2.22 (m, 2H), 2.05 (d, J=7.2 Hz, 3H), 1.32-1.24 (m, 2H), 0.90 (in, 1H). MS=503.3 (M+1). The slower-eluting enantiomer of the title compound was obtained (Example 78): $^1$H NMR (500 MHz, Chloroform-d) δ: 8.61 (s, 1H), 8.09 (s, 1H), 7.57 (d, J=8.2 Hz, 1H), 7.44 (s, 1H), 7.35-7.28 (m, 3H), 5.86 (q, J=7.1 Hz, 1H), 4.64 (h, J=8.3 Hz, 1H), 4.17 (dd, J=11.4, 5.7 Hz, 1H), 4.00 (d, J=11.5 Hz, 1H), 3.60 (p, J=9.6, 8.9 Hz, 1H), 3.10-3.01 (i, 1H), 2.25 (dt, J=26.3, 12.4 Hz, 2H), 2.05 (d, J=7.2 Hz, 3H), 1.32-1.24 (m, 2H), 0.90 (d, J=3.4 Hz, 1H). MS=503.3 (M+1).

The following compounds were prepared using procedures similar to those described for Examples 77 and 78 using appropriate starting materials.

| Example No. | Structure | Name | Exact Mass [M + H]$^+$ | Chiral column |
|---|---|---|---|---|
| 79 | | N-((cis)-3-(5-chloro-2-cyanophenyl)cyclobutyl)-1-((2-((1R,5S)-2-oxo-3-azabicyclo[3.1.0]hexan-3-yl)pyrimidin-5-yl)methyl)-1H-1,2,3-triazole-4-carboxamide | Calc'd 488.2 Found 489.2 | OJ-H |
| 80 | | N-((cis)-3-(5-chloro-2-cyanophenyl)cyclobutyl)-1-((R or S)-1-(4-methyl-2-((1R,5S)-2-oxo-3-azabicyclo[3.1.0]hexan-3-yl)pyrimidin-5-yl)ethyl)-1H-1,2,3-triazole-4-carboxamide | Calc'd 516.2 Found 517.5 | OJ-H |

| Example No. | Structure | Name | Exact Mass [M + H]+ | Chiral column |
|---|---|---|---|---|
| 81 | | N-((cis)-3-(5-chloro-2-cyanophenyl)cyclobutyl)-1-((S or R)-1-(4-methyl-2-((1R,5S)-2-oxo-3-azabicyclo[3.1.0]hexan-3-yl)pyrimidin-5-yl)ethyl)-1H-1,2,3-triazole-4-carboxamide | Calc'd 516.2 Found 517.5 | OJ-H |
| 82 | | N-((cis)-3-(5-chloro-2-cyanophenyl)-3-methylcyclobutyl)-1-((R or S)-1-(4-methyl-2-((1R,5S)-2-oxo-3-azabicyclo[3.1.0]hexan-3-yl)pyrimidin-5-yl)ethyl)-1H-1,2,3-triazole-4-carboxamide | Calc'd 530.2 Found 531.4 | OJ-H |
| 83 | | N-((cis)-3-(5-chloro-2-cyanophenyl)-3-methylcyclobutyl)-1-((S or R)-1-(4-methyl-2-((1R,5S)-2-oxo-3-azabicyclo[3.1.0]hexan-3-yl)pyrimidin-5-yl)ethyl)-1H-1,2,3-triazole-4-carboxamide | Calc'd 530.2 Found 531.4 | OJ-H |

Example 84 and 85

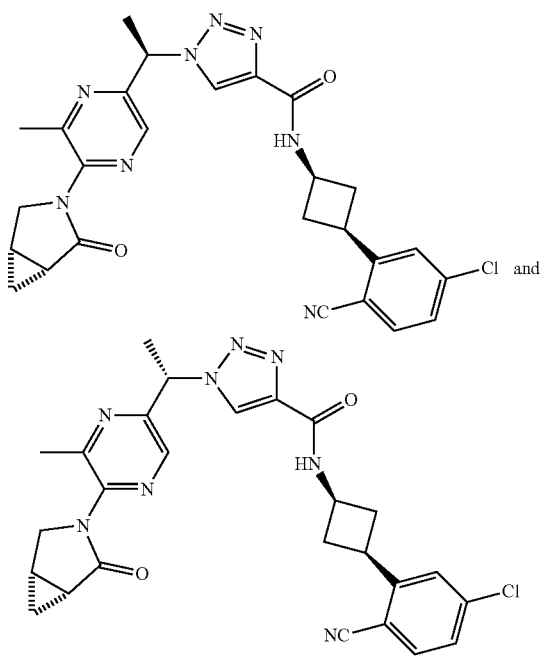

N-((cis)-3-(5-chloro-2-cyanophenyl)cyclobutyl)-1-((R)-1-(6-methyl-5-((1R,5S)-2-oxo-3-azabicyclo[3.1.0]hexan-3-yl)pyrazin-2-yl)ethyl)-1H-1,2,3-triazole-4-carboxamide and N-((cis)-3-(5-chloro-2-cyanophenyl)cyclobutyl)-1-((S)-1-(6-methyl-5-((1R,5S)-2-oxo-3-azabicyclo[3.1.0]hexan-3-yl)pyrazin-2-yl)ethyl)-1H-1,2,3-triazole-4-carboxamide (Scheme 8)

Step 1. 1-(5-chloro-6-methylpyrazin-2-yl)ethan-1-ol

Methylmagnesium bromide (2.71 ml, 8.14 mmol) was added to a stirred solution of 5-chloro-6-methylpyrazine-2-carbaldehyde (980 mg, 6.26 mmol) in THF (20 ml) at −78° C. and the mixture was stirred at 0° C. for 2 h. The mixture was diluted with water (30 mL) and extracted with ethyl acetate (2×30 mL). The combined organic phases were washed with brine, dried (MgSO$_4$) and filtered. The filtrate was concentrated under reduced pressure to give the title compound that was used directly in the subsequent step. MS=173.2 (M+1).

Step 2. 5-(1-azidoethyl)-2-chloro-3-methylpyrazine

Diphenylphosphoryl azide (1.669 ml, 7.74 mmol) and DBU (1.167 ml, 7.74 mmol) were added to a stirred solution of 1-(5-chloro-6-methylpyrazin-2-yl)ethan-1-ol (1.028 g, 5.96 mmol) in toluene (29.8 ml) at 0° C. and the mixture was stirred at room temperature overnight. The mixture was diluted with water (30 mL) and extracted with ethyl acetate (2×30 mL). The combined organic phases were washed with brine, dried (MgSO$_4$) and filtered. The filtrate was concentrated under reduced pressure. The residue was purified by flash silica gel chromatography (EtOAc/hexane 0-40%) to give the title compound. MS=198.2 (M+1).

Step 3. Ethyl 1-(1-(5-chloro-6-methylpyrazin-2-yl)ethyl)-1H-1,2,3-triazole-4-carboxylate Ethyl propiolate (0.929 ml, 9.17 mmol) was added to a stirred solution of starting material 5-(1-azidoethyl)-2-chloro-3-methylpyrazine (906 mg, 4.58 mmol) in EtOH (5.6 ml) at room temperature. A solution of sodium ascorbate (182 mg, 0.917 mmol) in water (2.8 ml) was added, followed by the addition of a solution of copper(II) sulfate pentahydrate (229 mg, 0.917 mmol) (in 2.8 mL water). The reaction mixture was stirred at room temperature for 45 min. The mixture was diluted with water (30 mL) and extracted with dichloromethane (2×30 mL). The combined organic phases were washed with brine, dried (MgSO$_4$) and filtered. The filtrate was concentrated under reduced pressure. The residue was purified by flash silica gel chromatography (EtOAc/hexane 0-70%) to give the title compound. MS=296.2 (M+1).

Step 4. 1-(1-(5-chloro-6-methylpyrazin-2-yl)ethyl)-1H-1,2,3-triazole-4-carboxylic acid Lithium hydroxide (202 mg, 8.45 mmol) was added to a stirred solution of ethyl 1-(1-(5-chloro-6-methylpyrazin-2-yl)ethyl)-1H-1,2,3-triazole-4-carboxylate (250 mg, 0.845 mmol) in THF (6 ml) and water (2 ml) at room temperature and the mixture was stirred at room temperature for 4 h. The mixture was diluted with aqueous ammonium chloride (30 mL) and extracted with ethyl acetate (2×30 mL). The combined organic phases were washed with brine, dried (MgSO$_4$) and filtered. The filtrate was concentrated under reduced pressure and the filtrate dried by lyophilization. The compound was purified by reverse phase HPLC (ACN/water with 0.05% TFA modifier) to give the title compound. MS=268.1 (M+1).

Step 5. 1-(1-(6-methyl-5-((1R,5S)-2-oxo-3-azabicyclo[3.1.0]hexan-3-yl)pyrazin-2-yl)ethyl)-1H-1,2,3-triazole-4-carboxylic acid (1R,5S)-3-azabicyclo[3.1.0]hexan-2-one (173 mg, 1.784 mmol), cesium carbonate (930 mg, 2.85 mmol), and XantPhos Pd G3 (203 mg, 0.214 mmol) were added to a stirred solution of 1-(1-(5-chloro-6-methylpyrazin-2-yl)ethyl)-1H-1,2,3-triazole-4-carboxylic acid (191 mg, 0.714 mmol) in dioxane (3568 µl) at room temperature and the mixture was sparged with N$_2$ (5 min) and then stirred at 100° C. for 8 h. The mixture was diluted with water (30 mL) and extracted with dichloromethane (2×30 mL). The combined organic phases were washed with brine, dried (MgSO$_4$) and filtered. The filtrate was concentrated under reduced pressure. The residue was purified by flash silica gel chromatography (EtOAc/hexane 0-90%) to give the title compound. MS=329.2 (M+1).

Step 6. N-((cis)-3-(5-chloro-2-cyanophenyl)cyclobutyl)-1-((R)-1-(6-methyl-5-((1R,5S)-2-oxo-3-azabicyclo[3.1.0]hexan-3-yl)pyrazin-2-yl)ethyl)-1H-1,2,3-triazole-4-carboxamide and N-((cis)-3-(5-chloro-2-cyanophenyl)cyclobutyl)-1-((S)-1-(6-methyl-5-((1R,5S)-2-oxo-3-azabicyclo[3.1.0]hexan-3-yl)pyrazin-2-yl)ethyl)-1H-1,2,3-triazole-4-carboxamid Hunig'sBase (0.194 ml, 1.112 mmol) and HATU (211 mg, 0.556 mmol) were added to a stirred solution of 1-(1-(6-methyl-5-((1R,5S)-2-oxo-3-azabicyclo[3.1.0]hexan-3-yl)

pyrazin-2-yl)ethyl)-1H-1,2,3-triazole-4-carboxylic acid (73 mg, 0.222 mmol) in DMF (2.0 ml) at room temperature, followed by the addition of 4-chloro-2-((cis)-3-((2,2,2-trifluoroacetyl)-14-azaneyl)cyclobutyl)benzonitrile (135 mg, 0.445 mmol) and the mixture was stirred at room temperature for 1 h. LCMS analysis indicated that the reaction was complete. The mixture was diluted with water (30 mL) and extracted with ethyl acetate (2×30 mL). The combined organic phases were washed with brine, dried (MgSO$_4$) and concentrated under reduced pressure. The residue was purified by reverse phase HPLC (ACN/water with 0.05% TFA modifier) to afford the mixture of diasteromers. The enantiopure title compounds were resolved by chiral SFC separation (OJ-H column), to provide the faster-eluting enantiomer of the title compound (Example 84). MS=517.3 (M+1). $^1$H NMR (500 MHz, Chloroform-d) δ 8.37 (s, 1H), 8.23 (s, 1H), 7.56 (d, J=8.2 Hz, 1H), 7.44 (s, 1H), 7.35-7.29 (m, 2H), 6.04 (q, J=7.0 Hz, 1H), 4.65 (q, J=7.8 Hz, 1H), 4.43 (dd, J=10.5, 5.6 Hz, 1H), 3.65 (d, J=10.9 Hz, 1H), 3.60 (t, J=7.9 Hz, 1H), 3.08-3.02 (m, 2H), 2.44 (s, 3H), 2.25 (p, J=10.1 Hz, 2H), 2.11 (dd, J=13.1, 7.8 Hz, 2H), 1.98 (d, J=7.1 Hz, 3H), 1.30 (dt, J=13.7, 6.9 Hz, 1H), 0.94 (d, J=3.3 Hz, 1H). The slower-eluting enantiomer of the title compound (Example 85): MS=517.3 (M+1). $^1$H NMR (500 MHz, Chloroform-d) δ 8.43 (s, 1H), 8.21 (s, 1H), 7.55 (t, J=8.1 Hz, 2H), 7.48-7.44 (m, 1H), 7.32 (dd, J=8.2, 1.8 Hz, 1H), 6.04 (q, J=7.1 Hz, 1H), 4.66 (h, J=8.4 Hz, 1H), 4.37 (dd, J=10.5, 5.2 Hz, 1H), 3.72 (d, J=10.4 Hz, 1H), 3.66-3.55 (m, 1H), 3.09-3.00 (m, 2H), 2.45 (s, 3H), 2.28 (q, J=10.2 Hz, 2H), 2.19-2.11 (m, 2H), 2.02 (d, J=7.1 Hz, 3H), 1.33 (td, J=8.0, 4.9 Hz, 1H), 0.96 (q, J=4.2 Hz, 1H).

The following compounds were prepared using procedures similar to those described for Examples 84 and 85, using appropriate starting materials.

| Example No. | Structure | Name | Exact Mass [M + H]$^+$ | Chiral column |
|---|---|---|---|---|
| 86 | | N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.2 | OD-H |
| 87 | | N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 529.2 Found 530.2 | OD-H |
| 88 | | N-((cis)-3-(5-chloro-2-cyanophenyl)cyclobutyl)-1-((R or S)-1-(4-methoxy-6-((1R,5S)-2-oxo-3-azabicyclo[3.1.0]hexan-3-yl)pyridin-3-yl)ethyl)-1H-1,2,3-triazole-4-carboxamide | Calc'd 531.1 Found 532.0 | OJ-H |

-continued

| Example No. | Structure | Name | Exact Mass [M + H]+ | Chiral column |
|---|---|---|---|---|
| 89 | | N-((cis)-3-(5-chloro-2-cyanophenyl)cyclobutyl)-1-((S or R)-1-(4-methoxy-6-((1R,5S)-2-oxo-3-azabicyclo[3.1.0]hexan-3-yl)pyridin-3-yl)ethyl)-1H-1,2,3-triazole-4-carboxamide | Calc'd 531.1 Found 532.0 | OJ-H |
| 90 | | N-((cis)-3-(5-chloro-2-cyanophenyl)cyclobutyl)-1-((R or S)-1-(3-methyl-5-((1R,5S)-2-oxo-3-azabicyclo[3.1.0]hexan-3-yl)pyridin-2-yl)ethyl)-1H-1,2,3-triazole-4-carboxamide | Calc'd 515.2 Found 516.3 | AS-H |
| 91 | | N-((cis)-3-(5-chloro-2-cyanophenyl)cyclobutyl)-1-((S or R)-1-(3-methyl-5-((1R,5S)-2-oxo-3-azabicyclo[3.1.0]hexan-3-yl)pyridin-2-yl)ethyl)-1H-1,2,3-triazole-4-carboxamide | Calc'd 515.2 Found 516.3 | AS-H |
| 92 | | N-((cis)-3-(5-chloro-2-cyanophenyl)cyclobutyl)-1-((R or S)-1-(3-fluoro-5-((1R,5S)-2-oxo-3-azabicyclo[3.1.0]hexan-3-yl)pyridin-2-yl)ethyl)-1H-1,2,3-triazole-4-carboxamide | Calc'd 519.2 Found 520.3 | AS-H |

| Example No. | Structure | Name | Exact Mass [M + H]+ | Chiral column |
|---|---|---|---|---|
| 93 | | N-((cis)-3-(5-chloro-2-cyanophenyl)cyclobutyl)-1-((S or R)-1-(3-fluoro-5-((1R,5S)-2-oxo-3-azabicyclo[3.1.0]hexan-3-yl)pyridin-2-yl)ethyl)-1H-1,2,3-triazole-4-carboxamide | Calc'd 519.2 Found 520.3 | AS-H |
| 94 | | N-((cis)-3-(5-chloro-2-cyanophenyl)cyclobutyl)-1-((R or S)-1-(2-methyl-6-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.4 | OD-H |
| 95 | | N-((cis)-3-(5-chloro-2-cyanophenyl)cyclobutyl)-1-((S or R)-1-(2-methyl-6-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.5 | OD-H |
| 96 | | N-((cis)-3-(5-chloro-2-cyanophenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 533.2 Found 534.2 | AD-H |

-continued

| Example No. | Structure | Name | Exact Mass [M + H]+ | Chiral column |
|---|---|---|---|---|
| 97 | | N-((cis)-3-(5-chloro-2-cyanophenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 533.2 Found 534.2 | AD-H |
| 98 | | N-((cis)-3-(3-cyano-6-methylpyridin-2-yl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 510.2 Found 511.0 | AD-3 |
| 99 | | N-((cis)-3-(3-cyano-6-methylpyridin-2-yl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 510.2 Found 511.0 | AD-3 |
| 100 | | N-((cis)-3-(5-chloro-2-cyanophenyl)cyclobutyl)-1-((R and S)-1-(5-methoxy-6-((1R,5S)-2-oxo-3-azabicyclo[3.1.0]hexan-3-yl)pyridin-3-yl)ethyl)-1H-1,2,3-triazole-4-carboxamide | Calc'd 531.2 Found 532.0 | AS-H |

| Example No. | Structure | Name | Exact Mass [M + H]+ | Chiral column |
|---|---|---|---|---|
| 101 | | N-((cis)-3-(5-chloro-2-cyanophenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-1,2,3-triazole-4-carboxamide | Calc'd 531.2 Found 532.0 | AS-H |
| 102 | | N-((cis)-3-(5-chloro-2-cyanophenyl)cyclobutyl)-1-((S or R)-1-(5-methoxy-6-((1R,5S)-2-oxo-3-azabicyclo[3.1.0]hexan-3-yl)pyridin-3-yl)ethyl)-1H-1,2,3-triazole-4-carboxamide | Calc'd 531.2 Found 532.0 | AS-H |
| 103 | | N-((cis)-3-(5-chloro-2-cyanophenyl)cyclobutyl)-1-((R or S)-1-(5-fluoro-6-((1R,5S)-2-oxo-3-azabicyclo[3.1.0]hexan-3-yl)pyridin-3-yl)ethyl)-1H-1,2,3-triazole-4-carboxamide | Calc'd 519.2 Found 520.3 | AS-H |
| 104 | | N-((cis)-3-(5-chloro-2-cyanophenyl)cyclobutyl)-1-((S or R)-1-(5-fluoro-6-((1R,5S)-2-oxo-3-azabicyclo[3.1.0]hexan-3-yl)pyridin-3-yl)ethyl)-1H-1,2,3-triazole-4-carboxamide | Calc'd 519.2 Found 520.2 | AS-H |

| Example No. | Structure | Name | Exact Mass [M + H]+ | Chiral column |
|---|---|---|---|---|
| 105 | | N-((cis)-3-(5-chloro-2-cyanophenyl)-3-methylcyclobutyl)-1-((R or S)-1-(5-methoxy-6-((1R,5S)-2-oxo-3-azabicyclo[3.1.0]hexan-3-yl)pyridin-3-yl)ethyl)-1H-1,2,3-triazole-4-carboxamide | Calc'd 545.2 Found 546.3 | AS-H |
| 106 | | N-((cis)-3-(5-chloro-2-cyanophenyl)-3-methylcyclobutyl)-1-((S or R)-1-(5-methoxy-6-((1R,5S)-2-oxo-3-azabicyclo[3.1.0]hexan-3-yl)pyridin-3-yl)ethyl)-1H-1,2,3-triazole-4-carboxamide | Calc'd 545.2 Found 546.3 | AS-H |
| 107 | | 1-((R or S)-1-(5-amino-6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide | Calc'd 517 Found 517.1 | AS-H |
| 108 | | 1-((S or R)-1-(5-amino-6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide | Calc'd 517 Found 517.1 | AS-H |

-continued

| Example No. | Structure | Name | Exact Mass [M + H]+ | Chiral column |
|---|---|---|---|---|
| 109 | | N-((cis)-3-(5-chloro-2-cyanophenyl)-3-methylcyclobutyl)-1-((R or S)-1-(6-methyl-5-((1R,5S)-2-oxo-3-azabicyclo[3.1.0]hexan-3-yl)pyrazin-2-yl)ethyl)-1H-1,2,3-triazole-4-carboxamide | Calc'd 530.2 Found 531.3 | OD-H |
| 110 | | N-((cis)-3-(5-chloro-2-cyanophenyl)-3-methylcyclobutyl)-1-((S or R)-1-(6-methyl-5-((1R,5S)-2-oxo-3-azabicyclo[3.1.0]hexan-3-yl)pyrazin-2-yl)ethyl)-1H-1,2,3-triazole-4-carboxamide | Calc'd 530.2 Found 531.3 | OD-H |
| 111 | | N-((cis)-3-(5-chloro-2-cyanophenyl)cyclobutyl)-1-((R or S)-1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 545.2 Found 546.2 | AD |
| 112 | | N-((cis)-3-(5-chloro-2-cyanophenyl)cyclobutyl)-1-((S or R)-1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 545.2 Found 546.2 | AD |

-continued

| Example No. | Structure | Name | Exact Mass [M + H]+ | Chiral column |
|---|---|---|---|---|
| 113 | | N-((cis)-3-(2-cyano-5-methylphenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 509.3 Found 510.3 | AD-H |
| 114 | | N-((cis)-3-(2-cyano-5-methylphenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 509.3 Found 510.3 | AD-H |
| 115 | | N-((cis)-3-(3-cyano-6-methylpyridin-2-yl)cyclobutyl)-1-((R or S)-1-(6-methyl-5-((1R,5S)-2-oxo-3-azabicyclo[3.1.0]hexan-3-yl)pyrazin-2-yl)ethyl)-1H-1,2,3-triazole-4-carboxamide | Calc'd 497.2 Found 498.2 | AD-H |
| 116 | | N-((cis)-3-(3-cyano-6-methylpyridin-2-yl)cyclobutyl)-1-((S or R)-1-(6-methyl-5-((1R,5S)-2-oxo-3-azabicyclo[3.1.0]hexan-3-yl)pyrazin-2-yl)ethyl)-1H-1,2,3-triazole-4-carboxamide | Calc'd 497.2 Found 498.2 | AD-H |

| Example No. | Structure | Name | Exact Mass [M + H]+ | Chiral column |
|---|---|---|---|---|
| 117 | | N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-1,2,3-triazole-4-carboxamide | Calc'd 516.2 Found 517.2 | AS |
| 118 | | N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-1,2,3-triazole-4-carboxamide | Calc'd 516.2 Found 517.2 | AS |
| 119 | | N-((cis)-3-(2-cyano-5-methylphenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 513.2 Found 514.3 | OJ-H |
| 120 | | N-((cis)-3-(2-cyano-5-methylphenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 513.2 Found 514.3 | OJ-H |

-continued

| Example No. | Structure | Name | Exact Mass [M + H]+ | Chiral column |
|---|---|---|---|---|
| 121 | | N-((cis)-3-(5-chloro-2-cyanophenyl)cyclobutyl)-1-((R or S)-1-(6-methoxy-5-((1R,5S)-2-oxo-3-azabicyclo[3.1.0]hexan-3-yl)pyrazin-2-yl)ethyl)-1H-1,2,3-triazole-4-carboxamide | Calc'd 532.2 Found 533.2 | AD |
| 122 | | N-((cis)-3-(5-chloro-2-cyanophenyl)cyclobutyl)-1-((S or R)-1-(6-methoxy-5-((1R,5S)-2-oxo-3-azabicyclo[3.1.0]hexan-3-yl)pyrazin-2-yl)ethyl)-1H-1,2,3-triazole-4-carboxamide | Calc'd 532.2 Found 533.2 | AD |
| 123 | | N-((1R,2R,3R or 1S,2S,3S)-3-(3-chlorophenyl)-2-hydroxycyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 524.2 Found 525.1 | Cellulose-2 (first peak) |
| 124 | | N-((1S,2S,3S or 1R,2R,3R)-3-(3-chlorophenyl)-2-hydroxycyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 524.2 Found 525.0 | Cellulose-2 (second peak); AS (first peak) |

| Example No. | Structure | Name | Exact Mass [M + H]+ | Chiral column |
|---|---|---|---|---|
| 125 | | N-((1R,2R,3R or 1S,2S,3S)-3-(3-chlorophenyl)-2-hydroxycyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 524.2 Found 525.0 | Cellulose-2 (second peak); AS (second peak) |
| 126 | | N-((1S,2S,3S or 1R,2R,3R)-3-(3-chlorophenyl)-2-hydroxycyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 524.2 Found 525.1 | Cellulose-2 (third peak) |
| 127 | | N-((cis)-3-(3-cyano-6-methylpyridin-2-yl)cyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 511.2 Found 512.1 | AD |
| 128 | | N-((cis)-3-(3-cyano-6-methylpyridin-2-yl)cyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 511.2 Found 512.1 | AD |

| Example No. | Structure | Name | Exact Mass [M + H]+ | Chiral column |
|---|---|---|---|---|
| 129 | | N-((1R,2R,3R or 1S,2S,3S))-3-(3-chlorophenyl)-2-hydroxycyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 521.2 Found 522.2 | REGIS (s,s) WHELK-01 |
| 130 | | N-((1S,2S,3S or 1R,2R,3R))-3-(3-chlorophenyl)-2-hydroxycyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 521.2 Found 522.0 | REGIS (s,s) WHELK-01 |
| 131 | | N-((1R,2R,3R or 1S,2S,3S))-3-(3-chlorophenyl)-2-hydroxycyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 521.2 Found 522.2 | REGIS (s,s) WHELK-01 |
| 132 | | N-((1S,2S,3S or 1R,2R,3R))-3-(3-chlorophenyl)-2-hydroxycyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide | Calc'd 521.2 Found 522.2 | REGIS (s,s WHELK-01 |

-continued

| Example No. | Structure | Name | Exact Mass [M + H]+ | Chiral column |
|---|---|---|---|---|
| 133 | | N-((cis)-3-(2-cyano-5-methylphenyl)cyclobutyl)-1-((R or S)-1-(5-methyl-6-((1R,5S)-2-oxo-3-azabicyclo[3.1.0]hexan-3-yl)pyridin-3-yl)ethyl)-1H-1,2,3-triazole-4-carboxamide | Calc'd 495.2 Found 496.1 | AD-H |
| 134 | | N-((cis)-3-(2-cyano-5-methylphenyl)cyclobutyl)-1-((S or R)-1-(5-methyl-6-((1R,5S)-2-oxo-3-azabicyclo[3.1.0]hexan-3-yl)pyridin-3-yl)ethyl)-1H-1,2,3-triazole-4-carboxamide | Calc'd 495.2 Found 496.1 | AD-H |
| 135 | | N-((cis)-3-(3-cyano-6-methylpyridin-2-yl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 514.2 Found 515.4 | OJ-H |
| 136 | | N-((cis)-3-(3-cyano-6-methylpyridin-2-yl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide | Calc'd 514.2 Found 515.4 | OJ-H |

Example 137 and 138

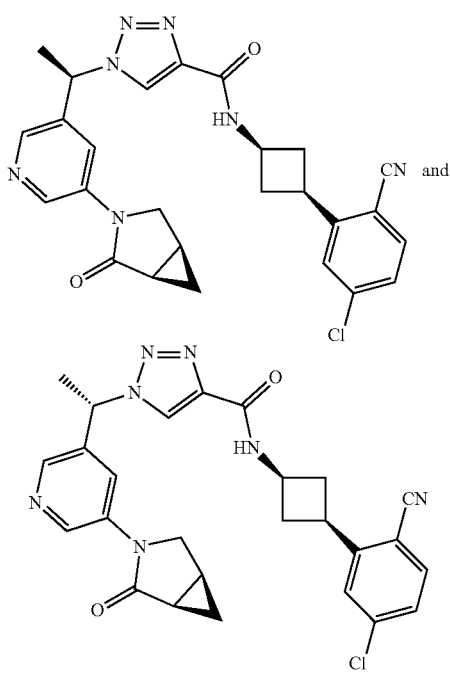

N-((cis)-3-(5-chloro-2-cyanophenyl)cyclobutyl)-1-((R)-1-(5-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-1-(5-((1R,5S)-2-oxo-3-azabicyclo[3.1.0]hexan-3-yl)pyridin-3-yl)ethyl)-1H-1,2,3-triazole-4-carboxamide (Scheme 9)

Step 1. 3-(1-azidoethyl)-5-bromopyridine

To a solution of 1-(5-bromopyridin-3-yl)ethan-1-ol (300 mg, 1.485 mmol) in toluene (12 ml) at 0° C., was slowly added diphenyphosphoryl azide (0.383 ml, 1.782 mmol) and DBU (0.269 ml, 1.782 mmol). The reaction was allowed to warm to room temperature and stirred for 44 h. The mixture was quenched with NaCl (sat aq.) and extracted with ethyl acetate (×3). The combined organic layers were dried over anhydrous sodium sulfate, filtered, concentrated under reduced pressure and purified by flash silica chromatography (0-70% ethyl acetate/hexane) to afford the title compound. MS=226.9 (M+1).

Step 2. Ethyl 1-(1-(5-bromopyridin-3-yl)ethyl)-1H-1,2,3-triazole-4-carboxylate To a solution of 3-(1-azidoethyl)-5-bromopyridine (418 mg, 1.491 mmol) in ethanol (5 mL), stirred at room temperature, was added ethyl propiolate (0.302 mL, 2.98 mmol), followed by a solution of L-sodium ascorbate (59.1 mg, 0.298 mmol) (in 2.5 mL water) and copper(II) sulfate pentahydrate (74.5 mg, 0.298 mmol) (in 2.5 mL water). The reaction mixture was stirred overnight at room temperature, then concentrated under reduced pressure. The mixture was quenched with water and extracted with dichloromethane (×3). The combined organic layers were dried over anhydrous sodium sulfate, filtered, concentrated under reduced pressure and purified by flash silica gel chromatography (0-100% ethyl acetate/hexane) to afford the title compound MS=324.9 (M+1).

Step 3. Ethyl 1-(1-(5-((1R,5S)-2-oxo-3-azabicyclo[3.1.0]hexan-3-yl)pyridin-3-yl)ethyl)-1H-1,2,3-triazole-4-carboxylate Ethyl 1-(1-(5-bromopyridin-3-yl)ethyl)-1H-1,2,3-triazole-4-carboxylate (195 mg, 0.600 mmol), $Cs_2CO_3$ (586 mg, 1.799 mmol), (1R,5S)-3-azabicyclo[3.1.0]hexan-2-one hydrochloride (84 mg, 0.630 mmol) and XantPhos PD G3 (114 mg, 0.120 mmol) were combined and placed under a nitrogen atmosphere. Dioxane (5 mL) was added and the reaction mixture was stirred for 30 hr at 100° C. The mixture was quenched with NaCl (sat aq.) and extracted with ethyl acetate (×2). The combined organic layers were dried over anhydrous sodium sulfate, filtered, concentrated under reduced pressure and purified by flash silica gel chromatography (0-100% ethyl acetate/hexane), followed by subsequent purification by flash silica gel chromatography (0-20% methanol/dichloromethane), to afford the title compound. MS=342.0 (M+1).

Step 4. 1-(1-(5-((1R,5S)-2-oxo-3-azabicyclo[3.1.0]hexan-3-yl)pyridin-3-yl)ethyl)-1H-1,2,3-triazole-4-carboxylic acid To a solution of ethyl 1-(1-(5-((1R,5S)-2-oxo-3-azabicyclo[3.1.0]hexan-3-yl)pyridin-3-yl)ethyl)-1H-1,2,3-triazole-4-carboxylate (245 mg, 0.599 mmol) in THF (1.5 ml), water (1.5 ml) and methanol (0.8 ml), stirred at room temperature, was added LiOH (71.8 mg, 3.00 mmol). The reaction mixture was stirred for 4 hr at room temperature, then concentrated under reduced pressure. The mixture was quenched with HCl (3.60 mL, 3.60 mmol) (1N aqueous), concentrated under reduced pressure and purified by reverse phase HPLC (ACN/water with 0.05% TFA modifier) to afford the title compound. MS=314.0 (M+1).

Step 5. N-((cis)-3-(5-chloro-2-cyanophenyl)cyclobutyl)-1-((R)-1-(5-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-1-(5-((1R,5S)-2-oxo-3-azabicyclo[3.1.0]hexan-3-yl)pyridin-3-yl)ethyl)-1H-1,2,3-triazole-4-carboxamide To a solution of 1-(1-(5-((1R,5S)-2-oxo-3-azabicyclo[3.1.0]hexan-3-yl)pyridin-3-yl)ethyl)-1H-1,2,3-triazole-4-carboxylic acid, 2,2,2-trifluoroacetate salt (65 mg, 0.152 mmol), DMF (3 mL), N-ethyl-N-isopropylpropan-2-amine (0.399 mL, 2.287 mmol) and 2-(3H-[1,2,3]triazolo[4,5-b]pyridin-3-yl)-1,1,3,3-tetramethylisouronium hexafluorophosphate(V) (58.0 mg, 0.152 mmol), in DMF (2 mL), stirred at room temperature, was added 2-((cis)-3-aminocyclobutyl)-4-chlorobenzonitrile hydrochloride (37.1 mg, 0.152 mmol). The reaction mixture was stirred for 45 minutes at room temperature. Upon reaction completion, the mixture was quenched with NaCl (aq.) and extracted with ethyl acetate (×3). The combined organic layers were concentrated under reduced pressure and purified by reverse phase HPLC (ACN/water with 0.05% TFA modifier) to afford the mixture to diasteromers. The enantiopure title compounds were resolved by Chiral SFC (AD-H, 21×250 mm, 50% IPA with 0.2% DIPA). The compounds were purified by reverse phase HPLC (ACN/water with 0.05% TFA modifier). The faster-eluting enantiomer of the title compound was obtained (Example 137): $^1$H NMR (500 MHz, Methanol-$d_4$) δ 8.87 (s, 1H), 8.53 (s, 1H), 8.38 (s, 1H), 8.21 (t, J=2.1 Hz, 1H), 7.75-7.60 (m, 2H), 7.43 (dd, J=8.3, 2.0 Hz, 1H), 6.12 (q, J=7.1 Hz, 1H), 4.67-4.53 (m, 1H), 4.12 (dd, J=10.1, 5.9 Hz, 1H), 3.88 (d, J=10.1 Hz, 1H), 3.71-3.56 (m, 1H), 2.99-2.86 (m, 2H), 2.37 (q, J=11.5, 10.6 Hz, 2H), 2.20 (dt, J=12.0, 6.1 Hz, 1H), 2.13 (d, J=7.1 Hz, 1H), 2.06 (d, J=7.1 Hz, 3H), 1.31 (td, J=8.1, 4.7 Hz, 1H), 0.87 (q, J=4.4 Hz, 1H). MS=502.3 (M+1). The slower-eluting enantiomer of the title compound (Example 138): ¹H NMR (500 MHz, Methanol-d₄) δ 8.92 (s, 1H), 8.53 (s, 1H), 8.41 (s, 1H), 8.27 (d, J=2.1 Hz, 1H), 7.72-7.65 (m, 2H), 7.43 (dd, J=8.3, 2.1 Hz, 1H), 6.13 (q, J=7.1 Hz, 1H), 4.65-4.53 (m, 1H), 4.12 (dd, J=10. 1, 5.9 Hz, 1H), 3.90 (d, J=9.1 Hz, 1H), 3.62 (ddd, J=17.8, 10.3, 7.8 Hz, 1H), 2.98-2.87 (m, 2H), 2.37 (q, J=11.5, 10.4 Hz, 2H), 2.21 (dt, J=11.6, 6.0 Hz, 1H), 2.18-2.11 (m, 1H), 2.07 (d, J=7.1 Hz, 3H), 1.32 (td, J=8.0, 4.7 Hz, 1H), 0.87 (q, J=4.4 Hz, 1H). MS=502.4 (M+1).

The following compounds were prepared using procedures similar to those described for Example 137 and 138, using appropriate starting materials.

| Example No. | Structure | Name | Exact Mass [M + H]⁺ | Chiral column |
|---|---|---|---|---|
| 139 | | N-((cis)-3-(5-chloro-2-cyanophenyl)cyclobutyl)-1-((R or S)-1-(6-methyl-5-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.2 | AD |
| 140 | | N-((cis)-3-(5-chloro-2-cyanophenyl)cyclobutyl)-1-((S or R)-1-(6-methyl-5-((1R,5S)-2-oxo-3-azabicyclo[3.1.0]hexan-3-yl)pyridin-3-yl)ethyl)-1H-1,2,3-triazole-4-carboxamide | Calc'd 515.2 Found 516.2 | AD |

Example 141

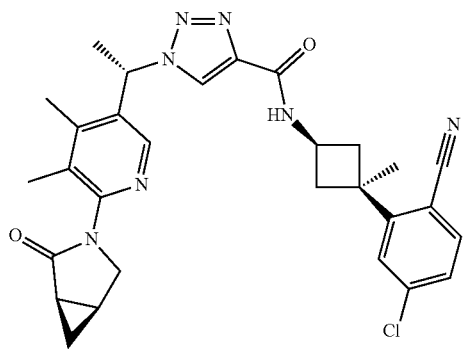 [SMILES: Cc1c([C@H](C)n2cc(C(=O)N[C@H]3C[C@@](C)(c4cc(Cl)ccc4C#N)C3)nn2)cnc(N2C[C@H]3C[C@H]3C2=O)c1C]

N-((cis)-3-(5-chloro-2-cyanophenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide (Scheme 10)

Step 1. N-((cis)-3-(5-chloro-2-cyanophenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide To a solution 1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxylic acid (Intermediate AC) (15 mg, 0.033 mmol), N-ethyl-N-isopropylpropan-2-amine (0.023 ml, 0.132 mmol) and 2-(3H-[1,2,3]triazolo[4,5-b]pyridin-3-yl)-1,1,3,3-tetramethylisouronium hexafluorophosphate(V) (12.55 mg, 0.033 mmol) in DMF (1 mL), stirred at room temperature, was added 2-((cis)-3-amino-1-methylcyclobutyl)-4-chlorobenzonitrile hydrochloride (8.94 mg, 0.033 mmol) (Intermediate R). The reaction mixture was stirred for 20 minutes at room temperature. The mixture was quenched with NaCl (aq.) and extracted with ethyl acetate (3 times). The combined organic layers were concentrated under reduced pressure and purified by preparative reverse phase HPLC (ACN/water with 0.05% TFA modifier) to afford the title compound. MS=544.2 (M+1). $^1$H NMR (500 MHz, Methanol-$d_4$) δ 8.39 (s, 1H), 8.23 (s, 1H), 7.69 (d, J=8.3 Hz, 1H), 7.41 (dd, J=8.3, 2.1 Hz, 1H), 7.38 (d, J=2.0 Hz, 1H), 6.30-6.35 (m, 1H), 4.70-4.77 (m, 1H), 4.25 (dd, J=10.4, 5.9 Hz, 1H), 3.71 (d, J=9.3 Hz, 1H), 2.77-2.90 (m, 2H), 2.55 (td, J=9.2, 2.6 Hz, 2H), 2.32 (s, 3H), 2.20 (dt, J=11.8, 6.0 Hz, 1H), 2.11 (s, 3H), 2.04-2.08 (m, 1H), 2.03 (d, J=7.0 Hz, 3H), 1.63 (s, 3H), 1.33 (td, J=8.0, 4.7 Hz, 1H), 0.99 (q, J=4.4 Hz, 1H).

The following compounds were prepared using procedures similar to those described for Example 141, using appropriate starting materials.

| Example No. | Structure | Name | Exact Mass [M + H]⁺ | Chiral column |
|---|---|---|---|---|
| 142 | | N-((cis)-3-(2-carbamoyl-5-chlorophenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 561.2 Found 562.0 | |
| 143 | | N-((cis)-3-(2-cyano-5-methylphenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 523.3 Found 524.0 | |
| 144 | | N-((cis)-3-(2-carbamoyl-5-chlorophenyl)-3-methylcyclobutyl)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 547.2 Found 547.9 | |

| Example No. | Structure | Name | Exact Mass [M + H]+ | Chiral column |
| --- | --- | --- | --- | --- |
| 145 | | N-((cis or trans)-3-(5-chloro-2-cyanophenyl)-3-methylcyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 530.2 Found 530.8 | OJ-H |
| 146 | | N-((trans or cis)-3-(5-chloro-2-cyanophenyl)-3-methylcyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 530.2 Found 530.9 | OJ-H |
| 147 | | N-((cis)-3-(5-chloro-2-cyanophenyl)cyclobutyl-3-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 516.2 Found 517.4 | |
| 148 | | N-((cis)-3-(5-chloro-2-cyanophenyl)cyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 516.2 Found 517.4 | |

-continued

| Example No. | Structure | Name | Exact Mass [M + H]+ | Chiral column |
|---|---|---|---|---|
| 149 | | N-((cis)-3-(5-chloro-2-(4-fluoro-1H-pyrazol-1-yl)phenyl)cyclobutyl)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide | Calc'd 574.2 Found 575.0 | |
| 150 | | N-(5-(5-chloro-2-cyanophenyl)bicyclo[3.1.1]heptan-1-yl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 569.2 Found 570.1 | |
| 151 | | N-((1R,2R,3R or 1S,2S,3S))-3-(3-chlorophenyl)-2-hydroxycyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 520.2 Found 521.2 | AS-H |
| 152 | | N-((1S,2S,3S or 1R,2R,3R))-3-(3-chlorophenyl)-2-hydroxycyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide | Calc'd 520.2 Found 521.2 | AS-H |

Example 153

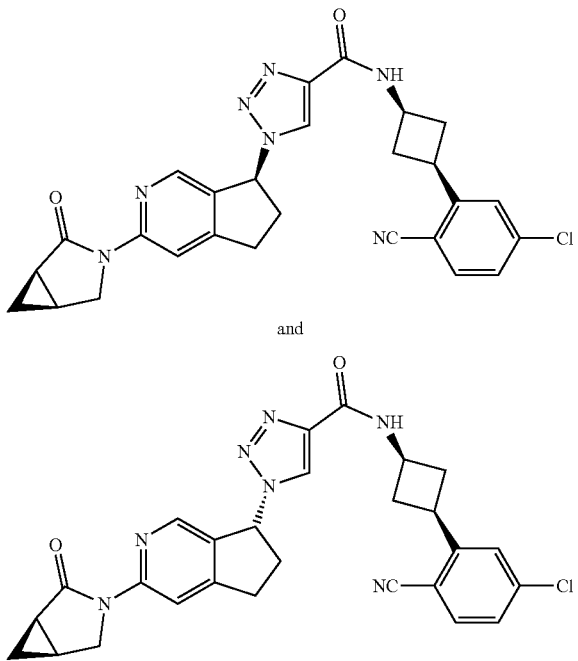

N-((cis)-3-(5-chloro-2-cyanophenyl)cyclobutyl)-1-((R)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide and N-((cis)-3-(5-chloro-2-cyanophenyl)cyclobutyl)-1-((S)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide

Step 1. 3-chloro-6,7-dihydro-5H-cyclopenta[c]pyridin-7-ol

To a solution of 3-chloro-5,6-dihydro-7H-cyclopenta[c]pyridin-7-one (250 mg, 1.492 mmol) in methanol (10 ml) at 0° C., was slowly added sodium borohydride (59.3 mg, 1.566 mmol). The reaction mixture was stirred for 2 h at 0° C. and the mixture was quenched with NH₄Cl (sat aq.) and extracted with ethyl acetate (×3). The combined organic layers were dried over anhydrous sodium sulfate, filtered, concentrated under reduced pressure and purified by flash silica gel chromatography (0-20% dichloromethane/methanol) to afford the title compound. MS=169.9 (M+1).

Step 2. 7-azido-3-chloro-6,7-dihydro-5H-cyclopenta[c]pyridine

To a solution of 3-chloro-6,7-dihydro-5H-cyclopenta[c]pyridin-7-ol (338 mg, 1.495 mmol) in toluene (8 ml) at 0° C. was slowly added diphenylphosphoryl azide (0.386 ml, 1.794 mmol) and DBU (0.270 ml, 1.794 mmol). The reaction mixture was warmed to room temperature and was stirred overnight. The mixture was quenched with NaCl (sat aq.) and extracted with ethyl acetate (×3) and the combined organic layers were dried over anhydrous sodium sulfate, filtered, concentrated under reduced pressure and purified by flash silica gel chromatography (0-70% ethyl acetate/hexane) to afford the title compound. MS=195.0 (M+1).

Step 3. ethyl-1-(3-chloro-6,7-dihydro-5H-cyclopenta[c]pyridin-7-yl)-1H-1,2,3-triazole-4-carboxylate To a solution of 7-azido-3-chloro-6,7-dihydro-5H-cyclopenta[c]pyridine (408 mg, 1.488 mmol) in ethanol (5 mL), stirred at room temperature, was added ethyl propiolate (0.302 mL, 2.98 mmol). followed by a solution of L-sodium ascorbate (59.0 mg, 0.298 mmol) (42.8 mg, 0.216 mmol) (in 2.5 mL water) and copper(II)sulfate pentahydrate (74.3 mg, 0.298 mmol) (in 2.5 mL water). The reaction mixture was stirred for 1.5 h at room temperature. The mixture was concentrated under reduced pressure, quenched with water and extracted with dichloromethane (3 times). The combined organic layers were dried over anhydrous sodium sulfate, filtered, concentrated under reduced pressure and purified by flash silica gel chromatography (0-100% ethyl acetate/hexane) to afford the title compound. MS=293.0 (M+1).

Step 4. ethyl 1-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxylate To a solution of Ethyl 1-(3-chloro-6,7-dihydro-5H-cyclopenta[c]pyridin-7-yl)-1H-1,2,3-triazole-4-carboxylate (50 mg, 0.171 mmol), Cs₂CO₃ (167 mg, 0.512 mmol), (1R,5S)-3-azabicyclo[3.1.0]hexan-2-one hydrochloride (34.2 mg, 0.256 mmol) in dioxane (2 mL) was added XantPhos Pd G3 (32.4 mg, 0.034 mmol) and the solution was placed again under a nitrogen atmosphere. The reaction mixture was stirred for 30 hr at 100° C., followed by stirring for 58 hr at room temperature. Upon reaction completion, the mixture was quenched with water and extracted with ethyl acetate (×2). The combined organic layers were dried over anhydrous sodium sulfate, filtered, concentrated under reduced pressure and purified by flash silica gel chromatography (0-100% ethyl acetate/hexane) to afford the title compound. MS=354.2 (M+1).

Step 5. 1-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxylic acid To a solution of ethyl 1-(3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxylate (54 mg, 0.153 mmol) in THF (0.5 ml), water (0.5 ml) and methanol (0.3 ml), stirred at room temperature, was added LiOH (36.6 mg, 1.528 mmol). The reaction mixture was stirred for 2 hr at room temperature and concentrated under reduced pressure. The mixture was quenched with HCl (2.292 mL, 2.292 mmol) (1N aqueous), concentrated under reduced pressure and purified by reverse phase HPLC (ACN/water with 0.05% TFA modifier) to afford the title compound, as a TFA salt. MS=326.0 (M+1).

Step 6. N-((cis)-3-(5-chloro-2-cyanophenyl)cyclobutyl)-1-((R)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide and N-((cis)-3-(5-chloro-2-cyanophenyl)cyclobutyl)-1-((S)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide To a solution of 1-(3-((1R,5S)-2-oxo-3-azabicyclo[3.1.0]hexan-3-yl)-6,7-dihydro-5H-cyclopenta[c]pyridin-7-yl)-

1H-1,2,3-triazole-4-carboxylic acid, 2,2,2-trifluoroacetate salt (6.3 mg, 0.014 mmol), N-ethyl-N-isopropylpropan-2-amine (27.9 mg, 0.216 mmol) and 2-(3H-[1,2,3]triazolo[4,5-b]pyridin-3-yl)-1,1,3,3-tetramethylisouronium hexafluorophosphate(V) (5.46 mg, 0.014 mmol) in DMF (1 mL), stirred at room temperature, was added 2-((cis)-3-aminocyclobutyl)-4-chlorobenzonitrile hydrochloride (3.49 mg, 0.014 mmol). The reaction mixture was stirred for 1 hr at room temperature and quenched with NaCl (aq.) and extracted with ethyl acetate (×3). The combined organic layers were concentrated under reduced pressure and purified by reverse phase HPLC (ACN/water with 0.05% TFA modifier) to afford the mixture of diasteromers, as a TFA salt. $^1$H NMR (500 MHz, Methanol-d$_4$) δ 8.34 (s, 1H), 8.21 (d, J=12.6 Hz, 2H), 7.68 (d, J=8.3 Hz, 2H), 7.44 (s, 1H), 6.34 (q, 1H), 4.58-4.63 (m, 1H), 4.05-4.20 (m, 2H), 3.56-3.65 (m, 1H), 3.10-3.17 (m, 1H), 2.83-2.99 (m, 4H), 2.50-2.60 (m, 1H), 2.29-2.41 (m, 2H), 2.12-2.19 (m, 2H), 1.30-1.34 (m, 1H), 0.79-0.84 (m, 1H). MS=514.0 (M+1).

Example 154 and 155

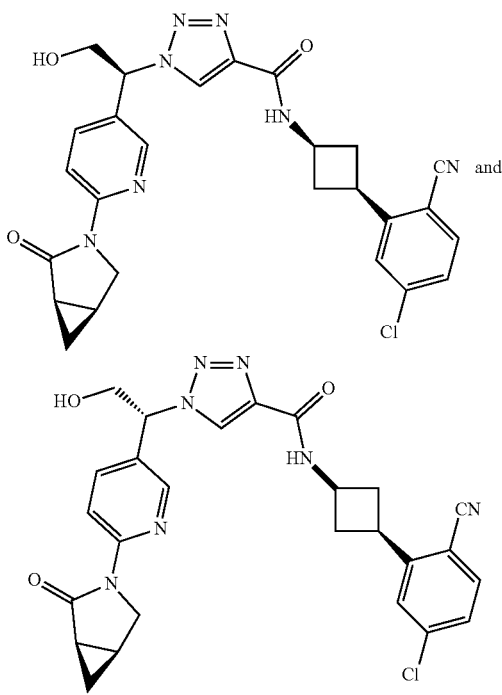

N-((cis)-3-(5-chloro-2-cyanophenyl)cyclobutyl)-1-((R)-2-hydroxy-1-(6-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-2-hydroxy-1-(6-((1R,5S)-2-oxo-3-azabicyclo[3.1.0]hexan-3-yl)pyridin-3-yl)ethyl)-1H-1,2,3-triazole-4-carboxamide Step 1. 2-chloro-5-vinylpyridine To a stirred solution of 5-bromo-2-chloropyridine (15 g, 78 mmol), 4,4,5,5-tetramethyl-2-vinyl-1,3,2-dioxaborolane (15 g, 97 mmol), Na$_2$CO$_3$ (47.2 mL, 94 mmol) in ethylene glycol dimethyl ether (150 mL) and water (50 mL) was added tetrakis(triphenylphosphine)palladium(0) (4 g, 3.46 mmol), and the mixture was stirred at 85° C. under N$_2$ for 12 h. The reaction was diluted with EtOAc (40 mL), concentrated, diluted with water (30 mL) and extracted with EtOAc (40 mL×3). The combined organic layer was washed with brine, dried and concentrated, and the residue was purified by flash silica gel chromatography (0~7% Ethyl acetate/Petroleum ether) to give the title compound. MS=140.0 (M+1).

Step 2. 1-(6-chloropyridin-3-yl)ethane-1,2-diol

To a stirred solution of 2-chloro-5-vinylpyridine (8.7 g, 62.3 mmol), 4-methylmorpholine 4-oxide (10.95 g, 93 mmol) in water (20 mL) and MeCN (60 mL) was added osmium(VIII) oxide (20.00 mL, 3.93 mmol) at 25° C.; after the addition was finished, the reaction was stirred at 25° C. for 12 h. Anhydrous sodium thiosulfate solid (300 mg) was added to the reaction liquid, and it was stirred for 0.5 h. The mixture was filtrated and concentrated under reduced pressure. The residue was purified by flash silica gel chromatography (0~10% CH$_2$Cl$_2$/MeOH) to give the title compound. MS=174.0 (M+1).

Step 3. 2-((tert-butyldiphenylsilyl)oxy)-1-(6-chloropyridin-3-yl)ethanol

To a solution of 1-(6-chloropyridin-3-yl)ethane-1,2-diol (3.6 g, 20.74 mmol) in DMF (20 mL) was added 1H-imidazole (3.6 g, 45.6 mmol) and tert-butylchlorodiphenylsilane (4.56 g, 16.59 mmol) at 20° C. The reaction mixture was stirred at 50° C. for 12 h. The mixture was concentrated, diluted with water (20 mL) and extracted with EtOAc (20 mL×3). The organic layers were washed with sat. NaCl (20 mL) dried over Na$_2$SO$_4$ and concentrated. The residue was purified by flash silica gel chromatography (0~16% Ethyl acetate/Petroleum ether) to give the title compound. MS=412.2 (M+1).

Step 4. 2-((tert-butyldiphenylsilyl)oxy)-1-(6-chloropyridin-3-yl)ethyl methanesulfonate MsCl (2.1 mL, 25.9 mmol) was added to a stirred mixture of Et$_3$N (4.16 mL, 29.9 mmol) and 2-((tert-butyldiphenylsilyl)oxy)-1-(6-chloropyridin-3-yl)ethanol (4.0 g, 9.95 mmol) in DCM (5 mL) at 0° C. and the mixture was stirred at 20° C. for 2 h. Aqueous ammonium chloride (saturated, 10 mL) was added and the mixture was extracted with dichloromethane (10 mL×3). The combined organic fractions were washed with brine (saturated, 20 mL), dried (Na$_2$SO$_4$), filtered and the solvent was evaporated under reduced pressure. The residue was concentrated to give the title compound, that was used directly without further purification. MS=490.2 (M+1).

Step 5. 5-(1-azido-2-((tert-butyldiphenylsilyl)oxy)ethyl)-2-chloropyridine:

18-crown-6 (27.0 mg, 0.102 mmol) and sodium azide (100 mg, 1.538 mmol) were added to a stirred mixture of 2-((tert-butyldiphenylsilyl)oxy)-1-(6-chloropyridin-3-yl)ethyl methanesulfonate (500 mg, 1.020 mmol) in DMF (4 mL) and water (4 mL) at 25° C. and the mixture was stirred at 25° C. for 12 h. The mixture was concentrated, water (6 mL) was added, it was extracted with EtOAc (10 mL×3), the organic layers were washed with sat. NaCl (20 mL), dried over Na$_2$SO$_4$ and concentrated. The residue was purified by flash silica gel chromatography (0~30% EtOAc/Pet.) to give the title compound. MS=436.7 (M+1).

Step 6. tert-butyl 1-(2-((tert-butyldiphenylsilyl)oxy)-1-(6-chloropyridin-3-yl)ethyl)-1H-1,2,3-triazole-4-carboxylate To a stirred solution of tert-butyl propiolate (94 mg, 0.744 mmol) and 5-(1-azido-2-((tert-butyldiphenylsilyl)oxy) ethyl)-2-chloropyridine (250 mg, 0.572 mmol) in tert-butanol (2 mL) and water (2 mL) were added sodium ascorbate (227 mg, 1.144 mmol) and Cu2SO$_4$·5H$_2$O (28.6 mg, 0.114 mmol) at 20° C.; after the addition was finished, the reaction was stirred at 20° C. for 12 h. The mixture was concentrated, water (7 mL) was added, it was extracted with EtOAc (10 mL×3), the organic layers were washed with sat. NaCl (20 mL), dried over Na$_2$SO$_4$ and concentrated to give crude tert-butyl 1-(2-((tert-butyldiphenylsilyl)oxy)-1-(6-chloropyridin-3-yl)ethyl)-1H-1,2,3-triazole-4-carboxylate which was used in the next step without further purification. MS=563.2 (M+1).

Step 7. tert-butyl 1-(2-((tert-butyldiphenylsilyl)oxy)-1-(6-((1R,5S)-2-oxo-3-azabicyclo[3.1.0]hexan-3-yl)pyridin-3-yl)ethyl)-1H-1,2,3-triazole-4-carboxylate To a stirred solution of tert-butyl 1-(2-((tert-butyldiphenylsilyl)oxy)-1-(6-chloropyridin-3-yl)ethyl)-1H-1,2,3-triazole-4-carboxylate (280 mg, 0.497 mmol), (1R,5S)-3-azabicyclo[3.1.0]hexan-2-one (62.8 mg, 0.646 mmol), XANTPHOS (28.8 mg, 0.050 mmol) and cesium carbonate (324 mg, 0.994 mmol) in dioxane (4 mL) was added Pd2(dba)$_3$ (45.5 mg, 0.050 mmol) at 20° C. and the reaction was stirred at 100° C. under N$_2$ for 12 h. The mixture was concentrated, diluted with water (10 mL) and extracted with EtOAc (15 mL×3). The organic layers were washed with brine (20 mL), dried over Na$_2$SO$_4$ and concentrated and the residue was purified by flash silica gel chromatography (0~15% Ethyl acetate/Petroleum ether) to give the title compound. MS=624.3 (M+1).

Step 8. 1-(2-((tert-butyldiphenylsilyl)oxy)-1-(6-((1R,5S)-2-oxo-3-azabicyclo[3.1.0]hexan-3-yl)pyridin-3-yl)ethyl)-1H-1,2,3-triazole-4-carboxylic acid To a stirred solution of tert-butyl 1-(2-((tert-butyldiphenylsilyl)oxy)-1-(6-((1R,5S)-2-oxo-3-azabicyclo[3.1.0] hexan-3-yl)pyridin-3-yl)ethyl)-1H-1,2,3-triazole-4-carboxylate (260 mg, 0.417 mmol) in DCM (2 mL) was added TFA (0.4 mL, 4.17 mmol) at 25° C., and the reaction was stirred at 25° C. for 6 h. The mixture was concentrated to give the crude title compound which was used in the next step without further purification. MS=568.1 (M+1).

Step 9. 1-(2-((tert-butyldiphenylsilyl)oxy)-1-(6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide To a solution of 1-(2-((tert-butyldiphenylsilyl)oxy)-1-(6-((1R,5S)-2-oxo-3-azabicyclo[3.1.0]hexan-3-yl)pyridin-3-yl)ethyl)-1H-1,2,3-triazole-4-carboxylic acid (200 mg, 0.352 mmol) in ACN (2 mL) was added 1-methyl-1H-imidazole (116 mg, 1.409 mmol), TCFH (119 mg, 0.423 mmol) and (cis)-2-(3-aminocyclobutyl)-4-chlorobenzonitrile 2,2,2-trifluoroacetate (124 mg, 0.388 mmol) at 25° C., and the mixture was stirred at 25° C. under N$_2$ for 2 h. The mixture was concentrated, diluted with water (10 mL) and extracted with EtOAc (15 mL×3). The organic layers were washed with sat. NaCl (20 mL) dried over Na$_2$SO$_4$ and concentrated to give crude title compound which was used in the next step without further purification. MS=756.3 (M+1).

Step 10. N-((cis)-3-(5-chloro-2-cyanophenyl)cyclobutyl)-1-((R)-2-hydroxy-1-(6-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-2-hydroxy-1-(6-((1R,5S)-2-oxo-3-azabicyclo[3.1.0]hexan-3-yl)pyridin-3-yl)ethyl)-1H-1,2,3-triazole-4-carboxamide To a stirred solution of 1-(2-((tert-butyldiphenylsilyl)oxy)-1-(6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide (200 mg, 0.264 mmol) in THF (1 mL) was added TBAF (1 mL, 0.793 mmol) at 25° C. The reaction was stirred at 25° C. for 4 h. The reaction mixture was concentrated and the residue was purified by reverse phase HPLC (ACN/water with 0.05% TFA modifier). The enantiopure title compounds were resolved by chiral SFC (DAICEL CHIRALCEL OJ-H; 250 mm*30 mm, 5 um; 40% 0.1% NH$_3$H$_2$O EtOH) to provide the faster-eluting isomer (Example 154). $^1$H NMR (400 MHz, Methanol-d$_4$) δ 8.53 (s, 1H), 8.38 (s, 1H), 8.22 (d, J=8.6 Hz, 1H), 7.80-7.85 (m, 1H), 7.64-7.70 (m, 2H), 7.39-7.44 (m, 1H), 5.87 (dd, J=8.0, 5.3 Hz, 1H), 4.59 (s, 1H), 4.40 (dd, J=11.7, 8.2 Hz, 1H), 4.15-4.20 (m, 1H), 4.04-4.10 (m, 1H), 3.55-3.65 (m, 1H), 2.87-2.92 (m, 1H), 2.30-2.41 (m, 2H), 2.11 (br d, J=8.6 Hz, 2H), 1.63-1.70 (m, 1H), 1.40-1.46 (m, 1H), 1.23-1.28 (m, 1H), 0.77 (d, J=3.9 Hz, 1H). 99.48% ee. MS=518.2 (M+1). The slower-eluting isomer: (Example 155). $^1$H NMR (400 MHz, Methanol-d$_4$) δ 8.53 (s, 1H), 8.37 (s, 1H), 8.21 (d, J=9.0 Hz, 1H), 7.80-7.85 (m, 1H), 7.63-7.69 (m, 2H), 7.41 (dd, J=8.6, 2.0 Hz, 1H), 5.87 (dd, J=7.6, 4.9 Hz, 1H), 4.59 (t, J=7.2 Hz, 1H), 4.40 (dd, J=11.7, 8.2 Hz, 1H), 4.17 (dd, J=11.7, 4.7 Hz, 1H), 4.04-4.09 (m, 1H), 3.59 (br t, J=7.6 Hz, 1H), 2.93 (br s, 1H), 2.35 (br d, J=10.2 Hz, 2H), 2.11 (br d, J=7.0 Hz, 2H), 1.66 (s, 1H), 1.37-1.45 (m, 1H), 1.23-1.27 (m, 1H), 0.76 (d, J=4.3 Hz, 1H). 97.90% ee. MS=518.2 (M+1).

Example 156 and 157

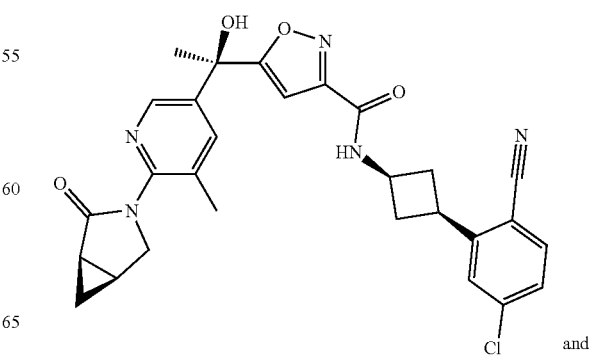

and

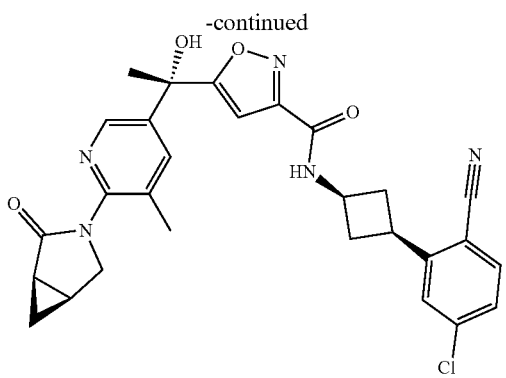

N-((cis)-3-(5-chloro-2-cyanophenyl)cyclobutyl)-5-((R)-1-hydroxy-1-(5-methyl-6-((1R,5S)-2-oxo-3-azabicyclo[3.1.0]hexan-3-yl)pyridin-3-yl)ethyl)isoxazole-3-carboxamide and N-((cis)-3-(5-chloro-2-cyanophenyl)cyclobutyl)-5-((S)-1-hydroxy-1-(5-methyl-6-((1R,5S)-2-oxo-3-azabicyclo[3.1.0]hexan-3-yl)pyridin-3-yl)ethyl)isoxazole-3-carboxamide Step 1. (R)-2-(6-chloro-5-methylpyridin-3-yl)but-3-yn-2-ol and (S)-2-(6-chloro-5-methylpyridin-3-yl)but-3-yn-2-ol To a solution of 1-(6-chloro-5-methylpyridin-3-yl)ethanone (2.3 g, 13.56 mmol) in THF (30 mL) was added ethynylmagnesium bromide (217 mL, 108 mmol) at 0° C. The mixture was stirred at 20° C. for 2 h. The mixture was concentrated in vacuum, sat. NH₄Cl and water were added, and the solution was extracted with EtOAc. The organic layers were dried over anhydrous sodium sulfate, filtered, and concentrated in vacuum and purified by flash silica gel chromatography (0-25% ethyl acetate/petroleum ether) to the title compound. MS=196.0 (M+1).

Step 2. ethyl (R)-5-(1-(6-chloro-5-methylpyridin-3-yl)-1-hydroxyethyl)isoxazole-3-carboxylate and ethyl (S)-5-(1-(6-chloro-5-methylpyridin-3-yl)-1-hydroxyethyl)isoxazole-3-carboxylate To a solution of 2-(6-chloro-5-methylpyridin-3-yl)but-3-yn-2-ol (1.3 g, 6.64 mmol) in ethyl acetate (10 mL) and water (2 mL) was added (Z)-ethyl 2-chloro-2-(hydroxyimino)acetate (5.03 g, 33.2 mmol) and sodium bicarbonate (5.58 g, 66.4 mmol). The mixture was stirred at 20° C. for 12 h. The mixture was concentrated and purified by flash silica gel chromatography (0-25% ethyl acetate/petroleum ether) to give the title compounds. ¹H NMR (500 MHz, CDCl₃): δ 8.34 (d, J=2.1 Hz, 1H), 7.63 (dd, J=2.4, 0.6 Hz, 1H), 6.61 (s, 1H), 4.41-4.47 (m, 2H), 2.39 (s, 3H), 2.01 (s, 3H), 1.39-1.43 (m, 3H).

Step 3. (R)-5-(1-(6-chloro-5-methylpyridin-3-yl)-1-hydroxyethyl)isoxazole-3-carboxylic acid and (S)-5-(1-(6-chloro-5-methylpyridin-3-yl)-1-hydroxyethyl)isoxazole-3-carboxylic acid To a solution of ethyl 5-(1-(6-chloro-5-methylpyridin-3-yl)-1-hydroxyethyl)isoxazole-3-carboxylate (650 mg, 2.092 mmol) in MeOH (10 mL) and water (2 mL) was added lithium hydroxide hydrate (439 mg, 10.46 mmol). The mixture was stirred at 20° C. for 3 h. The mixture was concentrated in vacuum, 1M HCl was added until a pH 2 and extracted with EtOAc. The organic layers were dried over anhydrous sodium sulfate, filtered, and concentrated in vacuum to give the title compound that was used directly. MS=283.0 (M+1).

Step 4. N-((cis)-3-(5-chloro-2-cyanophenyl)cyclobutyl)-5-((R)-1-(6-chloro-5-methylpyridin-3-yl)-1-hydroxyethyl)isoxazole-3-carboxamide and N-((cis)-3-(5-chloro-2-cyanophenyl)cyclobutyl)-5-((S)-1-(6-chloro-5-methylpyridin-3-yl)-1-hydroxyethyl)isoxazole-3-carboxamide In a round bottom flask, to a solution of 5-(1-(6-chloro-5-methylpyridin-3-yl)-1-hydroxyethyl)isoxazole-3-carboxylic acid (500 mg, 1.769 mmol) and 2-((cis)-3-aminocyclobutyl)-4-chlorobenzonitrile (645 mg, 2.123 mmol) in pyridine (3 mL) was added EDC (1017 mg, 5.31 mmol) at 20° C. The mixture was stirred at 20° C. for 2 h. The mixture was concentrated and purified by flash silica gel chromatography (0-50% ethyl acetate/petroleum ether) to give the title compound. MS=471.0 (M+1).

Step 5. N-((cis)-3-(5-chloro-2-cyanophenyl)cyclobutyl)-5-((R)-1-hydroxy-1-(5-methyl-6-((1R,5S)-2-oxo-3-azabicyclo[3.1.0]hexan-3-yl)pyridin-3-yl)ethyl)isoxazole-3-carboxamide and N-((cis)-3-(5-chloro-2-cyanophenyl)cyclobutyl)-5-((S)-1-hydroxy-1-(5-methyl-6-((1R,5S)-2-oxo-3-azabicyclo[3.1.0]hexan-3-yl)pyridin-3-yl)ethyl)isoxazole-3-carboxamide To a solution of N-((cis)-3-(5-chloro-2-cyanophenyl)cyclobutyl)-5-(1-(6-chloro-5-methylpyridin-3-yl)-1-hydroxyethyl)isoxazole-3-carboxamide (10 mg, 0.021 mmol), (1R,5S)-3-azabicyclo[3.1.0]hexan-2-one (3.09 mg, 0.032 mmol) and Cs₂CO₃ (27.7 mg, 0.085 mmol) in Dioxane (0.5 ml) was added 2-(Dicyclohexylphosphino)3,6-dimethoxy-2',4',6'-triisopropyl-1,1'-biphenyl (19.23 mg, 0.021 mmol) at 20° C. The mixture was stirred at 100° C. for 3 h. The mixture was purified by purified by reverse phase HPLC (ACN/water with 0.05% TFA modifier) to afford the mixture of diasteromers. The enantiopure title compounds were resolved by SFC (OD (250 mm*30 mm, 10 um), 45% 0.1% NH₃H₂O IPA) The faster eluting isomer was obtained (Example 156). ¹H NMR (400 MHz, Methanol-d₄) δ 8.39 (s, 1H), 7.81 (s, 1H), 7.57-7.70 (m, 2H), 7.39 (br d, J=8.6 Hz, 1H), 6.65 (s, 1H), 4.47-4.62 (m, 1H), 4.24 (dd, J=10.1, 6.0 Hz, 1H), 3.67 (br d, J=10.5 Hz, 1H), 3.49-3.64 (m, 1H), 2.88 (br d, J=10.0 Hz, 2H), 2.23-2.37 (m, 2H), 2.17 (s, 4H), 2.01 (br s, 1H), 1.93 (s, 3H), 1.30 (br d, J=7.6 Hz, 1H), 0.93 (br d, J=3.4 Hz, 1H). 100% ee. MS=532.2 (M+1). The slower eluting isomer was obtained (Example 157): ¹H NMR (400 MHz, Methanol-d₄) δ 8.32 (s, 1H), 7.72 (s, 1H), 7.52-7.61 (m, 2H), 7.31 (br d, J=8.6 Hz, 1H), 6.57 (s, 1H), 4.47 (br t, J=8.3 Hz, 1H), 4.16 (dd, J=10.3, 5.6 Hz, 1H), 3.60 (br d, J=10.5 Hz, 1H), 3.40-3.53 (m, 1H), 2.80 (br d, J=10.0 Hz, 2H), 2.15-2.28 (m, 2H), 2.09 (s, 4H), 1.94 (br s, 1H), 1.85 (s, 3H), 1.20 (br d, J=4.6 Hz, 1H), 0.85 (br d, J=3.7 Hz, 1H). 99.66% ee. MS=532.2 (M+1).

Example 158

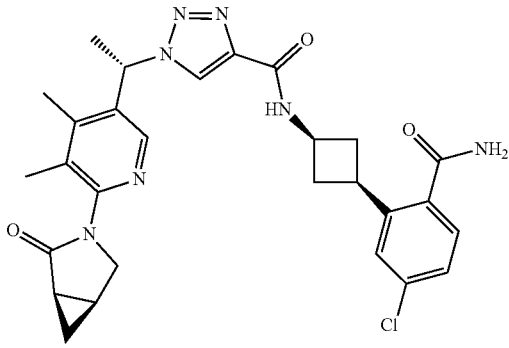 [SMILES: Cc1c([C@H](C)n2cc(C(=O)N[C@H]3C[C@@](C)(c4cc(Cl)ccc4C(N)=O)C3)nn2)cnc(N2C[C@H]3C[C@H]3C2=O)c1C]

N-(cis)-3-(2-carbamoyl-5-chlorophenyl)cyclobutyl)-
1-((S)-1-(4,5-dimethyl-6-((1R,5S)-2-oxo-3-azabicy-
clo[3.1.0]hexan-3-yl)pyridin-3-yl)ethyl)-1H-1,2,3-
triazole-4-carboxamide

Step 1. N-(cis)-3-(2-carbamoyl-5-chlorophenyl)cyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide To a solution of N-((cis)-3-(5-chloro-2-cyanophenyl)cyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide (40 mg, 0.062 mmol) in methanol (0.25 mL) and THF (0.25 mL) was added sodium hydroxide (0.150 mL, 0.750 mmol, 5M in water). The reaction mixture was stirred for 8 hr at 65° C. The mixture was concentrated under reduced pressure. The mixture was quenched with HCl (0.809 mL, 0.809 mmol) (1N aqueous), concentrated under reduced pressure and purified by preparative reverse phase HPLC (ACN/water with 0.05% TFA modifier) to afford title compound, as a TFA salt. MS=547.9 (M+1). $^1$H NMR (500 MHz, Methanol-$d_4$) δ 8.39 (s, 1H), 8.23 (s, 1H), 7.53 (s, 1H), 7.37 (d, J=8.1 Hz, 1H), 7.29 (dd, J=8.2, 2.0 Hz, 1H), 6.30-6.35 (m, 1H), 4.43-4.55 (m, 1H), 3.59-3.74 (m, 2H), 2.77-2.86 (m, 2H), 2.33 (s, 3H), 2.17-2.31 (m, 3H), 2.11 (s, 3H), 2.01-2.07 (m, 5H), 1.3-1.35 (m, 1H), 0.97-1.01 (m, 1H).

Example 159

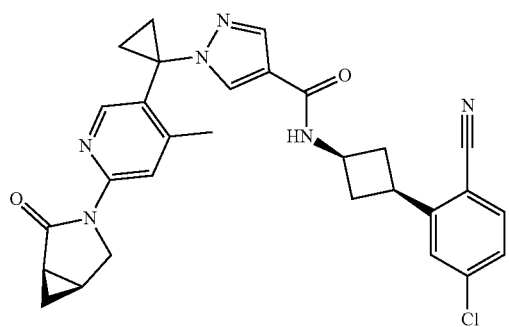 [SMILES: Cc1cc(N2C[C@H]3C[C@H]3C2=O)ncc1C1(n2cc(C(=O)N[C@H]3C[C@@H](c4cc(Cl)ccc4C#N)C3)cn2)CC1]

N-((cis)-3-(5-chloro-2-cyanophenyl)cyclobutyl)-1-
(1-(4-methyl-6-((1R,5S)-2-oxo-3-azabicyclo[3.1.0]
hexan-3-yl)pyridin-3-yl)cyclopropyl)-1H-pyrazole-
4-carboxamide

Step 1. 2-(6-chloro-4-methylpyridin-3-yl)acetonitrile

To a mixture of 5-bromo-2-chloro-4-methylpyridine (7.5 g, 36.3 mmol), 4-(4,4,5,5-tetramethyl-1,3,2-dioxaborolan-2-yl)isoxazole (7.08 g, 36.3 mmol) and potassium phosphate (23.13 g, 109 mmol) in 1,4-dioxane (50 mL) and water (10 mL) was added PdCl$_2$(dppf) (2.66 g, 3.63 mmol). The mixture was stirred at 80° C. for 36 h. The mixture was filtered and concentrated to remove organic solvent, then diluted with water (30 mL), exacted with EtOAc (50 mL×3), the combined organic solvent was washed with brine (50 mL), dried over Na$_2$SO$_4$, filtered and the filtrate was concentrated, and the residue was purified by flash silica gel chromatography (0~30% ethyl acetate/pet. ether) to give the title compound. $^1$H NMR (400 MHz, CDCl$_3$) δ 8.28 (s, 1H), 7.22 (s, 1H), 3.64 (s, 2H), 2.38 (s, 3H). MS=167.1 (M+1).

Step 2. 1-(6-chloro-4-methylpyridin-3-yl)cyclopropanecarbonitrile

To a solution of 2-(6-chloro-4-methylpyridin-3-yl)acetonitrile (450 mg, 2.70 mmol) and diphenyl(vinyl)sulfonium trifluoromethanesulfonate (979 mg, 2.70 mmol) in DMF (10 mL) was added 2,3,4,6,7,8,9,10-octahydropyrimido[1,2-a]azepine (411 mg, 2.70 mmol) at 20° C. The mixture was stirred at 20° C. for 12 h. The mixture was concentrated in vacuum to give crude product. The crude product was purified by flash silica gel chromatography (petroleum ether:ethyl acetate=5:1) to give the title compound. $^1$H NMR (400 MHz, CDCl$_3$) δ 8.22 (s, 1H), 7.20 (s, 1H), 2.54 (s, 3H), 1.75 (d, J=2.4 Hz, 2H), 1.27-1.36 (m, 2H). MS=193.1 (M+1).

Step 3. 1-(6-chloro-4-methylpyridin-3-yl)cyclopropanecarboxylic acid

To a solution of 1-(6-chloro-4-methylpyridin-3-yl)cyclopropanecarbonitrile (2.2 g, 11.42 mmol) in t-BuOH (20 mL) and water (4 mL) was added potassium hydroxide (2.559 g, 45.7 mmol) at 20° C. The mixture was stirred at 140° C. for 60 h. The mixture was concentrated in vacuum added sat. NaHCO$_3$ to pH 8 and extracted with EtOAc (20 mL×5). The combined organic layers were concentrated and the residue was purified by reverse phase MPLC (C18 (20~35 µm), 10%~50% H$_2$O (0.5‰ TFA)/MeCN gradient) to give 1-(6-chloro-4-methylpyridin-3-yl)cyclopropanecarboxamide. MS=211.0 (M+1). The aqueous layers were purified by purified by reverse phase HPLC (ACN/water with 0.05% TFA modifier) to give the title compound. MS=212.0 (M+1).

Step 4. di-tert-butyl 1-(1-(6-chloro-4-methylpyridin-3-yl)cyclopropyl)hydrazine-1,2-dicarboxylate To a solution of 1-(6-chloro-4-methylpyridin-3-yl)cyclopropanecarboxylic acid (400 mg, 1.890 mmol) in MeCN (5 mL) was added DBAD (653 mg, 2.83 mmol), CeCl$_3$ (70.4 mg, 0.189 mmol) and Cs$_2$CO$_3$ (123 mg, 0.378 mmol) at 20° C. The reaction mixture irradiated in a integrated Photoreactor, Royal Blue (450 nm) LED light. 100% LED light power was applied. Stir rate was 1000 rpm. Fan rate was 1500 rpm. for 24 h. The mixture was filtered and the filtrate was concentrated in vacuum to give crude product. The crude product was purified by prep-TLC (SiO$_2$; petroleum ether:ethyl acetate=3:1) to give the title compound. $^1$H NMR (400 MHz, CDCl$_3$) δ 8.53 (br s, 1H), 7.09 (s, 1H), 5.91-6.47 (m, 1H), 2.50 (s, 3H), 1.57 (br s, 2H), 1.31-1.54 (m, 18H), 1.24-1.28 (m, 2H). MS=398.1 (M+1).

Step 5. 2-chloro-5-(1-hydrazinylcyclopropyl)-4-methylpyridine

A solution of di-tert-butyl 1-(1-(6-chloro-4-methylpyridin-3-yl)cyclopropyl)hydrazine-1,2-dicarboxylate (400 mg, 1.005 mmol) in 4M HCl/dioxane (5 mL) was stirred at 20° C. for 12 h. The mixture was concentrated under vacuum to give the title compound. The crude material was used directly without further purification. MS=198.2 (M+1).

Step 6. ethyl 1-(1-(6-chloro-4-methylpyridin-3-yl)cyclopropyl)-1H-pyrazole-4-carboxylate To a solution of 2-chloro-5-(1-hydrazinylcyclopropyl)-4-methylpyridine (190 mg, 0.961 mmol) in EtOH (10 mL) was added ethyl 2-formyl-3-oxopropanoate (277 mg, 1.922 mmol) at 20° C. The reaction mixture was stirred at 20° C. for 12 h. The mixture was concentrated in vacuum to give crude product. The crude product was purified by prep-TLC (SiO$_2$; petroleum ether:ethyl acetate=3:1) to give the title compound. MS=306.0 (M+1).

Step 7. 1-(1-(6-chloro-4-methylpyridin-3-yl)cyclopropyl)-1H-pyrazole-4-carboxylic acid To a solution of ethyl 1-(1-(6-chloro-4-methylpyridin-3-yl)cyclopropyl)-1H-pyrazole-4-carboxylate (200 mg, 0.654 mmol) in MeOH (5 mL) and water (1 mL) was added lithium hydroxide hydrate (137 mg, 3.27 mmol). The mixture was stirred at 20° C. for 12 h. The mixture was concentrated in vacuum, 1M HCl was added until a pH 2 was reached, and the solution extracted with EtOAc (10 mL×3). The organic layers were dried over anhydrous sodium sulfate, filtered, and concentrated under vacuum to give the title compound. MS=278.0 (M+1).

Step 8. 1-(1-(4-methyl-6-((1R,5S)-2-oxo-3-azabicyclo[3.1.0]hexan-3-yl)pyridin-3-yl)cyclopropyl)-1H-pyrazole-4-carboxylic acid To a solution of 1-(1-(6-chloro-4-methylpyridin-3-yl)cyclopropyl)-1H-pyrazole-4-carboxylic acid (150 mg, 0.540 mmol), (1R,5S)-3-azabicyclo[3.1.0]hexan-2-one (62.9 mg, 0.648 mmol) and Cs$_2$CO$_3$ (528 mg, 1.620 mmol) in dioxane (1 mL) was added Pd(dba)$_3$ (43.7 mg, 0.054 mmol) and 4,5-bis(diphenylphosphino)-9,9-dimethylxanthene (31.3 mg, 0.054 mmol) at 20° C. The mixture was stirred at 100° C. for 12 h. The mixture was concentrated in vacuum and purified by purified by reverse phase HPLC (ACN/water with 0.05% TFA modifier) to give the title compounds. MS=339.1 (M+1).

Step 9. N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)cyclopropyl)-1H-pyrazole-4-carboxamide To a solution of 1-(1-(4-methyl-6-((1R,5S)-2-oxo-3-azabicyclo[3.1.0]hexan-3-yl)pyridin-3-yl)cyclopropyl)-1H-pyrazole-4-carboxylic acid (50 mg, 0.148 mmol) and 2-((cis)-3-aminocyclobutyl)-4-chlorobenzonitrile (76 mg, 0.148 mmol) in MeCN (5 mL) was added chloro-N,N,N',N'-tetramethylformamidinium hexafluorophosphate (41.5 mg, 0.148 mmol) and 1-methylimidazole (36.4 mg, 0.443 mmol) at 20° C. The mixture was stirred at 20° C. for 2 h. The mixture was concentrated in vacuum to give crude product. The crude product was purified by purified by reverse phase HPLC (ACN/water with 0.05% TFA modifier) to give the title compound. $^1$H NMR (400 MHz, Methanol-d$_4$) δ 8.48 (s, 1H), 8.10 (s, 1H), 7.96 (s, 1H), 7.83 (s, 1H), 7.64 (d, J=8.3 Hz, 1H), 7.57 (s, 1H), 7.35-7.42 (m, 1H), 4.39-4.53 (m, 1H), 4.10 (br d, J=4.6 Hz, 1H), 4.05 (s, 1H), 3.45-3.61 (m, 1H), 2.86 (qd, J=7.9, 2.8 Hz, 2H), 2.40 (s, 3H), 2.05-2.24 (m, 4H), 1.76-1.83 (m, 2H), 1.43 (s, 2H), 1.27 (td, J=8.0, 4.5 Hz, 1H), 0.76 (br d, J=3.7 Hz, 1H). MS=527.2 (M+1).

Example 160

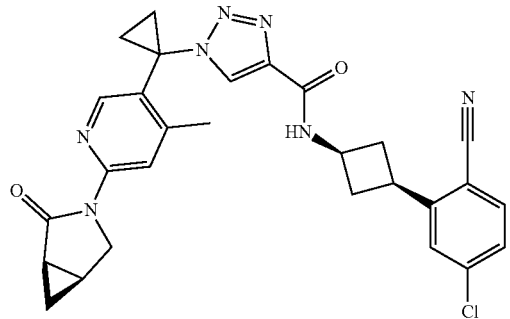 [SMILES: Cc1cc(N2C[C@H]3C[C@H]3C2=O)ncc1C1(n2cc(C(=O)N[C@H]3C[C@@H](c4cc(Cl)ccc4C#N)C3)nn2)CC1]

N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)cyclopropyl)-1H-1,2,3-triazole-4-carboxamide Step 1. tert-butyl (1-(6-chloro-4-methylpyridin-3-yl)cyclopropyl)carbamate To a solution of 1-(6-chloro-4-methylpyridin-3-yl)cyclopropanecarboxylic acid (200 mg, 0.945 mmol) and DPPA (0.407 mL, 1.890 mmol) in toluene (5 mL) was added TEA (0.395 mL, 2.83 mmol). The reaction was stirred at 60° C. for 1 h, then 2-methylpropan-2-ol (140 mg, 1.890 mmol) was added and the reaction was stirred at 80° C. for 12 h. The reaction mixture was concentrated and the residue was purified by prep-TLC (SiO$_2$, Pet.ether:EtOAc=3:1) to give the title compound. MS=283.1 (M+1).

Step 2. 1-(6-chloro-4-methylpyridin-3-yl)cyclopropan-1-amine

A solution of tert-butyl (1-(6-chloro-4-methylpyridin-3-yl)cyclopropyl)carbamate (140 mg, 0.495 mmol) in HCl/Dioxane (4N, 3 mL) was stirred at 25° C. for 1 h. The reaction mixture was concentrated to the title compound that was used directly without further purification. MS=183.1 (M+1)

Step 3. 5-(1-azidocyclopropyl)-2-chloro-4-methylpyridine

To a solution of 1-(6-chloro-4-methylpyridin-3-yl)cyclopropanamine (60 mg, 0.328 mmol) and 2-azido-1,3-dimethylimidazolinium hexafluorophosphate (112 mg, 0.394 mmol) in ACN (0.6 mL) was added DMAP (60.2 mg, 0.493 mmol) and the reaction was stirred at 30° C. for 1.5 h. The reaction was diluted with water (3 mL) and extracted with EtOAc (3 mL*2), and the combined organic layers were concentrated to give the title compound which was used directly without further purification. MS=209.1 (M+1).

Step 4. tert-butyl 1-(1-(6-chloro-4-methylpyridin-3-yl)cyclopropyl)-1H-1,2,3-triazole-4-carboxylate To a stirred solution of 5-(1-azidocyclopropyl)-2-chloro-4-methylpyridine (68 mg, 0.326 mmol), sodium ascorbate (129 mg, 0.652 mmol) in tert-butanol (2.5 mL), and water (2.5 mL) was added Cu2SO$_4$·5H$_2$O (8.14 mg, 0.033 mmol) and tert-butyl propiolate (53.4 mg, 0.424 mmol) at room temperature. The reaction mixture was stirred at 27° C. for 12 h, then concentrated and diluted with water (5 mL). The mixture was extracted with EtOAc (10 mL*2), the combined organic layers were washed with brine (10 mL), dried over Na$_2$SO$_4$ and concentrated. The residue was purified by prep-TLC (SiO$_2$, pet.ether:EtOAc=1:1) to give the title compound. MS=335.1 (M+1).

Step 5. tert-butyl 1-(1-(4-methyl-6-((1R,5S)-2-oxo-3-azabicyclo[3.1.0]hexan-3-yl)pyridin-3-yl)cyclopropyl)-1H-1,2,3-triazole-4-carboxylate To a solution of tert-butyl 1-(1-(6-chloro-4-methylpyridin-3-yl)cyclopropyl)-1H-1,2,3-triazole-4-carboxylate (90 mg, 0.269 mmol) in toluene (3 mL) was added (1R,5S)-3-azabicyclo[3.1.0]hexan-2-one (33.9 mg, 0.349 mmol), (9,9-dimethyl-9H-xanthene-4,5-diyl)bis(diphenylphosphine) (15.55 mg, 0.027 mmol), Pd$_2$dba$_3$ (24.62 mg, 0.027 mmol) and cesium carbonate (175 mg, 0.538 mmol). The mixture was stirred at 100° C. for 16 h. The reaction was diluted with water (3 mL) and extracted with EtOAc (3 mL*3), the combined organic layers were concentrated and the residue was purified by prep-TLC (SiO$_2$, pet.ether:EtOAc=1:2) to give the title compound. MS=396.2 (M+1).

Step 6. 1-(1-(4-methyl-6-((1R,5S)-2-oxo-3-azabicyclo[3.1.0]hexan-3-yl)pyridin-3-yl)cyclopropyl)-1H-1,2,3-triazole-4-carboxylic acid To a solution of tert-butyl 1-(1-(4-methyl-6-((1R,5S)-2-oxo-3-azabicyclo[3.1.0]hexan-3-yl)pyridin-3-yl)cyclopropyl)-1H-1,2,3-triazole-4-carboxylate (47 mg, 0.119 mmol) in DCM (3 mL) was added TFA (0.6 mL, 7.79 mmol) at 27° C. The mixture was stirred at 27° C. for 12 h. The mixture was concentrated to give the title compound which was used directly without further purification. MS=340.1 (M+1).

Step 7. N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)cyclopropyl)-1H-1,2,3-triazole-4-carboxamide 1-Methyl-1H-imidazole (29.0 mg, 0.354 mmol) was added to a stirred mixture of 2-((cis)-3-aminocyclobutyl)-4-chlorobenzonitrile (63.9 mg, 0.124 mmol), 1-(1-(4-methyl-6-((1R,5S)-2-oxo-3-azabicyclo[3.1.0]hexan-3-yl)pyridin-3-yl)cyclopropyl)-1H-1,2,3-triazole-4-carboxylic acid (40 mg, 0.118 mmol) and chloro-N,N,N',N'-tetramethylformamidinium hexafluorophosphate (66.1 mg, 0.236 mmol) in MeCN (2 mL) at 25° C. The mixture was stirred at 25° C. for 12 h. The reaction was concentrated and the residue was purified by purified by reverse phase HPLC (ACN/water with 0.05% TFA modifier) to give the title compound. $^1$H NMR (400 MHz, Methanol-d$_4$) δ 8.56 (s, 1H), 8.39 (s, 1H), 7.82 (br s, 1H), 7.60-7.65 (m, 2H), 7.38 (dd, J=8.2, 1.8 Hz, 1H), 4.48-4.59 (m, 1H), 3.97-4.16 (m, 2H), 3.49-3.63 (m, 1H), 2.81-2.94 (m, 2H), 2.49 (s, 3H), 2.24-2.36 (m, 2H), 2.17 (br d, J=7.8 Hz, 2H), 1.91-2.00 (m, 2H), 1.62 (br s, 2H), 1.27-1.28 (m, 1H), 0.84 ppm (br d, J=3.9 Hz, 1H). MS=528.2 (M+1).

Example 161 and 162

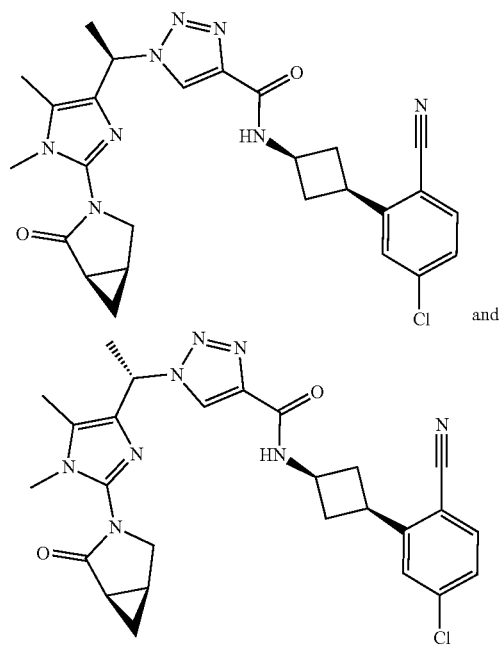

N-((cis)-3-(5-chloro-2-cyanophenyl)cyclobutyl)-1-((R)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide and N-((cis)-3-(5-chloro-2-cyanophenyl)cyclobutyl)-1-((S)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide Step 1. ethyl 1,5-dimethyl-1H-imidazole-4-carboxylate Sodium hydride (0.519 g, 12.97 mmol) was added to a stirred mixture of ethyl 5-methyl-1H-imidazole-4-carboxylate (2 g, 12.97 mmol) in THF (20 mL) at 0° C. The mixture was stirred at 0° C. for 30 min. Iodomethane (0.969 mL, 15.57 mmol) was added to the mixture and the reaction was stirred at 25° C. for 12 h. Aqueous ammonium chloride (1 mL) was added and the mixture was dried (Na$_2$SO$_4$), filtered and the solvent was evaporated under reduced pressure to give a residue. The residue was purified by flash silica gel chromatography (10% to 55% Ethyl acetate/Petroleum ether) to give the title compound. $^1$H NMR (400 MHz, CDCl$_3$) δ 7.42 (s, 1H), 4.37 (q, J=7.3 Hz, 2H), 3.59 (s, 3H), 2.54 (s, 3H), 1.41 ppm (t, J=7.1 Hz, 3H). MS=169.1 (M+1).

Step 2. ethyl 2-bromo-1,5-dimethyl-1H-imidazole-4-carboxylate

NBS (1143 mg, 6.42 mmol) was added to a solution of ethyl 1,5-dimethyl-1H-imidazole-4-carboxylate (900 mg, 5.35 mmol) in MeCN (15 mL) at 25° C. and the mixture was stirred for 8 h at 25° C. The reaction was concentrated under reduced pressure, EtOAc (20 mL) was added, and the solution was washed with water (10 mL*3), dried over anhydrous $Na_2SO_4$ and concentrated to give a residue. The residue was purified by flash silica gel chromatography (0% to 45% Ethyl acetate/Petroleum ether) to give the title compound. $^1H$ NMR (400 MHz, $CDCl_3$) δ 4.37 (q, J=7.3 Hz, 2H), 3.55 (s, 3H), 2.58 (s, 3H), 1.40 ppm (t, J=7.1 Hz, 3H). MS=247.0, 249.0 (M+1).

Step 3. (2-bromo-1,5-dimethyl-1H-imidazol-4-yl)methanol

DIBAL-H (29.0 mL, 29.0 mmol) was added to a stirred mixture of ethyl 2-bromo-1, 5-dimethyl-1H-imidazole-4-carboxylate (2.87 g, 11.62 mmol) in THF (30 mL) at −78° C. and the mixture was stirred at 25° C. for 12 h. The mixture was cooled to 0° C., diluted with THF (20 mL), water (1.16 mL), and 1.16 mL NaOH (15%) (2.9 mL) was added in sequence with stirring. The mixture was stirred at 25° C. for 15 min, dried over $MgSO_4$, filtered and the filter cake was washed by EtOAc (20 mL*3), and the filtrate was evaporated under reduced pressure to give a residue. The residue was purified by flash silica gel chromatography (10% to 60% Ethyl acetate/Petroleum) to give the title compound. $^1H$ NMR (400 MHz, $CDCl_3$) δ 4.52 (s, 2H), 3.50 (s, 3H), 2.24 ppm (s, 3H). MS=205.1, 207.1 (M+1).

Step 4. 2-bromo-1,5-dimethyl-1H-imidazole-4-carbaldehyde

Manganese dioxide (3.73 g, 42.9 mmol) was added to a stirred solution of (2-bromo-1,5-dimethyl-1H-imidazol-4-yl)methanol (1.1 g, 5.36 mmol) in DCM (40 mL) at 25° C. and the mixture was stirred at 40° C. for 12 h. The mixture was filtered and the filter cake was washed with DCM (30 mL), and the filtrate was concentrated to give the title compound. The crude material was used directly without further purification. $^1H$ NMR (500 MHz, $CDCl_3$) δ 9.81-9.90 (m, 1H), 3.50-3.64 (m, 3H), 2.58 ppm (s, 3H). MS=203.0, 205.0 (M+1).

Step 5. 1-(2-bromo-1,5-dimethyl-1H-imidazol-4-yl)ethan-1-ol

Methylmagnesium bromide (3M in THF) (3.13 mL, 9.40 mmol) was added to a stirred solution of 2-bromo-1, 5-dimethyl-1H-imidazole-4-carbaldehyde (954 mg, 4.70 mmol) in THF (10 mL) at −78° C. and the mixture was stirred at −78° C. for 2 h. Aqueous ammonium chloride (saturated, 10 mL) was added and the mixture was extracted with EtOAc (3×15 mL). The combined organic fractions were washed with brine (10 mL), dried ($Na_2SO_4$), filtered and the solvent was evaporated under reduced pressure to give a residue. The residue was purified by flash silica gel chromatography (10% to 30% Ethyl acetate/Petroleum ether) to give the title compound. $^1H$ NMR (500 MHz, $CDCl_3$) δ 4.80 (br t, J=6.5 Hz, 1H), 3.48 (s, 3H), 2.23 (s, 3H), 1.52 ppm (d, J=6.4 Hz, 3H). MS=219.0, 221.0 (M+1).

Step 6. 4-(1-azidoethyl)-2-bromo-1,5-dimethyl-1H-imidazole

To a solution of 1-(2-bromo-1, 5-dimethyl-1H-imidazol-4-yl) ethanol (110 mg, 0.502 mmol), triphenylphosphine (198 mg, 0.753 mmol) and diphenyl phosphorazidate (0.541 mL, 2.51 mmol) in THF (3 mL) was added DIAD (0.148 mL, 0.753 mmol) at 0° C. The mixture was stirred at 45° C. for 12 h, then water (10 mL) was added and the mixture was extracted with ethyl acetate (3×10 mL). The combined organic fractions were washed with brine (saturated, 10 mL), dried over $Na_2SO_4$, filtered and the solvent was evaporated under reduced pressure. The residue was purified by flash silica gel chromatography (100% Ethyl acetate/Petroleum ether) to give the title compound. MS=244.1, 246.1 (M+1).

Step 7. tert-butyl 1-(1-(2-bromo-1,5-dimethyl-1H-imidazol-4-yl)ethyl)-1H-1,2,3-triazole-4-carboxylate 4-(1-azidoethyl)-2-bromo-1,5-dimethyl-1H-imidazole (90 mg, 0.369 mmol) was added to a stirred mixture of sodium (R)-2-((S)-1,2-dihydroxyethyl)-4-hydroxy-5-oxo-2, 5-dihydrofuran-3-olate (146 mg, 0.737 mmol), copper(II) sulfate pentahydrate (27.6 mg, 0.111 mmol) and tert-butyl propiolate (60.5 mg, 0.479 mmol) in t-BuOH (4 mL) and water (4 mL) at 0° C. The mixture was stirred at 45° C. for 1 h, then concentrated to give a residue. Water (10 mL) was added and the mixture was extracted with EtOAc (4×10 mL). The combined organic fractions were washed with brine (10 mL), dried ($Na_2SO_4$), filtered and the solvent was evaporated under reduced pressure to give a residue. The residue was purified by prep-TLC on silica gel, eluting with EtOAc/petroleum ether=1:1 to give the title compound. MS=370.1, 372.1 (M+1).

Step 8. tert-butyl 1-(1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxylate

[(2-Di-cyclohexylphosphino-3,6-dimethoxy-2',4',6'-tri-isopropyl-1,1'-biphenyl)-2-(2'-amino-1,1'-biphenyl)]palladium(II) methanesulfonate (19.59 mg, 0.022 mmol) was added to a stirred mixture of cesium carbonate (282 mg, 0.864 mmol), tert-butyl 1-(1-(2-bromo-1,5-dimethyl-1H-imidazol-4-yl)ethyl)-1H-1,2,3-triazole-4-carboxylate (80 mg, 0.216 mmol) and (1R,5S)-3-azabicyclo[3.1.0]hexan-2-one (31.5 mg, 0.324 mmol) in dioxane (0.5 mL) at 25° C. The mixture was stirred at 90° C. for 12 h, then filtered and concentrated to give a residue. The residue was purified by reverse phase HPLC (ACN/water with 0.05% TFA modifier) to give the title compound. MS=387.3 (M+1).

Step 9. 1-(1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxylic acid TFA (0.5 mL) was added to a stirred mixture of tert-butyl 1-(1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxylate (5 mg, 0.013 mmol) in DCM (0.500 mL) at 25° C. and the mixture was stirred at 25° C. for 2 h. The mixture was concentrated to give the title compound. The crude material was used directly without further purification. MS=331.2 (M+1).

161

Step 10. N-((cis)-3-(5-chloro-2-cyanophenyl)cyclobutyl)-1-((R)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide and N-((cis)-3-(5-chloro-2-cyanophenyl)cyclobutyl)-1-((S)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide 1-methyl-1H-imidazole (2.98 mg, 0.036 mmol) was added to a stirred mixture of 2-((cis)-3-aminocyclobutyl)-4-chlorobenzonitrile (3.00 mg, 0.015 mmol), 1-(1-(1,5-dimethyl-2-((TR,5S)-2-oxo-3-azabicyclo[3.1.0]hexan-3-yl)-1H-imidazol-4-yl)ethyl)-1H-1,2,3-triazole-4-carboxylic acid (4 mg, 0.012 mmol) and N-(chloro(dimethylamino)methylene)-N-methylmethanaminium hexafluorophosphate (V) (5.10 mg, 0.018 mmol) in MeCN (0.5 mL) at 25° C. and the mixture was stirred at 25° C. for 2 h. The mixture was filtered, diluted with MeCN (0.5 mL), then purified by purified by reverse phase HPLC (ACN/water with 0.05% TFA modifier) to afford the mixture of diastereomers. The enantiopure title compounds were resolved by SFC (DAICEL CHIRALPAK AS (250 mm*30 mm, 10 um), 30% 0.1% NH$_3$H$_2$O EtOH). The faster eluting isomer was re-purified by reverse phase HPLC (ACN/water with 0.05% TFA modifier) to give the faster eluting isomer (Example 161): $^1$H NMR (400 MHz, Methanol-d$_4$) δ 8.34 (s, 1H), 7.62-7.71 (m, 2H), 7.41 (dd, J=8.3, 2.0 Hz, 1H), 6.06 (q, J=6.8 Hz, 1H), 4.50-4.65 (m, 1H), 4.09 (dd, J=9.8, 5.9 Hz, 1H), 3.73 (d, J=9.8 Hz, 1H), 3.53-3.65 (m, 1H), 3.41 (s, 3H), 2.84-2.96 (m, 2H), 2.31-2.40 (m, 2H), 2.28 (s, 3H), 2.16-2.27 (m, 1H), 2.02-2.11 (m, 1H), 1.94 (d, J=7.1 Hz, 3H), 1.37 (td, J=8.1, 5.0 Hz, 1H), 1.01-1.07 ppm (m, 1H). MS=519.2 (M+1). The slower eluting isomer was re-purified by purified by reverse phase HPLC (ACN/water with 0.05% TFA modifier) to give the slower eluting isomer (Example 162): $^1$H NMR (400 MHz, Methanol-d$_4$) δ 8.34 (s, 1H), 7.66 (dd, J=4.8, 3.3 Hz, 2H), 7.41 (dd, J=8.3, 2.0 Hz, 1H), 6.08 (q, J=6.9 Hz, 1H), 4.50-4.64 (m, 1H), 4.09 (dd, J=9.8, 5.9 Hz, 1H), 3.74 (d, J=9.8 Hz, 1H), 3.53-3.66 (m, 1H), 3.42 (s, 3H), 2.84-2.97 (m, 2H), 2.32-2.41 (m, 2H), 2.30 (s, 3H), 2.24 (dt, J=11.8, 6.0 Hz, 1H), 2.02-2.13 (m, 1H), 1.96 (d, J=7.1 Hz, 3H), 1.37 (td, J=8.1, 4.9 Hz, 1H), 0.99-1.08 ppm (m, 1H) MS=519.2 (M+1). MS=519.2 (M+1).

Example 163 and 164

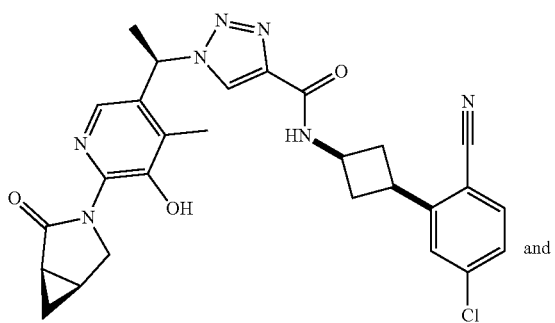

and

-continued

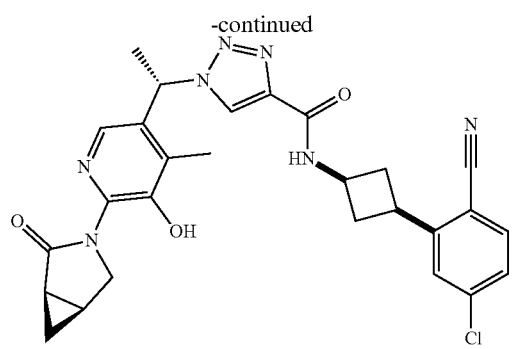

N-((cis)-3-(5-chloro-2-cyanophenyl)cyclobutyl)-1-((R)-1-(5-hydroxy-4-methyl-6-((R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((S)-1-(5-hydroxy-4-methyl-6-((1R,5S)-2-oxo-3-azabicyclo[3.1.0]hexan-3-yl)pyridin-3-yl)ethyl)-1H-12,3-triazole-4-carboxamide Step 1. 2-chloro-5-(1-chloroethyl)-3-methoxy-4-methylpyridine MsCl (0.464 mL, 5.95 mmol) was added to a stirred mixture of Et3N (1.382 mL, 9.92 mmol) and 1-(6-chloro-5-methoxy-4-methylpyridin-3-yl)ethan-1-ol (400 mg, 1.984 mmol) in DCM (8 mL) at 0° C. and the mixture was stirred at 20° C. for 12 h. The reaction mixture was added to aqueous ammonium chloride (saturated, 5 mL) and water (10 mL) and was extracted with dichloromethane (3×10 mL). The combined organic fractions were washed with brine (saturated, 1×20 mL), dried (Na$_2$SO$_4$), filtered and the solvent was evaporated under reduced pressure to give the title compound. MS=220.0 (M+1).

Step 2. 5-(1-azidoethyl)-2-chloro-3-methoxy-4-methylpyridine

To a solution of 2-chloro-5-(1-chloroethyl)-3-methoxy-4-methylpyridine (437 mg, 1.985 mmol) in N,N-dimethylformamide (8 mL) was added sodium azide (740 mg, 11.38 mmol) at 0° C., then the mixture was stirred at 50° C. for 2 h. Water (8 mL) was added and the reaction was extracted with ethyl acetate (8 mL*3). The combined organic layer was washed with brine (20 mL), dried over anhydrous Na$_2$SO$_4$, filtered and the filtrate was concentrated to give crude product. MS=227.1 (M+1).

Step 3. tert-butyl 1-(1-(6-chloro-5-methoxy-4-methylpyridin-3-yl)ethyl)-1H-1,2,3-triazole-4-carboxylate To a solution of tert-butyl propiolate (326 mg, 2.58 mmol) and 5-(1-azidoethyl)-2-chloro-3-methoxy-4-methylpyridine (450 mg, 1.985 mmol) in tert-butanol (5 mL) and water (5 mL) was added sodium ascorbate (787 mg, 3.97 mmol) and Cu2SO$_4$·5H$_2$O (49.6 mg, 0.199 mmol) at 20° C., then the reaction mixture was stirred at 20° C. for 12 h. The mixture was concentrated, water (10 mL) was added, and the aqueous layer was extracted with EtOAc (15 mL*2). The combined organic layers were washed with brine (10 mL), dried over Na$_2$SO$_4$, concentrated and the residue was purified by flash silica gel chromatography (0~30% Pet.ether/EtOAc) to give the title compound. $^1$H NMR (400 MHz, CDCl$_3$) δ 8.16

(s, 1H), 7.83 (s, 1H), 6.08 (q, J=7.1 Hz, 1H), 3.85 (s, 3H), 2.24 (s, 3H), 2.02 (d, J=7.1 Hz, 3H), 1.60 ppm (s, 9H). MS=353.1 (M+1).

Step 4. tert-butyl 1-(1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxylate To a solution of tert-butyl 1-(1-(6-chloro-5-methoxy-4-methylpyridin-3-yl)ethyl)-1H-1,2,3-triazole-4-carboxylate (150 mg, 0.425 mmol) in toluene (5 mL) was added (1R,5S)-3-azabicyclo[3.1.0]hexan-2-one (53.7 mg, 0.553 mmol), XantPhos (24.60 mg, 0.043 mmol), Pd$_2$dba$_3$ (38.9 mg, 0.043 mmol) and cesium carbonate (277 mg, 0.850 mmol), and the mixture was stirred at 120° C. for 12 h. Water (5 mL) was added and the mixture was extracted with EtOAc (5 mL*3). The combined organic layers were concentrated and the residue was purified by prep-TLC (SiO$_2$, EtOAc) to give the title compound. MS=414.3 (M+1).

Step 5. 1-(1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxylic acid To a stirred solution of tert-butyl 1-(1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxylate (150 mg, 0.363 mmol) in DCM (3 mL) was added BBr$_3$ (0.171 mL, 1.814 mmol) dropwise over 10 min under vigorous stirring at 0° C. Upon completion of the addition, the ice bath was removed and the reaction mixture was stirred for another 12 h at 25° C. The mixture was diluted with DCM (5 mL), cooled to 0° C., and quenched by careful sequential addition of H$_2$O (3 mL). The mixture was concentrated and the residue was purified by reverse phase HPLC (ACN/water with 0.05% TFA modifier) to give the title compound. MS=344.1 (M+1).

Step 6. N-((cis)-3-(5-chloro-2-cyanophenyl)cyclobutyl)-1-((S)-1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxamide and N-((cis)-3-(5-chloro-2-cyanophenyl)cyclobutyl)-1-((R)-1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxamide 1-methyl-1H-imidazole (10.76 mg, 0.131 mmol) was added to a stirred mixture of 1-(1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxylic acid (15 mg, 0.044 mmol), 2-((cis)-3-aminocyclobutyl)-4-chlorobenzonitrile (10.84 mg, 0.052 mmol) and chloro-N,N,N',N'-tetramethylformamidinium hexafluorophosphate (24.52 mg, 0.087 mmol) in MeCN (1 mL) at 25° C. and the mixture was stirred at around 25° C. for 2 h. The reaction was concentrated and the residue was purified by reverse phase HPLC (ACN/water with 0.05% TFA modifier) to afford the diastereomeric mixture of products. The enantiopure title compounds were resolved by SFC (DAICEL CHIRALPAK AD (250 mm*30 mm, 10 um), 45% IPA (0.1% NH$_3$H$_2$O). The faster eluting isomer was obtained (Example 163): $^1$H NMR (400 MHz, DMSO_d$_6$) δ 9.78 (br s, 1H), 8.92 (d, J=8.6 Hz, 1H), 8.69 (s, 1H), 7.90 (s, 2H), 7.80 (d, J=8.6 Hz, 1H), 7.51 (dd, J=8.2, 2.0 Hz, 1H), 6.22 (q, J=7.0 Hz, 1H), 4.48-4.61 (m, 1H), 4.23 (dd, J=11.0, 5.1 Hz, 1H), 3.87 (d, J=11.0 Hz, 1H), 3.40-3.54 (m, 1H), 2.66-2.76 (m, 2H), 2.37 (q, J=10.2 Hz, 2H), 2.18 (s, 3H), 2.11-2.17 (m, 2H), 1.92 (br d, J=7.0 Hz, 3H), 1.21-1.25 (m, 1H), 0.87 ppm (br d, J=3.5 Hz, 1H). MS=532.2 (M+1). The slower eluting isomer was obtained (Example 164): $^1$H NMR (400 MHz, DMSO_d$_6$) δ 9.81 (br s, 1H), 8.93 (d, J=8.6 Hz, 1H), 8.72 (s, 1H), 7.91 (d, J=2.0 Hz, 1H), 7.87 (s, 1H), 7.81 (d, J=8.2 Hz, 1H), 7.51 (dd, J=8.2, 2.0 Hz, 1H), 6.22 (d, J=7.0 Hz, 1H), 4.51-4.63 (m, 1H), 4.21 (dd, J=11.3, 5.5 Hz, 1H), 3.89 (d, J=11.0 Hz, 1H), 3.46 (br t, J=8.2 Hz, 1H), 2.70 (br d, J=10.2 Hz, 2H), 2.38 (br d, J=9.8 Hz, 2H), 2.19 (s, 3H), 2.15 (br s, 2H), 1.92 (d, J=7.0 Hz, 3H), 1.24 (br s, 1H), 0.88 ppm (br d, J=3.1 Hz, 1H). MS=532.2 (M+1).

Example 165 and 166

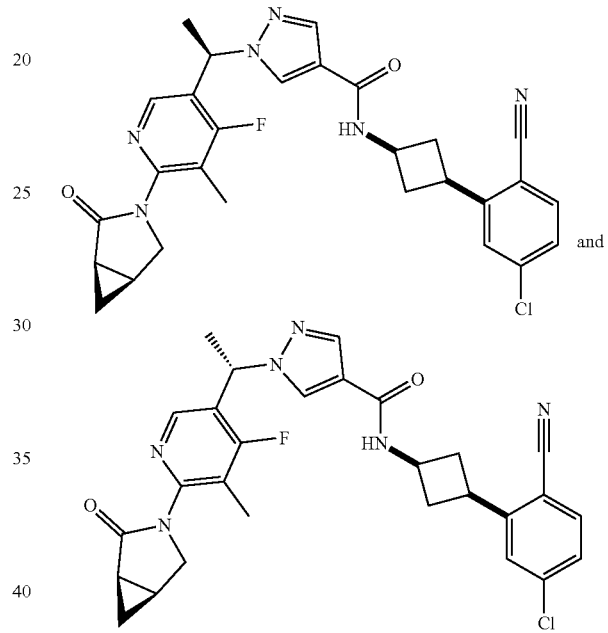

and

N-((cis)-3-(5-chloro-2-cyanophenyl)cyclobutyl)-1-((R)-1-(4-fluoro-5-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((S)-1-(4-fluoro-5-methyl-6-((1R,5S)-2-oxo-3-azabicyclo[3.1.0]hexan-3-yl)pyridin-3-yl)ethyl)-1H-pyrazole-4-carboxamide Step 1. 2-chloro-4-fluoro-3-methylpyridine To a mixture of 2-chloro-4-fluoropyridine (2 g, 15.21 mmol) in THF (10 mL) was added LDA (2M in THF and hexane) (9.12 mL, 18.25 mmol) dropwise at 78° C. The mixture was stirred at −78° C. for 0.5 h, then iodomethane (1.046 mL, 16.73 mmol) in THF (10 mL) was added dropwise. The mixture was stirred at −78° C. for 1 h, then warmed to 25° C. and stirred for another 1 h. The mixture was quenched with sat. aqueous ammonium chloride (50 mL) and extracted with DCM (100 mL*3). The combined organic layer was washed with brine (100 mL), dried over Na$_2$SO$_4$, filtered and the filtrate was concentrated to give crude product. The crude product was purified by flash silica gel chromatography (Pet. Ether) to give the title compound.

¹H NMR (400 MHz, Methanol-d₄) δ 8.20 (dd, J=7.7, 6.0 Hz, 1H), 7.10-7.23 (m, 1H), 2.30 ppm (d, J=1.7 Hz, 3H). MS=146.1 (M+1)

Step 2. (1R,5S)-3-(4-fluoro-3-methylpyridin-2-yl)-3-azabicyclo[3.1.0]hexan-2-one The mixture of 2-chloro-4-fluoro-3-methylpyridine (500 mg, 3.43 mmol), (1R,5S)-3-azabicyclo[3.1.0]hexan-2-one (400 mg, 4.12 mmol), $Cs_2CO_3$ (2238 mg, 6.87 mmol), $Pd_2(dba)_3$ (315 mg, 0.343 mmol) and XantPhos (199 mg, 0.343 mmol) in 1,4-dioxane (8 mL) was stirred at 100° C. for 12 h under $N_2$. The reaction was cooled to 20° C., filtered, and the filtrate was diluted with EtOAc (10 mL) and water (15 mL). The aqueous was extracted with EtOAc (20 mL*3) and the combined organic layers were concentrated. The residue was purified by flash silica gel chromatography (0~50% Pet.ether/EtOAc) to give the title compound. ¹H NMR (400 MHz, Methanol-d₄) δ 8.27 (dd, J=8.1, 5.6 Hz, 1H), 7.10 (dd, J=8.6, 5.6 Hz, 1H), 4.29 (dd, J=10.5, 5.9 Hz, 1H), 3.63-3.77 (m, 1H), 2.12-2.25 (m, 1H), 1.94-2.07 (m, 4H), 1.20-1.38 (m, 1H), 0.86-1.00 ppm (m, 1H). MS=207.1 (M+1)

Step 3. (1R,5S)-3-(5-bromo-4-fluoro-3-methylpyridin-2-yl)-3-azabicyclo[3.1.0]hexan-2-one The mixture of (1R,5S)-3-(4-fluoro-3-methylpyridin-2-yl)-3-azabicyclo[3.1.0]hexan-2-one (420 mg, 2.037 mmol) and NBS (1450 mg, 8.15 mmol) in TFA (10 mL) was stirred at 80° C. for 14 h. A second aliquat of NBS (1087 mg, 6.11 mmol) was added and the mixture was stirred at 80° C. for another 4 h. The solvent was evaporated, the residue was netrualized with aq. $NaHCO_3$, and extracted with EtOAc (3*20 mL). The combined organic layers were washed with water (2*10 mL) and brine (20 mL), dried over $Na_2SO_4$, filtered and concentrated. The residue was purified by flash silica gel chromatography (0~50% Pet.ether/EtOAc) to give the title compound. ¹H NMR (400 MHz, Methanol-d₄) δ 8.42 (d, J=8.8 Hz, 1H), 4.32 (dd, J=10.5, 5.9 Hz, 1H), 3.70 (d, J=10.5 Hz, 1H), 2.13-2.20 (m, 1H), 2.07 (d, J=2.0 Hz, 3H), 1.97-2.04 (m, 1H), 1.29 (td, J=8.0, 4.8 Hz, 1H), 0.84-0.99 ppm (m, 1H). MS=284.9; 286.9 (M+1)

Step 4. tert-butyl 1-(1-(4-fluoro-5-methyl-6-((1R,5S)-2-oxo-3-azabicyclo[3.1.0]hexan-3-yl)pyridin-3-yl)ethyl)-1H-pyrazole-4-carboxylate To a solution of (1R,5S)-3-(5-bromo-4-fluoro-3-methylpyridin-2-yl)-3-azabicyclo[3.1.0]hexan-2-one (100 mg, 0.351 mmol), tert-butyl 1-(1-(trifluoro-14-boraneyl)ethyl)-1H-pyrazole-4-carboxylate, potassium salt (106 mg, 0.351 mmol), nickel(II) chloride ethylene glycol dimethyl ether and 4,4'-Di-tert-butyl-2,2'-dipyridine, (20.54 mg, 0.042 mmol) (20.54 mg, 0.042 mmol) and bis [2-(2,4-difluorophenyl)-5-trifluoromethylpyridine][2-2'-bipyridyl]iridium hexafluorophosphate (9.86 mg, 8.77 μmol) in EtOAc (2 mL) and DMA (0.4 mL) was added $K_2HPO_4$ (183 mg, 1.052 mmol) in a glove box. Then the mixture was stirred in front of a blue LED at 25° C. for 14 h. The mixture was diluted with water (5 mL) and extracted with EtOAc (5 mL*3), the combined organic layer was washed with brine, dried over $Na_2SO_4$, concentrated and the residue was purified by reversed purified by reverse phase HPLC (ACN/water with 0.05% TFA modifier) to give the title compound. MS=401.1 (M+1)

Step 5. 1-(1-(4-fluoro-5-methyl-6-((1R,5S)-2-oxo-3-azabicyclo[3.1.0]hexan-3-yl)pyridin-3-yl)ethyl)-1H-pyrazole-4-carboxylic acid To a solution of tert-butyl 1-(1-(4-fluoro-5-methyl-6-((1R,5S)-2-oxo-3-azabicyclo[3.1.0]hexan-3-yl)pyridin-3-yl)ethyl)-1H-pyrazole-4-carboxylate (30 mg, 0.075 mmol) in DCM (1 mL) was added 2,2,2-trifluoroacetic acid (17.08 mg, 0.150 mmol). The reaction was stirred at 40° C. for 2 h. The reaction was concentrated to give crude product, which was used directly without further purification. MS=345.1 (M+1)

Step 6. N-((cis)-3-(5-chloro-2-cyanophenyl)cyclobutyl)-1-(1-(4-fluoro-5-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-(1-(4-fluoro-5-methyl-6-((1R,5S)-2-oxo-3-azabicyclo[3.1.0]hexan-3-yl)pyridin-3-yl)ethyl)-1H-pyrazole-4-carboxamide To a solution of 1-(1-(4-fluoro-5-methyl-6-((1R,5S)-2-oxo-3-azabicyclo[3.1.0]hexan-3-yl)pyridin-3-yl)ethyl)-1H-pyrazole-4-carboxylic acid (25 mg, 0.073 mmol) in ACN (2 mL) was added 1-methyl-1H-imidazole (17.88 mg, 0.218 mmol), Chloro-N,N,N',N'-tetramethylformamidinium hexafluorophosphate (24.44 mg, 0.087 mmol) and 2-((cis)-3-aminocyclobutyl)-4-chlorobenzonitrile) TFA salt (25.6 mg, 0.080 mmol) at 25° C. The mixture was stirred at 25° C. under $N_2$ atmosphere for 2 h, then the reaction mixture was concentrated and the residue was purified by reverse phase HPLC (ACN/water with 0.05% TFA modifier) to afford the diastereomeric mixture of products. The enantiopure title compounds were resolved by SFC (DAICEL CHIRALPAK AS (250 mm*30 mm, 10 um); 35% 0.1% $NH_3H_2O$ EtOH). The faster eluting isomer was obtained (Example 165): ¹H NMR (400 MHz, DMSO-d₆) δ 8.30 (s, 1H), 8.16-8.24 (m, 2H), 7.83 (s, 1H), 7.80 (d, J=8.1 Hz, 1H), 7.64 (s, 1H), 7.49 (dd, J=8.3, 2.0 Hz, 1H), 5.80-5.88 (m, 1H), 4.34-4.45 (m, 1H), 4.22 (dd, J=10.1, 5.7 Hz, 1H), 3.57 (br d, J=10.5 Hz, 1H), 3.36-3.47 (m, 1H), 2.72 (br d, J=8.3 Hz, 2H), 2.13-2.25 (m, 2H), 2.09 (br s, 1H), 1.93-1.99 (m, 1H), 1.90 (s, 3H), 1.82 (d, J=7.1 Hz, 3H), 1.20-1.21 (m, 1H), 0.80 ppm (br d, J=3.7 Hz, 1H). MS=533.3 (M+1). The slower eluting isomer was obtained (Example 166). ¹H NMR (400 MHz, DMSO_d₆) δ 8.30 (s, 1H), 8.18-8.26 (m, 2H), 7.82 (s, 1H), 7.80 (d, J=8.3 Hz, 1H), 7.65 (d, J=2.0 Hz, 1H), 7.49 (dd, J=8.3, 2.0 Hz, 1H), 5.83 (q, J=6.9 Hz, 1H), 4.36-4.46 (m, 1H), 4.22 (dd, J=10.4, 5.7 Hz, 1H), 3.58 (br d, J=10.3 Hz, 1H), 3.40-3.49 (m, 1H), 2.67-2.77 (m, 2H), 2.14-2.25 (m, 2H), 2.10 (br d, J=6.6 Hz, 1H), 1.94 (br d, J=7.8 Hz, 1H), 1.90 (s, 3H), 1.83 (d, J=6.8 Hz, 3H), 1.20-1.22 (m, 1H), 0.79-0.83 ppm (m, 1H). MS=533.3 (M+1)

Example 167 and 168

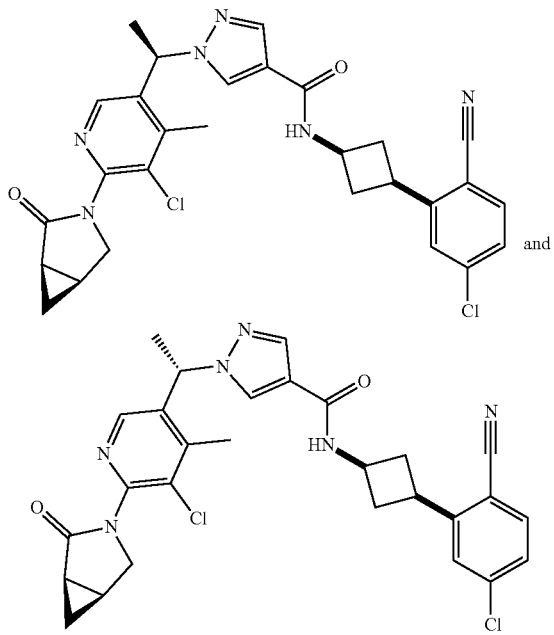

N-((cis)-3-(5-chloro-2-cyanophenyl)cyclobutyl)-1-((R)-1-(5-chloro-4-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((S)-1-(5-chloro-4-methyl-6-((1R,5S)-2-oxo-3-azabicyclo[3.1.0]hexan-3-yl)pyridin-3-yl)ethyl)-1H-pyrazole-4-carboxamide

Step 1. (1R,5S)-3-(3-chloro-4-methylpyridin-2-yl)-3-azabicyclo[3.1.0]hexan-2-one The mixture of (1R,5S)-3-azabicyclo[3.1.0]hexan-2-one (0.719 g, 7.41 mmol), 2,3-dichloro-4-methylpyridine (1 g, 6.17 mmol), Cs$_2$CO$_3$ (6.03 g, 18.52 mmol), Pd2(dba)$_3$ (0.565 g, 0.617 mmol) and Xantphos (0.357 g, 0.617 mmol) in toluene (30 mL) was stirred at 90° C. for 14 h under N$_2$. The solvent was evaporated and 40 mL of water was added. The aqueous layer was extracted with DCM (30 mL*3) and the combined organic layers were dried over Na$_2$SO$_4$, filtered and evaporated to dryness. The residue was purified by flash silica gel chromatography (0-100% EtOAc/Pet. ether) to give the title compound. $^1$H NMR (400 MHz, CDCl$_3$) δ 8.19 (d, J=4.9 Hz, 1H), 7.07 (d, J=4.9 Hz, 1H), 4.25 (td, J=2.8, 10.1 Hz, 1H), 3.62 (d, J=10.3 Hz, 1H), 2.38 (s, 3H), 1.99-2.09 (m, 2H), 1.14-1.25 (m, 1H), 1.00 (q, J=4.2 Hz, 1H). MS=223.1 (M+1).

Step 2. (1R,5S)-3-(5-bromo-3-chloro-4-methylpyridin-2-yl)-3-azabicyclo[3.1.0]hexan-2-one The mixture of (1R,5S)-3-(3-chloro-4-methylpyridin-2-yl)-3-azabicyclo[3.1.0]hexan-2-one (750 mg, 3.37 mmol) and NBS (2398 mg, 13.47 mmol) in TFA (25 mL) was stirred at 80° C. for 14 h. Another aliquot of NBS (1798 mg, 10.10 mmol) was added and the mixture was stirred at 80° C. for 4 h. The solvent was evaporated and the residue was added to 20 mL of aq. NaHCO$_3$. The aqueous layer was extracted with EtOAc (3*20 mL) and the combined organic layers were washed with water (2*20 mL), brine (20 mL), dried over Na$_2$SO$_4$, filtered and concentrated. The residue was purified by flash silica gel chromatography (0~35% EtOAc/Per. Ether) to give the title compound. $^1$H NMR (400 MHz, CDCl$_3$) δ 8.40 (s, 1H), 4.25 (dd, J=4.9, 9.98 Hz, 1H), 3.62 (d, J=9.8 Hz, 1H), 2.54 (s, 3H), 1.98-2.11 (m, 2H), 1.22 (dt, J=4.7, 8.02 Hz, 1H), 1.01 (q, J=3.9 Hz, 1H). MS=302.9 (M+1).

Step 3. (1R,5S)-3-(5-acetyl-3-chloro-4-methylpyridin-2-yl)-3-azabicyclo[3.1.0]hexan-2-one The mixture of (1R,5S)-3-(5-bromo-3-chloro-4-methylpyridin-2-yl)-3-azabicyclo[3.1.0]hexan-2-one (920 mg, 3.05 mmol), tributyl(1-ethoxyvinyl)stannane (1.133 mL, 3.36 mmol) and bis(triphenylphosphine)palladium(II) dichloride (214 mg, 0.305 mmol) in toluene (15 mL) was stirred at 100° C. for 14 h under N$_2$. The reaction was cooled to rt, 10 mL of 6 M HCl was added, and the mixture was stirred for 1 h. 5 mL of aq. KF was added and the mixture was stirred at room temperature for 1 h. 50 mL of aq. NaHCO$_3$ was added and the mixture was extracted with DCM (3*30 mL). The combined organic layers were dried over Na$_2$SO$_4$, filtered and evaporated to dryness. The residue was purified by flash silica gel chromatography (0~60% EtOAc/Pet. ether) to give the title compound. $^1$H NMR (400 MHz, CDCl$_3$) δ 8.59 (s, 1H), 4.36 (dd, J=5.1, 10.17 Hz, 1H), 3.66 (d, J=9.8 Hz, 1H), 2.60 (s, 3H), 2.58 (s, 3H), 1.97-2.17 (m, 2H), 1.25 (dt, J=4.7, 8.0 Hz, 1H), 1.05 (q, J=4.3 Hz, 1H). MS=265.2 (M+1).

Step 4. (1R,5S)-3-(3-chloro-5-(1-hydroxyethyl)-4-methylpyridin-2-yl)-3-azabicyclo[3.1.0]hexan-2-one To the mixture of (1R,5S)-3-(5-acetyl-3-chloro-4-methylpyridin-2-yl)-3-azabicyclo[3.1.0]hexan-2-one (550 mg, 2.078 mmol) in THF (10 mL) was added NaBH$_4$ (157 mg, 4.16 mmol) and MeOH (1 mL), and the reaction was stirred at 25° C. for 1 h. 5 mL of acetone was added and the mixture was stirred at room temperature for 1 h. The solvent was evaporated and 20 mL of water was added. The mixture was extracted with DCM (3*30 mL). The combined organic layers were dried over Na$_2$SO$_4$, filtered and evaporated to dryness. The residue was purified by flash silica gel chromatography (0~100% EtOAc/Pet.) to give the title compound. MS=267.1 (M+1).

Step 5. tert-butyl 1-(1-(5-chloro-4-methyl-6-((1R,5S)-2-oxo-3-azabicyclo[3.1.0]hexan-3-yl)pyridin-3-yl)ethyl)-1H-pyrazole-4-carboxylate The mixture of (1R,5S)-3-(3-chloro-5-(1-hydroxyethyl)-4-methylpyridin-2-yl)-3-azabicyclo[3.1.0]hexan-2-one (380 mg, 1.425 mmol), tert-butyl 1H-pyrazole-4-carboxylate (359 mg, 2.137 mmol), DBAD (656 mg, 2.85 mmol) and triphenylphosphine (747 mg, 2.85 mmol) in toluene (15 mL) was stirred at 80° C. for 5 h under N$_2$. The solvent was evaporated and the residue was purified by reverse phase HPLC (ACN/water with 0.05% TFA modifier) to give the title compound. $^1$H NMR (400 MHz, CDCl$_3$) δ 8.01-8.19 (m, 1H), 7.67-7.91 (m, 2H), 5.64-5.80 (m, 1H), 4.18-4.33 (m, 1H), 3.56-3.71 (m, 1H), 2.37 (d, J=10.56 Hz, 3H), 2.02-2.11 (m, 2H), 1.84-1.96 (m, 3H), 1.54 (d, J=2.35 Hz, 9H), 1.18-1.29 (m, 1H), 0.96-1.08 (m, 1H). MS=439.1 (M+Na).

Step 6. 1-(1-(5-chloro-4-methyl-6-((1R,5S)-2-oxo-3-azabicyclo[3.1.0]hexan-3-yl)pyridin-3-yl)ethyl)-1H-pyrazole-4-carboxylic acid, TFA salt The mixture of tert-butyl 1-(1-(5-chloro-4-methyl-6-((1R,5S)-2-oxo-3-azabicyclo[3.1.0]hexan-3-yl)pyridin-3-yl)ethyl)-1H-pyrazole-4-carboxylate (280 mg, 0.672 mmol) in DCM (3 mL) and TFA (3 mL) was stirred at 25° C. (room temperature) for 1 h. The solvent was evaporated to give crude title compounds that was used directly without further purification. MS=361.1 (M+1).

Step 7. N-((cis)-3-(5-chloro-2-cyanophenyl)cyclobutyl)-1-((R)-1-(5-chloro-4-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-1-((S)-1-(5-chloro-4-methyl-6-((1R,5S)-2-oxo-3-azabicyclo[3.1.0]hexan-3-yl)pyridin-3-yl)ethyl)-1H-pyrazole-4-carboxamide The mixture of 1-(1-(5-chloro-4-methyl-6-((1R,5S)-2-oxo-3-azabicyclo[3.1.0]hexan-3-yl)pyridin-3-yl)ethyl)-1H-pyrazole-4-carboxylic acid, TFA salt (370 mg, crude), 2-((cis)-3-aminocyclobutyl)-4-chlorobenzonitrile, TFA (705 mg, 0.880 mmol), N,N,N',N'-tetramethylchloroformamidinium hexafluorophosphate (247 mg, 0.880 mmol) and 1-methyl-1H-imidazole (206 mg, 2.51 mmol) in ACN (8 mL) was stirred at 25° C. for 2 h. The solvent was evaporated and the residue was purified by reverse phase HPLC (ACN/water with 0.05% TFA modifier) to afford the diastereomeric mixture of products. The enantiopure title compounds were resolved by SFC (Column: REGIS (s,s) WHELK-01 (250 mm*30 mm, 5 um) 60% 0.1% NH$_3$H$_2$O EtOH. The faster eluting isomer was obtained (Example 167). $^1$H NMR (400 MHz, Methanol-d$_4$) δ 8.17 (d, J=12.2 Hz, 2H), 7.93 (s, 1H), 7.53-7.70 (m, 2H), 7.39 (dd, J=1.8, 8.2 Hz, 1H), 5.93 (q, J=6.9 Hz, 1H), 4.44-4.57 (m, 1H), 4.20 (dd, J=5.8, 10.2 Hz, 1H), 3.48-3.69 (m, 2H), 2.79-2.96 (m, 2H), 2.40 (s, 3H), 2.11-2.27 (m, 3H), 1.97-2.08 (m, 1H), 1.91 (d, J=7.1 Hz, 3H), 1.23-1.30 (m, 1H), 0.94-1.02 (m, 1H). MS=549.2 (M+1). The slower eluting isomer was obtained (Example 168). $^1$H NMR (400 MHz, Methanol-d$_4$) δ 8.17 (br d, J=16.9 Hz, 2H), 7.94 (br s, 1H), 7.51-7.72 (m, 2H), 7.39 (br d, J=6.9 Hz, 1H), 5.93 (br d, J=5.9 Hz, 1H), 4.51 (br s, 1H), 4.21 (br s, 1H), 3.46-3.70 (m, 2H), 2.90 (br s, 2H), 2.41 (br s, 3H), 2.13-2.30 (m, 3H), 2.01 (br s, 1H), 1.90 (br d, J=5.9 Hz, 3H), 1.27 (br s, 1H), 0.98 (br s, 1H). MS=549.2 (M+1).

Example 169, 170, 171 and 172

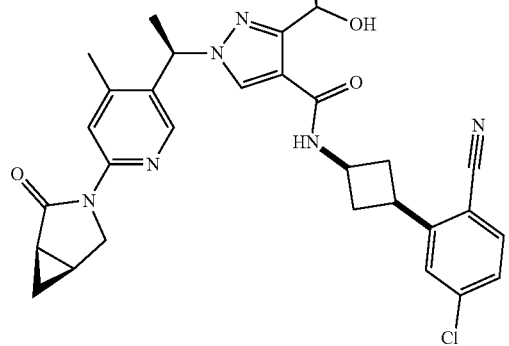

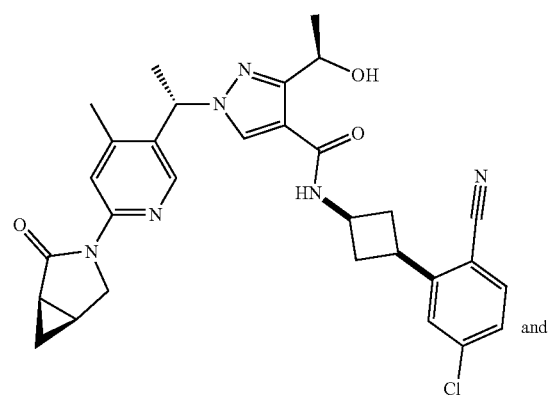

and

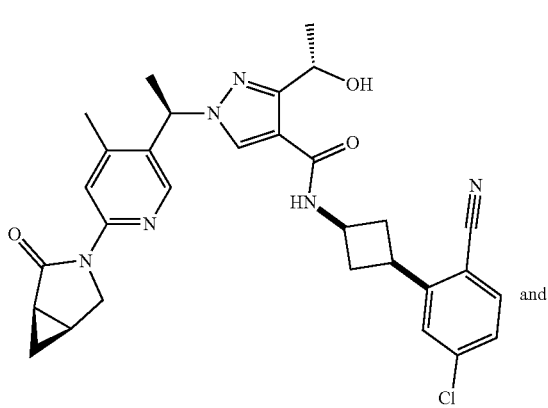

and

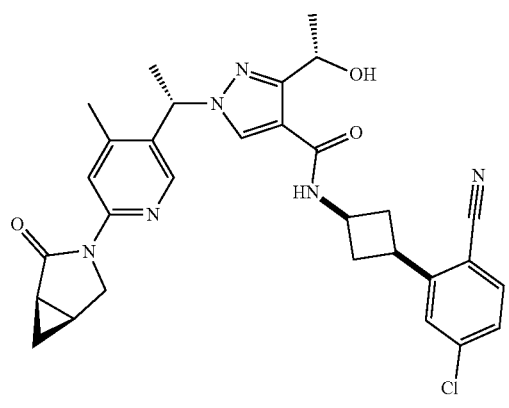

N-((cis)-3-(5-chloro-2-cyanophenyl)cyclobutyl)-3-((S)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide, N-((cis)-3-(5-chloro-2-cyanophenyl)cyclobutyl)-3-((R)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide, N-((cis)-3-(5-chloro-2-cyanophenyl)cyclobutyl)-3-((R)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-3-((S)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide Step 1. ethyl 3-bromo-1-(1-(6-chloro-4-methylpyridin-3-yl)ethyl)-1H-pyrazole-4-carboxylate In a round bottom flask, to a solution of 1-(6-chloro-4-methylpyridin-3-yl)ethanol (1.1 g, 6.41 mmol), ethyl 3-bromo-1H-pyrazole-4-carboxylate (1.404 g, 6.41 mmol) and Ph$_3$P (2.52 g, 9.61 mmol) in THF (15 mL) was added DBAD (2.214 g, 9.61 mmol) at 20° C. The mixture was stirred at 25° C. for 4 h. The mixture was cooled to r.t. and poured into water (50 mL), then filtered and the filtrate was extracted with EtOAc (50 mL*3). The organic layer was washed with brine, dried over Na$_2$SO$_4$, filtered, and the filtrate was concentrated in vacuum to give crude product. The obtained crude product was purified by a flash silica gel chromatography (30% Pet. Ether/EtOAc) to give the title compound. MS=374.1, 376.1 (M+1).

Step 2. ethyl 3-acetyl-1-(1-(6-chloro-4-methylpyridin-3-yl)ethyl)-1H-pyrazole-4-carboxylate To a solution of ethyl 3-bromo-1-(1-(6-chloro-4-methylpyridin-3-yl)ethyl)-1H-pyrazole-4-carboxylate (1.5 g, 4.03 mmol) in t-amyl OH (15 mL) was added tributyl(1-ethoxyvinyl)stannane (1.494 mL, 4.43 mmol) and chloro[(di(1-adamantyl)-n-butylphosphine)-2-(2-aminobiphenyl)]palladium(II) (0.269 g, 0.403 mmol) at 20° C. The resulting mixture was stirred for 12 h at 100° C. under N$_2$, then HCl (6M, 10 mL) was added and stirred at 20° C. for 1 h. Water (10 mL) was added and the aqueous was extracted with DCM (10 mL*3). The organic layers were concentrated and the residue was purified by flash silica gel chromatography (0-35% pet/EtOAc) to give the title compound. MS=336.1 (M+1).

Step 3. 3-acetyl-1-(1-(6-chloro-4-methylpyridin-3-yl)ethyl)-1H-pyrazole-4-carboxylic acid To a solution of ethyl 3-acetyl-1-(1-(6-chloro-4-methylpyridin-3-yl)ethyl)-1H-pyrazole-4-carboxylate (500 mg, 1.489 mmol) in EtOH (8 mL) and H$_2$O (2 mL) was added LiOH H$_2$O (94 mg, 2.234 mmol) at 25° C. The mixture was stirred at 25° C. for 2 h. LCMS showed the reaction was complete. The mixture was concentrated, water (10 mL) was added and it was extracted with DCM (5 mL*3). The aqueous layer was added HCl (1M) to pH=6 and extracted with DCM (15 mL*3). The combined organic layers were concentrated to give the title compound. MS=308.0 (M+1).

Step 4. 3-acetyl-1-(1-(4-methyl-6-((1R,5S)-2-oxo-3-azabicyclo[3.1.0]hexan-3-yl)pyridin-3-yl)ethyl)-1H-pyrazole-4-carboxylic acid The mixture of (1R,5S)-3-azabicyclo[3.1.0]hexan-2-one (166 mg, 1.706 mmol), 3-acetyl-1-(1-(6-chloro-4-methylpyridin-3-yl)ethyl)-1H-pyrazole-4-carboxylic acid (350 mg, 1.137 mmol), cesium carbonate (1112 mg, 3.41 mmol), Pd2(dba)$_3$ (104 mg, 0.114 mmol) and XantPhos (65.8 mg, 0.114 mmol) in 1,4-dioxane (8 mL) was stirred at 100° C. for 5 h under N$_2$. Water (10 mL) was added and the aqueous was extracted with ethyl acetate (10 mL×3). The combined organic layers were washed with brine (10 mL×2), dried over sodium sulfate and filtered. The filtrate was concentrated under reduced pressure to give a residue. The crude product was purified by reverse phase HPLC (ACN/water with 0.05% TFA modifier) to give the title compound. MS=369.1 (M+1).

Step 5. 3-acetyl-N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)ethyl)-1H-pyrazole-4-carboxamide To a mixture of 3-acetyl-1-(1-(4-methyl-6-((1R,5S)-2-oxo-3-azabicyclo[3.1.0]hexan-3-yl)pyridin-3-yl)ethyl)-1H-pyrazole-4-carboxylic acid (160 mg, 0.434 mmol), 2-((cis)-3-aminocyclobutyl)-4-chlorobenzonitrile (269 mg, 0.521 mmol) and chloro-N,N,N',N'-tetramethylformamidinium hexafluorophosphate (244 mg, 0.869 mmol) in MeCN (2 mL) was added 1-methyl-1H-imidazole (178 mg, 2.172 mmol) at 25° C. The mixture was stirred at 25° C. for 2 h. Water (10 mL) was added and the aqueous was extracted with ethyl acetate (10 mL×3). The combined organic layers were washed with brine (10 mL×2), dried over sodium sulfate and filtered. The filtrate was concentrated. The crude product was purified by prep-TLC (SiO$_2$, Pet.ether:EtOAc=1:2) to give the title compound. MS=557.2 (M+1).

Step 6. N-((cis)-3-(5-chloro-2-cyanophenyl)cyclobutyl)-3-((S)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide, N-((cis)-3-(5-chloro-2-cyanophenyl)cyclobutyl)-3-((R)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide, N-((cis)-3-(5-chloro-2-cyanophenyl)cyclobutyl)-3-((R)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide and N-((cis)-3-(5-chloro-2-cyanophenyl)cyclobutyl)-3-((S)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide To a solution of 3-acetyl-N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)ethyl)-1H-pyrazole-4-carboxamide (150 mg, 0.269 mmol) in THF (5 mL) and MeOH (0.8 mL) was added sodium tetrahydroborate (12.23 mg, 0.323 mmol) at 0° C. and the reaction was stirred 1 h at 25° C. Sat. NH$_4$Cl (5 mL) was added and the aqueous was extracted with EtOAc (5 mL*3). The combined organic layers were concentrated and the residue was purified by reverse phase HPLC (ACN/water with 0.05% TFA modifier) to afford the diastereomeric mixture of products. The enantiopure title compounds were resolved by SFC (Column: DAICEL CHIRALPAK AD-H (250 mm*30 mm, 5 um) 40% EtOH (0.1% NH₃H₂O)) to give three peaks. The first eluting peak afforded a mixture of 2 diastereomeric products. The enantiopure title compounds were resolved by SFC (of the first eluting peak): Column: DAICEL CHIRALPAK AD-H (250 mm*30 mm, 5 um); 40% EtOH (0.1% NH₃H₂O) The faster eluting isomer (from peak 1, first SFC) was obtained (Example 169). $^1$H NMR (400 MHz, Methanol-$d_4$) δ 8.17 (s, 1H), 8.09 (s, 1H), 8.05 (s, 1H), 7.67 (d, J=8.2 Hz, 1H), 7.57 (s, 1H), 7.39-7.44 (m, 1H), 5.72-5.80 (m, 1H), 4.97 (q, J=7.2 Hz, 1H), 4.47-4.55 (m, 1H), 4.11-4.18 (m, 1H), 3.99-4.08 (m, 1H), 3.55-3.64 (m, 1H), 2.86-2.98 (m, 2H), 2.28 (s, 3H), 2.08-2.23 (m, 4H), 1.88 (d, J=7.0 Hz, 3H), 1.50 (d, J=6.7 Hz, 3H), 1.23-1.28 (m, 1H), 0.71-0.76 ppm (m, 1H). 99.12% ee. MS=559.3 (M+1). The slower eluting isomer (from peak 1, first SFC) was obtained (Example 170). $^1$H NMR (400 MHz, Methanol-$d_4$) δ 8.19 (s, 1H), 8.07 (s, 1H), 8.06 (s, 1H), 7.67 (d, J=8.2 Hz, 1H), 7.57 (d, J=1.6 Hz, 1H), 7.41 (dd, J=8.2, 2.0 Hz, 1H), 5.76 (q, J=7.2 Hz, 1H), 4.98 (q, J=6.4 Hz, 1H), 4.45-4.55 (m, 1H), 4.09-4.18 (m, 1H), 4.00-4.07 (m, 1H), 3.54-3.63 (m, 1H), 2.93 (dt, J=11.2, 7.7 Hz, 2H), 2.27 (s, 3H), 2.05-2.22 (m, 4H), 1.88 (d, J=7.0 Hz, 3H), 1.50 (d, J=6.7 Hz, 3H), 1.23-1.28 (m, 1H), 0.74 ppm (q, J=3.9 Hz, 1H). 99.18% ee. MS=559.3 (M+1). The second eluting isomer (from first SFC) was purified by reverse phase HPLC (ACN/water with 0.05% TFA modifier) give pure compound (Example 171). $^1$H NMR (400 MHz, Methanol-$d_4$) δ 8.14-8.21 (m, 2H), 7.78 (br s, 1H), 7.67 (d, J=8.2 Hz, 1H), 7.57 (d, J=1.6 Hz, 1H), 7.42 (dd, J=8.2, 2.0 Hz, 1H), 5.84 (q, J=6.9 Hz, 1H), 4.98 (q, J=6.7 Hz, 1H), 4.47-4.58 (m, 1H), 4.09-4.15 (m, 1H), 4.03-4.08 (m, 1H), 3.53-3.69 (m, 1H), 2.84-3.02 (m, 2H), 2.41 (s, 3H), 2.13-2.27 (m, 4H), 1.89 (d, J=7.0 Hz, 3H), 1.50 (d, J=6.7 Hz, 3H), 1.32-1.39 (m, 1H), 0.89 ppm (br s, 1H). 93.41% ee. MS=559.3 (M+1). The third isomer (from first SFC) was obtained (Example 172). $^1$H NMR (400 MHz, Methanol-$d_4$) δ 8.16 (s, 1H), 8.08 (s, 1H), 8.04 (s, 1H), 7.65 (d, J=8.3 Hz, 1H), 7.56 (d, J=1.7 Hz, 1H), 7.40 (dd, J=8.2, 1.8 Hz, 1H), 5.73-5.80 (m, 1H), 4.97 (q, J=6.6 Hz, 1H), 4.44-4.53 (m, 1H), 3.99-4.16 (m, 2H), 3.53-3.62 (m, 1H), 2.85-2.98 (m, 2H), 2.27 (s, 3H), 2.08-2.22 (m, 4H), 1.87 (d, J=6.8 Hz, 3H), 1.50 (d, J=6.6 Hz, 3H), 1.21-1.27 (m, 1H), 0.75 ppm (q, J=3.8 Hz, 1H). 88.87% ee. MS=559.3 (M+1).

Example 173 and 174

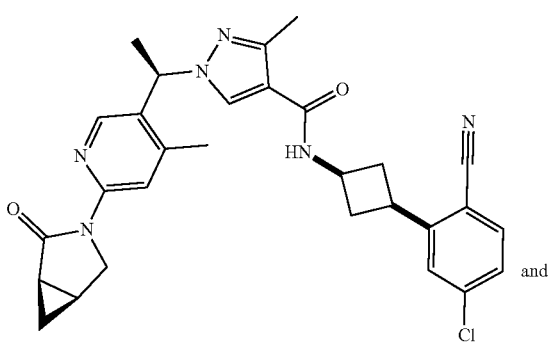

and

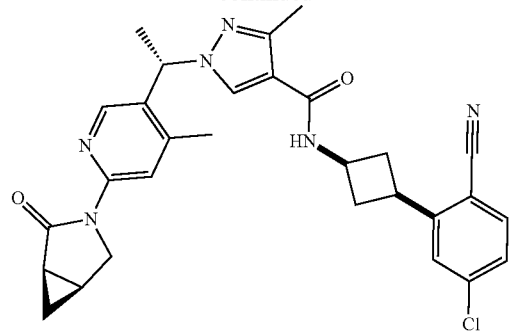

N-((cis)-3-(5-chloro-2-cyanophenyl)cyclobutyl)-1-methyl-3-((S)-1-(4-methyl-6-((1R,5S)-2-oxo-3-azabicyclo[3.1.0]hexan-3-yl)pyridin-3-yl)ethyl)-1H-pyrazole-5-carboxamide and N-((cis)-3-(5-chloro-2-cyanophenyl)cyclobutyl)-1-methyl-3-((R)-1-(4-methyl-6-((1R,5S)-2-oxo-3-azabicyclo[3.1.0]hexan-3-yl)pyridin-3-yl)ethyl)-1H-pyrazole-5-carboxamide Step 1. ethyl 3-acetyl-1H-pyrazole-5-carboxylate To a solution of but-3-yn-2-one (7 g, 103 mmol) in water (100 mL) was added ethyl 2-diazoacetate (16.22 mL, 154 mmol) at 0° C. The mixture was stirred at 25° C. for 4 h, and then filtered to give the title compound. $^1$H NMR (400 MHz, Methanol-$d_4$) δ 7.26 (br s, 1H), 4.36 (q, J=7.2 Hz, 2H), 2.54 (s, 3H), 1.36 ppm (t, J=7.1 Hz, 3H). MS=183.1 (M+1)

Step 2. ethyl 3-acetyl-1-methyl-1H-pyrazole-5-carboxylate

To a solution of ethyl 3-acetyl-1H-pyrazole-5-carboxylate (7 g, 38.4 mmol) and cesium carbonate (18.78 g, 57.6 mmol) in DMF (100 mL) was added iodomethane (3.12 mL, 50.0 mmol) at 25° C. EtOAc (50 mL) was added and the organic phase was washed with water (100 mL). The aqueous fraction was extracted with EtOAc (100 mL×3). The organic fractions were combined, dried over Na₂SO₄, filtered, concentrated in vacuo, and the residue was purified by flash silica gel chromatography (0~30% Pet.ether/EtOAc) to give ethyl 3-acetyl-1-methyl-1H-pyrazole-5-carboxylate and ethyl 5-acetyl-1-methyl-1H-pyrazole-3-carboxylate. MS=197.1 (M+1)

Step 3. ethyl 1-methyl-3-(1-(2-tosylhydrazineylidene)ethyl)-1H-pyrazole-5-carboxylate To a solution of ethyl 3-acetyl-1-methyl-1H-pyrazole-5-carboxylate (500 mg, 2.55 mmol) in MeOH (8 mL) was added 4-methylbenzenesulfonohydrazide (475 mg, 2.55 mmol), then the reaction mixture was stirred at 40° C. for 2 h. The reaction was concentrated to give the title compound, which was used to the next step without further purification. MS=365.1 (M+1).

Step 4. ethyl 3-(1-(6-chloro-4-methylpyridin-3-yl)ethyl)-1-methyl-1H-pyrazole-5-carboxylate Potassium carbonate (228 mg, 1.646 mmol) was added to a stirred mixture of (6-chloro-4-methylpyridin-3-yl)boronic acid (141 mg, 0.823 mmol) and ethyl 1-methyl-3-(1-(2-tosylhydrazono)ethyl)-1H-pyrazole-5-carboxylate (200 mg, 0.549 mmol) in dioxane (4 mL) at 25° C. The mixture was stirred at 110° C. for 2 h. The reaction was diluted with water (20 mL), extracted with EtOAc (20 mL*3), the combined organic layer was washed with brine, dried over $Na_2SO_4$, and concentrated to give crude product. The crude product was purified by prep-TLC ($SiO_2$; petroleum ether:ethyl acetate=1:1) to give the title compound. MS=308.1 (M+1)

Step 5. 3-(1-(6-chloro-4-methylpyridin-3-yl)ethyl)-1-methyl-1H-pyrazole-5-carboxylic acid To a solution of ethyl 3-(1-(6-chloro-4-methylpyridin-3-yl)ethyl)-1-methyl-1H-pyrazole-5-carboxylate (50 mg, 0.162 mmol) in THF (0.8 mL) and water (0.2 mL) was added lithium hydroxide hydrate (8.18 mg, 0.195 mmol). The reaction was stirred at 40° C. for 12 h. Then, the mixture was diluted with water (5 mL), extracted with EtOAc (5 mL×3), and the aqueous layers was adjusted to a pH of 3-4 with HCl. The aqueous was extracted with DCM (10 mL×3), the combined organic layer was washed with brine, dried over $Na_2SO_4$, and concentrated to give the title compound, which was used to next step directly without further purification. MS=280.1 (M+1)

Step 6. 1-methyl-3-(1-(4-methyl-6-((1R,5S)-2-oxo-3-azabicyclo[3.1.0]hexan-3-yl)pyridin-3-yl)ethyl)-1H-pyrazole-5-carboxylic acid The mixture of 3-(1-(6-chloro-4-methylpyridin-3-yl)ethyl)-1-methyl-1H-pyrazole-5-carboxylic acid (42 mg, 0.150 mmol), (1R,5S)-3-azabicyclo[3.1.0]hexan-2-one (29.2 mg, 0.300 mmol), $Cs_2CO_3$ (98 mg, 0.300 mmol), $Pd_2(dba)_3$ (13.75 mg, 0.015 mmol) and XANTPHOS (8.69 mg, 0.015 mmol) in 1,4-dioxane (2 mL) was stirred at 100° C. for 12 h under $N_2$. Then the mixture was diluted with water (5 mL), extracted with EtOAc (5 mL×3), and the aqueous layer was adjusted to pH to 3-4 with HCl. The aqueous was extracted with DCM (10 mL*3), the combined organic layers were washed with brine, dried over $Na_2SO_4$, and concentrated to give the title compound, which was used in the next step without further purification. MS=341.1 (M+1).

Step 7. N-((cis)-3-(5-chloro-2-cyanophenyl)cyclobutyl)-1-methyl-3-(1-(4-methyl-6-((1R,5S)-2-oxo-3-azabicyclo[3.1.0]hexan-3-yl)pyridin-3-yl)ethyl)-1H-pyrazole-5-carboxamide and N-((cis)-3-(5-chloro-2-cyanophenyl)cyclobutyl)-1-methyl-3-(1-(4-methyl-6-((1R,5S)-2-oxo-3-azabicyclo[3.1.0]hexan-3-yl)pyridin-3-yl)ethyl)-1H-pyrazole-5-carboxamide To a solution of 1-methyl-3-(1-(4-methyl-6-((1R,5S)-2-oxo-3-azabicyclo[3.1.0]hexan-3-yl)pyridin-3-yl)ethyl)-1H-pyrazole-5-carboxylic acid (20 mg, 0.059 mmol) in ACN (1.5 mL) was added 1-methyl-1H-imidazole (14.47 mg, 0.176 mmol), TCFH (19.78 mg, 0.071 mmol) and 2-((cis)-3-aminocyclobutyl)-4-chlorobenzonitrile TFA salt (20.73 mg, 0.065 mmol) at 25° C. The mixture was stirred at 25° C. under $N_2$ atmosphere for 2 h, concentrated, and the residue was purified by reverse phase HPLC (ACN/water with 0.05% TFA modifier) to) to afford the diastereomeric mixture of products. The enantiopure title compounds were resolved by SFC (Column: DAICEL CHIRALPAK AD-H (250 mm*30 mm, 5 um); 40% 0.1% $NH_3H_2O$ EtOH) to give two isomers. The faster eluting isomer was obtained (Example 173). $^1$H NMR (400 MHz, DMSO_$d_6$) δ 8.48 (br d, J=7.8 Hz, 1H), 8.09 (s, 1H), 7.91 (s, 1H), 7.79 (d, J=8.3 Hz, 1H), 7.64 (d, J=1.7 Hz, 1H), 7.48 (dd, J=8.3, 2.0 Hz, 1H), 6.52 (s, 1H), 4.37-4.46 (m, 1H), 4.16-4.27 (m, 1H), 3.98 (br s, 1H), 3.94 (s, 3H), 3.84-3.91 (m, 1H), 3.40-3.49 (m, 1H), 2.70 (br d, J=11.5 Hz, 2H), 2.21 (s, 3H), 2.18 (br s, 1H), 2.02 (br d, J=7.3 Hz, 2H), 1.96 (br d, J=7.6 Hz, 1H), 1.52 (d, J=7.1 Hz, 3H), 1.22-1.23 (m, 1H), 0.62-0.67 ppm (m, 1H). MS=529.2 (M+1). The slower eluting isomer was obtained (Example 174). $^1$H NMR (400 MHz, DMSO $d_6$) δ 8.48 (d, J=8.1 Hz, 1H), 8.09 (s, 1H), 7.91 (s, 1H), 7.79 (d, J=8.1 Hz, 1H), 7.65 (s, 1H), 7.48 (dd, J=8.3, 2.2 Hz, 1H), 6.52 (s, 1H), 4.35-4.48 (m, 1H), 4.18-4.29 (m, 1H), 3.98 (br s, 1H), 3.95 (s, 3H), 3.84-3.90 (m, 1H), 3.39-3.49 (m, 1H), 2.70 (br d, J=8.1 Hz, 2H), 2.22 (s, 3H), 2.00-2.04 (m, 2H), 1.93-1.99 (m, 2H), 1.51 (d, J=7.3 Hz, 3H), 1.23-1.24 (m, 1H), 0.67 ppm (br d, J=3.7 Hz, 1H). MS=529.2 (M+1)

Kallikrein Assay

The effectiveness of a compound of the present invention as an inhibitor of Kallikrein can be determined using a relevant purified serine protease, and an appropriate synthetic substrate. The rate of hydrolysis of the chromogenic or fluorogenic substrate by the relevant serine protease was measured both in the absence and presence of compounds of the present invention. Assays were conducted at room temperature or at 37° C. Hydrolysis of the substrate resulted in release of amino trifluoromethylcoumarin (AFC), which was monitored spectrofluorometrically by measuring the increase in emission at 510 nm with excitation at 405 nm. A decrease in the rate of fluorescence change in the presence of inhibitor is indicative of enzyme inhibition. Such methods are known to one skilled in the art. The results of this assay are expressed as the half-maximal inhibitory concentrations (IC50), or the inhibitory constant, $K_i$.

Kallikrein determinations were made in 50 mM HEPES buffer at pH 7.4 containing 150 mM NaCl, 5 mM $CaCl_2$), and 0.1% PEG 8000 (polyethylene glycol; Fisher Scientific). Determinations were made using purified Human plasma kallikrein at a final concentration of 0.5 nM (Enzyme Research Laboratories) and the synthetic substrate, Acetyl-K—P—R-AFC (Sigma #C6608) at a concentration of 100 mM.

Activity assays were performed by diluting a stock solution of substrate at least tenfold to a final concentration ≤0.2 Km into a solution containing enzyme or enzyme equilibrated with inhibitor. Times required to achieve equilibration between enzyme and inhibitor were determined in control experiments. The reactions were performed under linear progress curve conditions and fluorescence increase measured at 405 Ex/510 Em nm. Values were converted to percent inhibition of the control reaction (after subtracting 100% Inhibition value). $IC_{50}$ was determined by inflection point from a four parameter logistic curve fit. Ki was calculated using the Cheng Prusoff equation, $Ki=IC_{50}/(1+([S]/Km))$.

The activities shown by this assay indicate that the compounds of the invention may be therapeutically useful for treating or preventing various ophthalmic, cardiovascular and/or cerebrovascular thromboembolic conditions in patients suffering from unstable angina, acute coronary syndrome, refractory angina, myocardial infarction, transient ischemic attacks, atrial fibrillation, stroke such as thrombotic stroke or embolic stroke, venous thrombosis, coronary and cerebral arterial thrombosis, cerebral and pulmonary embolism, atherosclerosis, deep vein thrombosis, disseminated intravascular coagulation, reocclusion or restenosis of recanalized vessels, hereditary angioedema, uveitis, posterior uveitis, wet age related macular edema, diabetic macular edema, diabetic retinopathy and retinal vein occlusion.

Plasma Kallikrein IC50 (nM) for selected compounds are as follows:

| Example # | Plasma Kallikrein IC50 (nM) |
|---|---|
| 1 | 8.6 |
| 2 | 10.6 |
| 3 | 6.7 |
| 4 | 17.5 |
| 5 | 0.6 |
| 6 | 0.7 |
| 7 | 0.3 |
| 8 | 2.8 |
| 9 | 0.3 |
| 10 | 3.6 |
| 11 | 0.9 |
| 12 | 7.7 |
| 13 | 1.0 |
| 14 | 2.8 |
| 15 | 2.6 |
| 16 | 6.7 |
| 17 | 5.5 |
| 18 | 10.2 |
| 19 | 0.3 |
| 20 | 2.1 |
| 21 | 1.1 |
| 22 | 1.5 |
| 23 | 3.9 |
| 24 | 5.1 |
| 25 | 25.3 |
| 26 | 3.7 |
| 27 | 18.6 |
| 28 | 0.2 |
| 29 | 1.6 |
| 30 | 2.4 |
| 31 | 7.3 |
| 32 | 11.1 |
| 33 | 84.4 |
| 34 | 5.1 |
| 35 | 101.6 |
| 36 | 1.1 |
| 37 | 0.7 |
| 38 | 1.1 |
| 39 | 0.3 |
| 40 | 0.7 |
| 41 | 15.8 |
| 42 | 0.3 |
| 43 | 1.8 |
| 44 | 0.2 |
| 45 | 0.2 |
| 46 | 2.7 |
| 47 | 2.1 |
| 48 | 127.1 |
| 49 | 0.4 |
| 50 | 8.2 |
| 51 | 2.4 |
| 52 | 10.1 |
| 53 | 4.7 |
| 54 | 239.1 |
| 55 | 0.6 |
| 56 | 1.5 |
| 57 | 7.7 |
| 58 | 5.0 |
| 59 | 0.6 |
| 60 | 14.6 |
| 61 | 10.1 |
| 62 | 2710.0 |
| 63 | 26.0 |
| 64 | 15.9 |
| 65 | 0.3 |
| 66 | 62.6 |
| 67 | 1.7 |
| 68 | 1.9 |
| 69 | 2793.0 |
| 70 | 14.6 |
| 71 | 12.7 |
| 72 | 10000.0 |
| 73 | 107.2 |
| 74 | 3.9 |
| 75 | 0.2 |
| 76 | 15.7 |
| 77 | 8.1 |
| 78 | 41.5 |
| 79 | 16.1 |
| 80 | 104.5 |
| 81 | 1.9 |
| 82 | 0.6 |
| 83 | 39.5 |
| 84 | 1.6 |
| 85 | 0.9 |
| 86 | 1.1 |
| 87 | 0.5 |
| 88 | 11.3 |
| 89 | 1.1 |
| 90 | 152.9 |
| 91 | 1.5 |
| 92 | 38.1 |
| 93 | 4.3 |
| 94 | 177.9 |
| 95 | 10.7 |
| 96 | 0.2 |
| 97 | 4.4 |
| 98 | 27.5 |
| 99 | 0.6 |
| 100 | 2.0 |
| 101 | 1.8 |
| 102 | 3.2 |
| 103 | 2.1 |
| 104 | 4.3 |
| 105 | 0.6 |
| 106 | 2.2 |
| 107 | 4.8 |
| 108 | 6.5 |
| 109 | 0.2 |
| 110 | 1.1 |
| 111 | 0.3 |
| 112 | 6.7 |
| 113 | 0.4 |
| 114 | 6.1 |
| 115 | 22.4 |
| 116 | 6.9 |
| 117 | 968.1 |
| 118 | 4.7 |
| 119 | 26.0 |
| 120 | 0.6 |
| 121 | 6.7 |
| 122 | 3.0 |
| 123 | 41.3 |
| 124 | 4.5 |
| 125 | 129.7 |
| 126 | 414.1 |
| 127 | 702.1 |
| 128 | 2.3 |
| 129 | 838.9 |
| 130 | 8.5 |
| 131 | 281.5 |
| 132 | 278.9 |
| 133 | 2.5 |
| 134 | 5.4 |
| 135 | 80.0 |
| 136 | 1.4 |
| 137 | 1.6 |
| 138 | 11.1 |
| 139 | 1.4 |
| 140 | 11.3 |
| 141 | 0.2 |
| 142 | 0.4 |
| 143 | 0.2 |

-continued

| Example # | Plasma Kallikrein IC50 (nM) |
|---|---|
| 144 | 1.0 |
| 145 | 126.4 |
| 146 | 0.7 |
| 147 | 0.6 |
| 148 | 0.6 |
| 149 | 5.0 |
| 150 | 5.8 |
| 151 | 1.1 |
| 152 | 78.0 |
| 153 | 23.9 |
| 154 | 29.6 |
| 155 | 28.0 |
| 156 | 0.7 |
| 157 | 24.0 |
| 158 | 0.9 |
| 159 | 1.7 |
| 160 | 6.7 |
| 161 | 95.9 |
| 162 | 3.7 |
| 163 | 1.1 |
| 164 | 46.7 |
| 165 | 1.0 |
| 166 | 1.2 |
| 167 | 1.9 |
| 168 | 0.1 |
| 169 | 0.8 |
| 170 | 0.7 |
| 171 | 5.6 |
| 172 | 11.1 |
| 173 | 3.2 |
| 174 | 26.9 |

What is claimed is:
1. A compound of the formula:

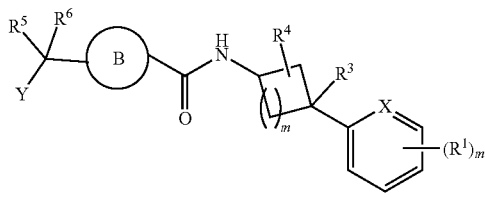

wherein X is $CR^2$ or N;
Y is

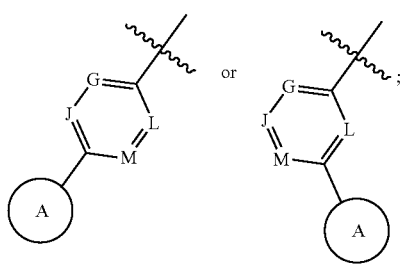

wherein

A is selected from

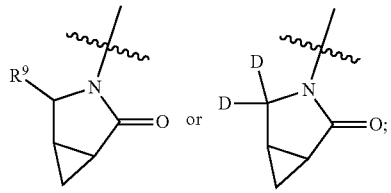

B is a 5 membered heteroaryl ring which is optionally substituted with one or two substituents independently selected from the group consisting of halo, cyano, $R^x$ and $OR^x$;
G is N or $CR^7$;
J is N or $CR^8$;
L is N or $CR^7$;
M is absent, N or $CR^8$;
each $R^1$ is independently selected from the group consisting of halo, cyano, $R^x$ and $OR^x$;
$R^2$ is hydrogen, halo, cyano, $R^x$, $OR^x$, $CONH_2$ or heteroaryl, wherein said heteroaryl is optionally substituted with halo;
$R^3$ is hydrogen, deuterium, halo or methyl;
$R^4$ is hydrogen, deuterium, halo, hydroxyl or methyl;
or $R^3$ and $R^4$ can be taken with the carbon atoms between them to form a $C_{3-6}$ membered cycloalkyl group;
$R^5$ is hydrogen or $C_{1-3}$ alkyl, which is optionally substituted with one to three substituents selected from the group consisting of halo and hydroxyl;
or $R^5$ and L can be taken with the carbon atoms between them to form a $C_{3-6}$ membered cycloalkyl group;
$R^6$ is hydrogen, hydroxyl or $C_{1-3}$ alkyl;
or $R^5$ and $R^6$ can be taken together with the carbon atom between them to form a $C_{3-6}$ cycloalkyl group;
each $R^7$ is independently selected from the group consisting of hydrogen, halo, $R^x$ and $OR^x$;
each $R^8$ is independently selected from the group consisting of hydrogen, halo, $R^x$, $OR^x$ and $NH_2$;
$R^9$ is hydrogen or $C_{1-3}$ alkyl;
$R^x$ is hydrogen or $C_{1-6}$ alkyl, which is optionally substituted with one to four substituents independently selected from the group consisting of halo, hydroxyl, methoxy and ethoxy;
m is one or two;
n is an integer from zero to three;
or a pharmaceutically salt thereof.
2. The compound of claim 1 wherein

B is selected from the group consisting of pyrrolyl, pyrazolyl, imidazolyl, triazolyl, isoxazolyl and oxazolyl, wherein said pyrrolyl, pyrazolyl, imidazolyl, triazolyl, isoxazolyl and oxazolyl groups are optionally substituted with one or two substituents independently selected from the group consisting of halo, cyano, $R^x$ and $OR^x$; or a pharmaceutically acceptable salt thereof.

3. The compound of claim 1 wherein

is selected from the group consisting of pyrazolyl, triazolyl or isoxazolyl, wherein said pyrazolyl group is optionally substituted with $R^x$ or $OR^x$; or a pharmaceutically acceptable salt thereof.

4. The compound of claim 1 wherein X is $CR^2$; $R^2$ is cyano, $CONH_2$, fluoropyrazolyl, $R^x$ or $OR^x$; or a pharmaceutically acceptable salt thereof.

5. The compound of claim 1 wherein $R^1$ is chloro, fluoro, methyl or cyano; n is one or two; or a pharmaceutically acceptable salt thereof.

6. The compound of claim 1 wherein Y is

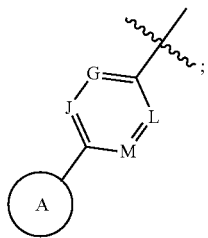

or a pharmaceutically acceptable salt thereof.

7. The compound of claim 1 wherein

is

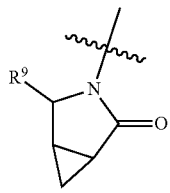

and $R^9$ is hydrogen; or a pharmaceutically acceptable salt thereof.

8. The compound of claim 1 wherein J is N; or a pharmaceutically acceptable salt thereof.

9. The compound of claim 1 selected from any one of

N-((cis)-3-(5-chloro-2-cyanophenyl)cyclobutyl)-1-((2-((1S,5R)-2-oxo-3-azabicyclo[3.1.0]hexan-3-yl)pyrimidin-5-yl)methyl)-1H-pyrazole-4-carboxamide:

N-((cis)-3-(5-chloro-2-cyanophenyl)cyclobutyl)-1-((2-((1R,5S)-2-oxo-3-azabicyclo[3.1.0]hexan-3-yl)pyrimidin-5-yl)methyl)-1H-pyrazole-4-carboxamide;

N-((cis)-3-(5-chloro-2-cyanophenyl)cyclobutyl)-1-((R or S)-1-(2-((1R,5S)-2-oxo-3-azabicyclo[3.1.0]hexan-3-yl)pyrimidin-5-yl)ethyl)-1H-pyrazole-4-carboxamide;

N-((cis)-3-(5-chloro-2-cyanophenyl)cyclobutyl)-1-((S or R)-1-(2-((1R,5S)-2-oxo-3-azabicyclo[3.1.0]hexan-3-yl)pyrimidin-5-yl)ethyl)-1H-pyrazole-4-carboxamide carboxamide;

N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R)-1-(5-methyl-6-((1R,5S)-2-oxo-3-azabicyclo[3.1.0]hexan-3-yl)pyridin-3-yl)ethyl)-1H-psyrazole-4-carboxamide;

N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)-3-methylcyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)-3-methylcyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S)-1-(4-methoxy-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R)-1-(4-methoxy-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(5-methoxy-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-3-methyl-1-((R or S)-1-(2-((1R,5S)-2-oxo-3-azabicyclo[3.1.0]hexan-3-yl)pyrimidin-5-yl)ethyl)-1H-pyrazole-4-carboxamide;

N-((cis)-3-(5-chloro-2-cyanophenyl)cyclobutyl)-3-methyl-1-((S or R)-1-(2-((1R,5S)-2-oxo-3-azabicyclo[3.1.0]hexan-3-yl)pyrimidin-5-yl)ethyl)-1H-pyrazole-4-carboxamide;

N-((cis)-3-(5-chloro-2-cyanophenyl)cyclobutyl)-3-cyano-1-((R or S)-1-(2-((1R,5S)-2-oxo-3-azabicyclo[3.1.0]hexan-3-yl)pyrimidin-5-yl)ethyl)-1H-pyrazole-4-carboxamide;

N-((cis)-3-(5-chloro-2-cyanophenyl)cyclobutyl)-3-cyano-1-((S or R)-1-(2-((1R,5S)-2-oxo-3-azabicyclo[3.1.0]hexan-3-yl)pyrimidin-5-yl)ethyl)-1H-pyrazole-4-carboxamide;

N-((cis)-3-(5-chloro-2-cyanophenyl)cyclobutyl)-3-methyl-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-3-methyl-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(5-fluoro-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(5-fluoro-6-((1R,5S)-2-oxo-3-azabicyclo[3.1.0]hexan-3-yl)pyridin-3-yl)ethyl)-1H-pyrazole-4-carboxamide;

N-((cis)-3-(2-cyano-5-methylphenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(3-methyl-5-((1R,5S)-2-oxo-3-azabicyclo[3.1.0]hexan-3-yl)pyridin-2-yl)ethyl)-1H-pyrazole-4-carboxamide;

N-((cis)-3-(5-chloro-2-cyanophenyl)cyclobutyl)-1-((S or R)-1-(3-methyl-5-((1R,5S)-2-oxo-3-azabicyclo[3.1.0]hexan-3-yl)pyridin-2-yl)ethyl)-1H-pyrazole-4-carboxamide;

N-((cis)-3-(5-chloro-2-cyanophenyl)cyclobutyl)-1-((R or S)-1-(3-fluoro-5-((1R,5S)-2-oxo-3-azabicyclo[3.1.0]hexan-3-yl)pyridin-2-yl)ethyl)-1H-pyrazole-4-carboxamide;

N-((cis)-3-(5-chloro-2-cyanophenyl)cyclobutyl)-1-((S or R)-1-(3-fluoro-5-((1R,5S)-2-oxo-3-azabicyclo[3.1.0]hexan-3-yl)pyridin-2-yl)ethyl)-1H-pyrazole-4-carboxamide;

N-((cis)-3-(5-chloro-2-cyanophenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(5-methyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((S or R)-1-(5-methyl-6-((1R,5S)-2-oxo-3-azabicyclo[3.1.0]hexan-3-yl)pyridazin-3-yl)ethyl)-1H-pyrazole-4-carboxamide;

1-((R or S)-1-(4-methyl-6-((1R,5S)-2-oxo-3-azabicyclo[3.1.0]hexan-3-yl)pyridin-3-yl)ethyl)-N-((cis)-3-(4-methylpyridin-2-yl)cyclobutyl)-1H-pyrazole-4-carboxamide;

1-((S or R)-1-(4-methyl-6-((1R,5S)-2-oxo-3-azabicyclo[3.1.0]hexan-3-yl)pyridin-3-yl)ethyl)-N-((cis)-3-(4-methylpyridin-2-yl)cyclobutyl)-1H-pyrazole-4-carboxamide;

N-((cis)-3-(2-cyano-5-fluorophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(2-cyano-5-fluorophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(2-cyano-5-methylphenyl)cyclobutyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((4-methyl-6-((1R,5S)-2-oxo-3-azabicyclo[3.1.0]hexan-3-yl)pyridin-3-yl)methyl)-1H-pyrazole-4-carboxamide;

N-((cis)-3-(5-chloro-2-cyanophenyl)cyclobutyl)-3-(difluoromethyl)-1-((4-methyl-6-((1R,5S)-2-oxo-3-azabicyclo[3.1.0]hexan-3-yl)pyridin-3-yl)methyl)-1H-pyrazole-4-carboxamide;

N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((R or S)-1-(5-methoxy-4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((S or R)-1-(5-methoxy-4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(2-cyano-5-methylphenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-pyrazole-4-carboxamide;

N-((cis)-3-(2-cyano-5-methylphenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-3-(methoxymethyl)-1-((R or S)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(5-chloro-2-cyanophenyl)cyclobutyl)-3-(methoxymethyl)-1-((S or R)-1-(4-methyl-6-((1R,5S)-2-oxo-3-azabicyclo[3.1.0]hexan-3-yl)pyridin-3-yl)ethyl)-1H-pyrazole-4-carboxamide;

N-((cis)-3-(3-cyano-6-methylpyridin-2-yl)cyclobutyl)-1-((R or S)-1-(6-methyl-5-((1R,5S)-2-oxo-3-azabicyclo[3.1.0]hexan-3-yl)pyrazin-2-yl)ethyl)-1H-pyrazole-4-carboxamide;

N-((cis)-3-(3-cyano-6-methylpyridin-2-yl)cyclobutyl)-1-((S or R)-1-(6-methyl-5-((1R,5S)-2-oxo-3-azabicyclo[3.1.0]hexan-3-yl)pyrazin-2-yl)ethyl)-1H-pyrazole-4-carboxamide;

N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-pyrazole-4-carboxamide;

N-((cis)-3-(5-chloro-2-cyanophenyl)cyclobutyl)-1-((R)-1-(5-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S)-1-(5-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-(2-(5-methyl-6-((1R,5S)-2-oxo-3-azabicyclo[3.1.0]hexan-3-yl)pyridin-3-yl)propan-2-yl)-1H-1,2,3-triazole-4-carboxamide;

N-((1R,3S)-3-(5-chloro-2-cyanophenyl)cyclopentyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((1R,3S)-3-(5-chloro-2-cyanophenyl)cyclopentyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-(difluoromethoxy)phenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-(difluoromethoxy)phenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-(difluoromethyl)phenyl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-(difluoromethyl)phenyl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(4-chloropyridin-2-yl)cyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(4-chloropyridin-2-yl)cyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-(cis)-3-(5-chloro-2-cyanophenyl)-3-fluorocyclobutyl)-1-((R or S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-(cis)-3-(5-chloro-2-cyanophenyl)-3-fluorocyclobutyl)-1-((S or R)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R)-1-(2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)cyclobutyl)-1-((S)-1-(2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)cyclobutyl)-1-((2-((1R,5S)-2-oxo-3-azabicyclo[3.1.0]hexan-3-yl)pyrimidin-5-yl)methyl)-1H-1,2,3-triazole-4-carboxamide;

N-((cis)-3-(5-chloro-2-cyanophenyl)cyclobutyl)-1-((R or S)-1-(4-methyl-2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)cyclobutyl)-1-((S or R)-1-(4-methyl-2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)-3-methylcyclobutyl)-1-((R or S)-1-(4-methyl-2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)-3-methylcyclobutyl)-1-((S or R)-1-(4-methyl-2-((1R,5S)-2-oxo-3-azabicyclo[3.1.0]hexan-3-yl)pyrimidin-5-yl)ethyl)-1H-1,2,3-triazole-4-carboxamide;

N-((cis)-3-(5-chloro-2-cyanophenyl)cyclobutyl)-1-((R)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)cyclobutyl)-1-((S)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(4-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(4-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(3-methyl-5-((1R,5S)-2-oxo-3-azabicyclo[3.1.0]hexan-3-yl)pyridin-2-yl)ethyl)-1H-1,2,3-triazole-4-carboxamide;

N-((cis)-3-(5-chloro-2-cyanophenyl)cyclobutyl)-1-((S or R)-1-(3-methyl-5-((1R,5S)-2-oxo-3-azabicyclo[3.1.0]hexan-3-yl)pyridin-2-yl)ethyl)-1H-1,2,3-triazole-4-carboxamide;

N-((cis)-3-(5-chloro-2-cyanophenyl)cyclobutyl)-1-((R or S)-1-(3-fluoro-5-((1R,5S)-2-oxo-3-azabicyclo[3.1.0]hexan-3-yl)pyridin-2-yl)ethyl)-1H-1,2,3-triazole-4-carboxamide;

N-((cis)-3-(5-chloro-2-cyanophenyl)cyclobutyl)-1-((S or R)-1-(3-fluoro-5-((1R,5S)-2-oxo-3-azabicyclo[3.1.0]hexan-3-yl)pyridin-2-yl)ethyl)-1H-1,2,3-triazole-4-carboxamide;

N-((cis)-3-(5-chloro-2-cyanophenyl)cyclobutyl)-1-((R or S)-1-(2-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(2-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R and S)-1-(5-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(5-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(5-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(5-fluoro-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(5-fluoro-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((R or S)-1-(5-methoxy-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((S or R)-1-(5-methoxy-6-((1R,5S)-2-oxo-3-azabicyclo[3.1.0]hexan-3-yl)pyridin-3-yl)ethyl)-1H-1,2,3-triazole-4-carboxamide;

1-((R or S)-1-(5-amino-6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide;

1-((S or R)-1-(5-amino-6-((1R,5S)-2-oxo-3-azabicyclo[3.1.0]hexan-3-yl)pyridin-3-yl)ethyl)-N-((cis)-3-(5-chloro-2-cyanophenyl)cyclobutyl)-1H-1,2,3-triazole-4-carboxamide;

N-((cis)-3-(5-chloro-2-cyanophenyl)-3-methylcyclobutyl)-1-((R or S)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)-3-methylcyclobutyl)-1-((S or R)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)cyclobutyl)-1-((R or S)-1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(5-methoxy-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((R or S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((S or R)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((R or S)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(3-cyano-6-methylpyridin-2-yl)cyclobutyl)-1-((S or R)-1-(6-methyl-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)cyclobutyl)-1-((R or S)-1-(4-methyl-6-((1R,5S)-2-oxo-3-azabicyclo[3.1.0]hexan-3-yl)pyridazin-3-yl)ethyl)-1H-1,2,3-triazole-4-carboxamide;

N-((cis)-3-(5-chloro-2-cyanophenyl)cyclobutyl)-1-((S or R)-1-(4-methyl-6-((1R,5S)-2-oxo-3-azabicyclo[3.1.0]hexan-3-yl)pyridazin-3-yl)ethyl)-1H-1,2,3-triazole-4-carboxamide;

N-((cis)-3-(2-cyano-5-methylphenyl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(6-methoxy-5-((1R,5S)-2-oxo-3-azabicyclo[3.1.0]hexan-3-yl)pyrazin-2-yl)ethyl)-1H-1,2,3-triazole-4-carboxamide;

N-((cis)-3-(5-chloro-2-cyanophenyl)cyclobutyl)-1-((S or R)-1-(6-methoxy-5-((1R,5S)-2-oxo-3-azabicyclo[3.1.0]hexan-3-yl)pyrazin-2-yl)ethyl)-1H-1,2,3-triazole-4-carboxamide;

N-((1R,2R,3R or 1S,2S,3S)-3-(3-chlorophenyl)-2-hydroxycyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((1S,2S,3S or 1R,2R,3R)-3-(3-chlorophenyl)-2-hydroxycyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((1R,2R,3R or 1S,2S,3S)-3-(3-chlorophenyl)-2-hydroxycyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((1S,2S,3S or 1R,2R,3R)-3-(3-chlorophenyl)-2-hydroxycyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((cis)-3-(3-cyano-6-methylpyridin-2-yl)cyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((1R,2R,3R or 1S,2S,3S))-3-(3-chlorophenyl)-2-hydroxycyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((1S,2S,3S or 1R,2R,3R))-3-(3-chlorophenyl)-2-hydroxycyclobutyl)-1-((R or S)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((1R,2R,3R or 1S,2S,3S))-3-(3-chlorophenyl)-2-hydroxycyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((1S,2S,3S or 1R,2R,3R))-3-(3-chlorophenyl)-2-hydroxycyclobutyl)-1-((S or R)-1-(4,5-dimethyl-6-((1R,5S)-2-oxo-3-azabicyclo[3.1.0]hexan-3-yl)pyridazin-3-yl)ethyl)-1H-1,2,3-triazole-4-carboxamide;

N-((cis)-3-(2-cyano-5-methylphenyl)cyclobutyl)-1-((R or S)-1-(5-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)cyclobutyl)-1-((S or R)-1-(5-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((R or S)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(3-cyano-6-methylpyridin-2-yl)cyclobutyl)-1-((S or R)-1-(5-fluoro-4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R)-1-(5-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S)-1-(5-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((R or S)-1-(6-methyl-5-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl)-1-((S or R)-1-(6-methyl-5-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-cyano-5-methylphenyl)-3-methylcyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(2-carbamoyl-5-chlorophenyl)-3-methylcyclobutyl)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis or trans)-3-(5-chloro-2-cyanophenyl)-3-methylcyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((trans or cis)-3-(5-chloro-2-cyanophenyl)-3-methylcyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl-3-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-cyanophenyl)cyclobutyl-1-d)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-((cis)-3-(5-chloro-2-(4-fluoro-1H-pyrazol-1-yl)phenyl)cyclobutyl)-1-((S)-1-(4-methyl-6-((1R,5S)-2-oxo-3-azabicyclo[3.1.0]hexan-3-yl)pyridin-3-yl)ethyl)-1H-1,2,3-triazole-4-carboxamide;

N-(5-(5-chloro-2-cyanophenyl)bicyclo[3.1.1]heptan-1-yl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;

N-((1R,2R,3R or 1S,2S,3S))-3-(3-chlorophenyl)-2-hydroxycyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;
N-((1S,2S,3S or 1R,2R,3R))-3-(3-chlorophenyl)-2-hydroxycyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-1-((R)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide;
N-((cis)-3-(5-chloro-2-cyanophenyl)cyclobutyl)-1-((S)-3-((1R,5S)-2-oxo-3-azabicyclo[3.1.0]hexan-3-yl)-6,7-dihydro-5H-cyclopenta[c]pyridin-7-yl)-1H-1,2,3-triazole-4-carboxamide;
N-((cis)-3-(5-chloro-2-cyanophenyl)cyclobutyl)-1-((R)-2-hydroxy-1-(6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-1-((S)-2-hydroxy-1-(6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-5-((R)-1-hydroxy-1-(5-methyl-6-((1R,5S)-2-oxo-3-azabicyclo[3.1.0]hexan-3-yl)pyridin-3-yl)ethyl)isoxazole-3-carboxamide;
N-((cis)-3-(5-chloro-2-cyanophenyl)cyclobutyl)-5-((S)-1-hydroxy-1-(5-methyl-6-((1R,5S)-2-oxo-3-azabicyclo[3.1.0]hexan-3-yl)pyridin-3-yl)ethyl)isoxazole-3-carboxamide;
N-(cis)-3-(2-carbamoyl-5-chlorophenyl)cyclobutyl)-1-((S)-1-(4,5-dimethyl-6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)cyclopropyl)-1H-pyrazole-4-carboxamide;
N-((cis)-3-(5-chloro-2-cyanophenyl)cyclobutyl)-1-(1-(4-methyl-6-((1R,5S)-2-oxo-3-azabicyclo[3.1.0]hexan-3-yl)pyridin-3-yl)cyclopropyl)-1H-1,2,3-triazole-4-carboxamide;
N-((cis)-3-(5-chloro-2-cyanophenyl)cyclobutyl)-1-((R)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide;
N-((cis)-3-(5-chloro-2-cyanophenyl)cyclobutyl)-1-((S)-1-(1,5-dimethyl-2-((1R,5S)-2-oxo-3-azabicyclo[3.1.0]hexan-3-yl)-1H-imidazol-4-yl)ethyl)-1H-1,2,3-triazole-4-carboxamide;
N-((cis)-3-(5-chloro-2-cyanophenyl)cyclobutyl)-1-((R)-1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-1-((S)-1-(5-hydroxy-4-methyl-6-((1R,5S)-2-oxo-3-azabicyclo[3.1.0]hexan-3-yl)pyridin-3-yl)ethyl)-1H-1,2,3-triazole-4-carboxamide;
N-((cis)-3-(5-chloro-2-cyanophenyl)cyclobutyl)-1-((R)-1-(4-fluoro-5-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-1-((S)-1-(4-fluoro-5-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-1-((R)-1-(5-chloro-4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-1-((S)-1-(5-chloro-4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-3-((S)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-3-((R)-1-hydroxyethyl)-1-((R)-1-(4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-3-((R)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-3-((S)-1-hydroxyethyl)-1-((S)-1-(4-methyl-6-((1R,5S)-2-oxo-3-azabicyclo[3.1.0]hexan-3-yl)pyridin-3-yl)ethyl)-1H-pyrazole-4-carboxamide;
N-((cis)-3-(5-chloro-2-cyanophenyl)cyclobutyl)-1-methyl-3-((S)-1-(4-methyl-6-((1R,5S)-2-oxo-3-azabicyclo[3.1.0]hexan-3-yl)pyridin-3-yl)ethyl)-1H-pyrazole-5-carboxamide; and
N-((cis)-3-(5-chloro-2-cyanophenyl)cyclobutyl)-1-methyl-3-((R)-1-(4-methyl-6-((1R,5S)-2-oxo-3-azabicyclo[3.1.0]hexan-3-yl)pyridin-3-yl)ethyl)-1H-pyrazole-5-carboxamide
or a pharmaceutically acceptable salt thereof.

10. A pharmaceutical composition comprising a compound of claim 1 or a pharmaceutically acceptable salt thereof and a pharmaceutically acceptable carrier.

11. The composition of claim 10 further comprising another agent selected from the group consisting of anti-inflammatory agents, anti-VEGF agents, immunosuppressive agents, anticoagulants, antiplatelet agents, and thrombolytic agents.

12. A method for treating impaired visual activity, diabetic retinopathy, diabetic macular edema, retinal vein occlusion, hereditary angioedema, pancreatitis, cerebral hemorrhage, nephropathy, cardiomyopathy, neuropathy, inflammatory bowel disease, arthritis, inflammation, septic shock, hypotension, adult respiratory distress syndrome, disseminated intravascular coagulation, blood coagulation during cardiopulmonary bypass surgery, or bleeding from postoperative surgery in a mammal, comprising administering a composition of claim 10 to a mammal in need of thereof.

13. The method of claim 12 further comprising another agent selected from the group consisting of anti-inflammatory agents, anti-VEGF agents, immunosuppressive agents, anticoagulants, antiplatelet agents, and thrombolytic agents.

14. A method for treating hereditary angioedema, uveitis, posterior uveitis, wet age related macular edema, diabetic macular edema, diabetic retinopathy and retinal vein occlusion in a mammal comprising administering a composition of claim 10 to a mammal in need thereof.

15. A method of treating diabetic retinopathy in a mammal comprising administering a composition of claim 10 to a mammal in need thereof.

16. A method of treating diabetic macular edema in a mammal comprising administering a composition of claim 10 to a mammal in need thereof.

* * * * *